(12) United States Patent
Browy

(10) Patent No.: US 11,455,137 B2
(45) Date of Patent: Sep. 27, 2022

(54) SYSTEMS AND METHODS FOR VIRTUAL AND AUGMENTED REALITY

(71) Applicant: Magic Leap, Inc., Plantation, FL (US)

(72) Inventor: Eric C. Browy, Meridian, ID (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/541,095

(22) Filed: Dec. 2, 2021

(65) Prior Publication Data

US 2022/0261200 A1 Aug. 18, 2022

Related U.S. Application Data

(63) Continuation of application No. 16/729,192, filed on Dec. 27, 2019, now Pat. No. 11,221,814.

(60) Provisional application No. 62/785,370, filed on Dec. 27, 2018.

(51) Int. Cl.
| | | |
|---|---|---|
| *H04N 13/04* | (2006.01) | |
| *G06F 3/14* | (2006.01) | |
| *G06F 3/01* | (2006.01) | |
| *H04B 7/155* | (2006.01) | |
| *G06K 9/62* | (2022.01) | |
| *H04L 67/10* | (2022.01) | |

(52) U.S. Cl.
CPC ............. *G06F 3/14* (2013.01); *G06F 3/011* (2013.01); *G06K 9/6256* (2013.01); *H04B 7/155* (2013.01); *H04L 67/10* (2013.01)

(58) Field of Classification Search
None
See application file for complete search history.

(56) References Cited

U.S. PATENT DOCUMENTS

| | | |
|---|---|---|
| 8,696,113 B2 | 4/2014 | Lewis |
| 8,733,927 B1 | 5/2014 | Lewis |
| 8,733,928 B1 | 5/2014 | Lewis |
| 9,658,473 B2 | 5/2017 | Lewis |
| 10,185,147 B2 | 1/2019 | Lewis |
| 11,221,814 B2 | 1/2022 | Browy |
| 11,328,475 B2 | 5/2022 | Huang et al. |
| 2013/0278631 A1 | 10/2013 | Border |

(Continued)

FOREIGN PATENT DOCUMENTS

| | | |
|---|---|---|
| WO | 2019164498 A1 | 8/2019 |
| WO | 2021077024 A1 | 4/2021 |

OTHER PUBLICATIONS

European Search Report dated Feb. 1, 2022, for EP Application No. 19903486.9, nine pages.

(Continued)

*Primary Examiner* — Carl Adams
(74) *Attorney, Agent, or Firm* — Morrison & Foerster LLP

(57) ABSTRACT

Disclosed herein are systems and methods for distributed computing and/or networking for mixed reality systems. A method may include capturing an image via a camera of a head-wearable device. Inertial data may be captured via an inertial measurement unit of the head-wearable device. A position of the head-wearable device can be estimated based on the image and the inertial data via one or more processors of the head-wearable device. The image can be transmitted to a remote server. A neural network can be trained based on the image via the remote server. A trained neural network can be transmitted to the head-wearable device.

18 Claims, 113 Drawing Sheets

(56) References Cited

U.S. PATENT DOCUMENTS

| | | | |
|---|---|---|---|
| 2014/0139621 A1 | 5/2014 | Shinozaki et al. | |
| 2016/0295038 A1 | 10/2016 | Rao | |
| 2017/0084074 A1 | 3/2017 | Hwang | |
| 2017/0270715 A1 | 9/2017 | Lindsay | |
| 2017/0307333 A1 | 10/2017 | Northrup | |
| 2018/0053056 A1 | 2/2018 | Rabinovich et al. | |
| 2018/0144649 A1 | 5/2018 | El Kaliouby | |
| 2018/0158197 A1 | 6/2018 | Dasgupta | |
| 2018/0293756 A1 | 10/2018 | Liu | |
| 2018/0319495 A1 | 11/2018 | Tu | |
| 2019/0096081 A1 | 3/2019 | Gupta | |
| 2019/0130639 A1* | 5/2019 | Boyce | G06F 3/013 |
| 2019/0197196 A1 | 6/2019 | Yang | |
| 2020/0039522 A1 | 2/2020 | Nakaoka et al. | |
| 2020/0045289 A1 | 2/2020 | Raziel et al. | |
| 2021/0118218 A1 | 4/2021 | Huang et al. | |

OTHER PUBLICATIONS

International Preliminary Report on Patentability and Written Opinion dated Apr. 28, 2022, for PCT Application No. PCT/US/2020/056163, filed Oct. 16, 2020, eight pages.

Azuma, Ronald T. (Aug. 1997). "A Survey of Augmented Reality," In Presence: Teieoperators and Virtual Environments 6, 4, Hughes Research Laboratories, Malibu, CA, located at: https://web.archive.org/web/20010604100006/http://www.cs.unc.edu/-azuma/ARpresence.pdf, retrieved on Oct. 26, 2020.

Azuma, Ronald T. (Feb. 1995). "Predictive Tracking for Augmented Reality," Department of Computer Science, UNC-Chapel Hill, Chapel Hill, NC, 262 pages.

Bimber, Oliver et al. (2005). "Spatial Augmented Reality: Merging Real and Virtual Worlds," A. K. Peters, Ltd., Wellesley, MA.

Final Office Action dated Feb. 8, 2021, for U.S. Appl. No. 16/729,192, filed Dec. 27, 2019, eight pages.

International Preliminary Report and Written Opinion dated Jul. 8, 2021, for PCT Application No. PCT/US2019/068812, filed Dec. 27, 2019, seven pages.

International Search Report and Written Opinion dated Jan. 21, 2021, for PCT Application No. PCT/US20/56163, filed Oct. 16, 2020, thirteen pages.

International Search Report and Written Opinion dated Mar. 12, 2020, for PCT Application No. PCT/US19/68812, filed Dec. 27, 2019, seven five pages.

Non-Finai Office Action dated May 25, 2021, for U.S. Appl. No. 16/729,192, filed Dec. 27, 2019, ten pages.

Non-Final Office Action dated Nov. 24, 2021, for U.S. Appl. No. 17/072,825, filed Oct. 16, 2020, six pages.

Non-Final Office Action dated Sep. 16, 2020 for U.S. Appl. No. 16/729,192, filed Dec. 27, 2019, seven pages.

Notice of Allowance dated Sep. 7, 2021, for U.S. Appl. No. 16/729,192, filed Dec. 27, 2019, eight pages.

Notice of Allowance dated Mar. 22, 2022, for U.S. Appl. No. 17/072,825, filed Oct. 16, 2020, nine pages.

* cited by examiner

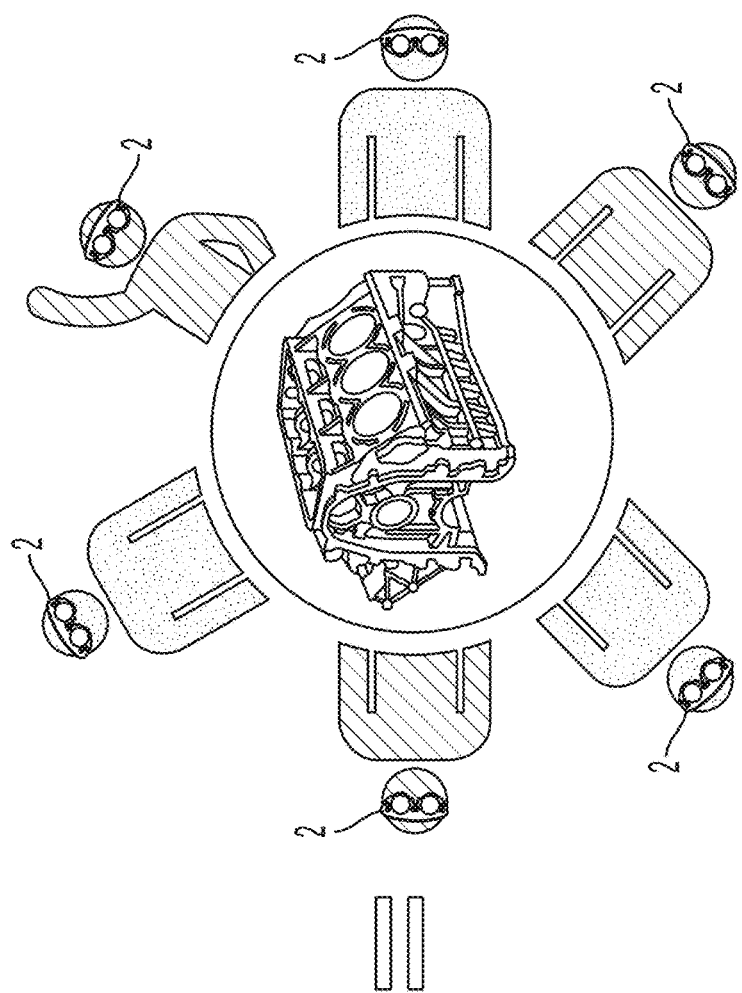
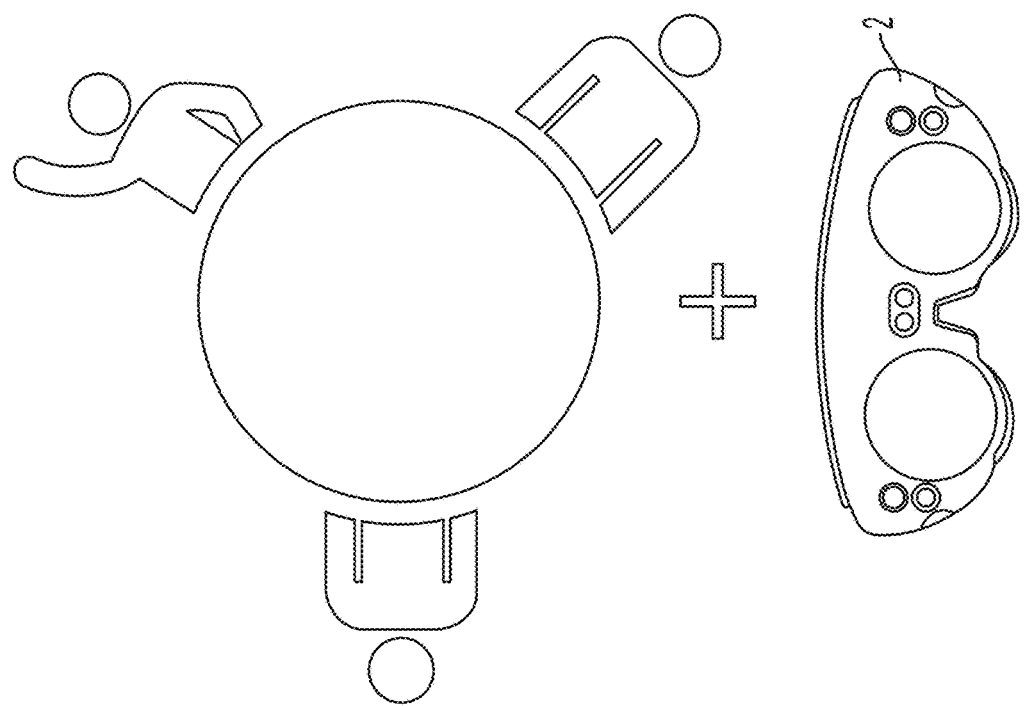
Figure 12

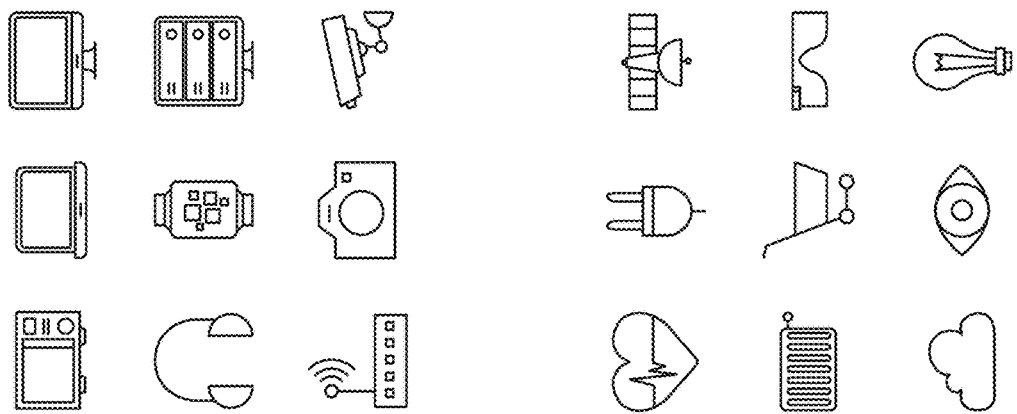
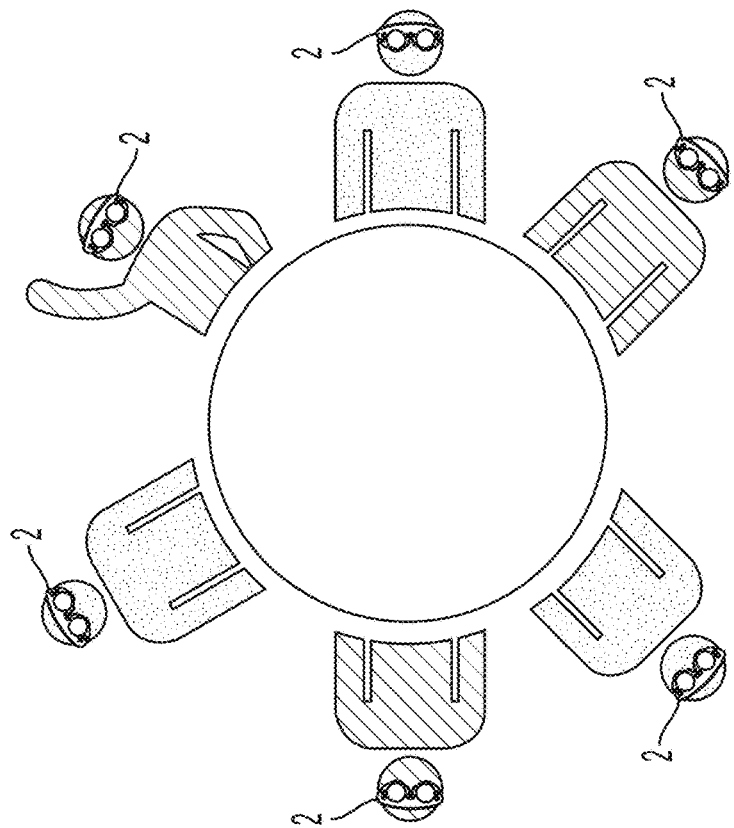
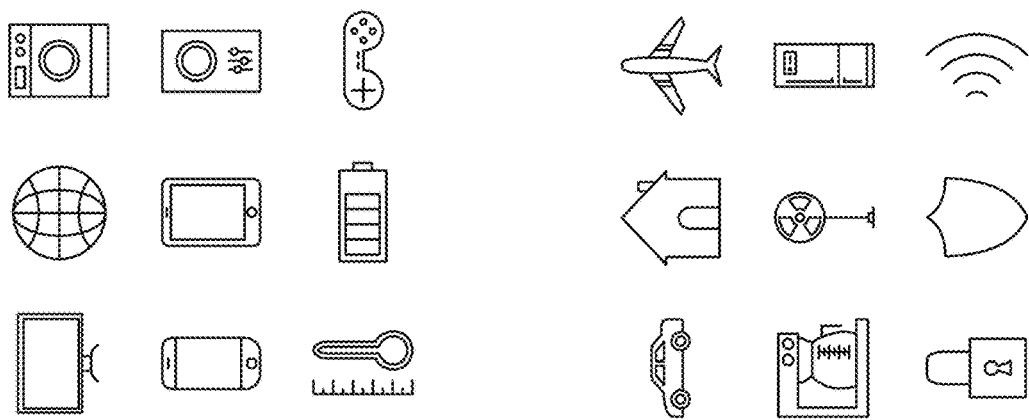
Figure 14

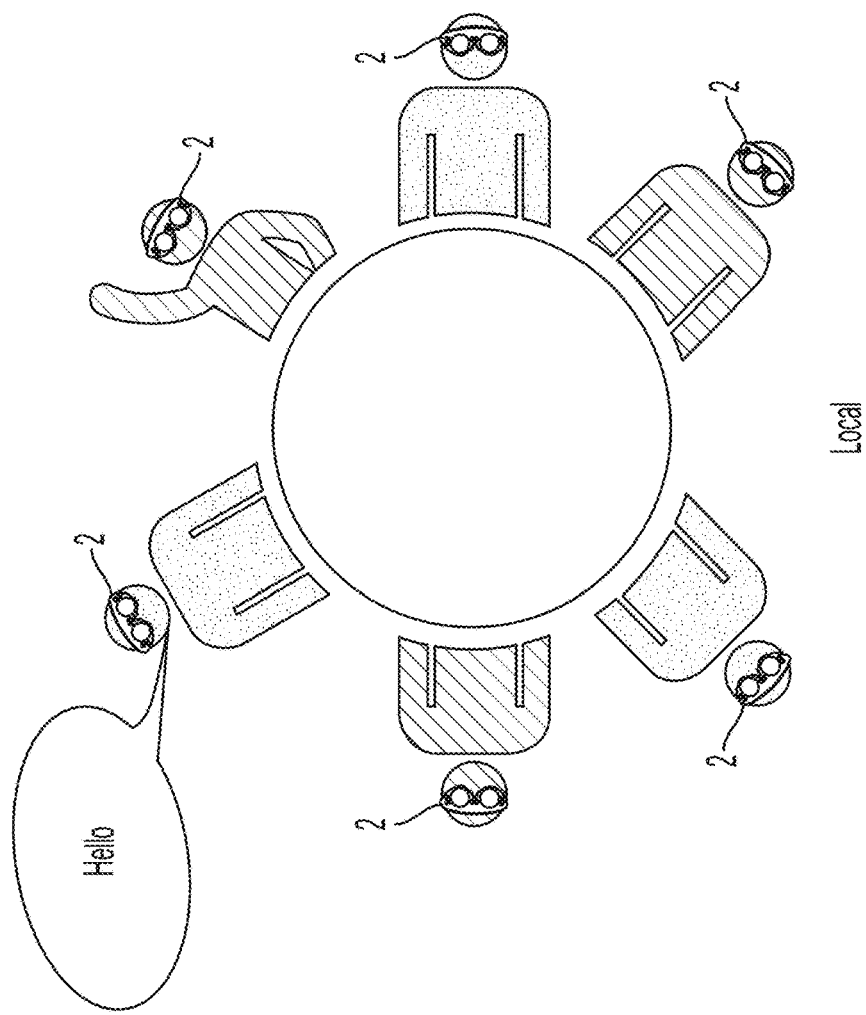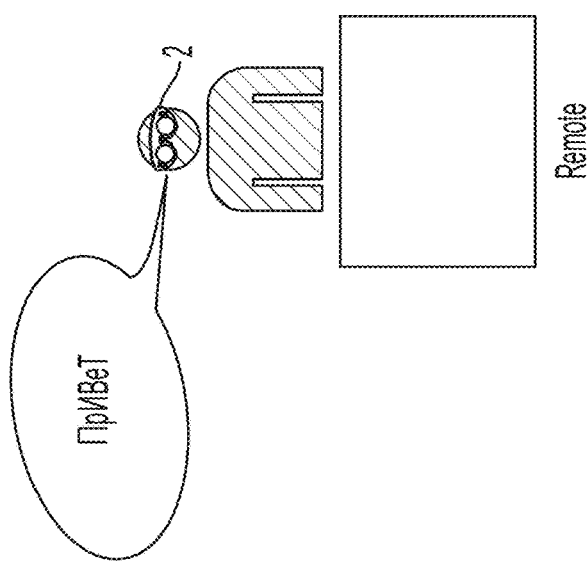
Figure 15

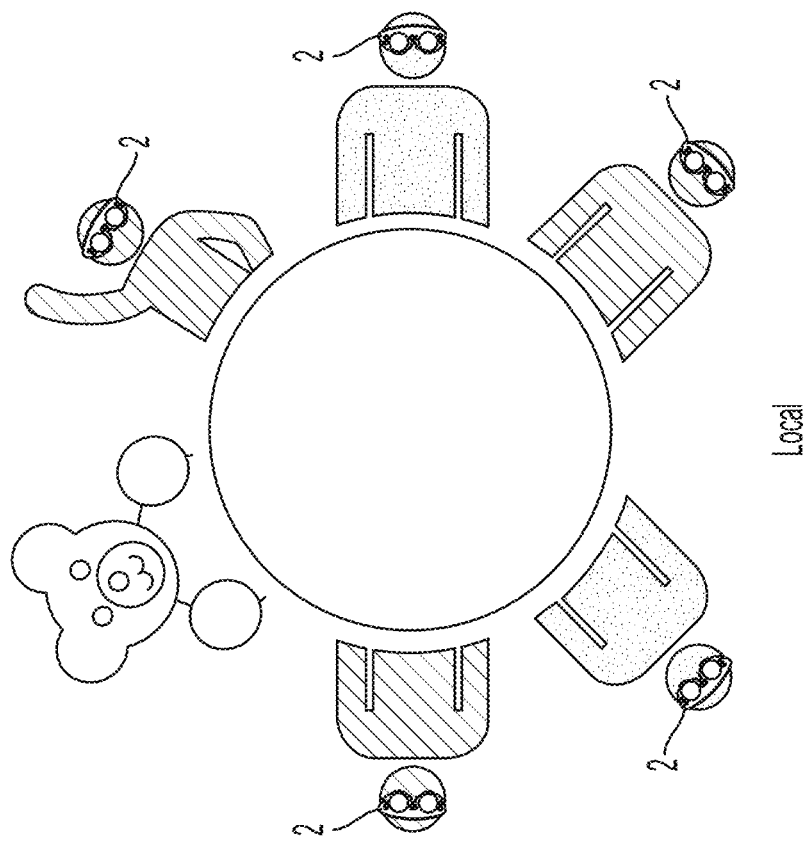
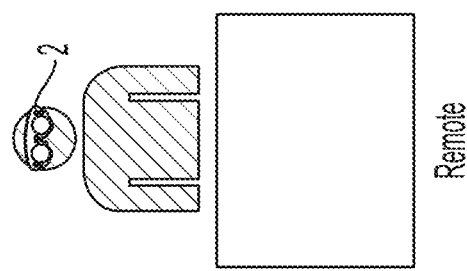
Figure 16

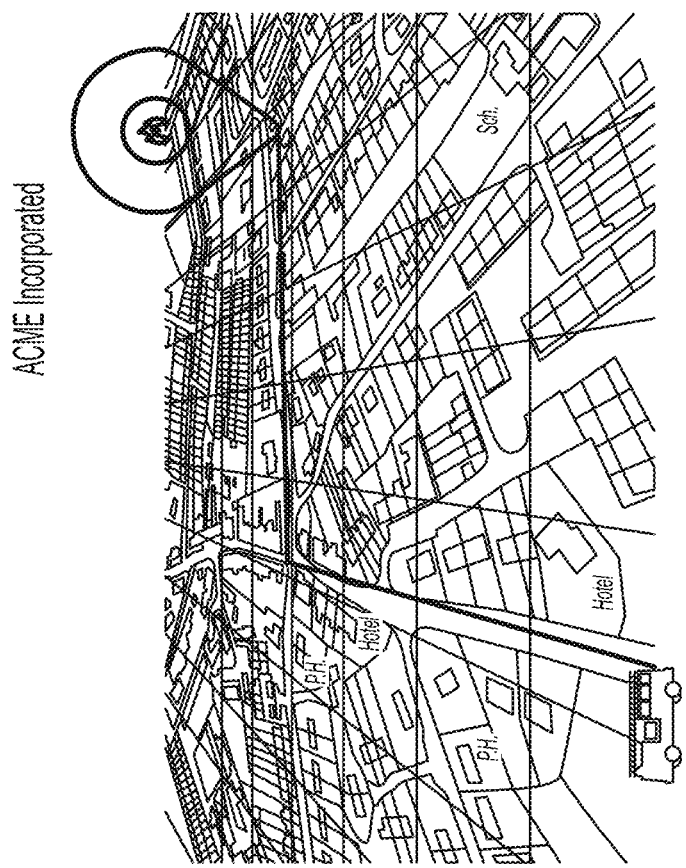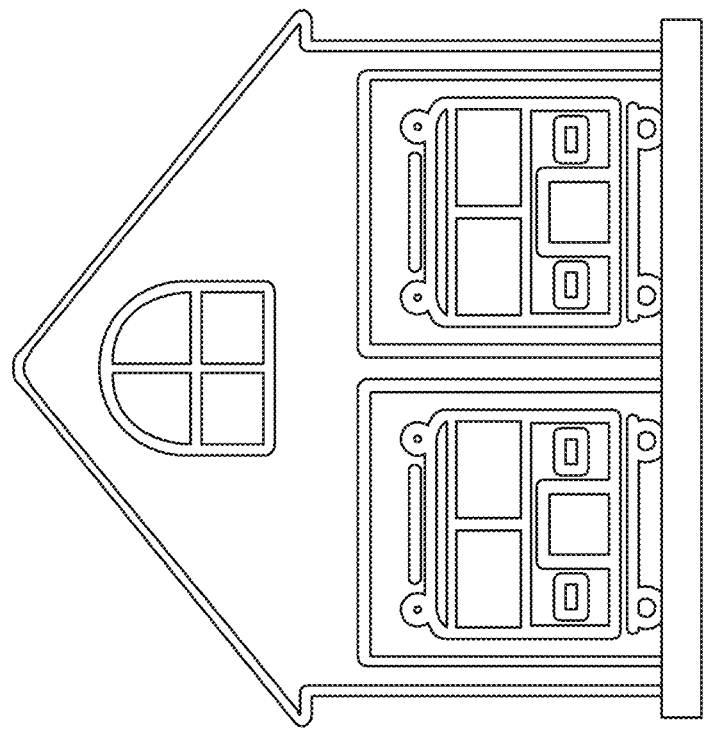
Figure 22

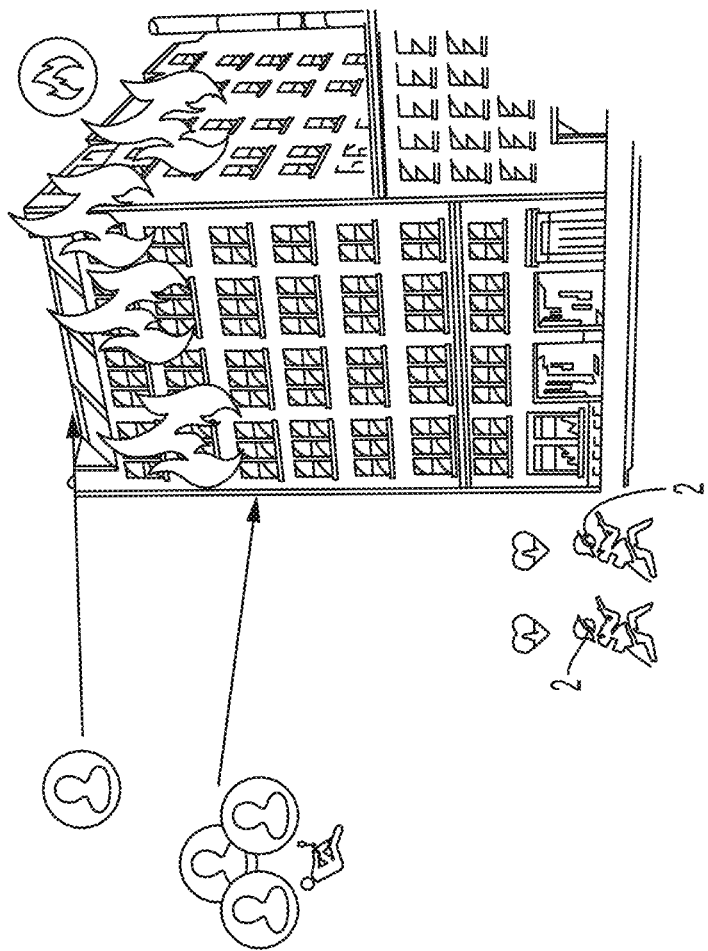
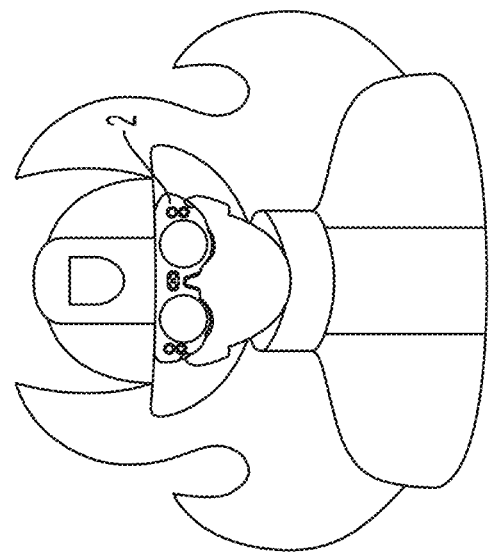
Figure 24

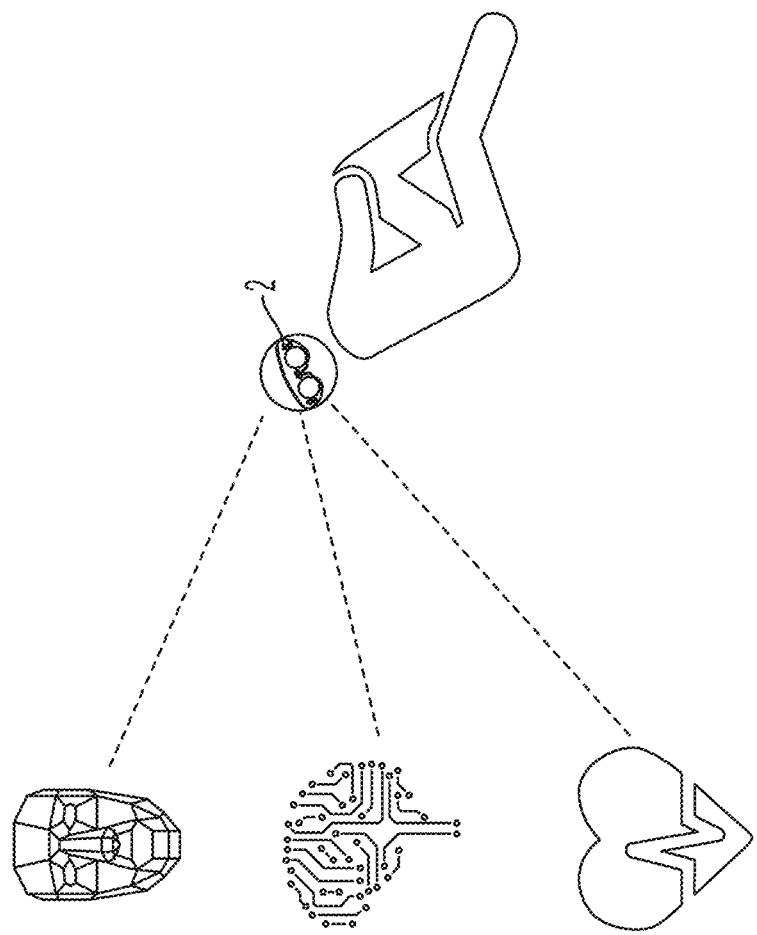
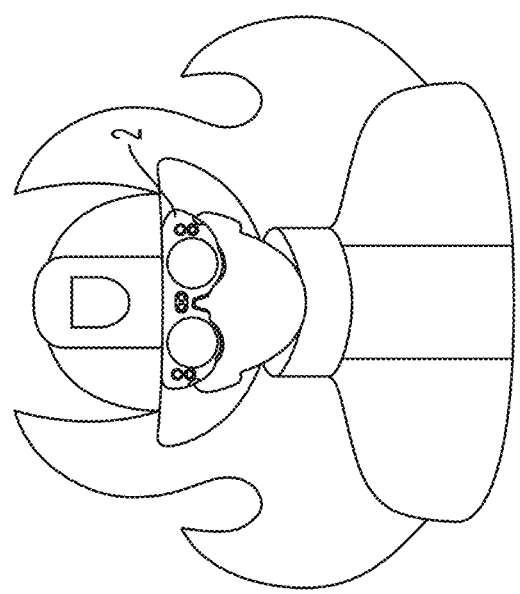
Figure 26

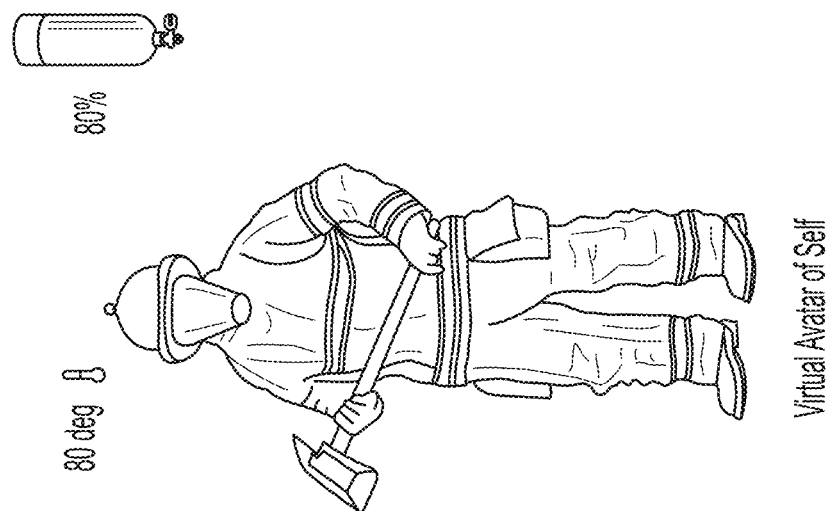
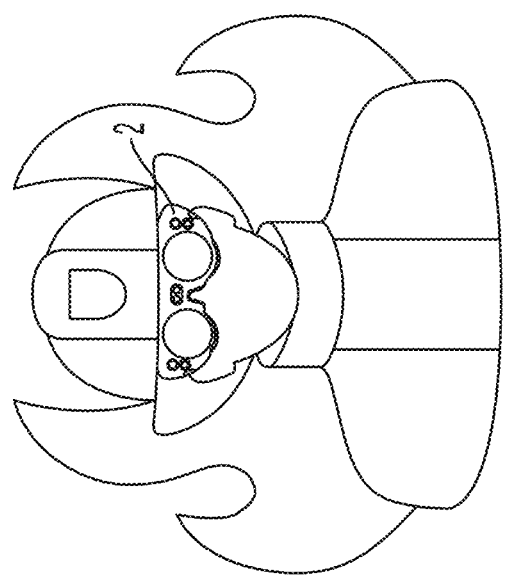
Figure 30

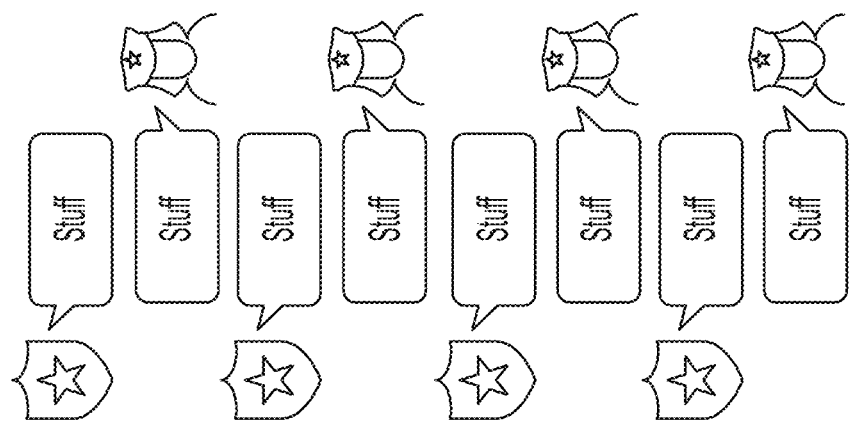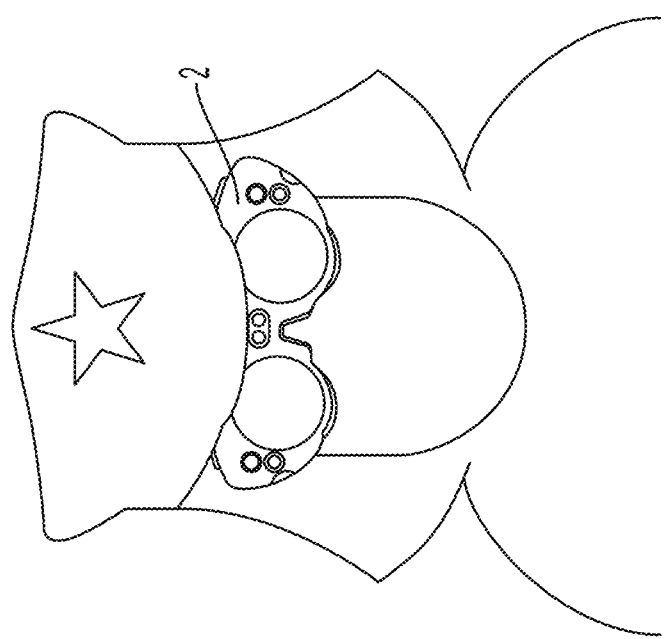
Figure 31

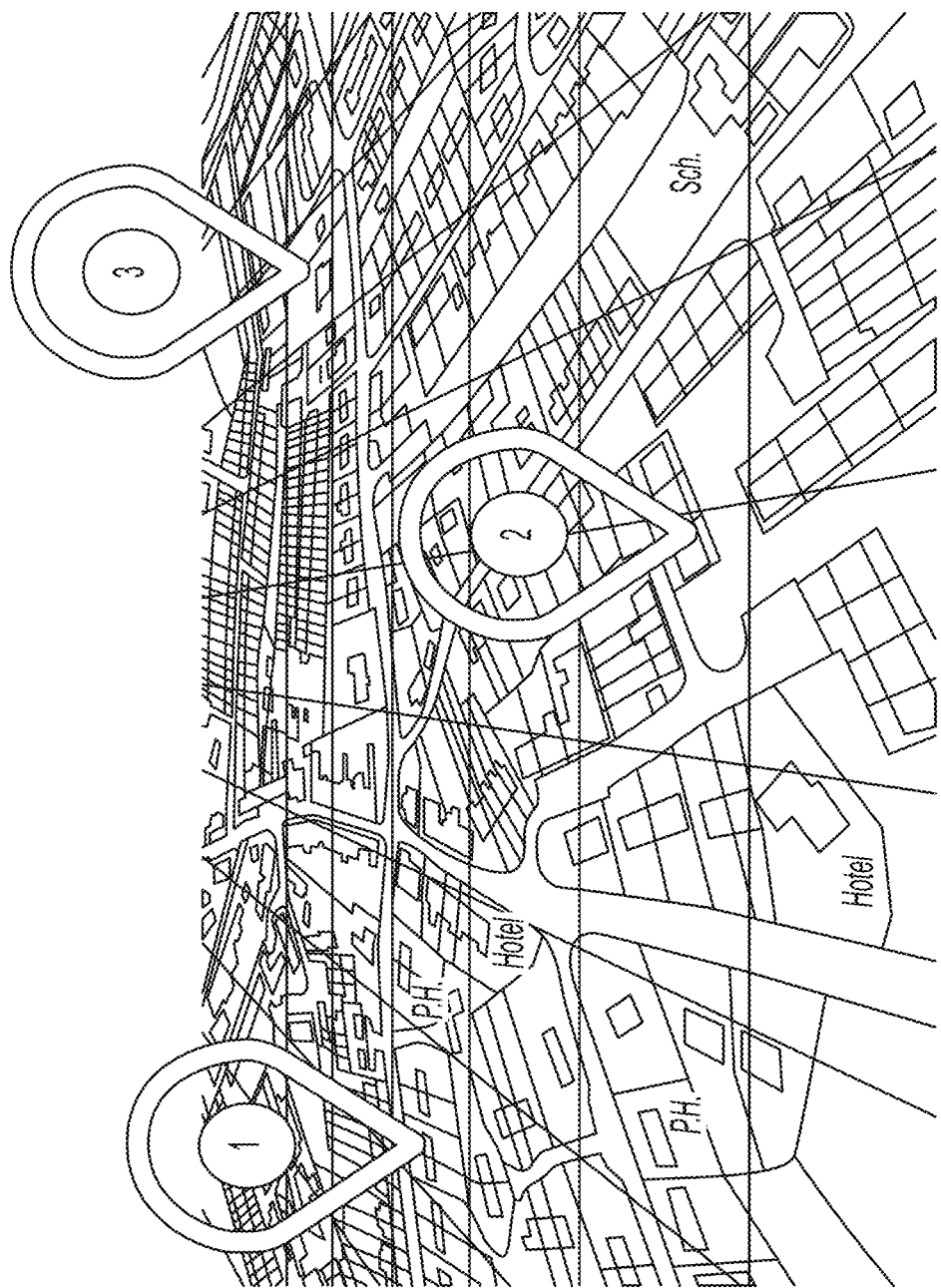
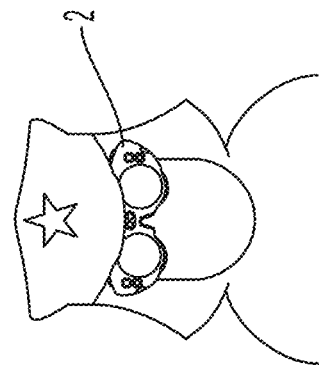
Figure 39

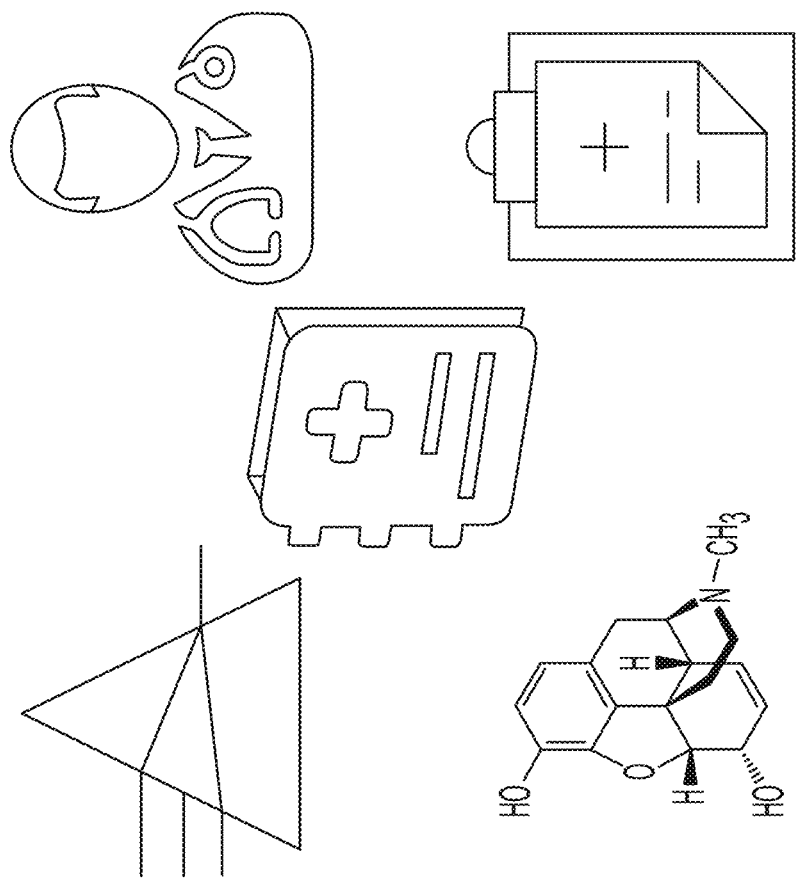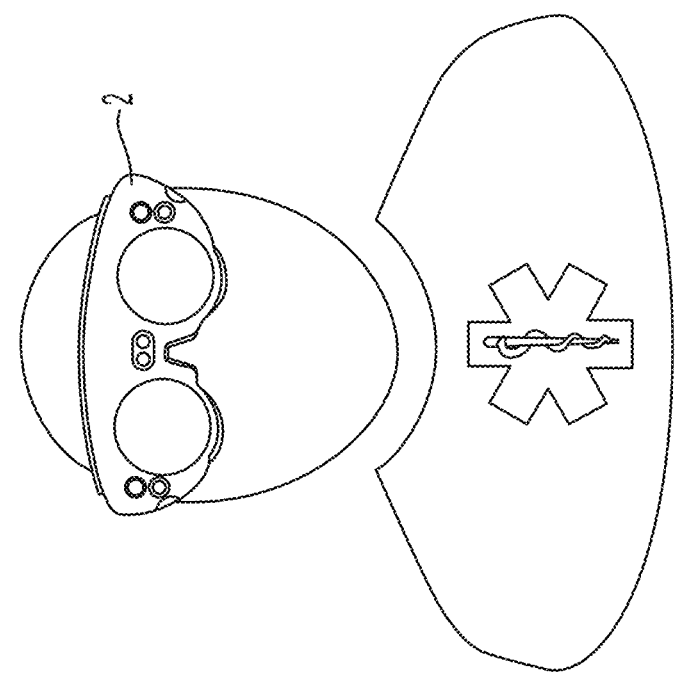
Figure 40

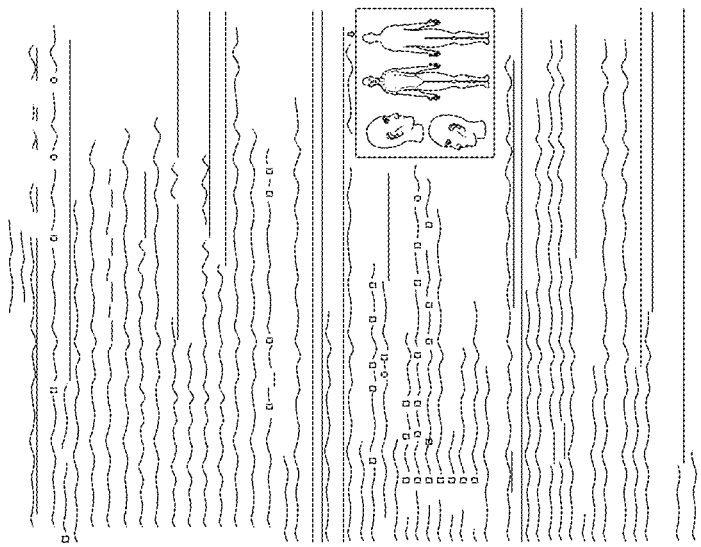
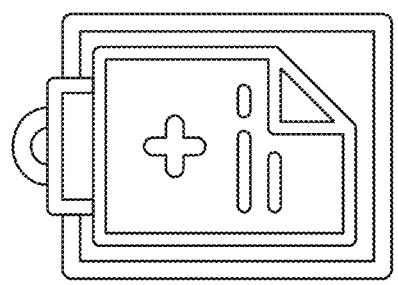
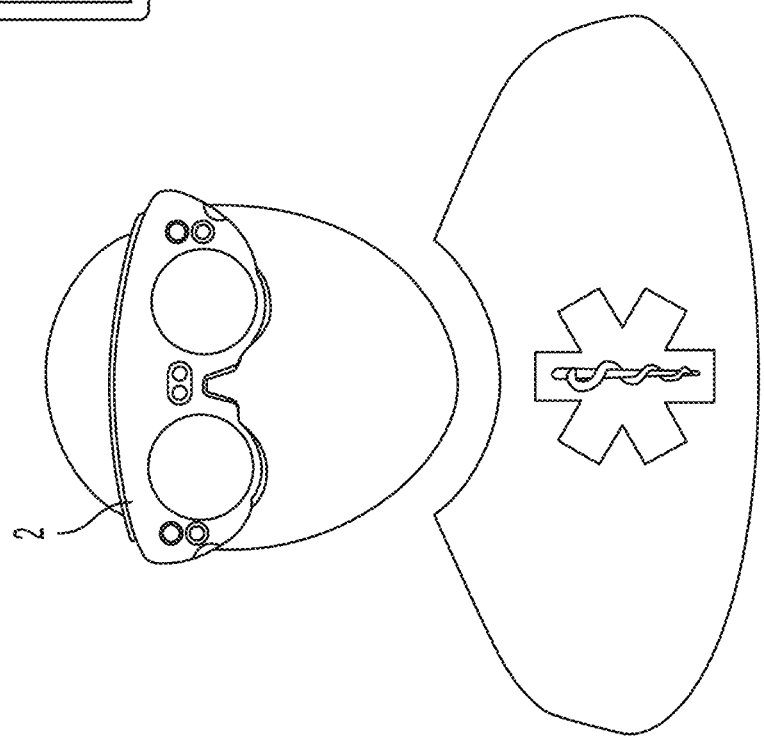
Full Patient History
Figure 41

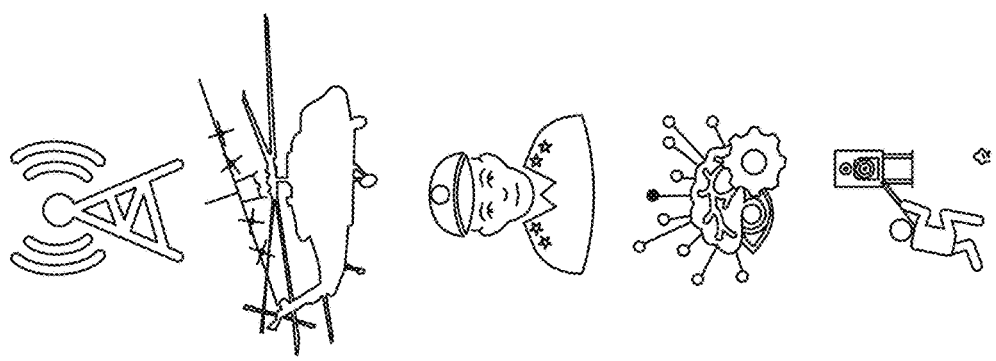
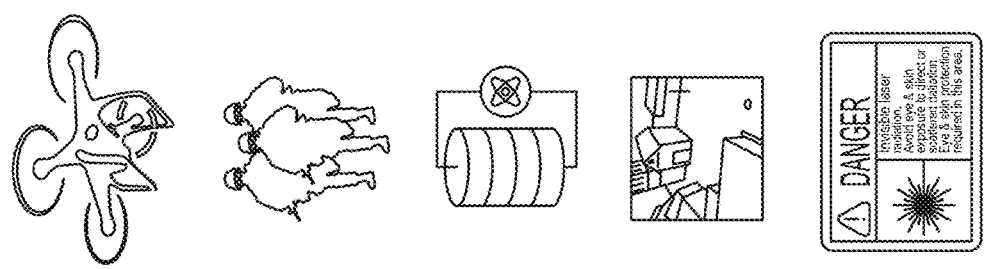
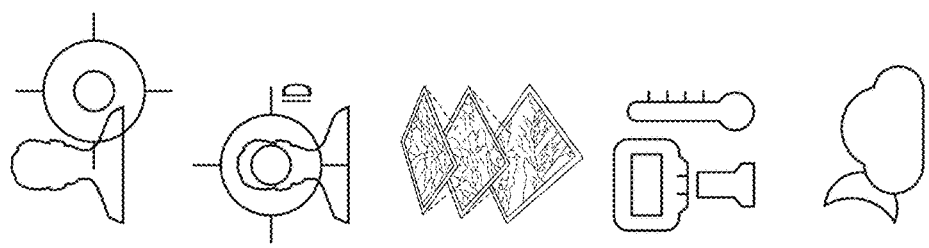
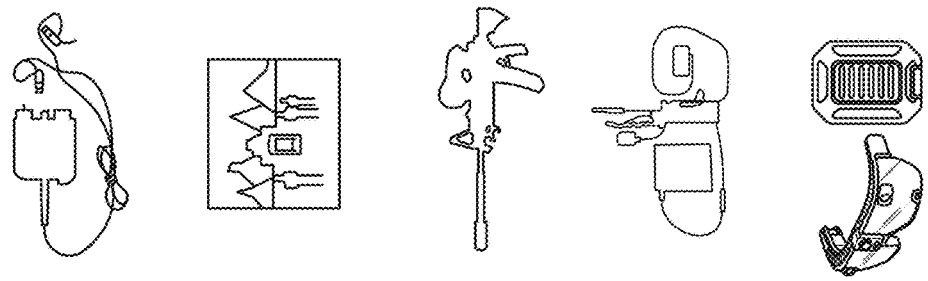
Figure 46

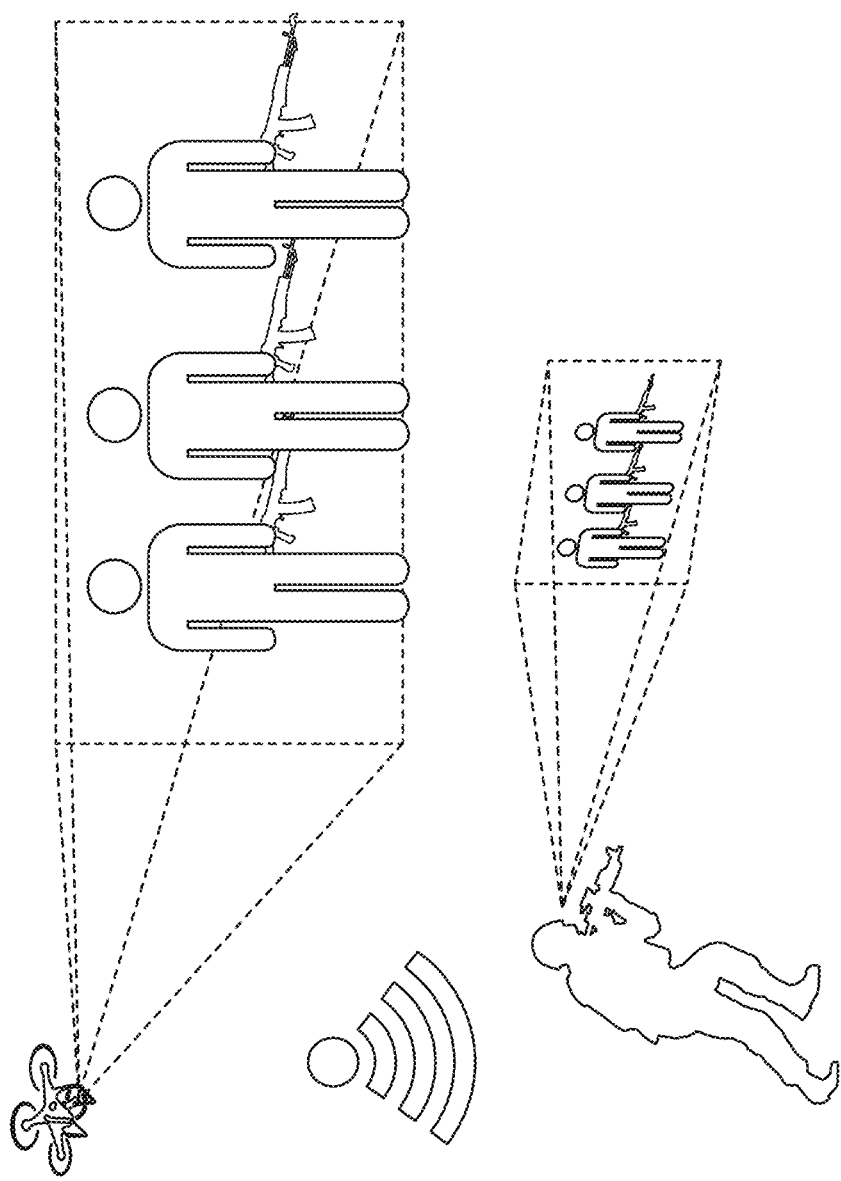
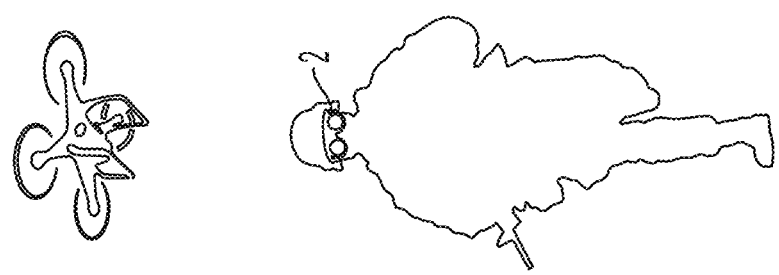
Figure 49

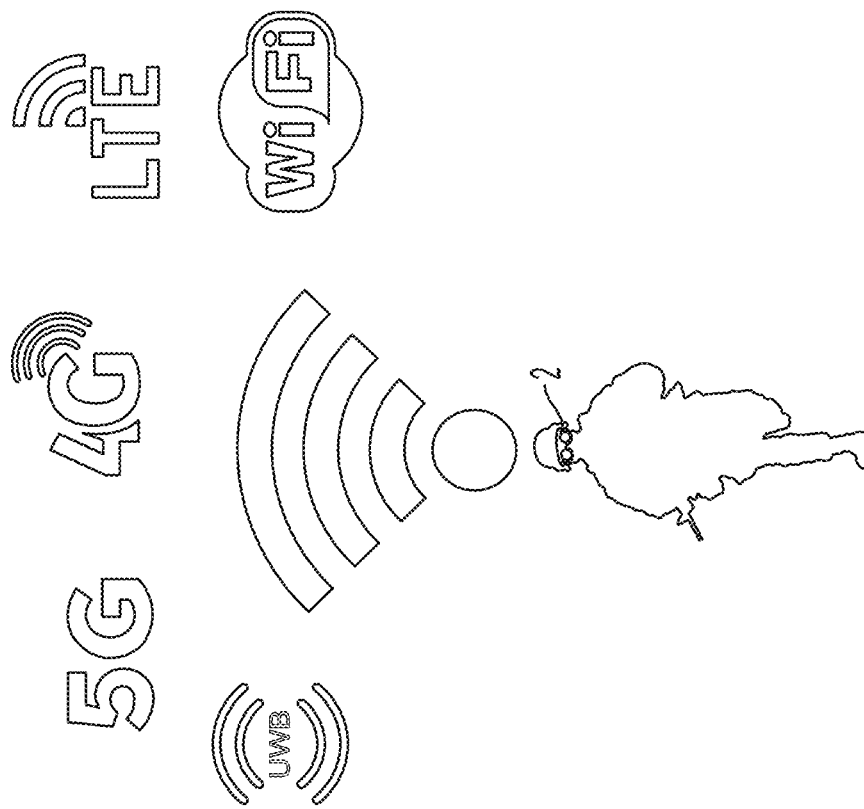
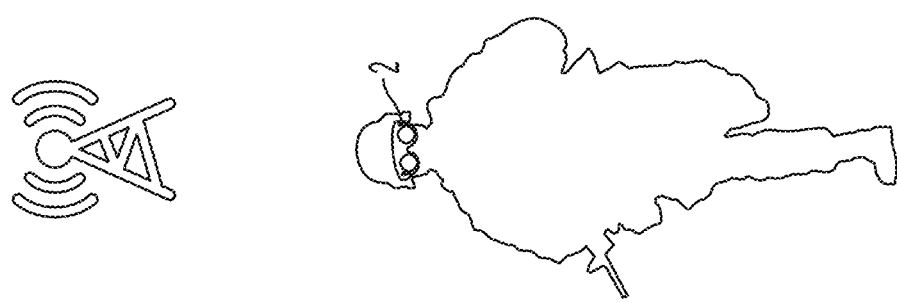
Figure 50

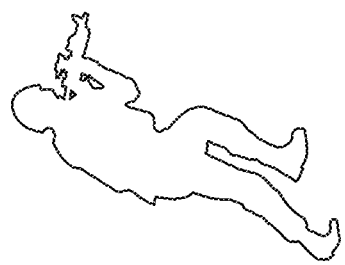
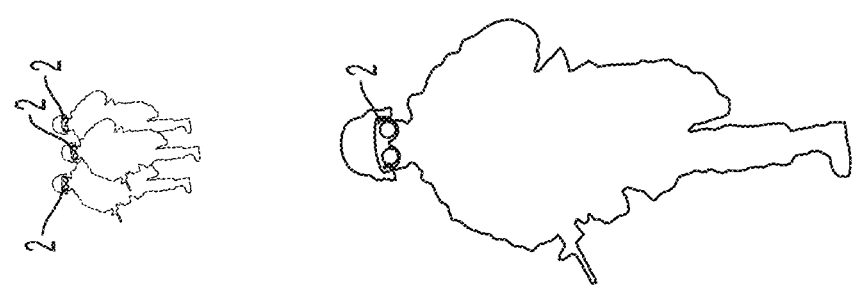
Figure 53

Med-evac and Air support visualization

9-LINE MEDEVAC

Line 1: Location of pick-up site

Line 2: Call Sign:      Freq.

Line 3: Number of Patients by Precedence
- ____ A - Urgent (within 2 hrs)
- ____ B - Priority (within 4 hrs)
- ____ C - Routine (within 24 hrs)

Line 4: Special Equipment Required
- A - None
- B - Hoist
- C - Extraction Equip
- D - Ventilation Line 5: Number of Patients & Type
     Litter:      Ambulatory:

Line 6: Security at Pick-up Site
- N - No enemy troops in area
- P - Possible enemy troops (approach w/ caution)
- E - Enemy troops in area (approach w/ caution)
- X - Enemy troops in area (armed escort req.)

Line 7: Method of Marking PZ
- A - Panels
- B - Pyrotechnic Signal
- C - Smoke Signal (Color: _____)
- D - None
- E - Other Line 8: Patient Nationality & Status
- A - US Military
- B - US Civilian
- C - Non-US Military
- D - Non-US Civilian
- E - EPW Line 9: Patient Nationality & Status
     N - Nuclear    B - Biological    C - Chemical

Figure 54

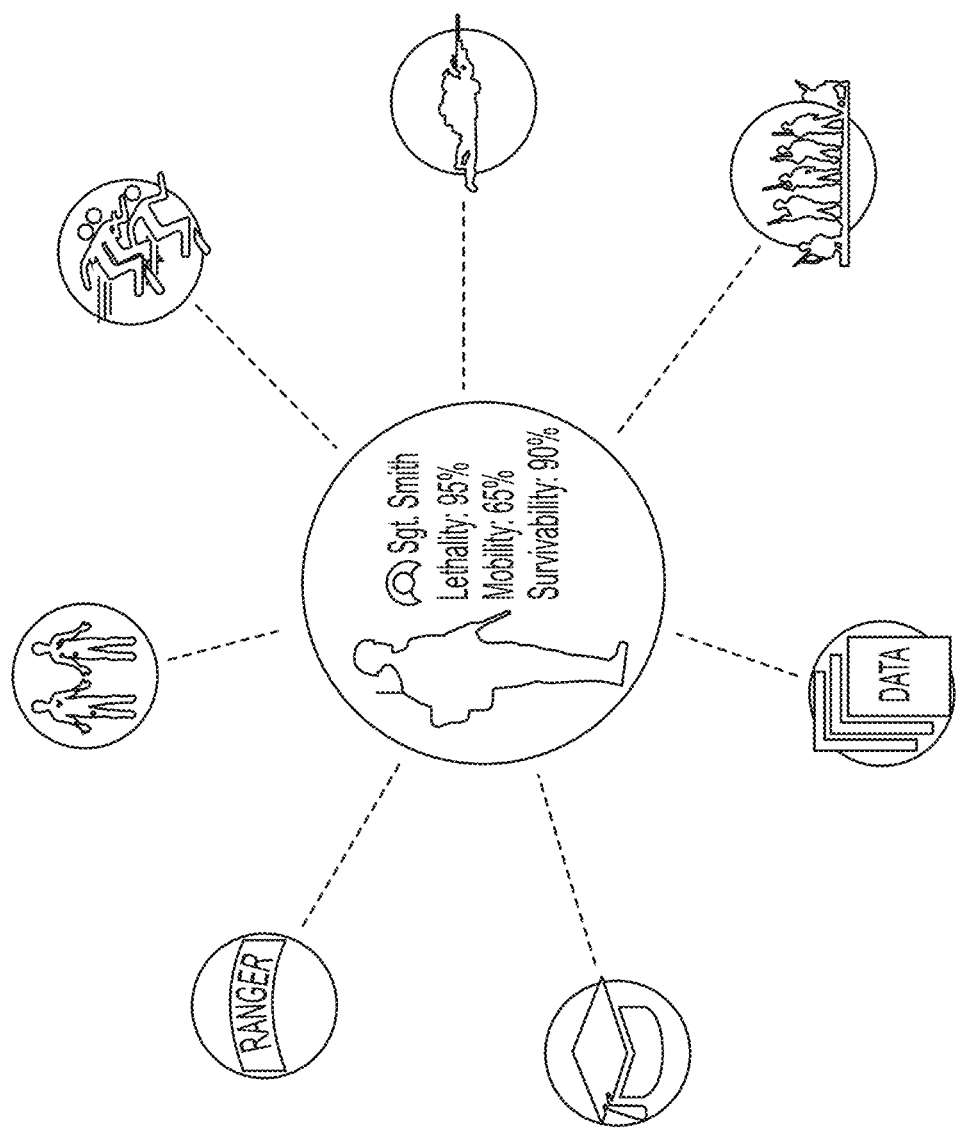
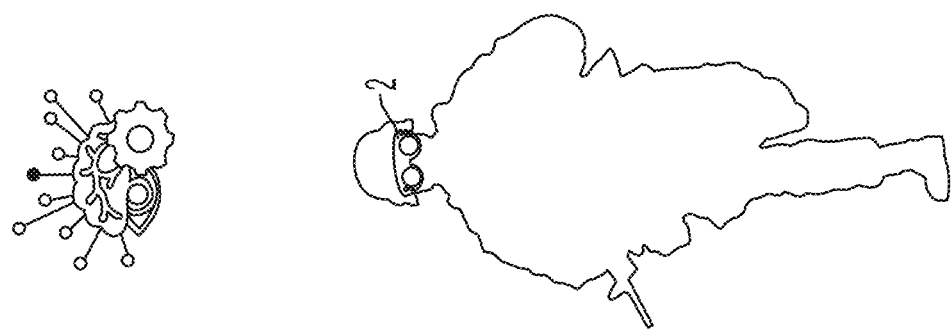
Figure 62

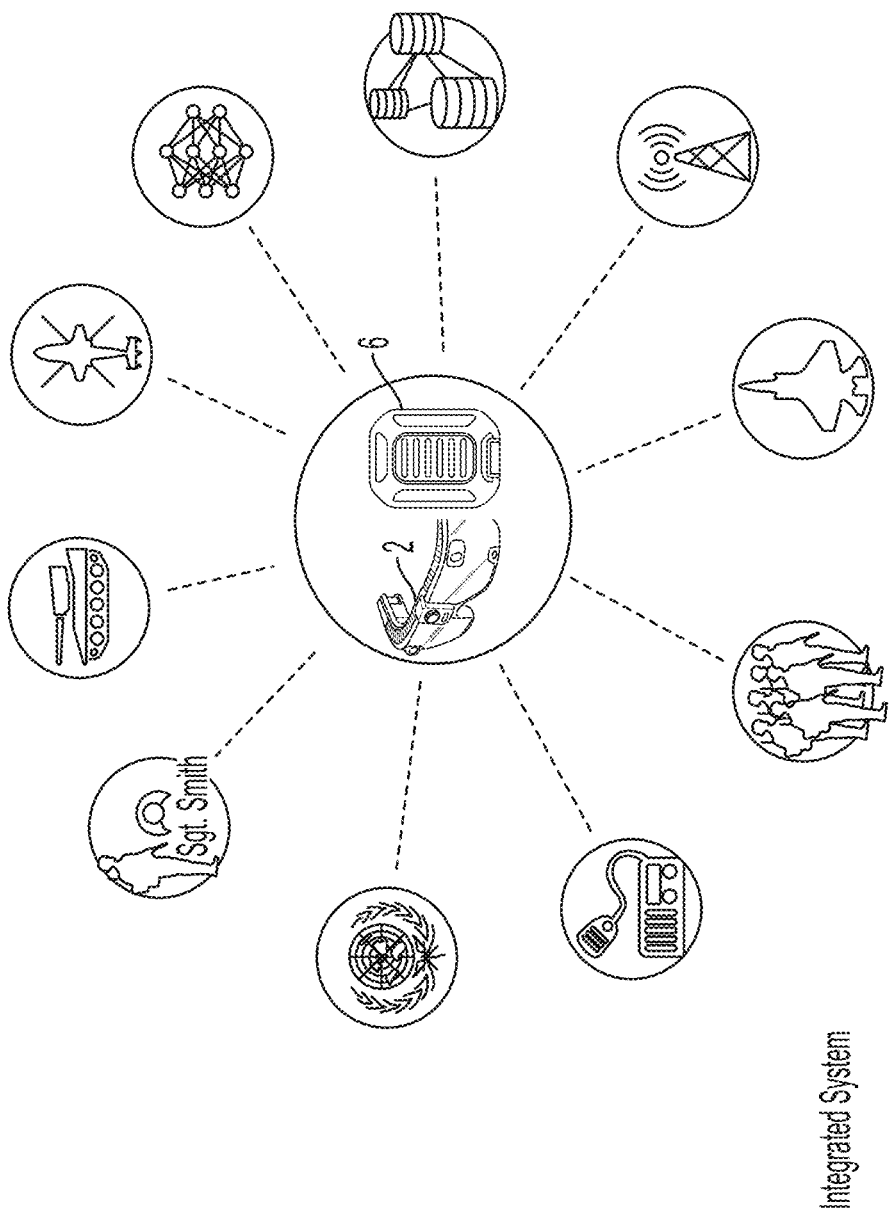
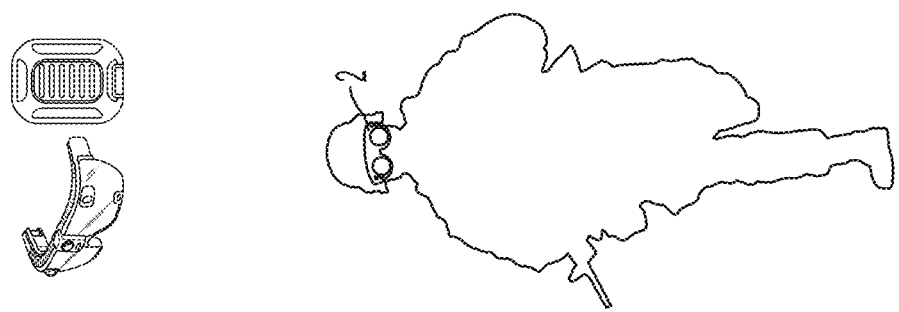
Figure 63

SYSTEMS AND METHODS FOR VIRTUAL AND AUGMENTED REALITY

CROSS-REFERENCE TO RELATED APPLICATIONS

This application is a continuation of U.S. Non-Provisional application Ser. No. 16/729,192, filed on Dec. 27, 2019, which claims priority to U.S. Provisional Application No. 62/785,370, filed on Dec. 27, 2018, the contents of which are incorporated by reference herein in their entirety.

FIELD

This invention is related to connected mobile computing systems, methods, and configurations, and more specifically to mobile computing systems, methods, and configurations featuring at least one wearable component which may be utilized for virtual and/or augmented reality operation.

BACKGROUND

It is desirable that mixed reality ("MR"), or augmented reality ("AR"), near-eye displays be lightweight, low-cost, have a small form-factor, have a wide virtual image field of view, and be as transparent as possible. In addition, it is desirable to have configurations that present virtual image information in multiple focal planes (for example, two or more) in order to be practical for a wide variety of use-cases without exceeding an acceptable allowance for vergence-accommodation mismatch. Referring to FIG. 1, an augmented reality system is illustrated featuring a head-worn viewing component (2), a hand-held controller component (4), and an interconnected auxiliary computing or controller component (6) which may be configured to be worn as a belt pack or the like on the user. Each of these components may be operatively coupled (10, 12, 14, 16, 17, 18) to each other and to other connected resources (8) such as cloud computing or cloud storage resources via wired or wireless communication configurations, such as those specified by IEEE 802.11, Bluetooth (RTM), and other connectivity standards and configurations. As described, for example, in U.S. Patent Application Ser. Nos. 14/555,585, 14/690,401, 14/331,218, 15/481,255, 62/518,539, 62/693,891, and Ser No. 62/743,492, each of which is incorporated by reference herein in its entirety, various aspects of such components are described, such as various embodiments of the two depicted optical elements (20) through which the user may see the world around them along with visual components which may be produced by the associated system components, for an augmented reality experience.

There are various virtual reality ("VR") systems and a few effective AR systems on the market. Many of these systems are configured for utilizing local data (such as gaming software stored on a local flash memory), or connecting with certain remote data (such as high scores stored on a cloud storage resource at a remote location), but few are configured to not only interconnect with other user nodes of various types, but also to effectively utilize and balance local and cloud resources for both processing/operation and storage.

Most VR systems are basically close-in monitors, akin to computer or television monitors placed close to the eye providing stereoscopic perspective for convergence cues, and are connected to computing and storage resources via a connected computing device, such as a high-performance gaming laptop or desktop computer. VR systems are of limited capability in many human operating scenarios because the user generally is unable to see the world around them—so the user would be challenged to remove a head mounted display component to see what he or she is doing, and then put the head mounted display component back over the eyes to continue viewing information developed or displayed by the computer. Certain variations of VR systems may accommodate so called "pass-through" video, whereby forward oriented cameras capture video which may be broadcasted to the user in the VR wearable component, but due to latency, perspective shifting, image fidelity, and negative physiological cues such systems may be less than desirable in many critical human operating scenarios. A further limitation is the size of the computing resources which generally need to be tethered for most modern wearable VR display systems. Even if the compute was present the power requirements to meet the physiological demands of a VR system would require a backpack sized battery. Further, there is a lack of such technologies which are secure and robust enough to be utilized in critical operation scenarios, such as emergency medical response, fire response, police operations, and/or military operations. The systems, configurations, and methods described herein are designed to address the various challenges of portable, robust, highly-connected, and highly-capable wearable computing deployments in various human scenarios. There is a need for compact and persistently connected systems and assemblies which are optimized for use in wearable computing systems.

BRIEF SUMMARY

Examples of the disclosure describe systems and methods for distributed computing and/or networking for mixed reality systems. According to examples of the disclosure, a method may include capturing an image via a camera of a head-wearable device. Inertial data may be captured via an inertial measurement unit of the head-wearable device. A position of the head-wearable device can be estimated based on the image and the inertial data via one or more processors of the head-wearable device. The image can be transmitted to a remote server. A neural network can be trained based on the image via the remote server. A trained neural network can be transmitted to the head-wearable device.

BRIEF DESCRIPTION OF THE DRAWINGS

FIG. 12 illustrates an example usage of connected mixed reality systems, according to some embodiments.

FIG. 14 illustrates an example usage of connected mixed reality systems, according to some embodiments.

FIG. 15 illustrates an example usage of connected mixed reality systems, according to some embodiments.

FIG. 16 illustrates an example usage of connected mixed reality systems, according to some embodiments.

FIG. 22 illustrates an example usage of mixed reality systems in emergency situations, according to some embodiments.

FIG. 24 illustrates an example usage of mixed reality systems in emergency situations, according to some embodiments.

FIG. 26 illustrates an example usage of mixed reality systems in emergency situations, according to some embodiments.

FIG. 30 illustrates an example usage of mixed reality systems in emergency situations, according to some embodiments.

FIG. 31 illustrates an example mixed reality network architecture, according to some embodiments.

FIG. 39 illustrates an example usage of mixed reality systems, according to some embodiments.

FIG. 40 illustrates an example usage of mixed reality systems in emergency situations, according to some embodiments.

FIG. 41 illustrates an example usage of mixed reality systems in emergency situations, according to some embodiments.

FIG. 46 illustrates an example mixed reality computing architecture, according to some embodiments.

FIG. 49 illustrates an example mixed reality computing architecture, according to some embodiments.

FIG. 50 illustrates an example mixed reality computing architecture, according to some embodiments.

FIG. 53 illustrates an example mixed reality computing architecture, according to some embodiments.

FIG. 54 illustrates an example mixed reality computing architecture, according to some embodiments.

FIG. 62 illustrates an example mixed reality computing architecture, according to some embodiments.

FIG. 63 illustrates an example mixed reality computing architecture, according to some embodiments.

DETAILED DESCRIPTION

Figure 1:
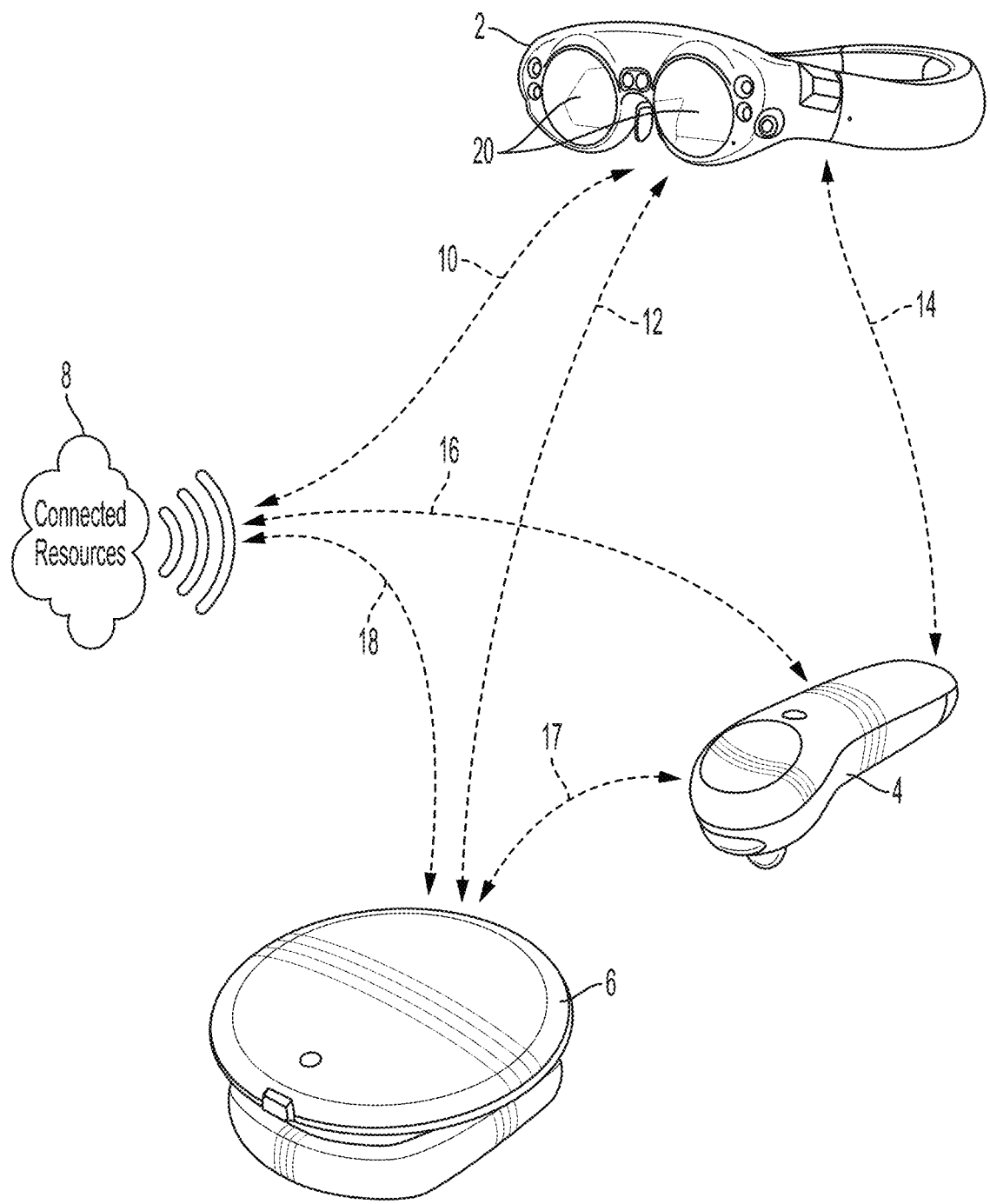
FIG. 1 illustrates an example mixed reality system, according to some embodiments.
Figure 2:
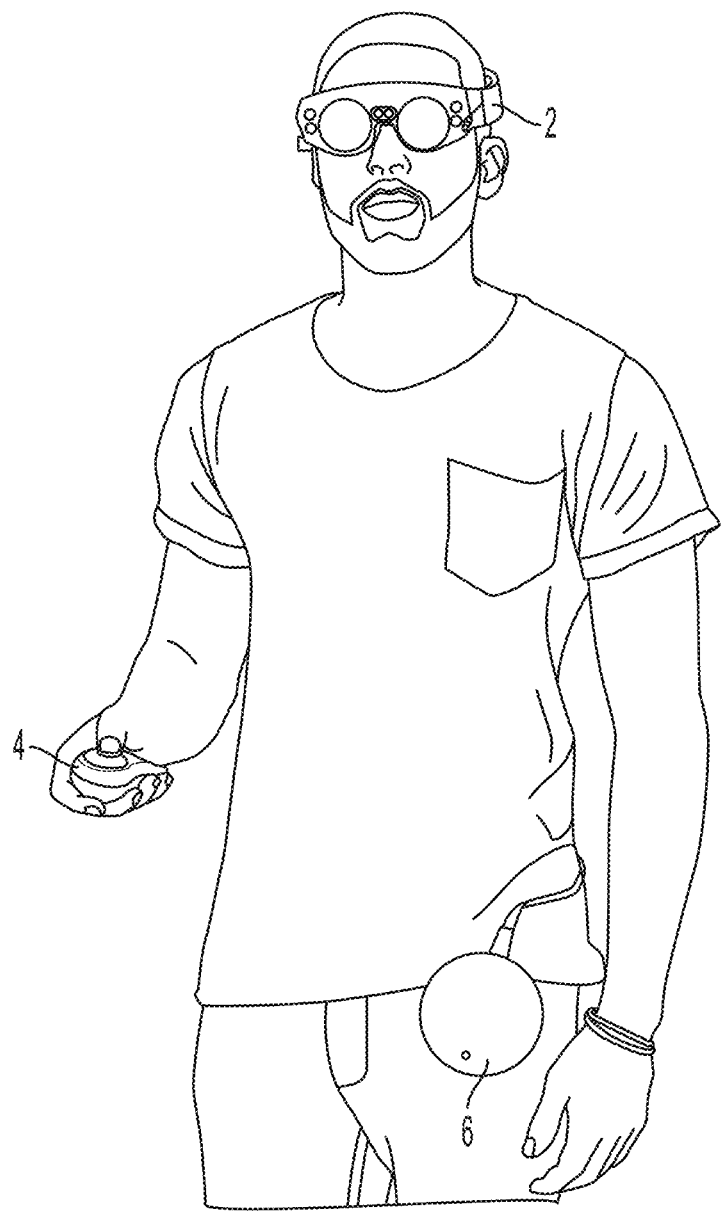
FIG. 2 illustrates an example mixed reality system, according to some embodiments.
Figure 3:
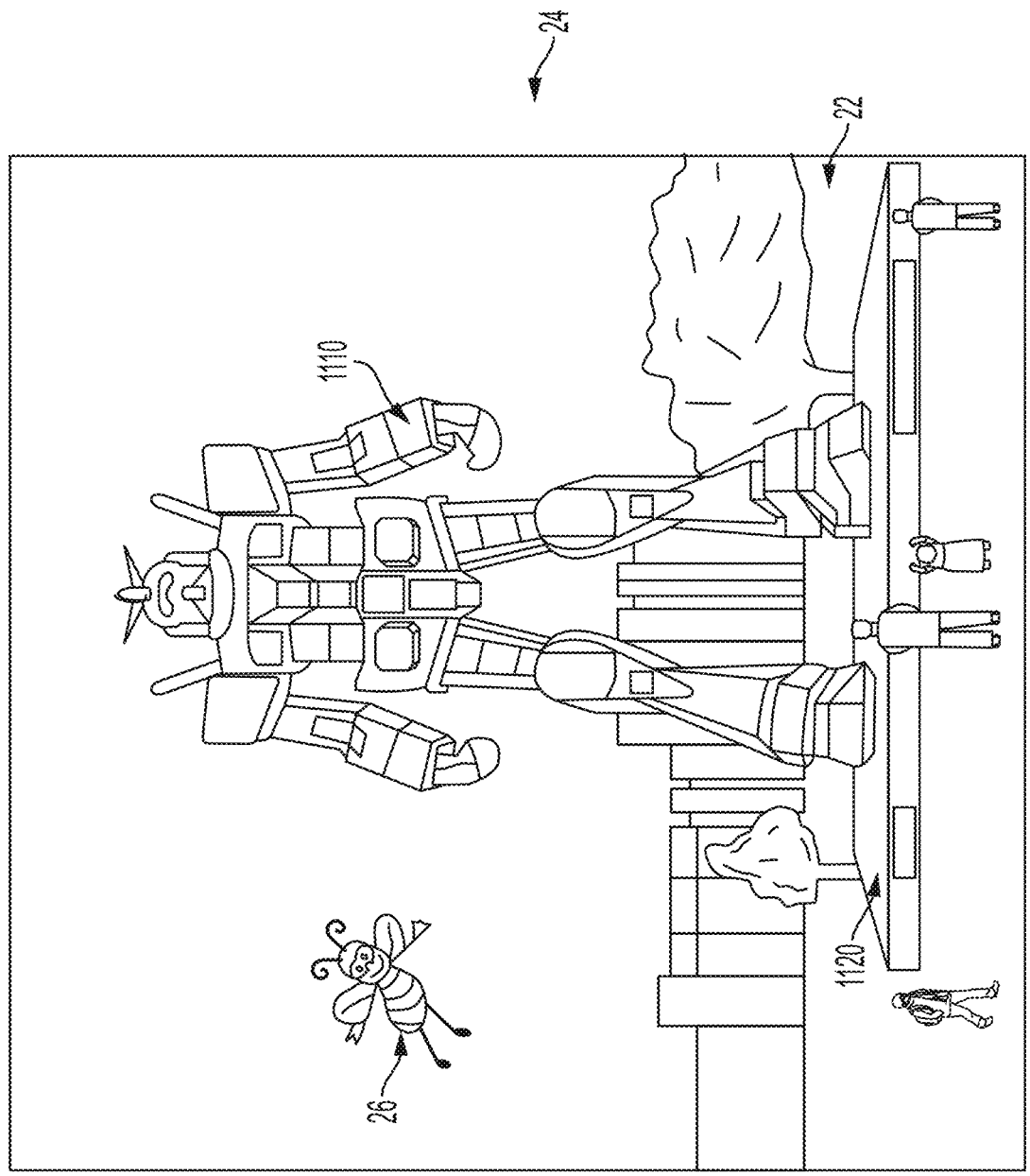
FIG. 3 illustrates an example mixed reality environment, according to some embodiments.
Figure 4:
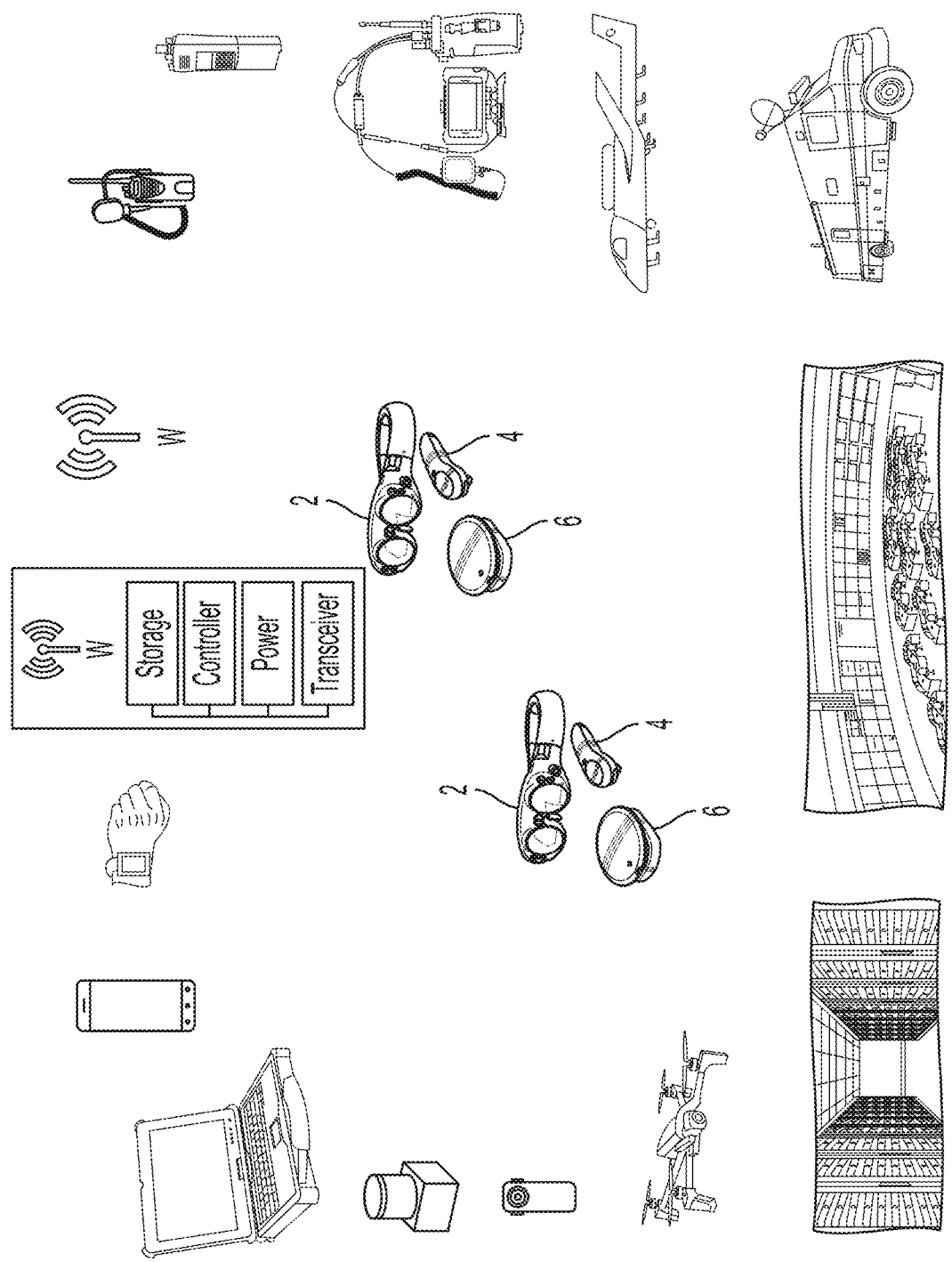
FIG. 4 illustrates an example mixed reality system, according to some embodiments.

Referring to FIG. 2, a user is illustrated wearing a head mounted display component (2), belt or "compute" pack (6), and holding a handheld controller component (4). With the system operatively connected to other resources, for example through an 802.11 WiFi connection, the user or operator may navigate around his environment and utilize the computing capabilities of the system while also seeing things around him. FIG. 3 illustrates some basic notions of how a user may see and/or perceive things in an augmented reality experience as the user walks through a park setting (22) and views (24) the world through a head mounted wearable component (2) such as those described herein; in this illustration, the user can see aspects of the actual world, such as trees, a concrete elevated pad (1120), and the rest of the park (22) setting, while also seeing in three dimensions an insect character (26) and a statue (1110) which don't exist in the actual physical world, but are presented to the user as though they do by using the augmented reality capabilities of the subject system. Referring to FIG. 4, as noted above in reference to FIG. 1, the subject AR system may be operatively coupled to many different resources, such as storage and computing resources, and also other important operational resources, such as other portable computing systems, smart phones, smart watches, storage and/or processing hubs, wireless connectivity hubs or nodes, personal radios of various types, aircraft or air support, emergency response vehicles, network operating centers or operational control centers, unmanned vehicles such as drones, mobile or wearable camera devices, and/or sensors or many types, including LIDAR and other sensors. In various embodiments, it is preferred that the user be connected with many resources.

Figure 5:
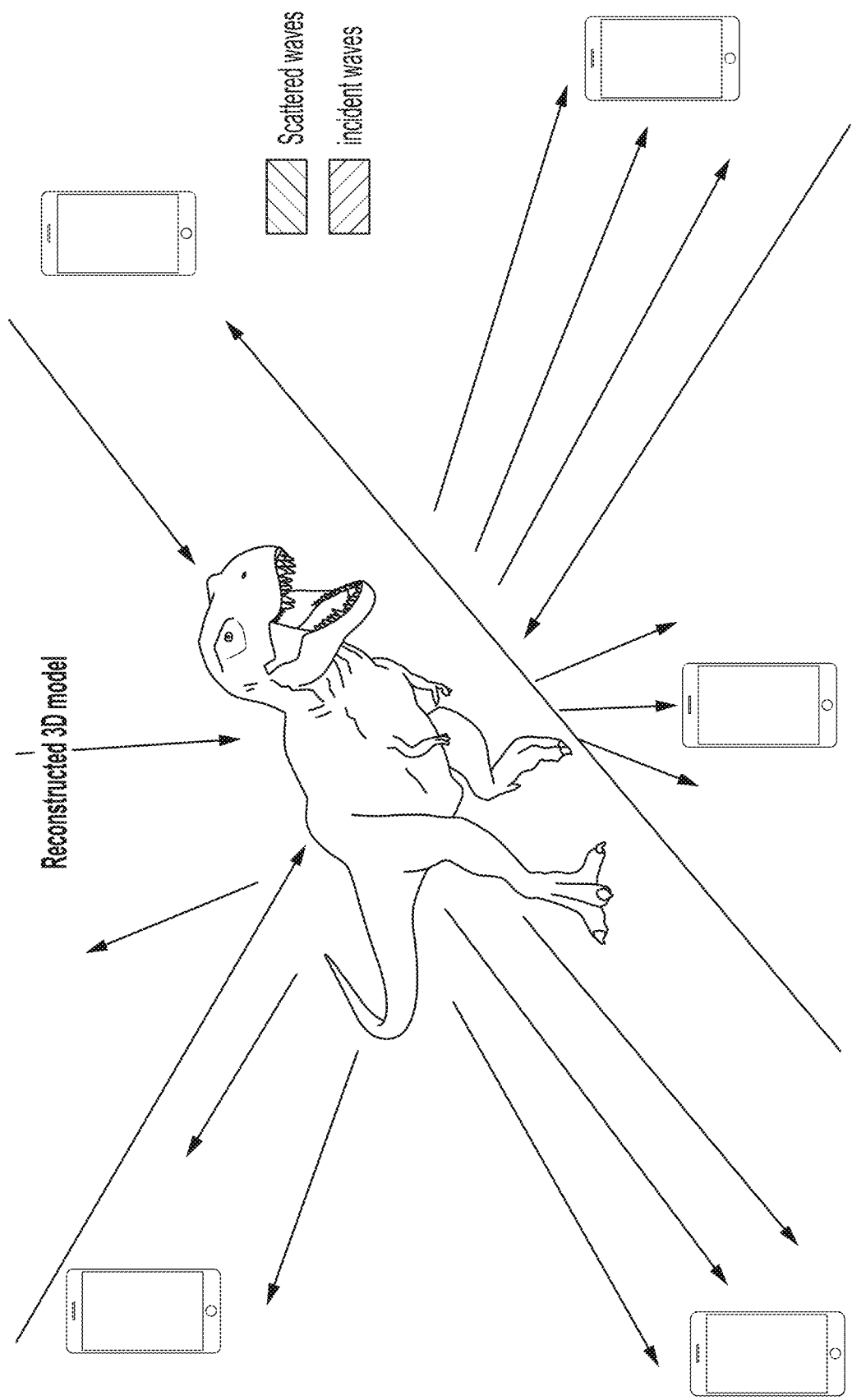
FIG. 5 illustrates an example process for constructing a virtual model, according to some embodiments.

Referring to FIG. 5, in one embodiment, with many connected resources, a connected collective may be utilized as a 3-D sensor of sorts to reconstruct a mesh or model of one or more objects which may be positioned in between or surrounded by one of more transmitting/ receiving devices, such as cellphones with 5G antennae arrays or the like. In other words, each phone, tablet, wearable or other connected device may be utilized as a sensor; for example, the direction and intensity, scatter, penetration, and absorbance of each signal-source pair may be utilized to create an interference map that then can be visualized, for example, with in the field of view of a wearable computing system by a user. In the case of a 5G connectivity environment, the source/signal pairing may provide a millimeter wave reconstruction of the world around; this may be fairly computationally intensive, but is one means of using modern frequency to spatial domain holographic reconstruction to create a general model of the world which can be updated.

Figure 6:
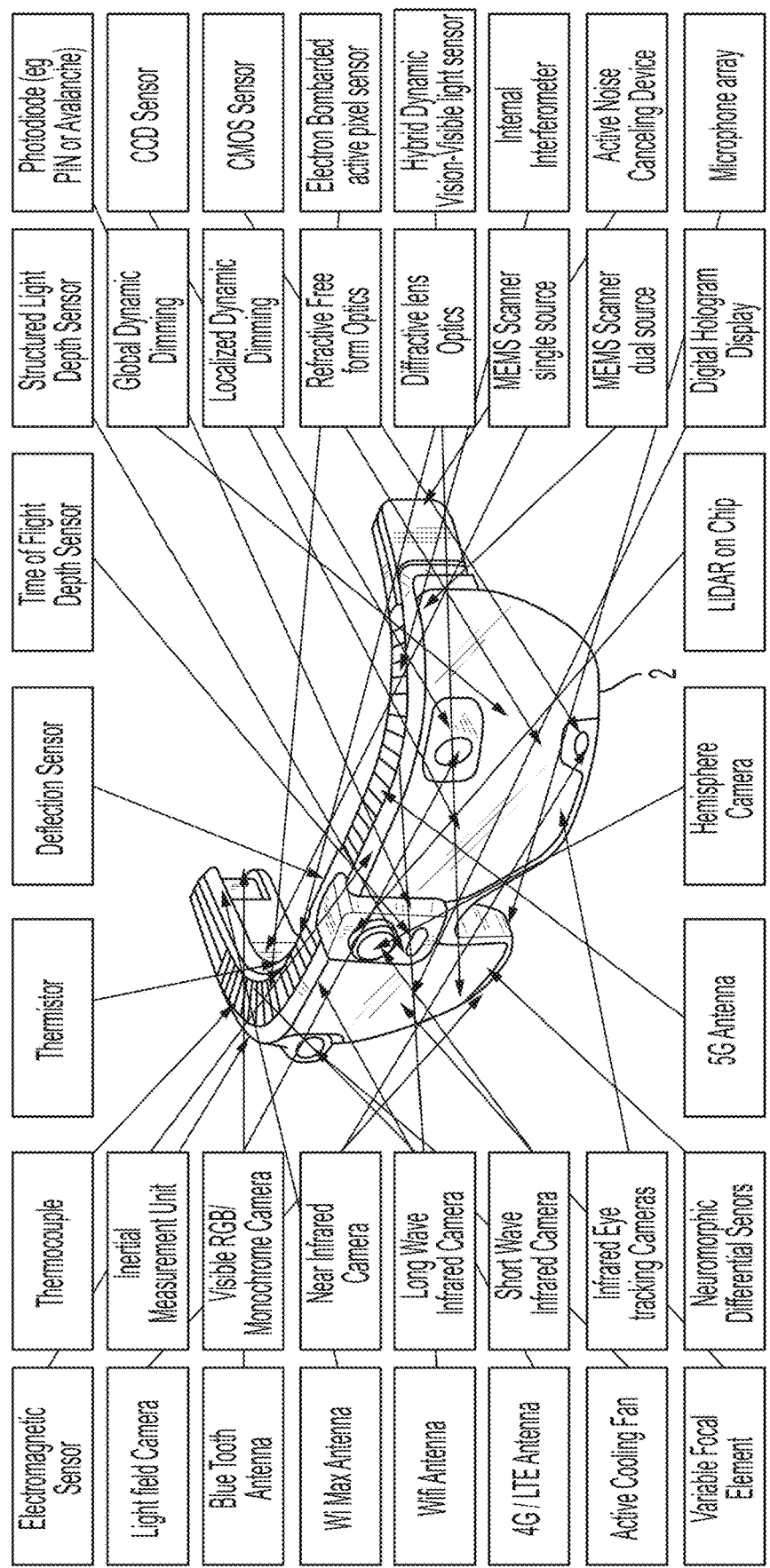
FIG. 6 illustrates an example head-wearable component of a mixed reality system, according to some embodiments.
Figure 7:
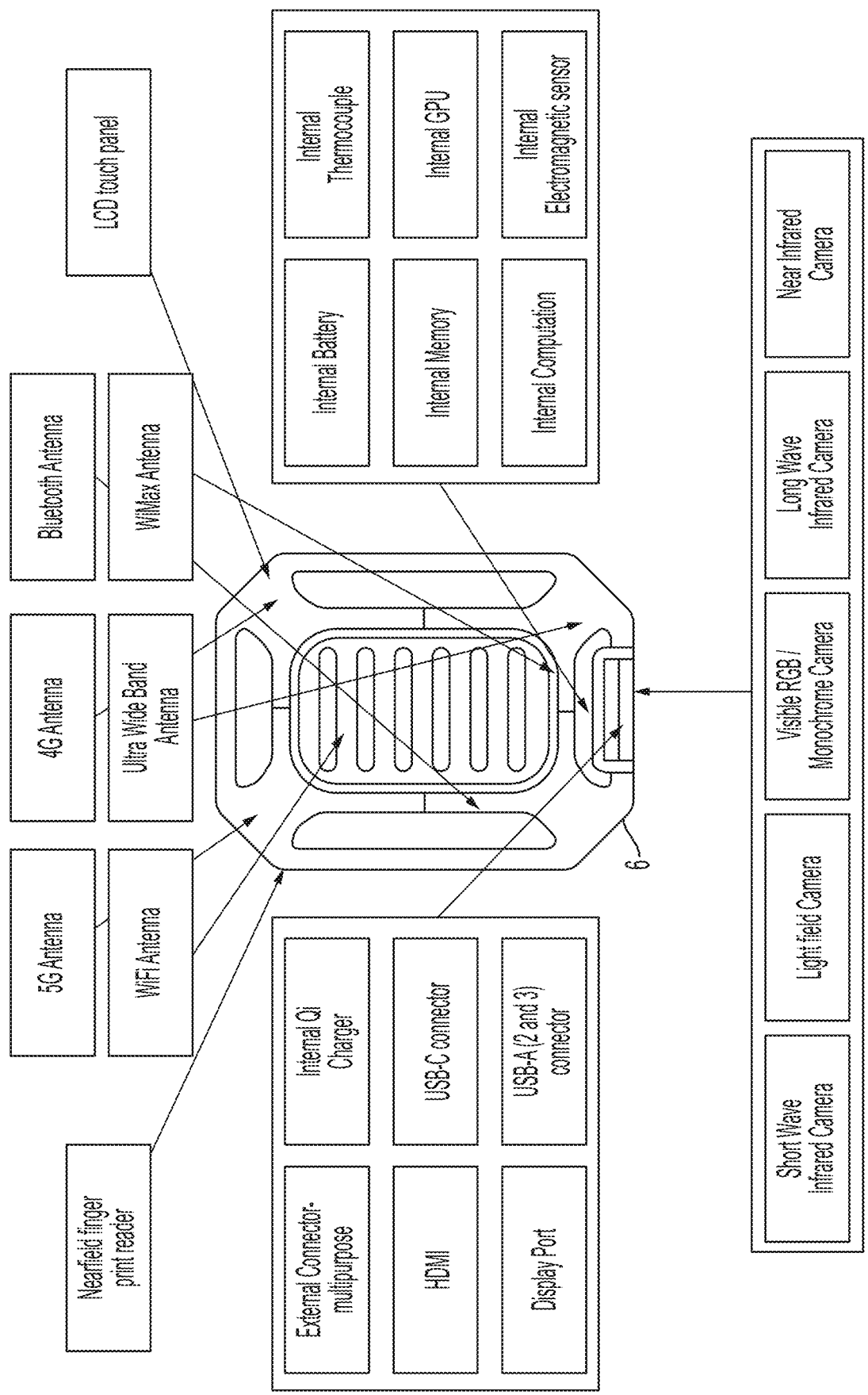
FIG. 7 illustrates an example wearable pack component of a mixed reality system, according to some embodiments.

Referring to FIGS. 6 and 7, as noted in the aforementioned incorporated references, in various embodiments it may be desirable to have many types of sensors and technologies integrated into a wearable component (2) and/or a belt pack/compute pack component (6). For example, in the depicted embodiment of FIG. 6, a deflection or bend sensor may comprise an internal interferometer with two different directions; based upon phase change detection, bending deflection may be correlated and determined; also shown is a hybrid-dynamic vision-visible light sensor, wherein a differential sensor and visible light sensor may be utilized on the same optical path, such as with a beam splitter; the signals may be analyzed together to process differences/similarities. As depicted in FIG. 7, in one embodiment the belt pack component (6) may be removably coupleable from the head mounted component, and may be removably coupleable/swappable from a battery component to ensure continuous operation. The belt pack component (6) may have an interface such as an LCD touch panel/display to be utilized as a cellphone if needed, and may have one or more cameras or sensing devices integrated therein, for example, to provide additional sensing for the operator, such as to the back or other direction relative to the operator.

Figure 8:
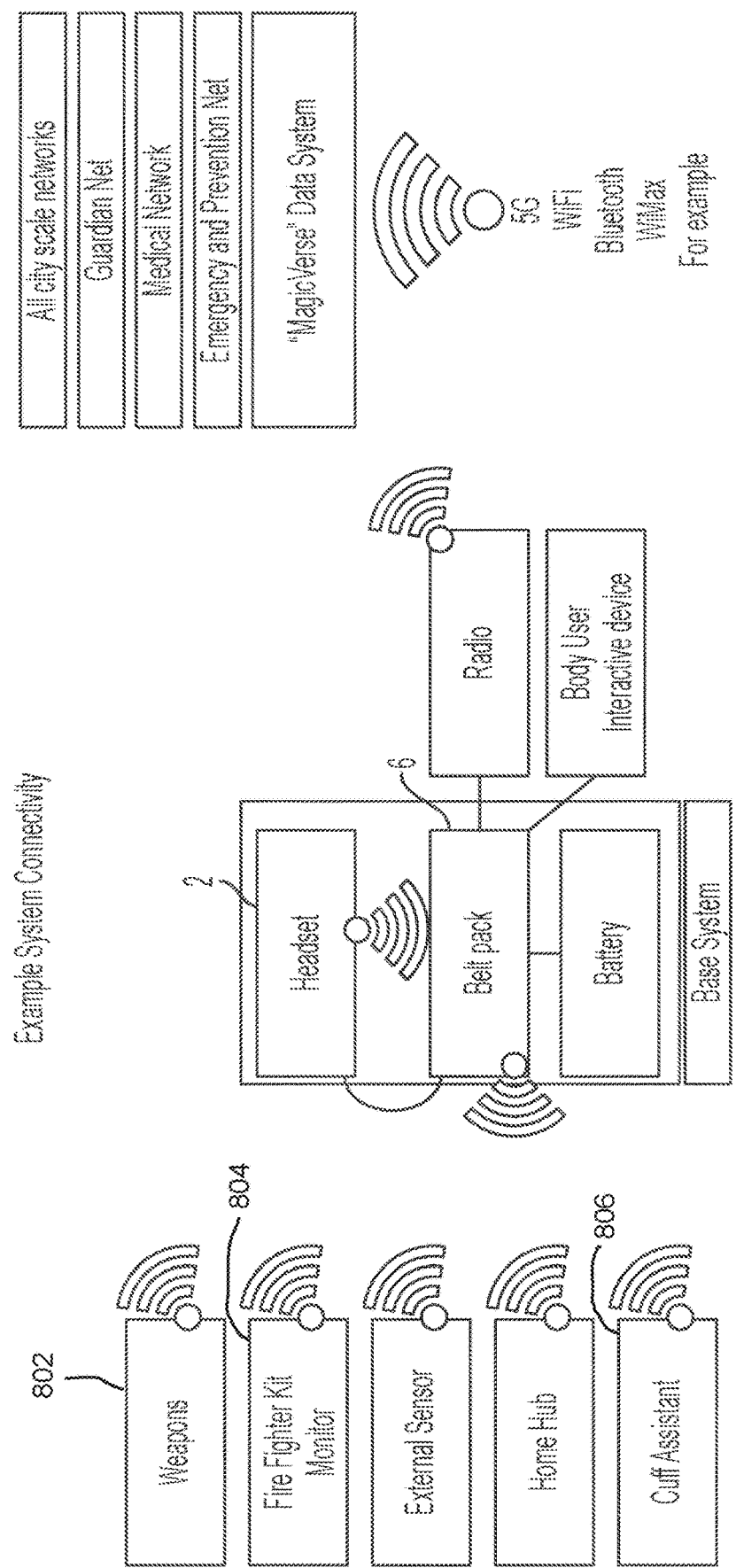
FIG. 8 illustrates an example mixed reality computing architecture, according to some embodiments.

Referring to FIG. 8, various aspects of system connectivity are illustrated, with an operator headset (2), belt pack (6), communications radio, and other elements operatively coupled to a variety of other resources. For example, various embodiments a "cuff assistant" element may comprise a cuff or band type device, mountable around the wrist of the user in certain scenarios, such as critical operations like escape from a hazard; such a device may be configured to sense the temperature, blood pressure, location (such as by GPS and/or mobile connectivity triangulation and/or IP address mapping), partial pressure of blood oxygen, and other variables related to such operator and his position and condition; these may be reported into emergency medical services or other systems or personnel so that they may direct resources to the operator, assist in managing the scenario, etc. FIG. 8 also illustrate the notion of connectivity with a universal or semi-universal collection of databases and information that pertain to the world of the operator (may be termed the "MagicVerse"); this may include, for example, connectivity with emergency medical systems through Emergency and Prevention networks or other medical networks which may contain, for example, full patient records with information pertaining to allergies or medical conditions; also connected may be various types of home, business, or city scale networks, such as groups of webcams, servers comprising related information and data, as well as resources from what may be termed a "Guardian Net", which may be a network of resources accessible to law enforcement and certain military personnel which gains access to web cams, microphones, satellites, and large scale storage devices for certain investigative, emergency, and other purposes.

Figure 9:
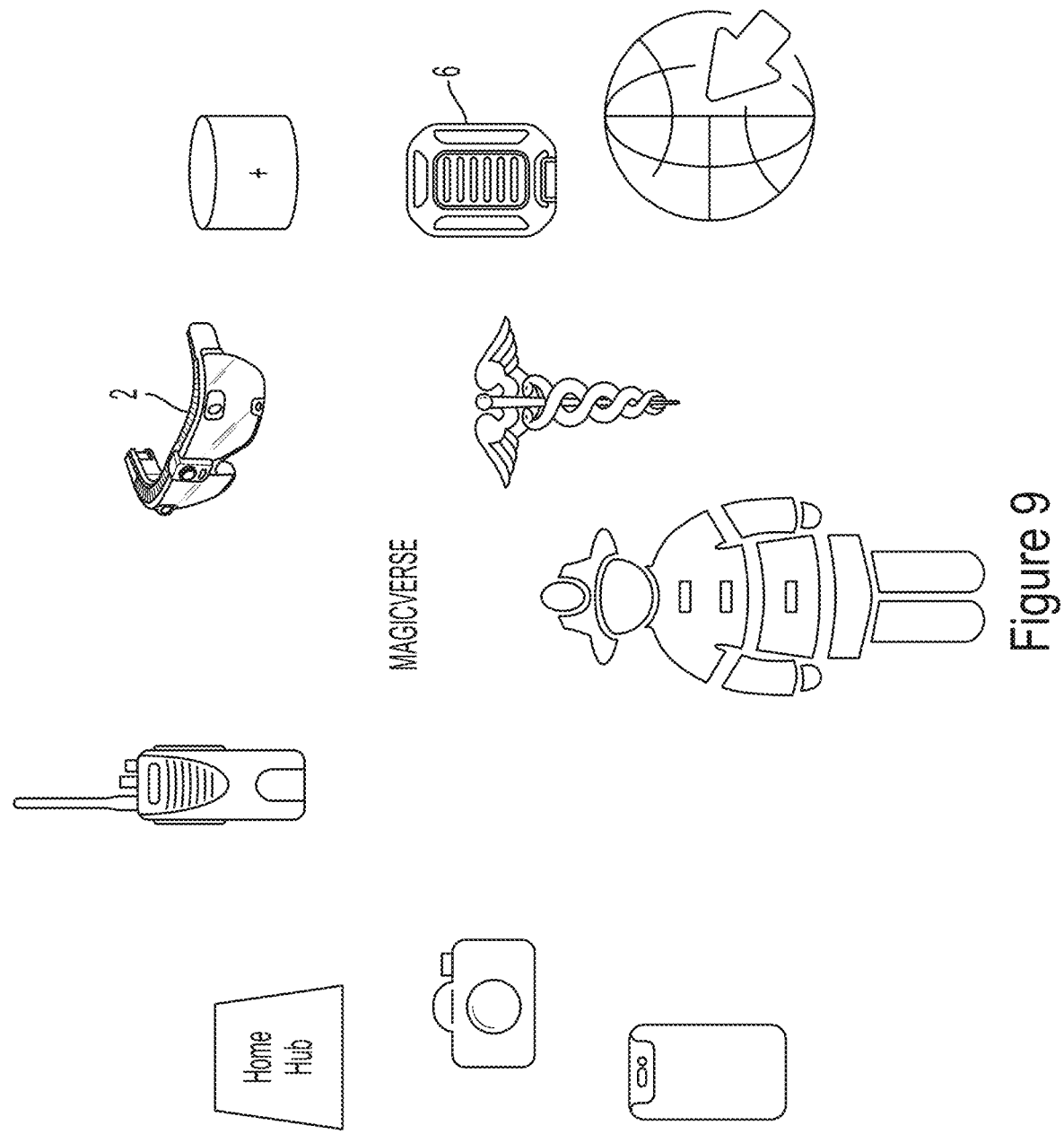
FIG. 9 illustrates an example mixed reality computing architecture, according to some embodiments.
Figure 10:
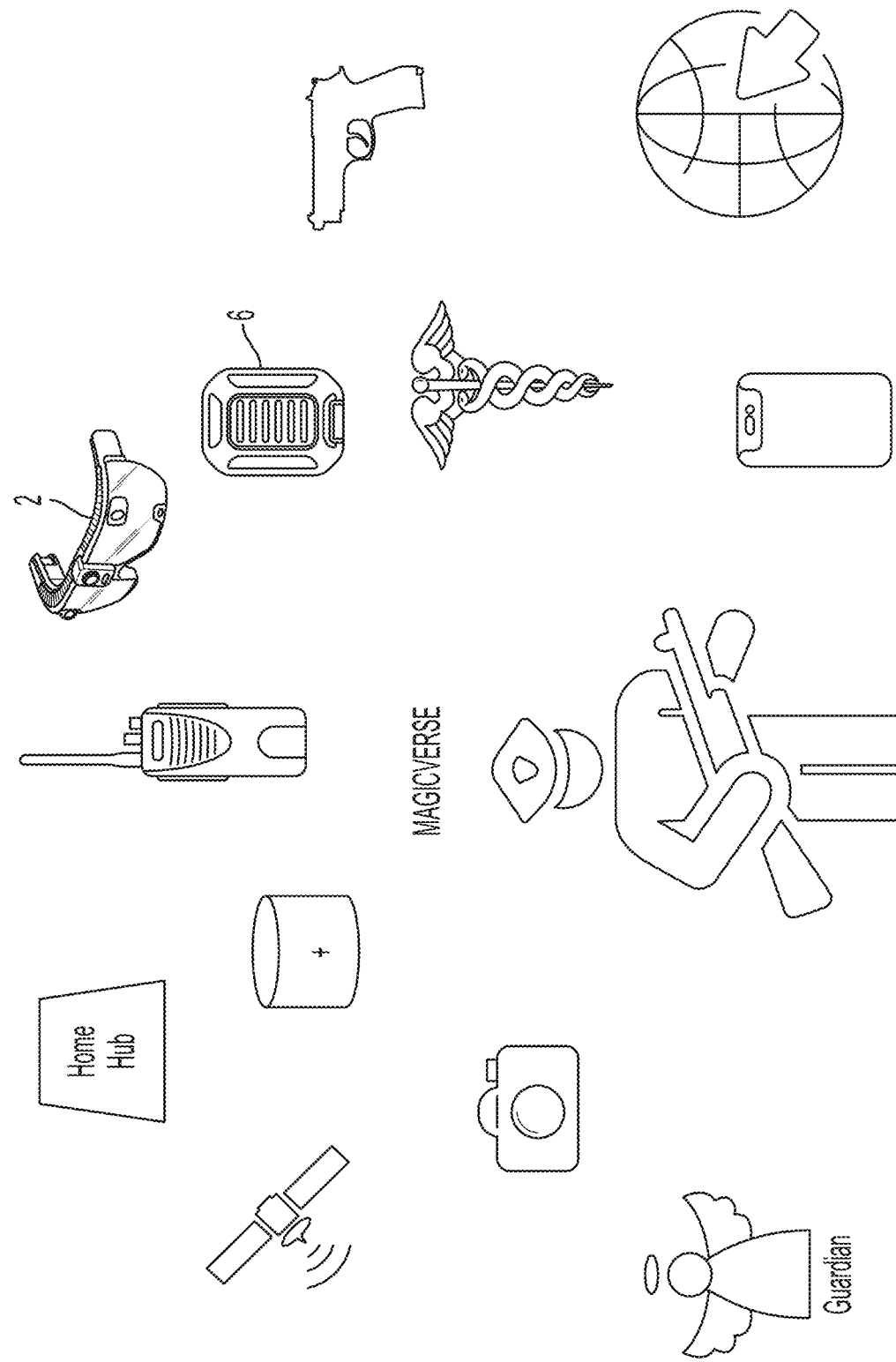
FIG. 10 illustrates an example mixed reality computing architecture, according to some embodiments.
Figure 11:
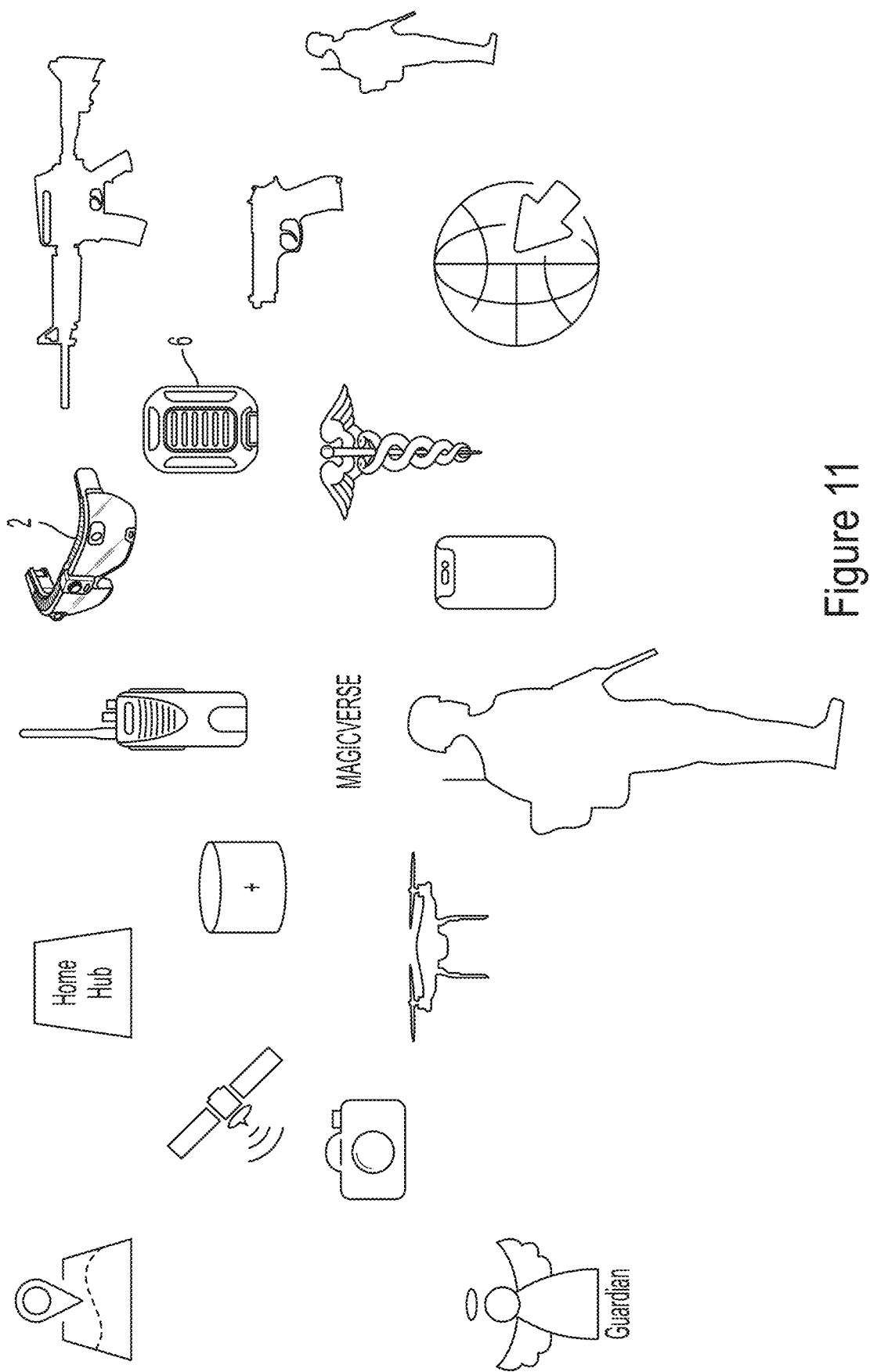
FIG. 11 illustrates an example mixed reality computing architecture, according to some embodiments.
Figure 13:
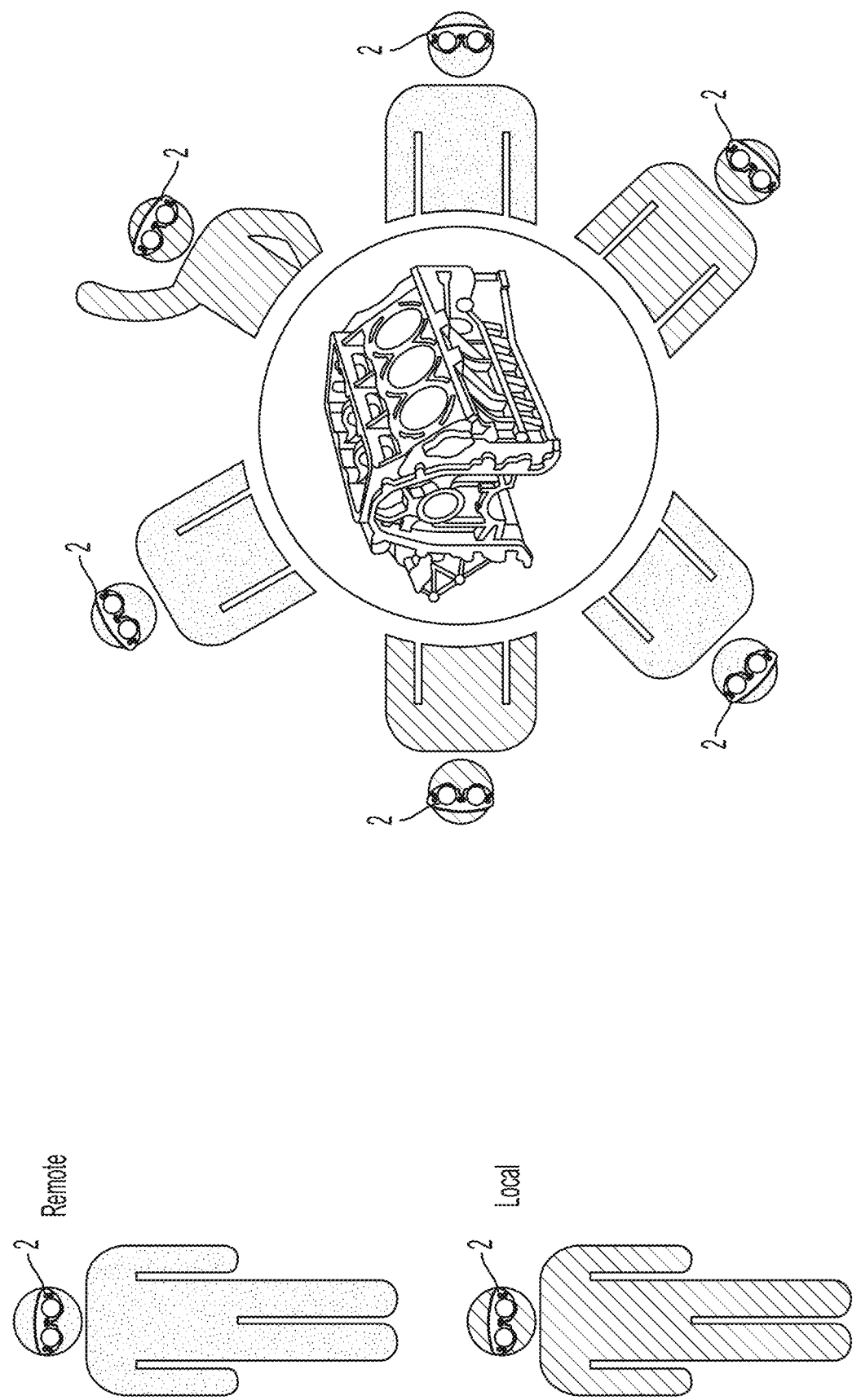
FIG. 13 illustrates an example usage of connected mixed reality systems, according to some embodiments.

Referring to FIGS. 9, 10, and 11, a firefighter, law enforcement officer, or military operator, respectively, may utilize a wearable computing system (2, 6) as a mobile operational hub of sorts for integrating the utility of a multitude of other connected resources, such as a smartphone, EMS radio, connectivity and/or storage hub in a home, business, or elsewhere, various cameras and related sensors, GPS, medical and emergency databases, law enforcement, Guardian Net connectivity, weapons system connectivity, connectivity to other manned or unmanned vehicles, and the like.

Figure 17:
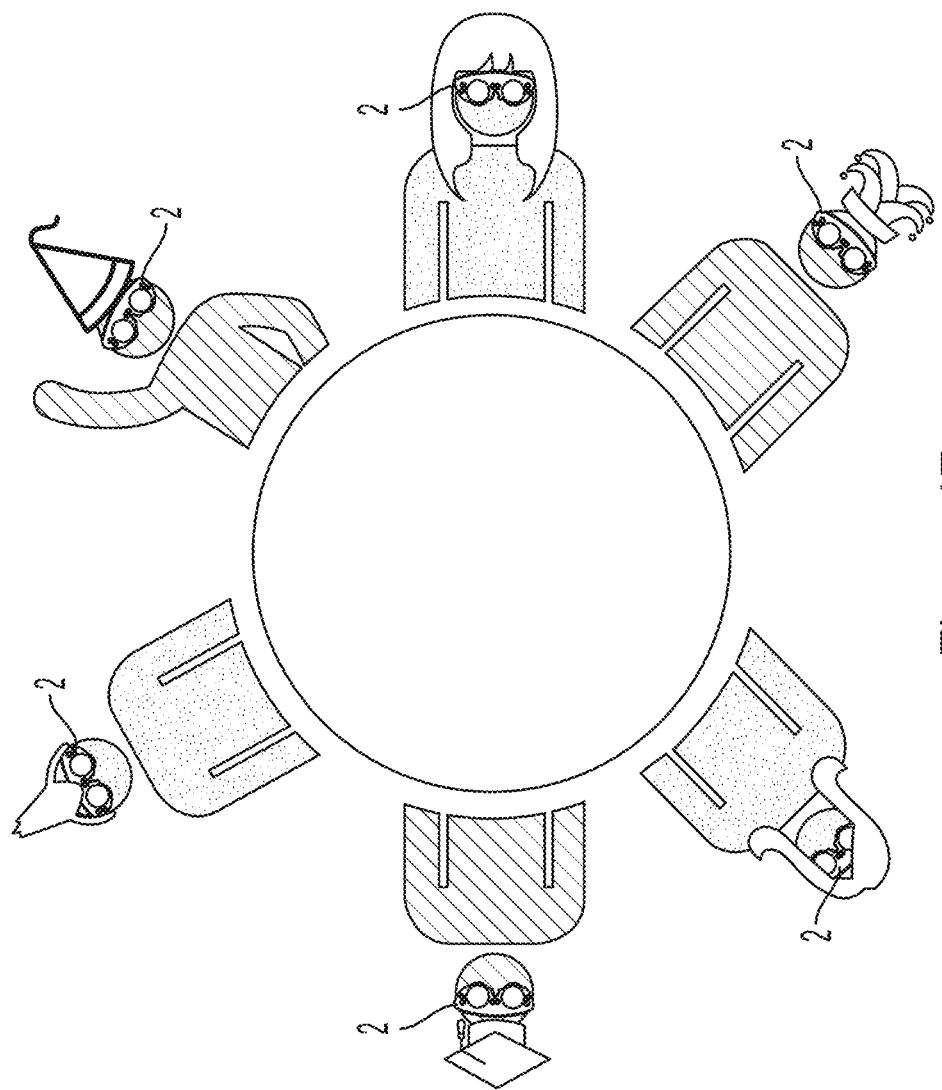
FIG. 17 illustrates an example usage of connected mixed reality systems, according to some embodiments.
Figure 18:
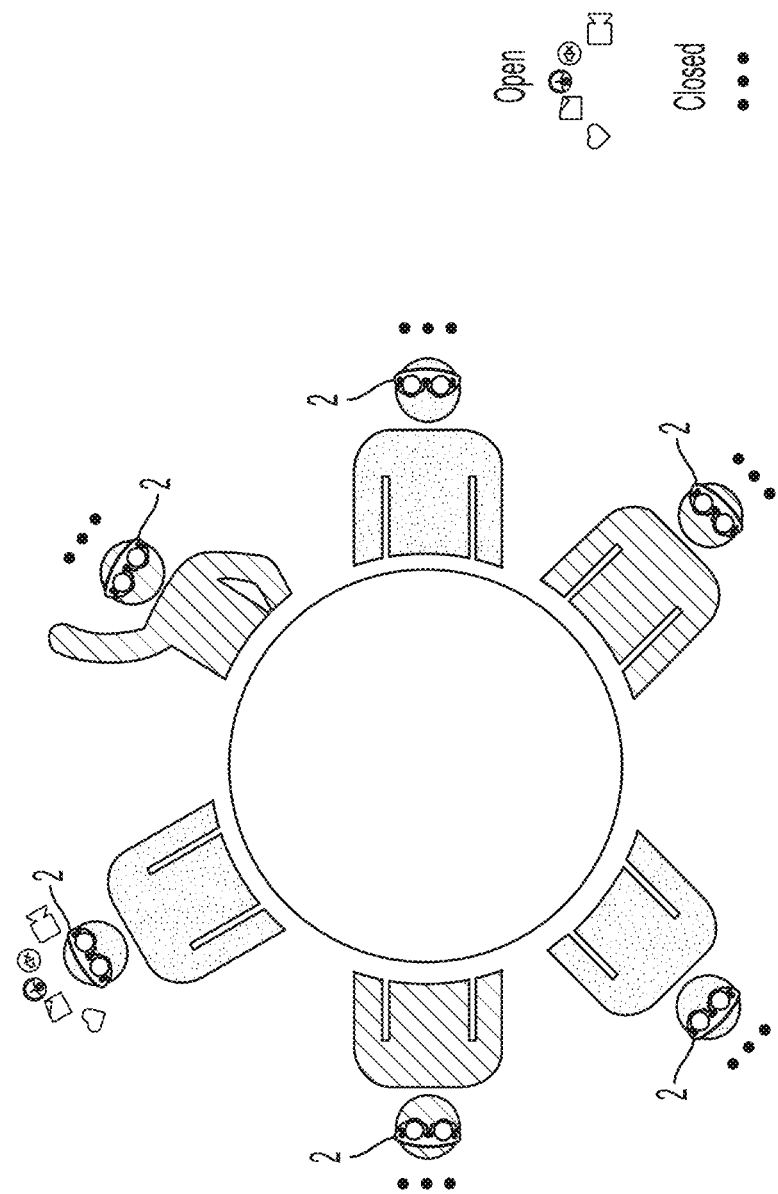
FIG. 18 illustrates an example usage of connected mixed reality systems, according to some embodiments.
Figure 19:
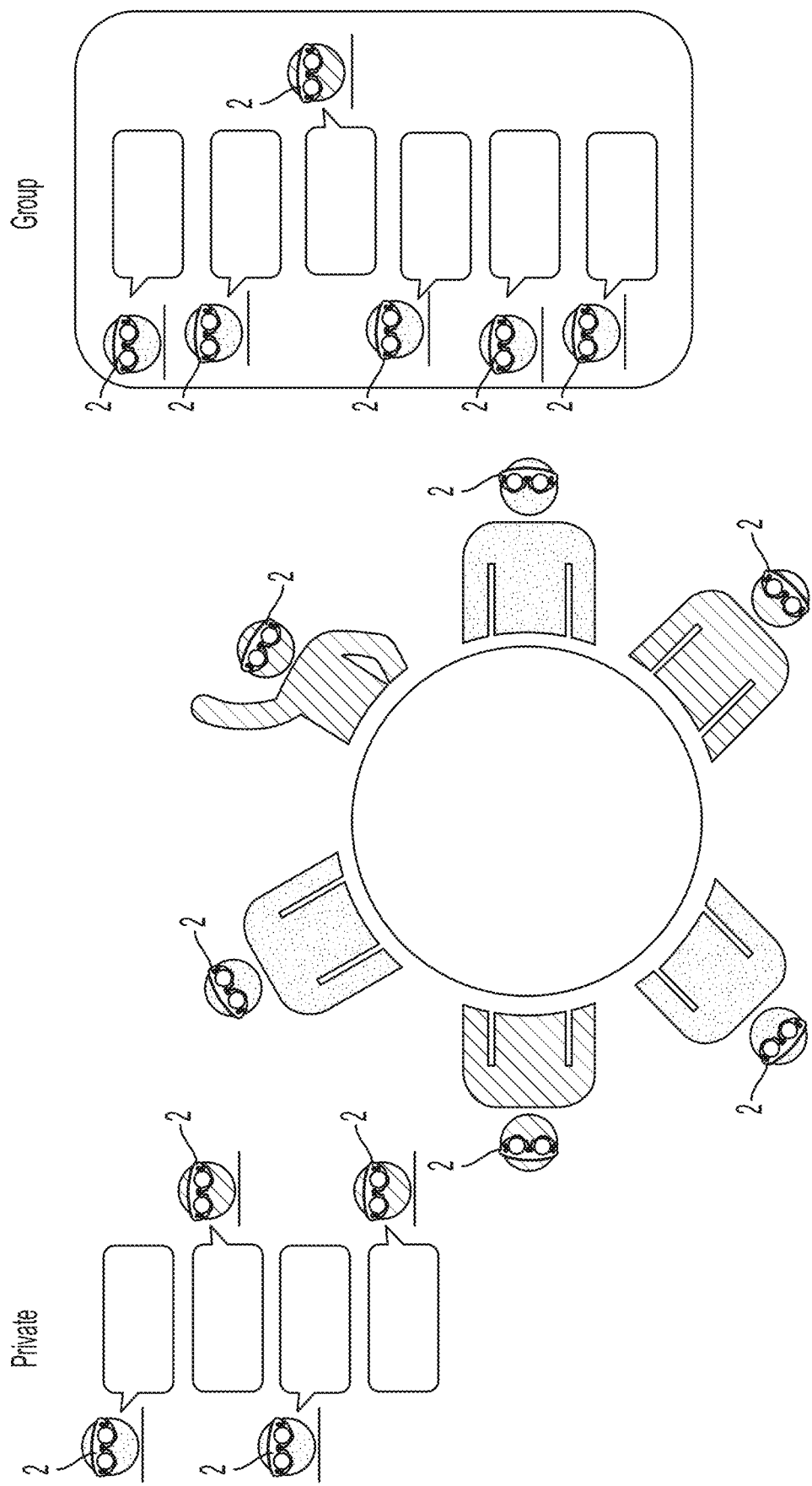
FIG. 19 illustrates an example usage of connected mixed reality systems, according to some embodiments.
Figure 20:
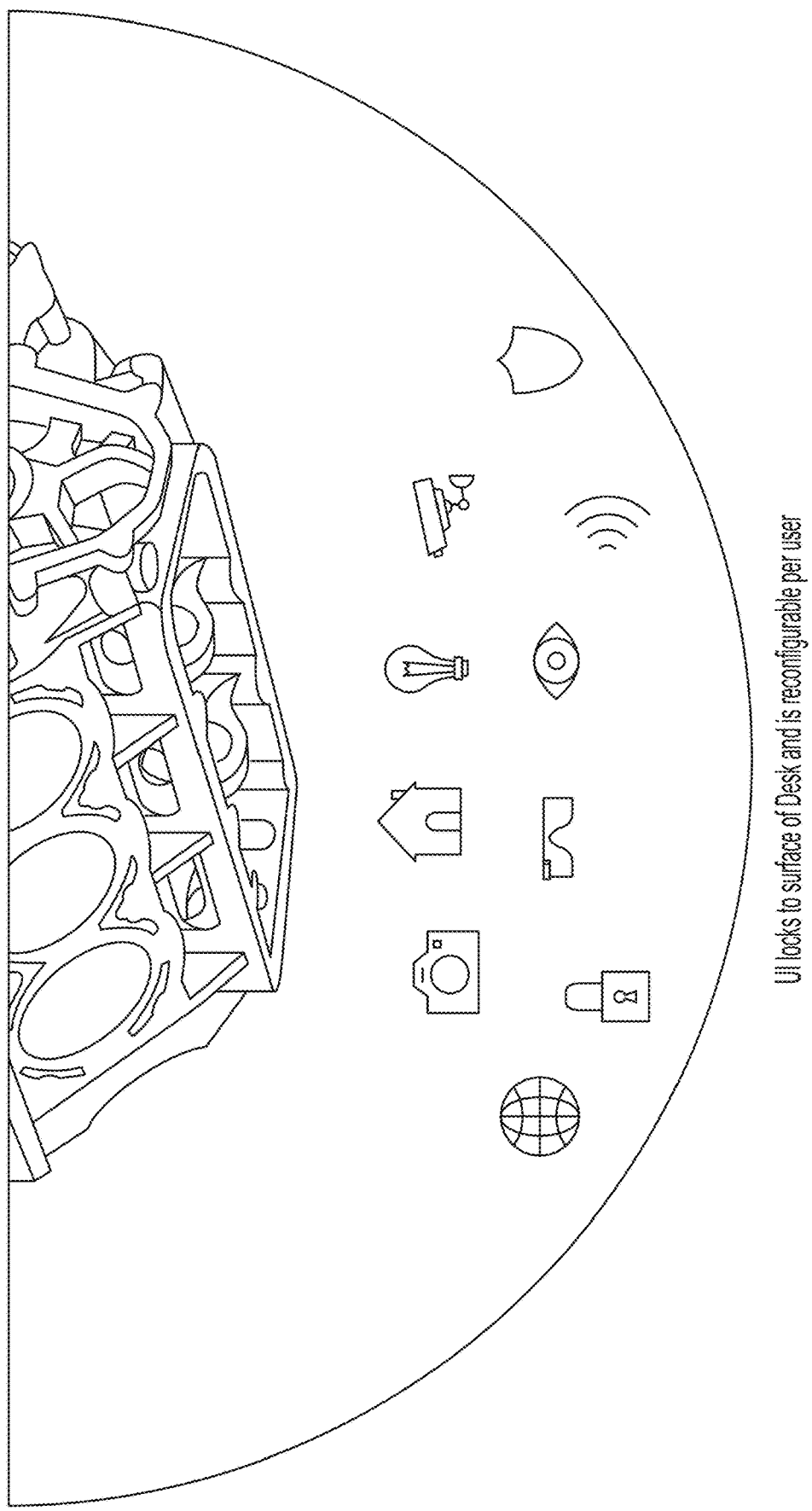
FIG. 20 illustrates an example usage of connected mixed reality systems, according to some embodiments.
Figure 21:
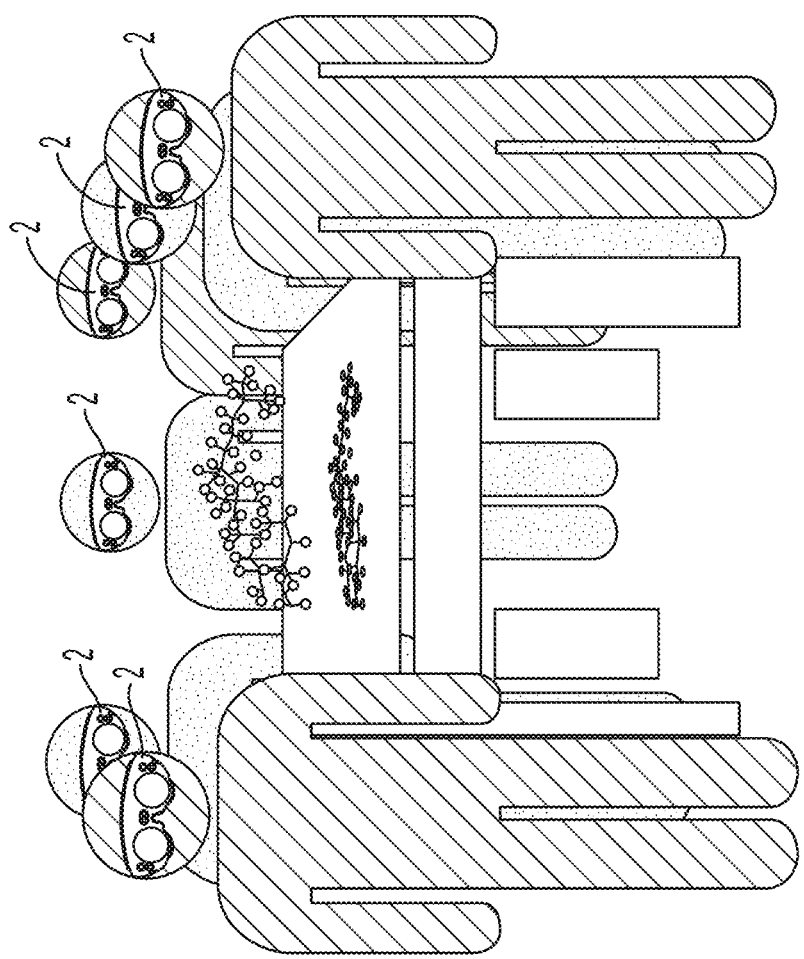
FIG. 21 illustrates an example usage of connected mixed reality systems, according to some embodiments.

Referring to FIGS. 12-21 the subject technologies may be utilized and adapted for office productivity scenarios as well. For example, referring to FIGS. 12 and 13, a meeting may be conducted with 6 people convening to discuss something, such as something visually complex such as a three dimensional automotive part, which may be displayed to each participant through his or her head mounted computing component (2); one or more of the attendees may be physically present in the room ("local") while one or more may be physically present elsewhere but represented by presented imagery, such as an avatar of themselves, within the meeting ("remote"). The attendees may utilize not only the mobile computing technology (2) to be part of the meeting, but also a variety of other "internet of things" connected devices, as shown in FIG. 14, such as displays within the room, lighting, microphones, speakers, cameras, and the like; in various embodiments, available devices from a particular room or environment may be mapped into such room or environment so that they are available to the user when present, actually or virtually, in such room. Referring to FIG. 15, in various embodiments translation technologies such as those available for translating language-to-text, and text-to-different-language, may be utilized to facilitate the real-time or near-real-time involvement of members who speak language different from those of the other participants in a meeting. Referring to FIGS. 16 and 17, the system may be configured such that participants may select aspects of their own avatar, such as customized views of their own faces or portions thereof, characters such as selected cartoon characters, and/or similar treatments for other participants. For example, User A may decide to appear to others as an Abraham Lincoln avatar for a particular meeting, while automatically assigning a "pig" avatar to another member (User B) of the meeting, and also while automatically placing a funny hat and fake mustache presentation over the otherwise standard avatar of a third member (User C) of the meeting. Referring to FIG. 18, various user interface configuration may be configured to display menus above each participant that other participants can see and utilize, for example to share notes, share video perspective, and/or share certain meeting or information controls. Referring to FIG. 19, the system may be configured to provide for private chat messaging user interfaces between a sub-group of the meeting attendees, or a more public chat visible to all attendees, for example for the sharing of notes from the meeting. As noted above, language may be translated, such as by automated settings, to provide access and utility in multi-lingual meeting environments. Referring to FIG. 20, in various embodiments, the system may be configured to present a user interface at the actual or virtually presented desk of each participant, so that they may utilize their hands to move things around, actuate or activate various things, control various aspects of the room, camera views, microphones, speakers, documents that participants are viewing, the sharing of notes, and the like. Such user interfaces preferably are configurable by each user to provide each user with a customized and efficient view of information and controls in a meeting environment. Referring to FIG. 21, as noted above in reference to FIG. 12, the unique 3-dimensional viewing capabilities that are possible with certain versions of head mounted computing components (2) present unique opportunities for participants in a meeting to view certain complex materials or information in three dimensions, together "around a table", whether or not all participants are physically actually in the room or not.

Figure 23:
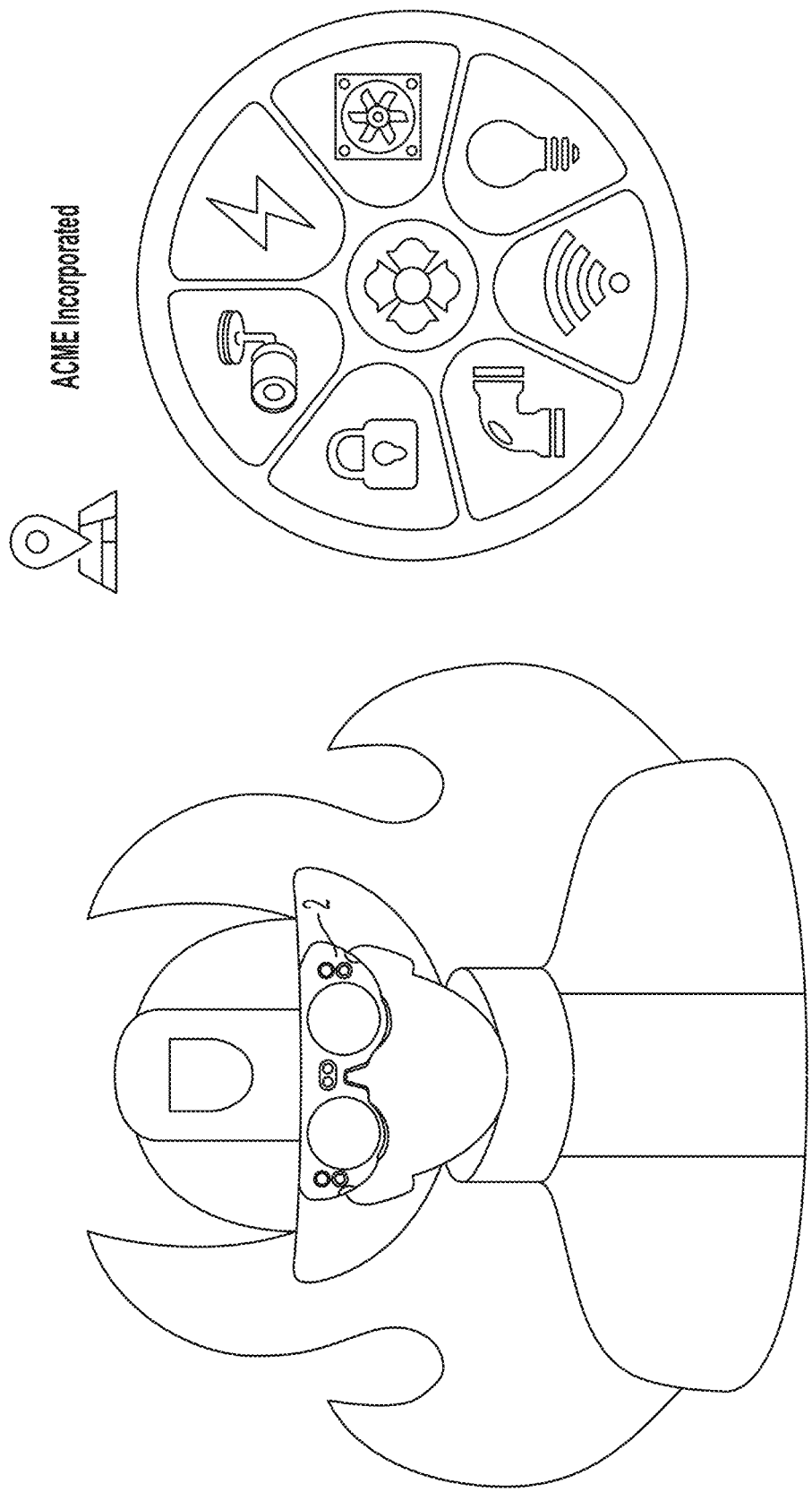
FIG. 23 illustrates an example usage of mixed reality systems in emergency situations, according to some embodiments.
Figure 25:
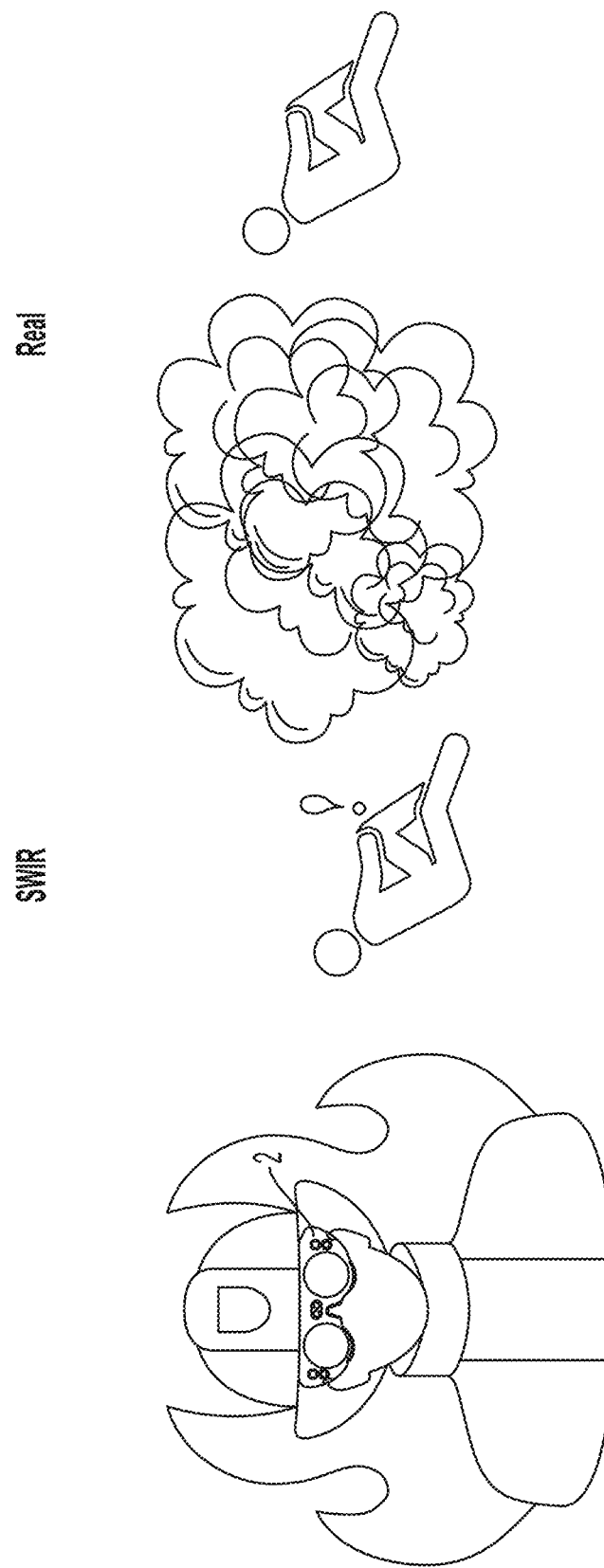
FIG. 25 illustrates an example usage of mixed reality systems in emergency situations, according to some embodiments.
Figure 27:
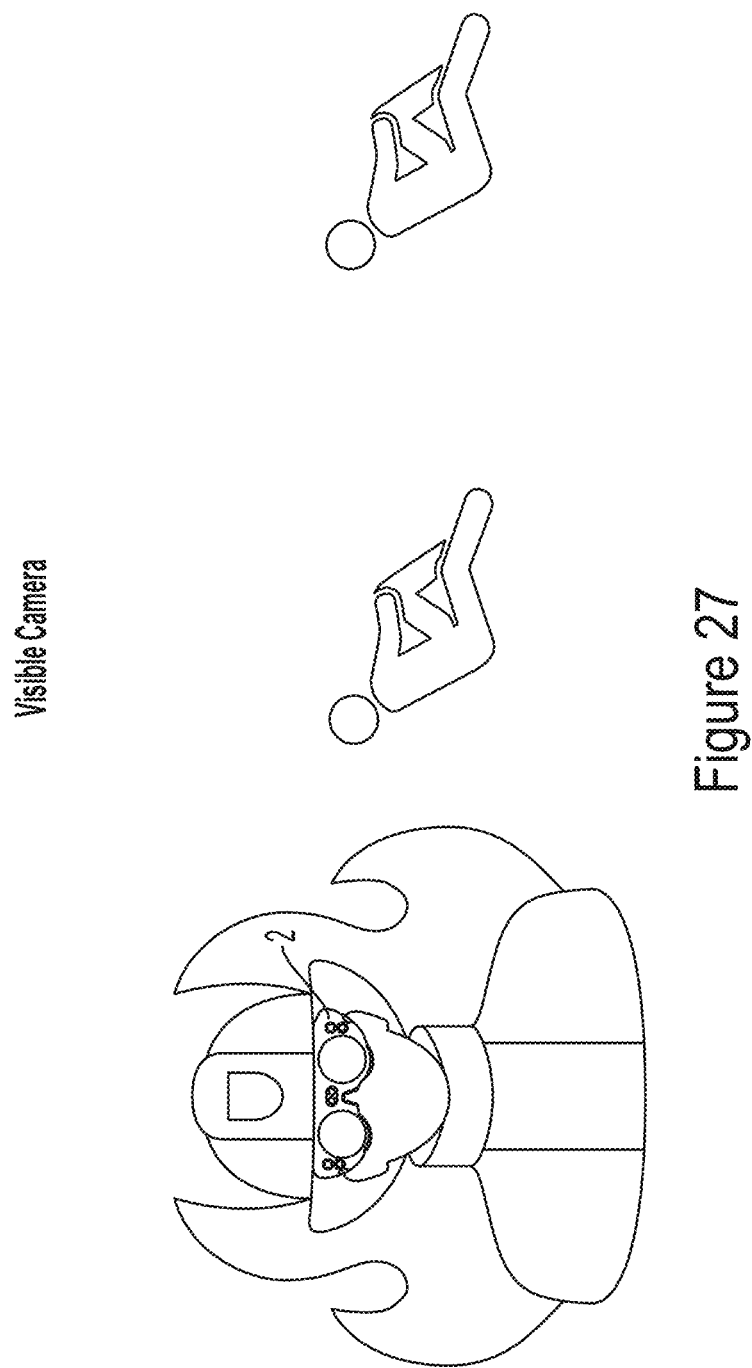
FIG. 27 illustrates an example usage of mixed reality systems in emergency situations, according to some embodiments.
Figure 28:
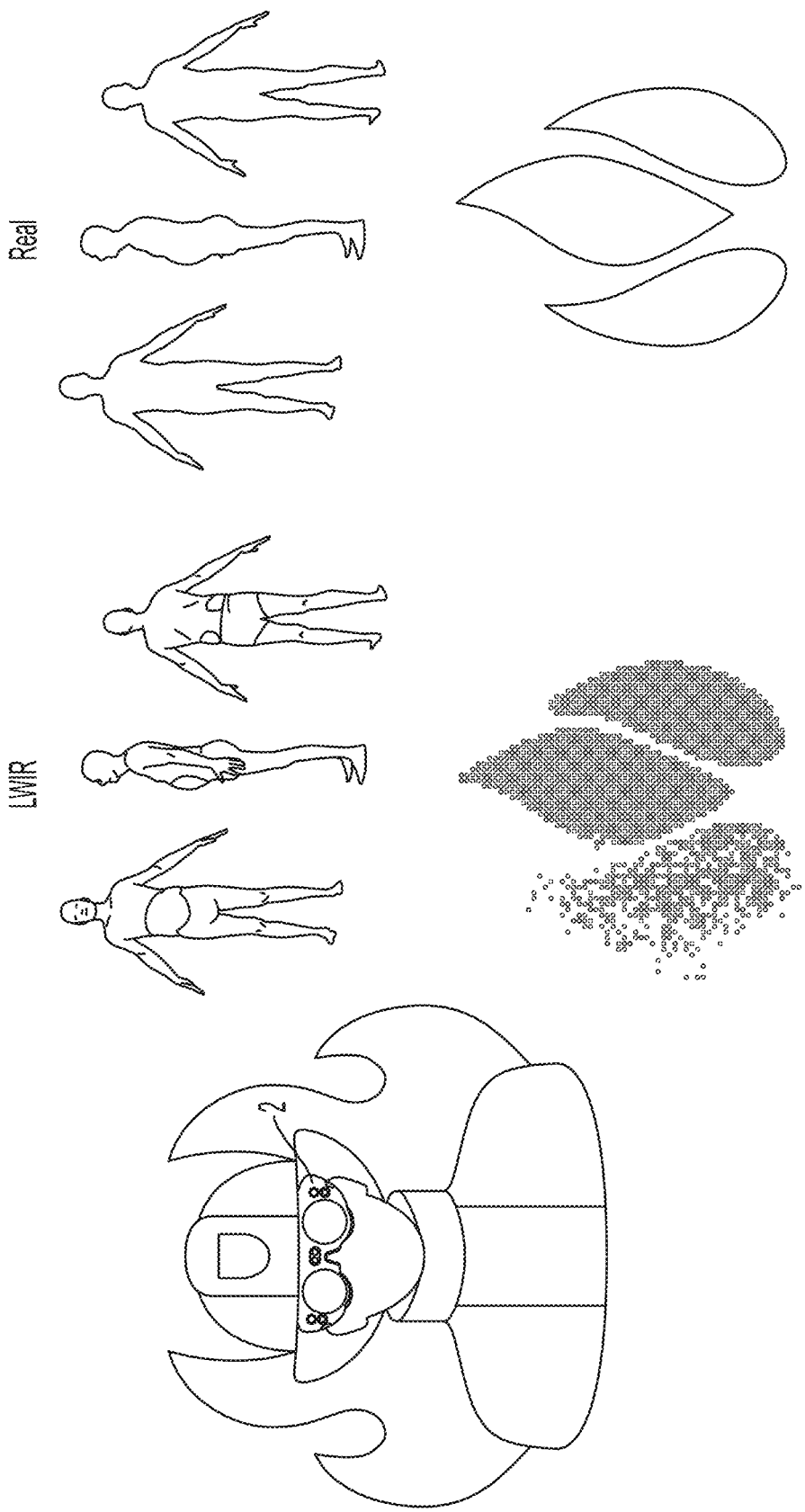
FIG. 28 illustrates an example usage of mixed reality systems in emergency situations, according to some embodiments.
Figure 29:
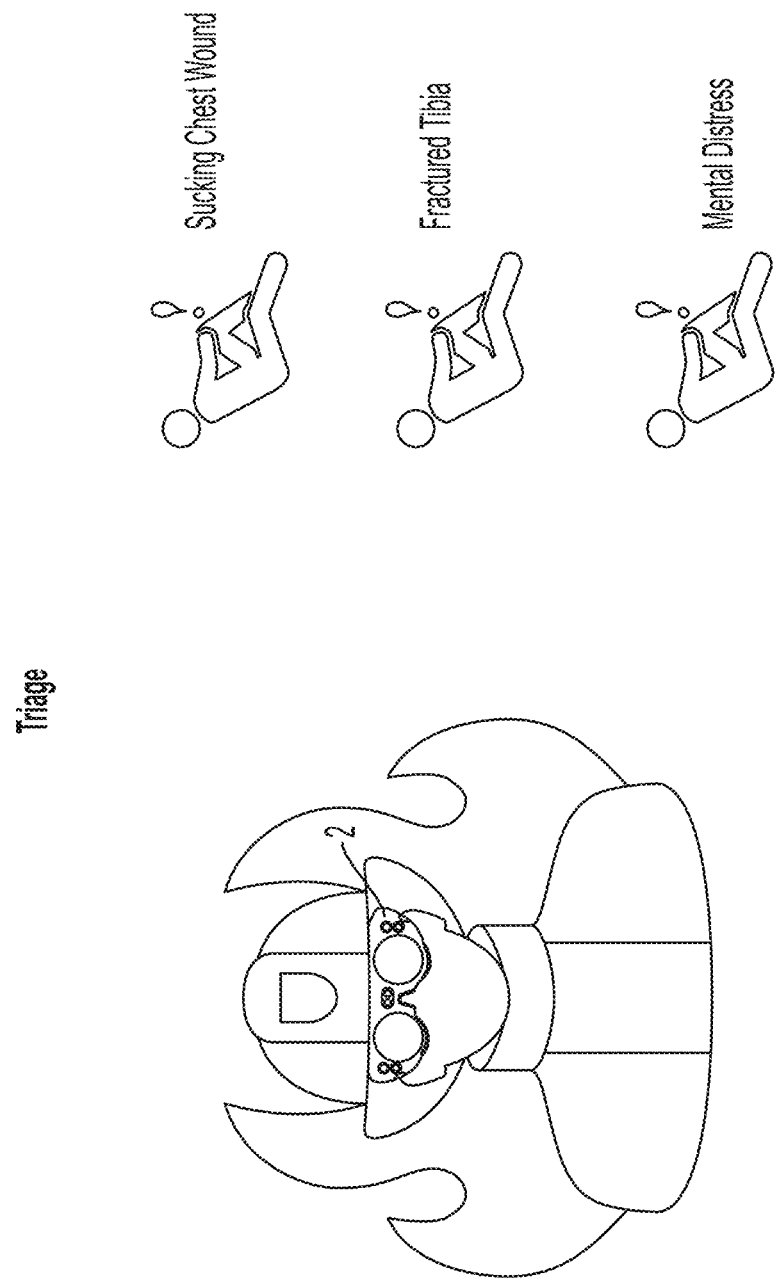
FIG. 29 illustrates an example usage of mixed reality systems in emergency situations, according to some embodiments.

Referring to FIGS. 22-30, in a firefighting environment, wearable computing systems may be configured for high utility. For example, referring to FIG. 22, firefighters may wear head mounted components (2) so that they can visualize routes and mapping to incidents. Referring to FIG. 23, internet-of-things connected resources, such as door locks, smoke alarms, cameras, electrical and gas resources, and lighting may be visualized (i.e., such as by a head mounted component 2) and made accessible for emergency control by the firefighter operators on scene or back in the control center. Referring to FIG. 24, in various embodiments the system may be configured to allow each member of the team who is connected with a mobile computing system, such as a head mounted component (2) which allows hands-free utility, to visualize the positioning (i.e., based upon GPS, connectivity triangulation, IP address, mapping/SLAM/computer-vision, etc.) and status (such as health status based upon biometric sensors which may be present on the users' head mounted components 2 as they encounter stress, danger, smoke, etc., which may be detected and/or visualized with various sensors and cameras present on such head mounted components and shared with other collaborators via wireless connectivity). For example, referring to FIG. 26, a head mounted component of a user (2) may be configured to monitor eye-based and facial indicators of stress, as well as heart rate, heart rate variability, etc., and to report out this information to others; further, a head mounted component of a user (2) may be configured to utilize computer vision resources, such as camera and local or remote/connected computing resources, to not only scan rooms around them for mapping and machine learning functionalities, but also to conduct facial recognition of personnel, such as hurt patients within a building; further, referring to FIG. 27, visible light camera technologies, such as those which may be operatively coupled to a head mounted component of a user (2) may be configured to capture pictures of various scenes, personnel, etc., to share with other operators in various locations, such as at a remote control center. Referring to FIG. 28, thermal/infrared (i.e., such as long or normal wavelength infrared), visible light, and/or short wavelength infrared imaging technologies ("SWIR"; has the advantage of being able to image fairly successfully through smoke which may be visually occlusive to other imagine modalities) may be combined to facilitate visualization of various things in an emergency operator environment, such as locations of fire hotspots, locations of people, pets, etc. Referring ahead to FIGS. 86A-86D, SWIR imaging may be utilized to significantly enhance user visibility relative to normal visible light, depending upon the environmental scenario. Referring to FIG. 29, operators may utilize a head mounted component of a user (2) to label various people of things within an emergency environment, such as patients with various ailments or injuries, for sharing with other operators. Referring to FIG. 30, connected systems, such as wearable components, may be configured to provide outgoing information regarding operator condition not only pertaining to operator biometrics and environmental issues, but also to other critical connected devices, such as an oxygen tank fill level sensor.

Figure 32:
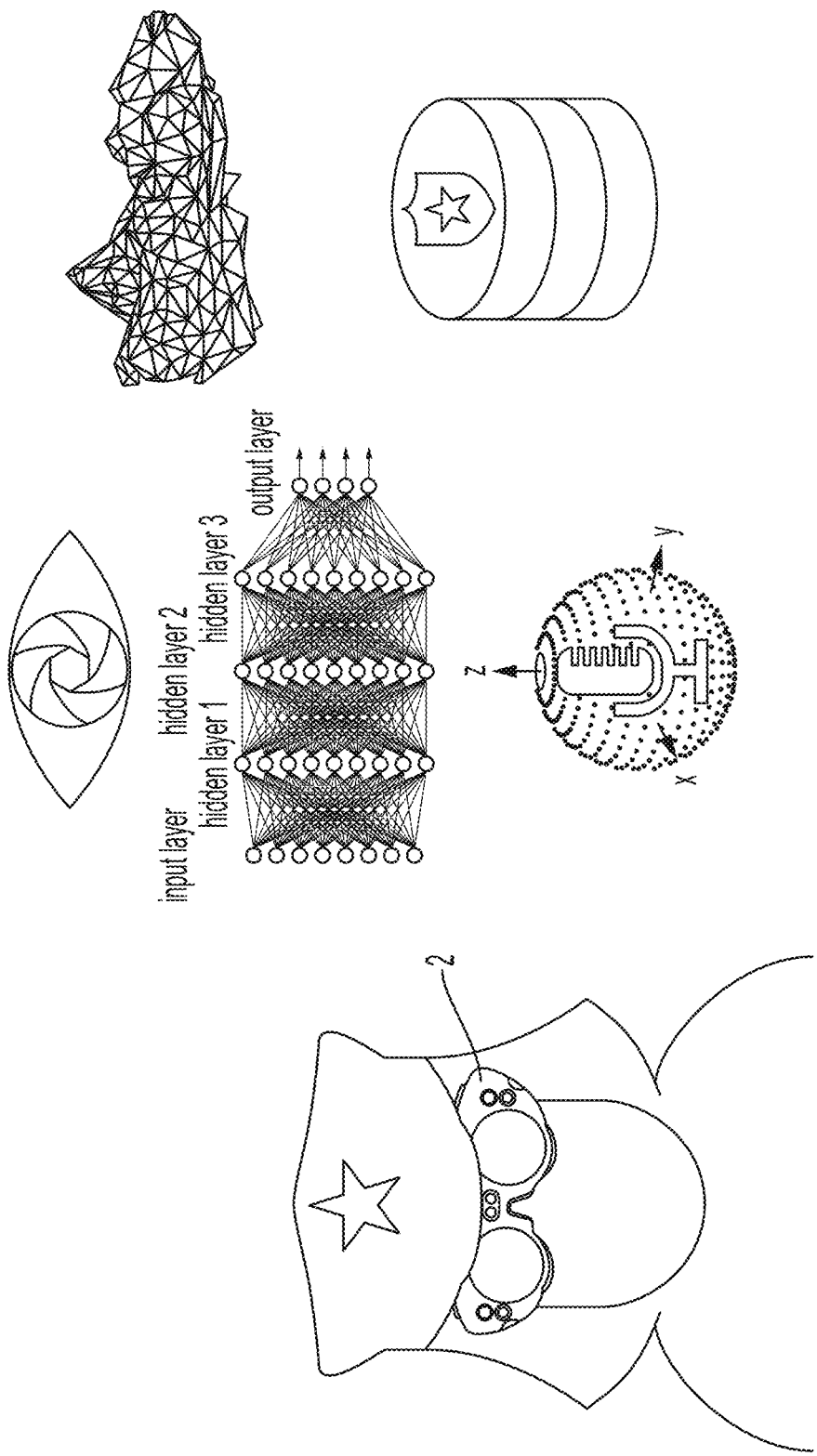
FIG. 32 illustrates an example mixed reality computing architecture, according to some embodiments.
Figure 33:
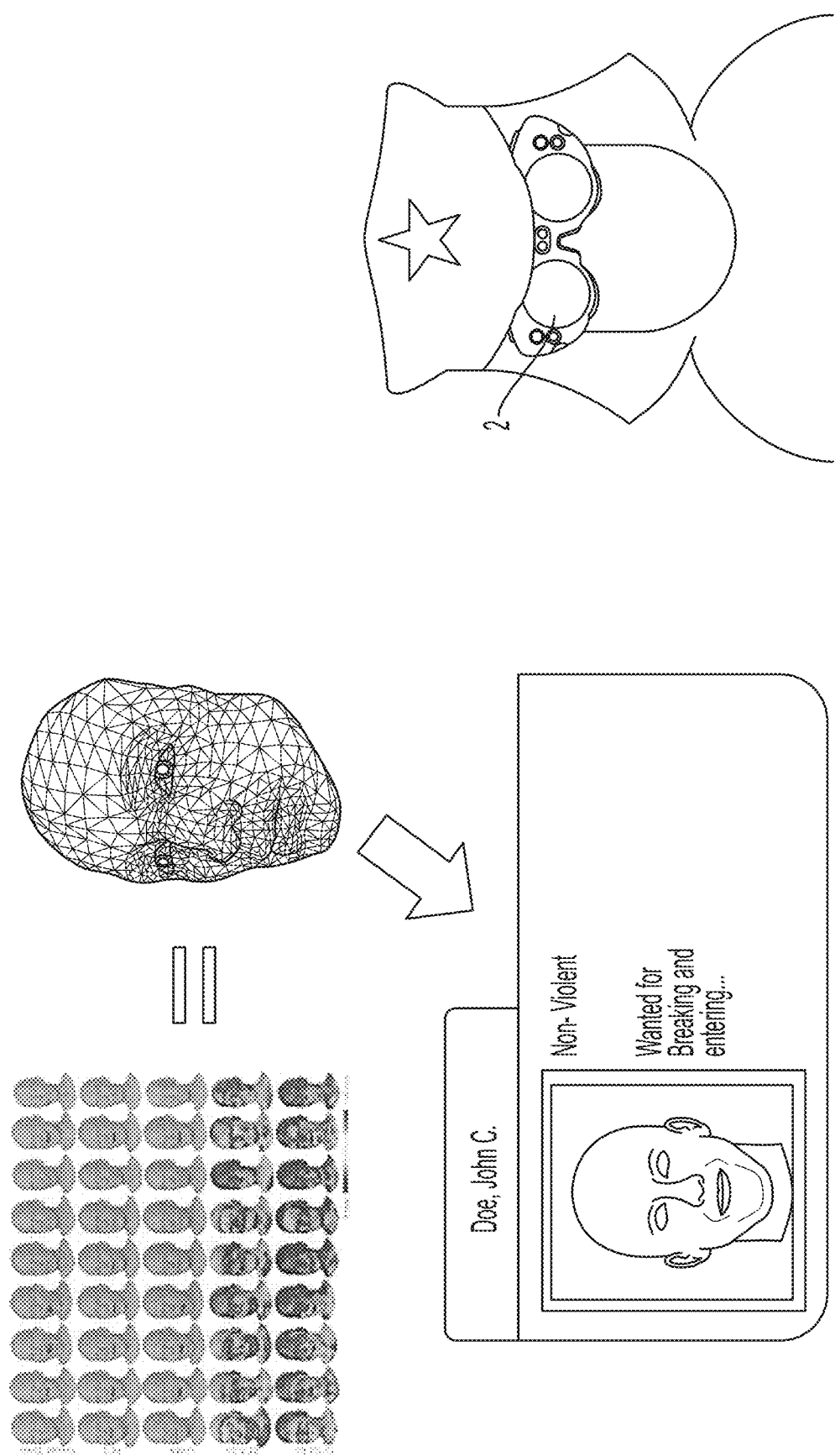
FIG. 33 illustrates an example usage of mixed reality systems, according to some embodiments.
Figure 34:
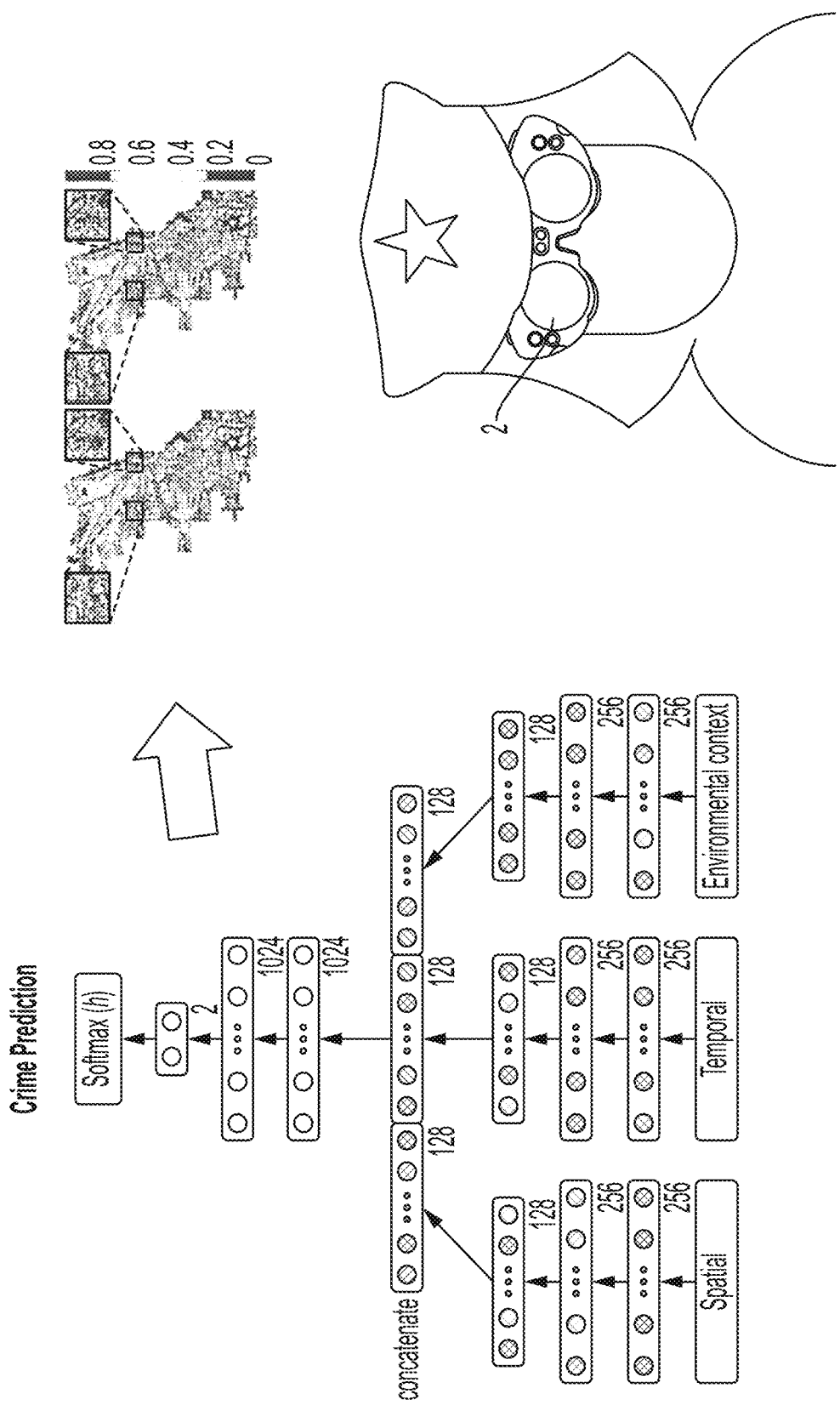
FIG. 34 illustrates an example mixed reality computing architecture, according to some embodiments.
Figure 35:
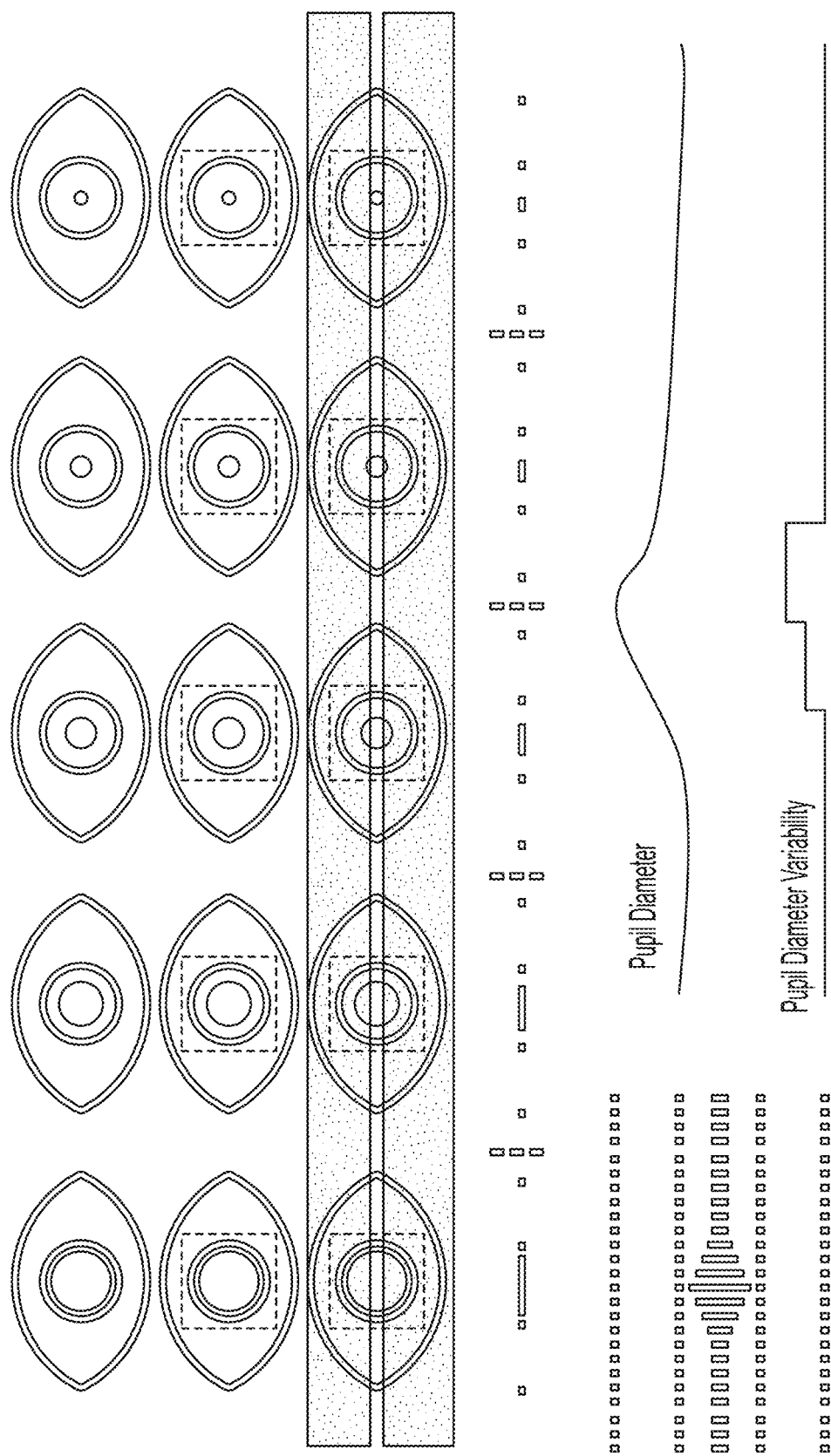
FIG. 35 illustrates example sensor components of mixed reality systems, according to some embodiments.
Figure 36:
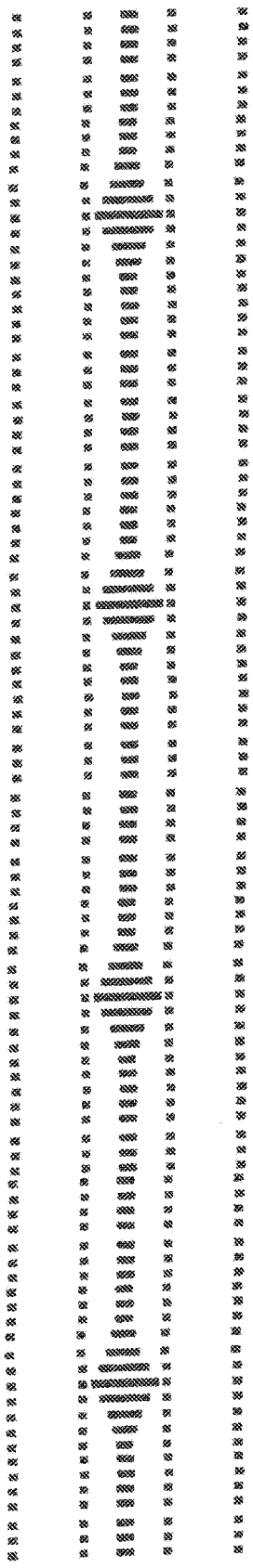
FIG. 36 illustrates example sensor components of mixed reality systems, according to some embodiments.
Figure 37:
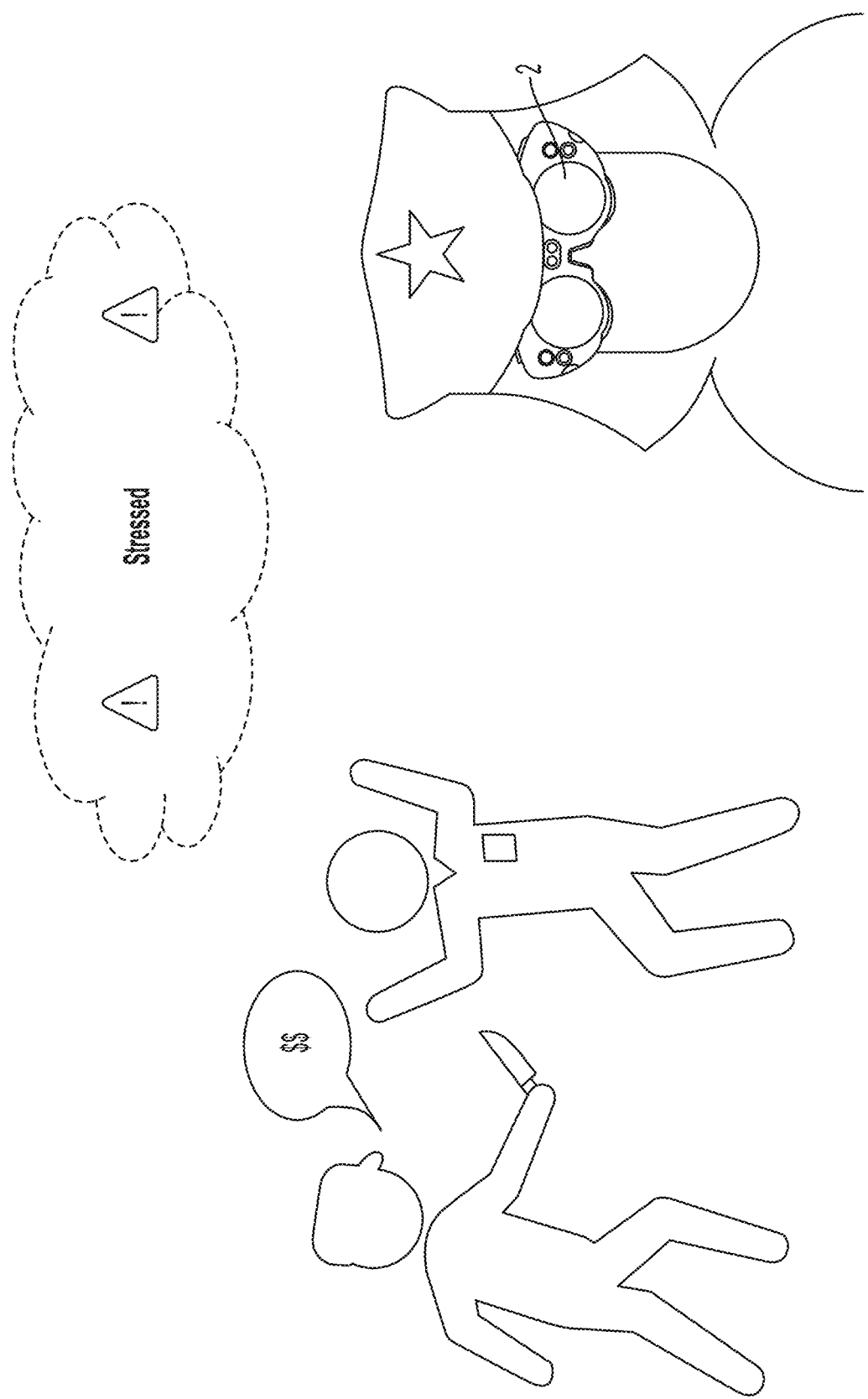
FIG. 37 illustrates an example usage of mixed reality systems, according to some embodiments.
Figure 38:
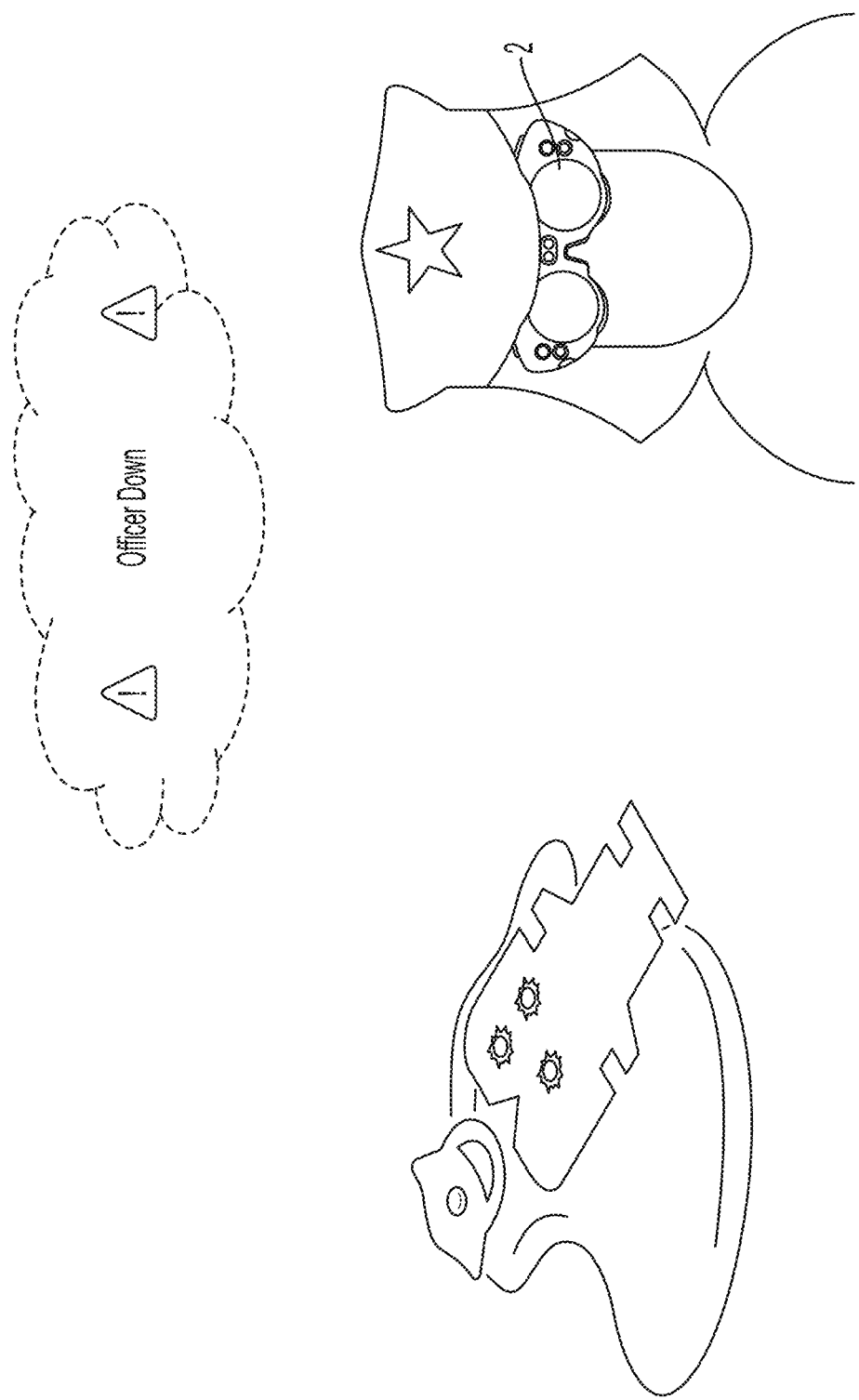
FIG. 38 illustrates an example usage of mixed reality systems, according to some embodiments.
Figure 42:
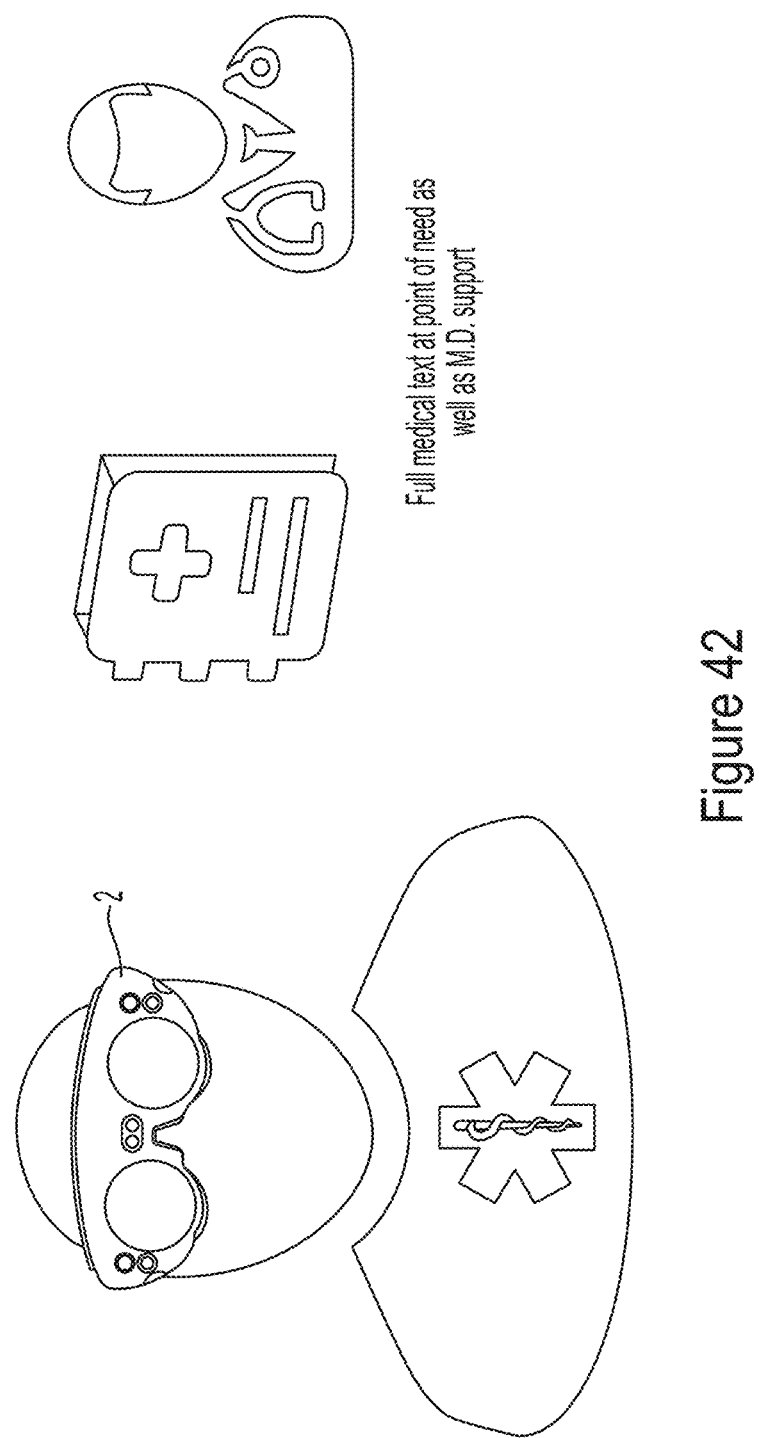
FIG. 42 illustrates an example usage of mixed reality systems in emergency situations, according to some embodiments.
Figure 43:
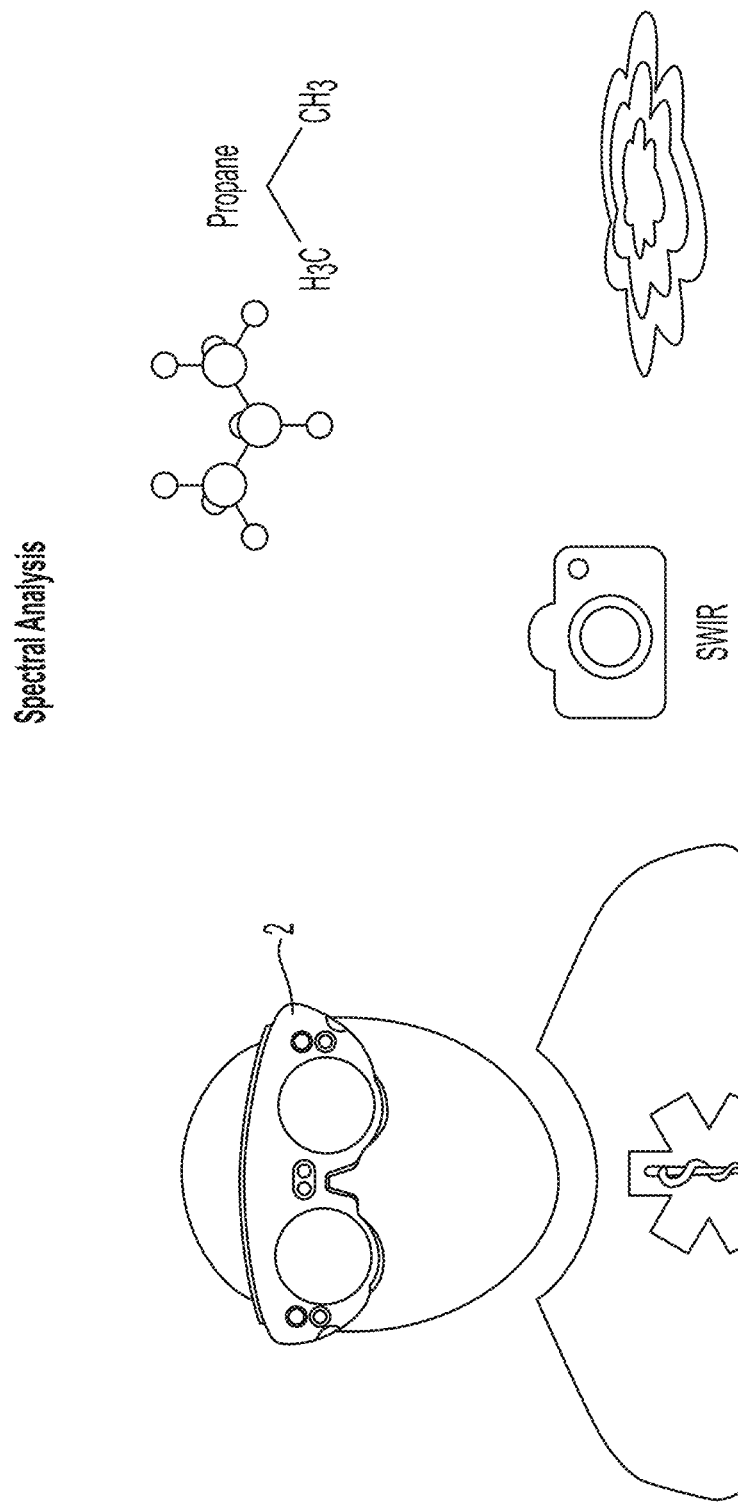
FIG. 43 illustrates an example usage of mixed reality systems in emergency situations, according to some embodiments.
Figure 44:
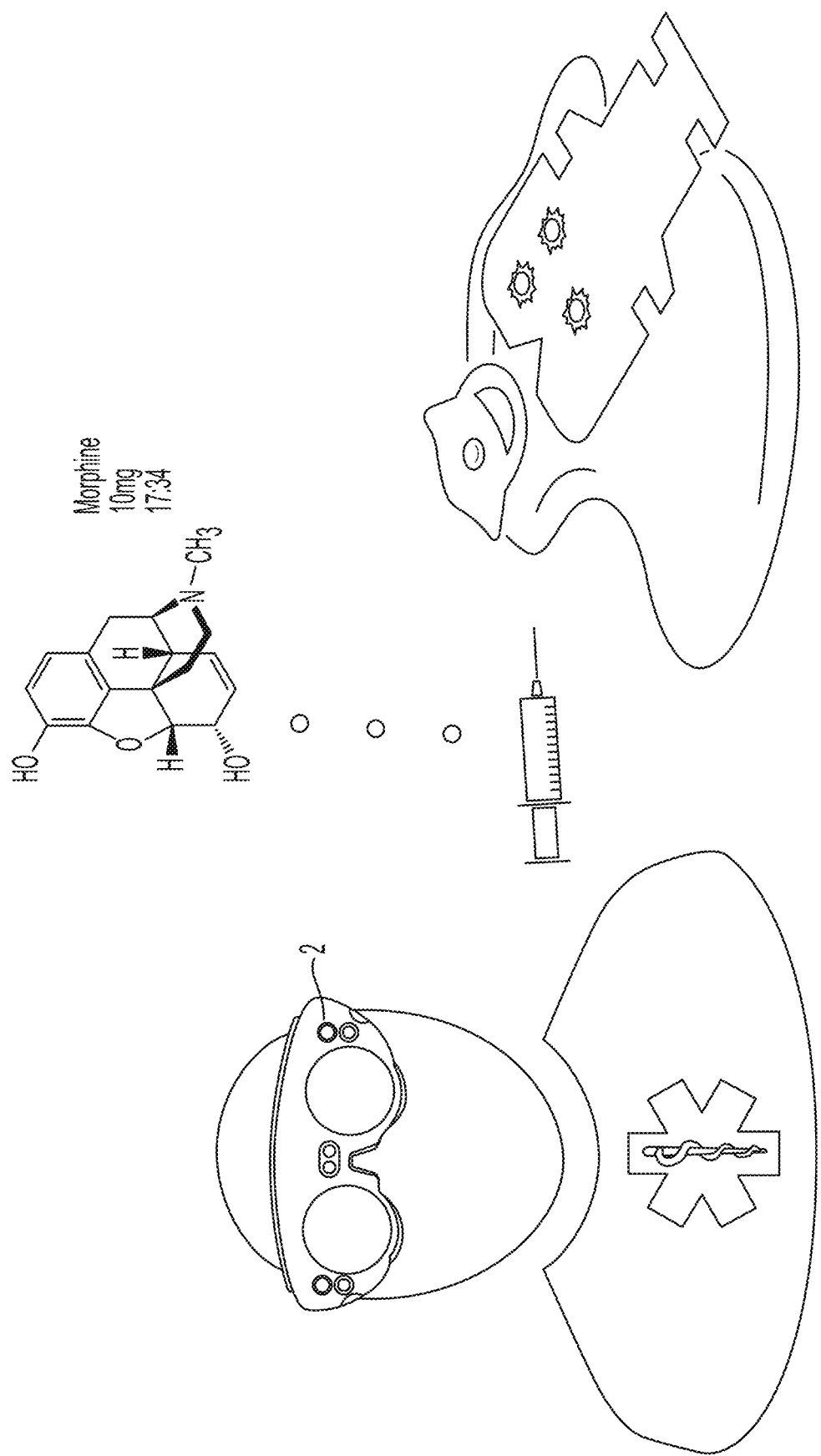
FIG. 44 illustrates an example usage of mixed reality systems in emergency situations, according to some embodiments.

Referring to FIGS. 31-39, in a police/law enforcement environment, wearable computing systems may be configured for high utility. Referring to FIG. 31, wearable computing systems (2) may be configured for various members of a police operational team to utilize hands free messaging to/from various disparate locations. Referring to FIG. 32, in various embodiments, each member is connected, and each member becomes another sensing "node" to the overall system, providing data not only pertinent to that operators biometrics, but also information pertaining to the environment around such operator, such as for evidence collection, personnel or structure identification, video/audio/photo capture, thermal/IR/SWIR imaging, simultaneous localization and mapping ("SLAM"), localization via wireless connectivity triangulation, GPS, and/or IP address, traffic or congestion sensing/reporting, access to remote databases such as crime or healthcare databases, sensing or receiving mapping data pertinent to the world around each operator, etc. For example, referring to FIG. 33, as a police operator walks around with his or her connected head mounted computing component (2), the system may be configured to analyze each face that comes into nearby visual contact with the officer, to conduct biometric analysis such as facial or iris recognition. Such info may be utilized along with connected database searching, for example, to inform the officer that they person they just walked by on the sidewalk is a felon with an active arrest warrant, and likely to be armed and dangerous. Referring to FIG. 34, utilizing connected resources such as crime/location databases, along with location determined, for example, by GPS, wireless connectivity localization, IP address, and/or SLAM/computer vision techniques using a connected head mounted computing component (2), the system may be configured to provide an operator in the field, operational headquarters, or anywhere else, with an indication regarding the crime rate in the particular area; for example, in one embodiment, when an operator is in a particularly crime ridden dark alley area of south Chicago at 2:30 am local time, everything around the operator may be tinted red or otherwise indicated as relatively high crime; in other locations, one side of the street may be indicated as relatively lower crime based upon recent data than the opposite side of the street. Thus, even if an officer is walking or driving through a known crime zone, at least this will not be a surprise; further, recent events or information can be marked for the operator, such as a pointer to: known location of high-density street-side crack dealing in last week. Referring to FIGS. 35-37, sensors, such as inward-facing cameras on a head mounted computing component (2) may be utilized for the tracking of variables that relate to the operator's transient stress level, such as pupil diameter variability over time; it has been shown that significant variability over time, when normalized for incoming light variability, is a relatively good indicator of individual stress state (for example, small constant pupil diameter may be correlated with a relative rest state while high variability and relatively large pupil diameter may be correlated with a relatively high stress state). Pupil diameter may be measured and reported out over time to connected systems and personnel; for example, in one embodiment Eulerian video magnification techniques involving scanning a line across a captured scene (such as the eye) and looking for changes/deltas, along with segmentation to identify the pupil versus sclera of the eye, etc., can provide an efficient window into certain biometric variability. Referring to FIG. 37, such technologies may be utilized pertaining to the biometrics of operators wearing appropriate components (2), such as police officers, but also may be utilized if in close enough proximity to analyze the biometrics of others, using outward facing sensors. Referring to FIG. 38, it has been shown that people in situations of extreme stress can have difficulty or inefficiency in processing certain things that would be considered relatively straightforward in an unstressed situation, and so various embodiments may be configured to assist with all sorts of information-related tasks, such as labelling a person with a certain wound as such, or a dead body as a dead body so that each operator need not walk up and check pulse to confirm, etc. Referring to FIG. 39, crime activity may be mapped in real time or near real time, and visualized, such as in an AR mapping user interface, by operators wearing appropriate components (2). In one embodiment, the AR mapping interface may be configured to provide an operator with a time-domain control also, so that they may rewind by an hour or whatever time frame to visualize what the scenario was like then.

Certain operators or responders, such as firefighters, police, or emergency medical responders, may also utilize connected medical resources through their connected wearable computing components (2) in various situations. For example, referring to FIGS. 40-44, operators may utilize their connected wearable computing components (2) to conduct spectral analysis regarding environmental issues around them (such as smoke, gases, chemicals; using technologies such as SWIR devices which may be coupled to an operator's headset 2), to have direct access to patient histories and/or expert physicians who may be able to connect into their headset (2) share their view and audio feed (i.e., via outward-facing microphones on the headset 2) of patients in high-resolution, to conduct biometric analysis (such as patient recognition by face, iris, and/or transient connectivity to special resources on the patient's smartphone, etc.), understand allergies or important case histories of the patient, etc. For example, an operator utilizing a connected wearable computing component (2) with direct connectivity to remote experts may encounter an unconscious patient who appears to be in cardiac arrest; the operator may ask for expert emergency medicine triage help, and an expert may come into the scene, such as a video teleconference and/or avatar presentation appearing in a portion of the operator's computing component (2) field of view, along with audio; facial recognition, other biometrics, specialized emergency responder patient smartphone access, and/or simple patient wallet identification card information may be utilized to identify the patient, and securely connected resources may be utilized to establish that the patient is a known heroin addict, and from what the appearing emergency medicine expert can see from the shared field of view of the operator, seems to be overdosed and close to death—time to urgently administer anti-opiate naloxone hydrochloride injection drug product such as that sold under the tradename NarCan.

Figure 45:
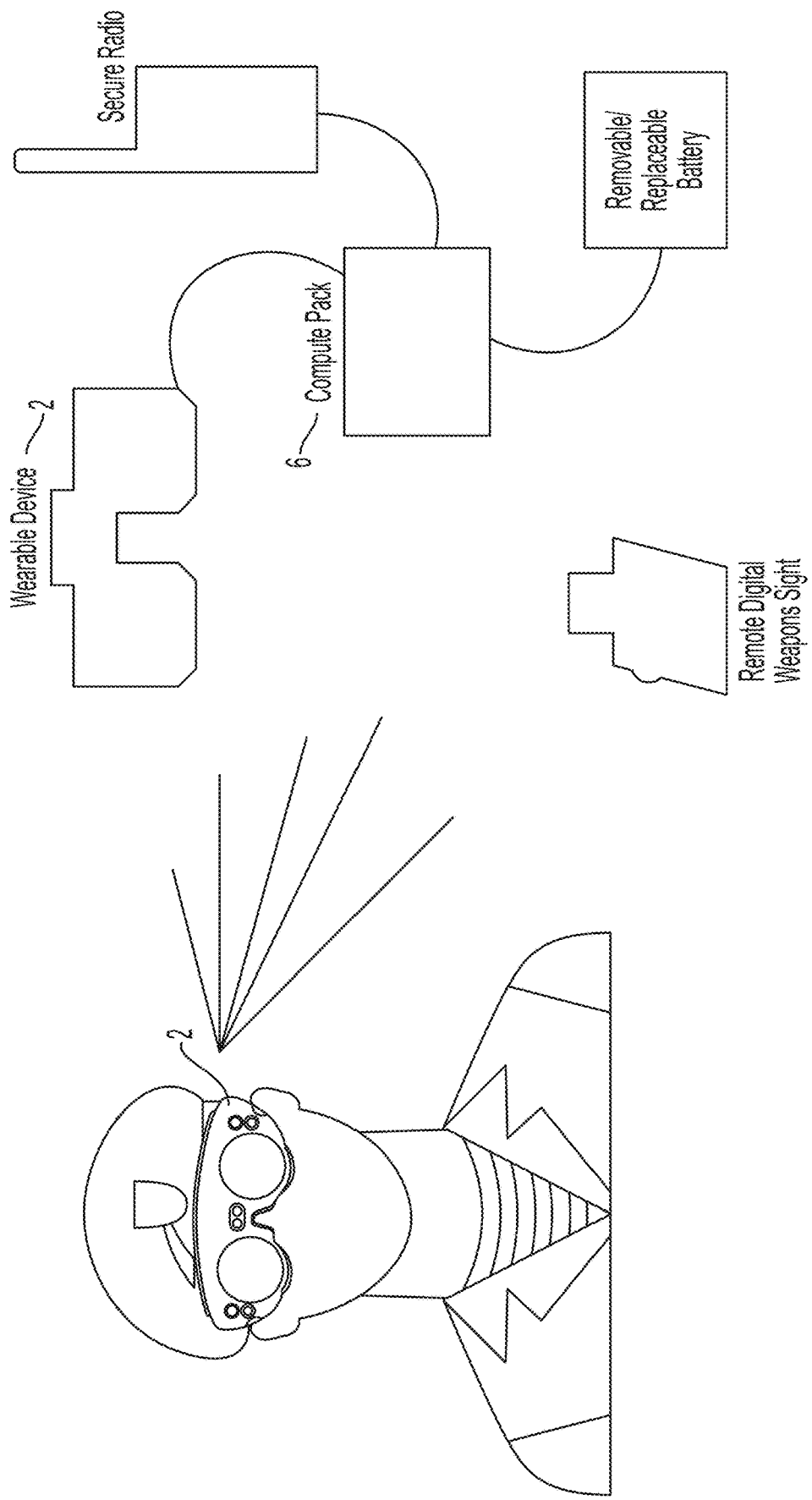
FIG. 45 illustrates an example mixed reality computing architecture, according to some embodiments.
Figure 47:
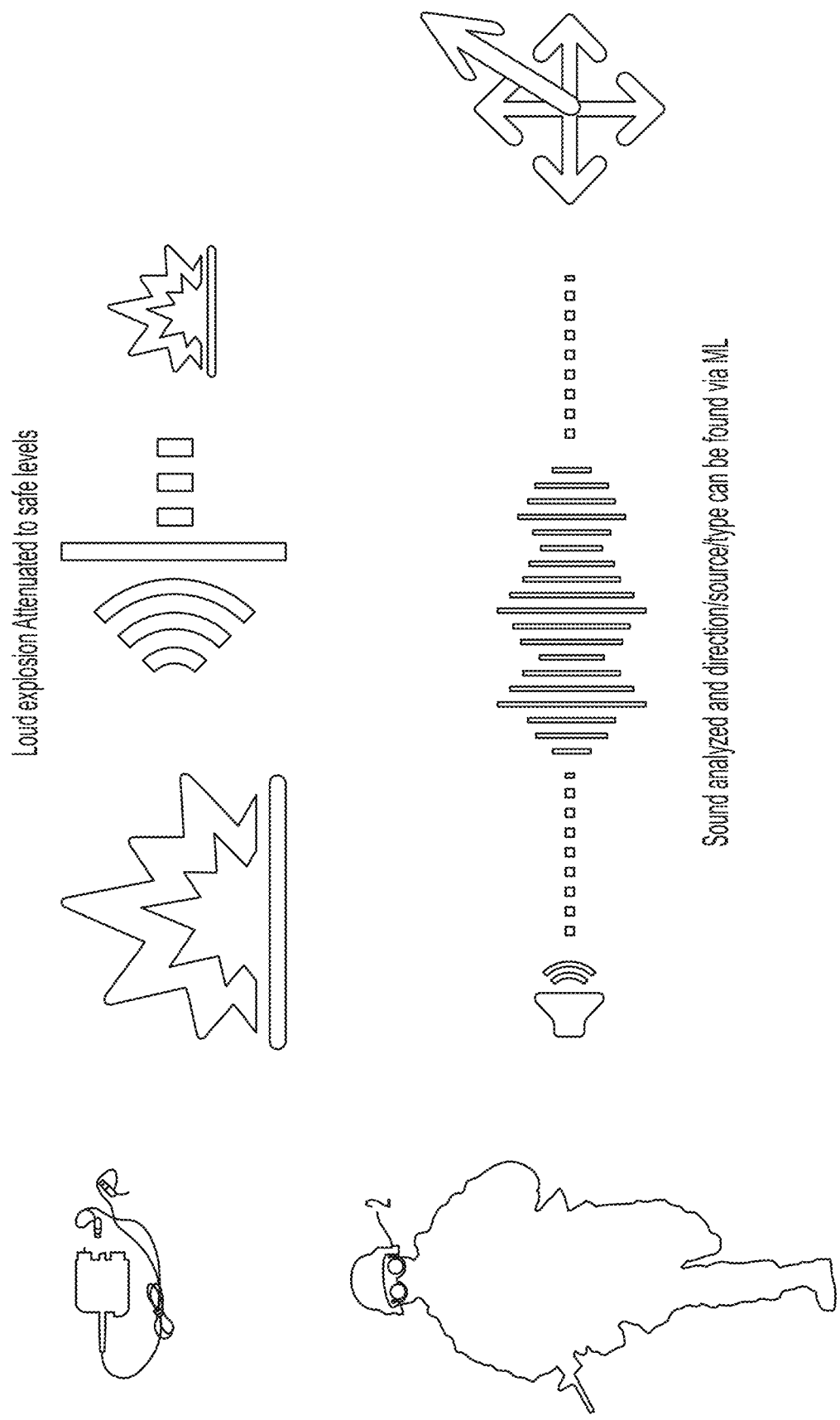
FIG. 47 illustrates an example mixed reality computing architecture, according to some embodiments.
Figure 48:
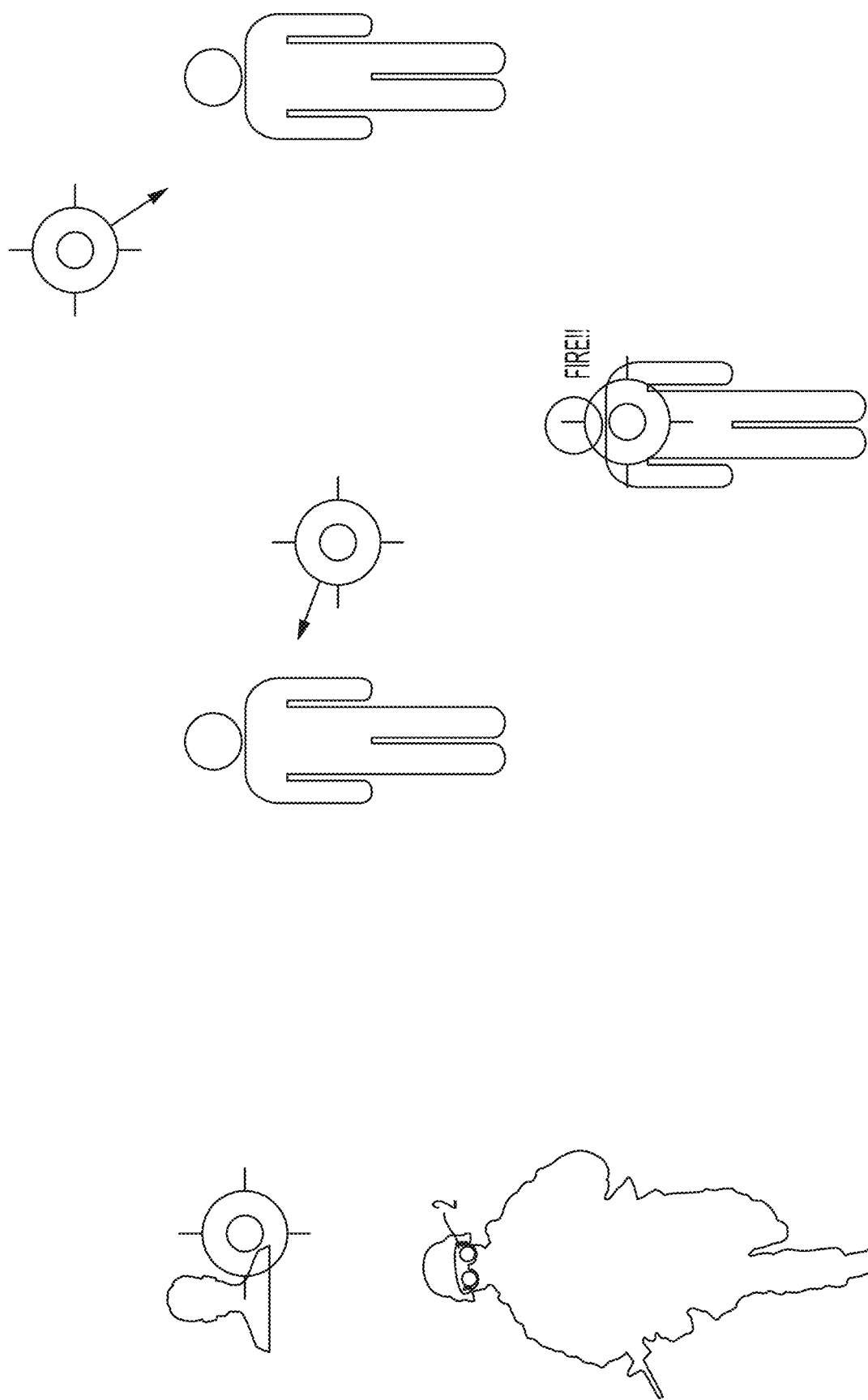
FIG. 48 illustrates an example mixed reality computing architecture, according to some embodiments.
Figure 55:
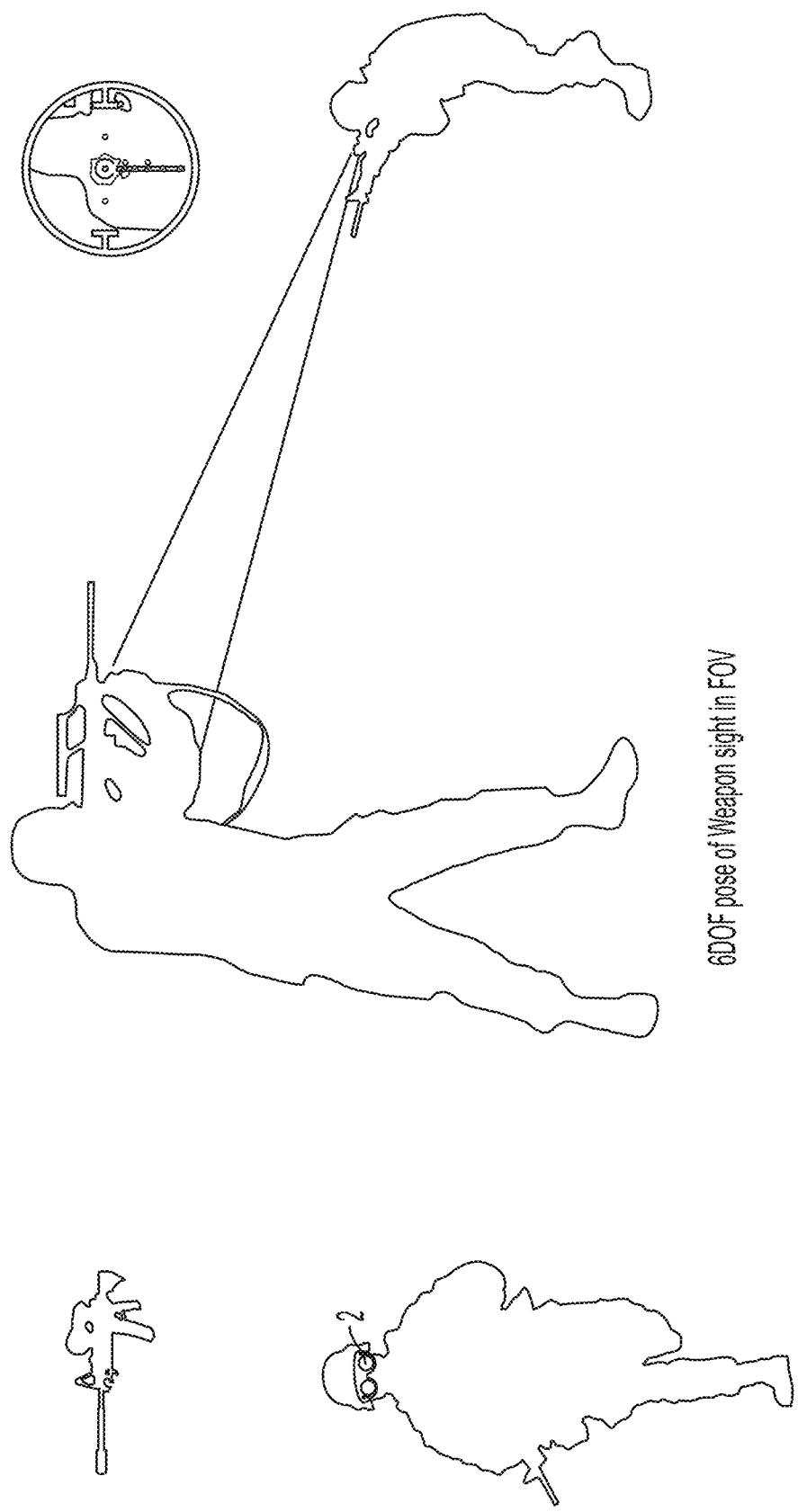
FIG. 55 illustrates an example mixed reality computing architecture, according to some embodiments.

Referring to FIGS. 45-63, many configurations may be utilized to assist military operators of various types in a myriad of scenarios. For example, referring to FIGS. 45-46, a military operator with a connected wearable computing system (2, 6) may be wirelessly connected with various other resources, such as a secure communications radio (such as ultra-wide-band radios available to military operators), one or more remote weapons sights, one or more battery packs configured to be removably coupled to the wearable computing system, databases, maps, images, video, audio, and communications of many kinds—all may be interconnected and operated by the military operator; such configurations may be informed and/or intercoupled with military systems such as those known as ATAC and NetWarrior. The wearable computing system also may be configured to provide certain protections to the operator, such as laser eye protection through the head mounted component (2), and hearing protection through earplug style headphones configured to only pass audio up to a certain intensity, after which transmission is shunted and the earplug blocks sound (in other words, the earplugs may be operatively coupled to microphones, such as directional microphones or arrays thereof, which may be capable of capturing and processing sounds and selectively reproducing those in the powered earplugs, or not). Referring to FIGS. 48 and 55, in a manner akin to that described in reference to the 6 degree-of-freedom ("DOF") tracking of a handheld component (4), described in detail in the aforementioned incorporated references, a weapon or portion thereof may be tracked, and a control system may be configured to assist in directing an operator to a desired target and/or only facilitating weapon activation or firing when the weapon is in the correct position/orientation relative to a desired target. Referring ahead to FIG. 52, the system also may be configured to provide pertinent information (such as enemy combatant status, rules of engagement, suspected weaponry situation, any detectable or known stress or medical information, etc.) regarding each visualized subject after identification, using outward facing cameras and/or sensors, and/or previous information from other sources pertaining to the particular subject in view.

In another embodiment, one or more directional microphones may be operatively coupled to highly sophisticated signal processing capabilities to assist in directionalizing and identifying sound captures; for example, at night around a troop fighting vehicle, troops may place a perimeter of their headsets (2) to act as a sound capturing perimeter, which may be monitored locally or remotely (i.e., as a group of individual sound capturing devices, or as an array) for particular sound patterns, such as, "sound pattern north at 1:39 am local time—diesel transport truck, one of ours;" or, "86% confidence; sound pattern due south 2:58am local time—AK-47 small arms fire along with small motorcycle activity; 83% confidence; awake troop leader to provide update re potential insurgent activity."

Figure 51:
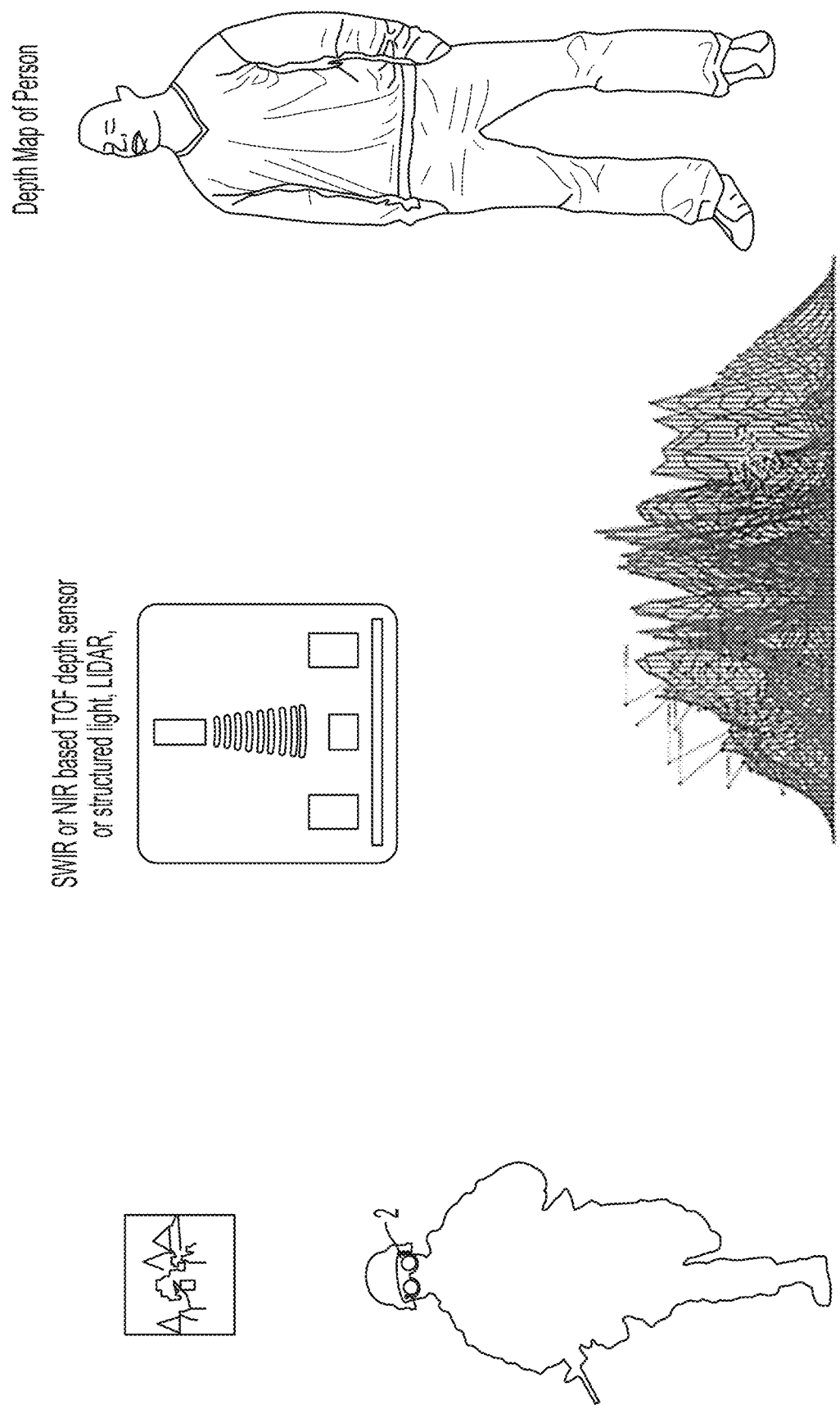
FIG. 51 illustrates an example mixed reality computing architecture, according to some embodiments.
Figure 52:
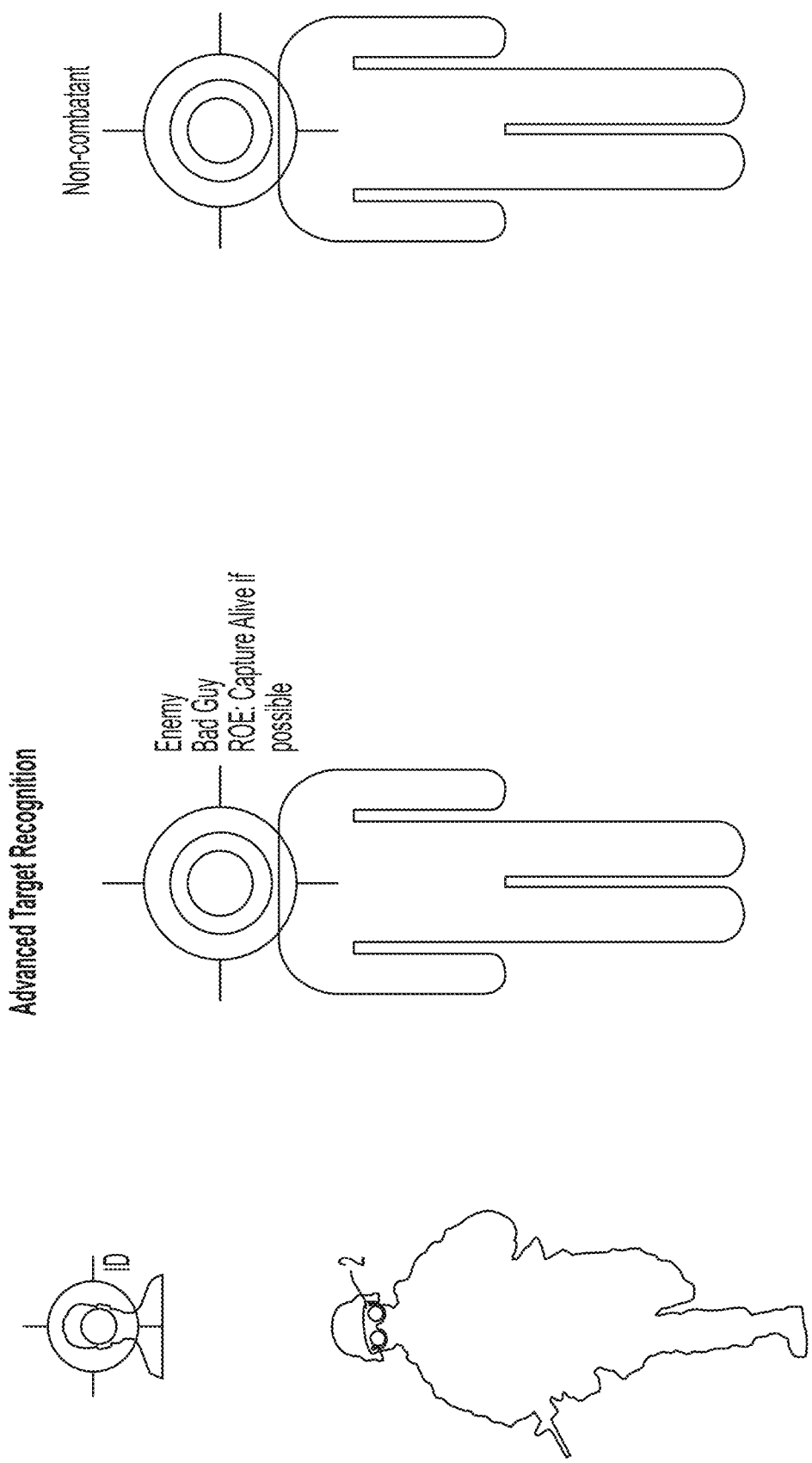
FIG. 52 illustrates an example mixed reality computing architecture, according to some embodiments.
Figure 56:
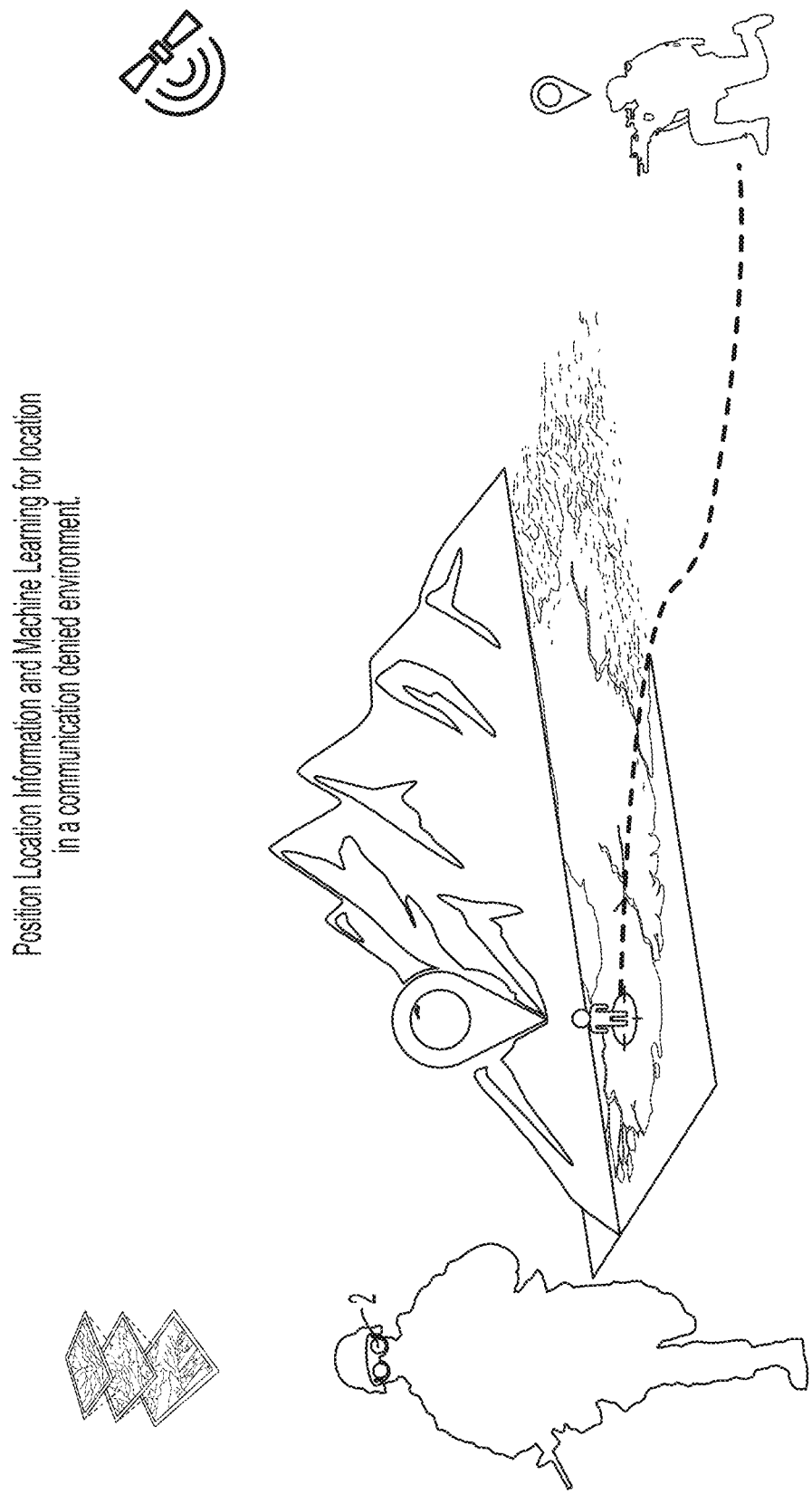
FIG. 56 illustrates an example mixed reality computing architecture, according to some embodiments.

Referring to FIG. 49-53, preferably the systems utilized by operators (2) are connected with those of other operators, as well as remote systems and resources, so that, for example, local on-ground operators may gain the benefit of video, audio, and other analysis and activity pertaining to the use of unmanned aircraft, other vehicles, other operators, and remote command centers, all of which may be connected by various technologies including but not limited to ultra wide band transceivers, 802.11/WiFi configurations, 3G, 4G, 5G, LTE and other mobile connectivity modalities, satellites, etc. For example, in FIG. 49, an on-ground operator is seen visualizing three armed enemies using imagery captured by an unmanned aircraft, from a position wherein the operator otherwise would not have been able to see such enemies (for example, because they are on the other side of a ridge, etc.). Referring to FIG. 51, short wavelength infrared ("SWIM"), or NIR-based (near-infrared) time-of-flight sensors, or structured light configurations, LIDAR, RADAR, and the like may be utilized to understand the surroundings and to look for specific things, such as people. Referring to FIG. 53, in various embodiments the connected system may be configured to provide each operator on the ground, as well as others in other locations, with a real time or near real time feed of the activity and issues pertaining to a given situation. Referring to FIG. 54, this may include information pertaining to medical evacuation, such as by using air resources (a so-called "Med-Evac" air resource). For example, in various embodiments the system may be configured such that operators wearing their connected computing systems (2) on air and ground (as well as connected operators at base camps, headquarters, etc.) may be able to share valuable information that otherwise is hard to communicate efficiently in a hands free manner, such as an approximate cone (or other geometry) of air traffic avoidance to avoid contact with small arms fire from enemy combatants while still being able to reach and pick up wounded; the operators on the ground may be able to adjust or change the geometry and/or location of this avoidance zone by using their headsets and pointers created the gestures, their connected weapons or weapon sights, etc. Referring to FIG. 56, an operator wearing his computing system (2) may be able to orient himself and other resources such as weapons by using computer vision, object recognition, SLAM, and other image-based technologies when GPS, mobile telecom triangulation, IP address, and other localization technologies are not readily available or operational.

Referring to FIGS. 57-58, 81, and 87-89, the level of connectivity of operators and resources available with the subject configurations provides for detailed quantitative analysis of various aspects of military operations as never before, through facts and performance rather than recommendation or blanket standardized testing. The system may be configured so that the lowest ranking operators have access to a minimal subset of information relative to them and their peers, which operators up the chain of command, all the way to the top, have access to more and more information, classified and otherwise. Referring to FIGS. 59-63, everyone in an operation can benefit from the sharing and capture of information in an efficient manner, such as one that is primarily hands-free. Operators can work with each other, visualize things as never before, communicate with and utilize other resources such as aircraft, other imaging systems, database resources, experts, team members, and/or health-related information, all with their wearable computing system, preferably with a head-mounted AR visualization component, at the center of functionality and enablement.

Figure 65:
FIG. 65 illustrates an example training usage of mixed reality systems, according to some embodiments.
Figure 66:
FIG. 66 illustrates an example training usage of mixed reality systems, according to some embodiments.
Figure 67:
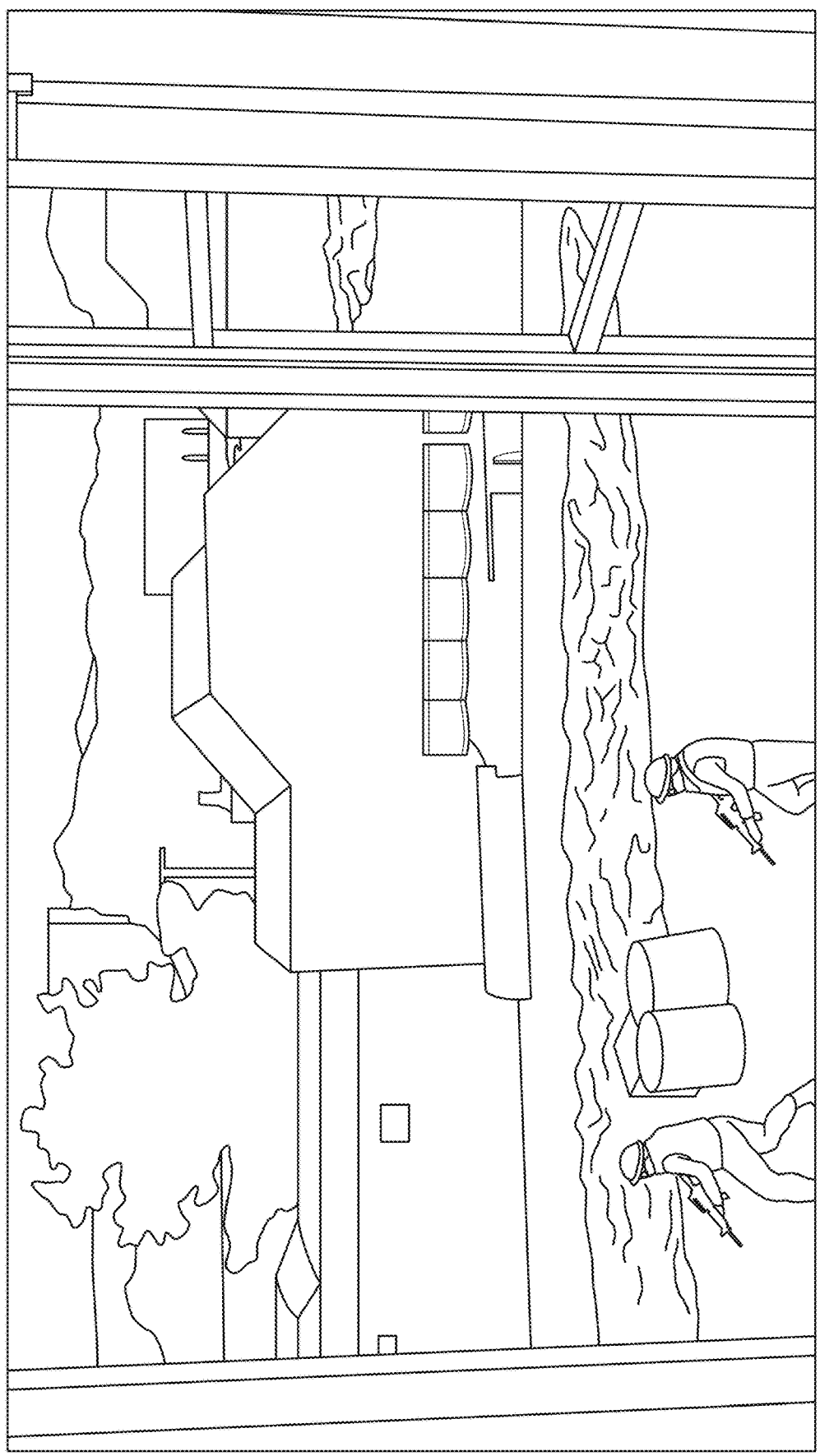
FIG. 67 illustrates an example training usage of mixed reality systems, according to some embodiments.
Figure 68:
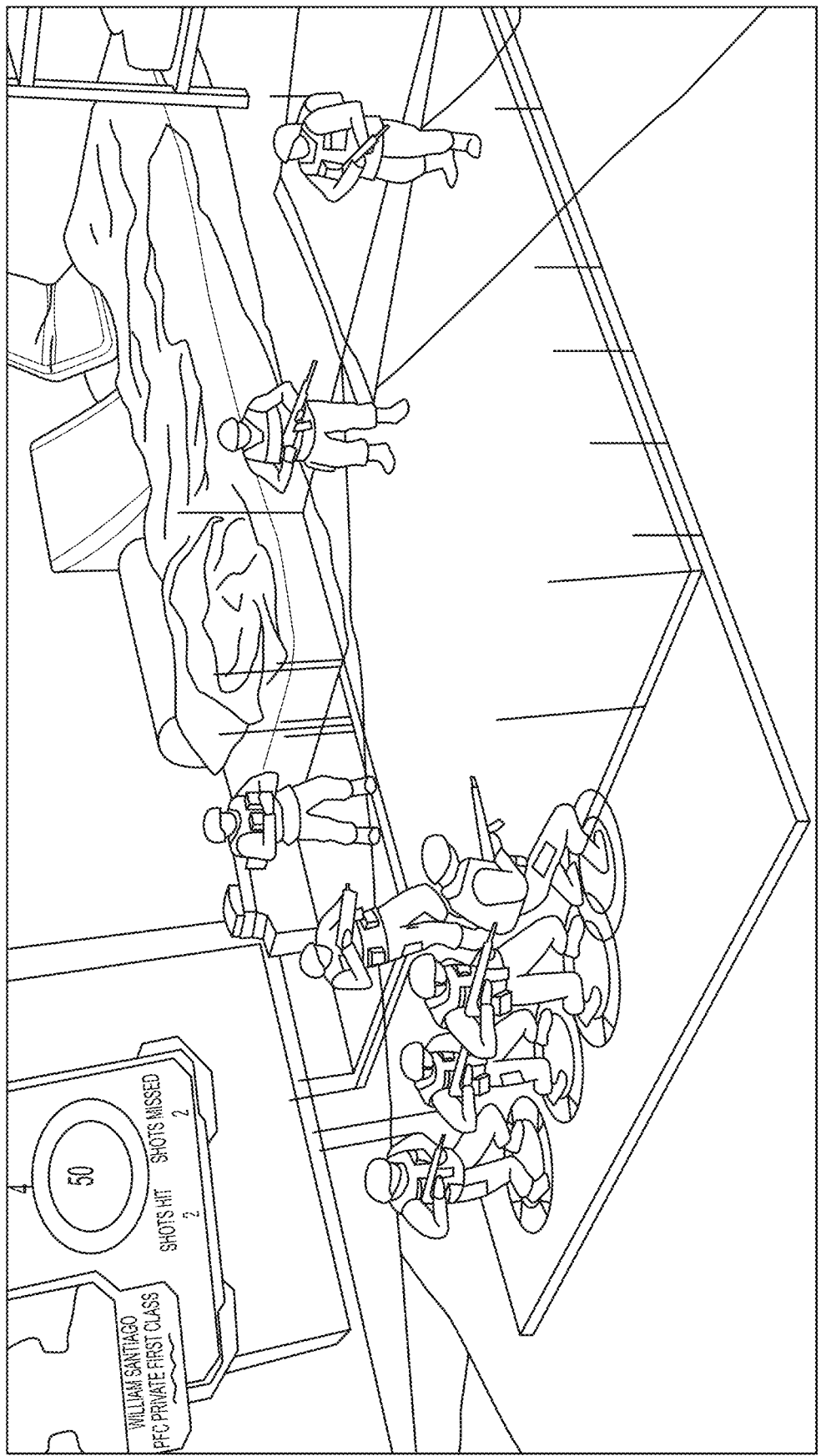
FIG. 68 illustrates an example training usage of mixed reality systems, according to some embodiments.
Figure 69:
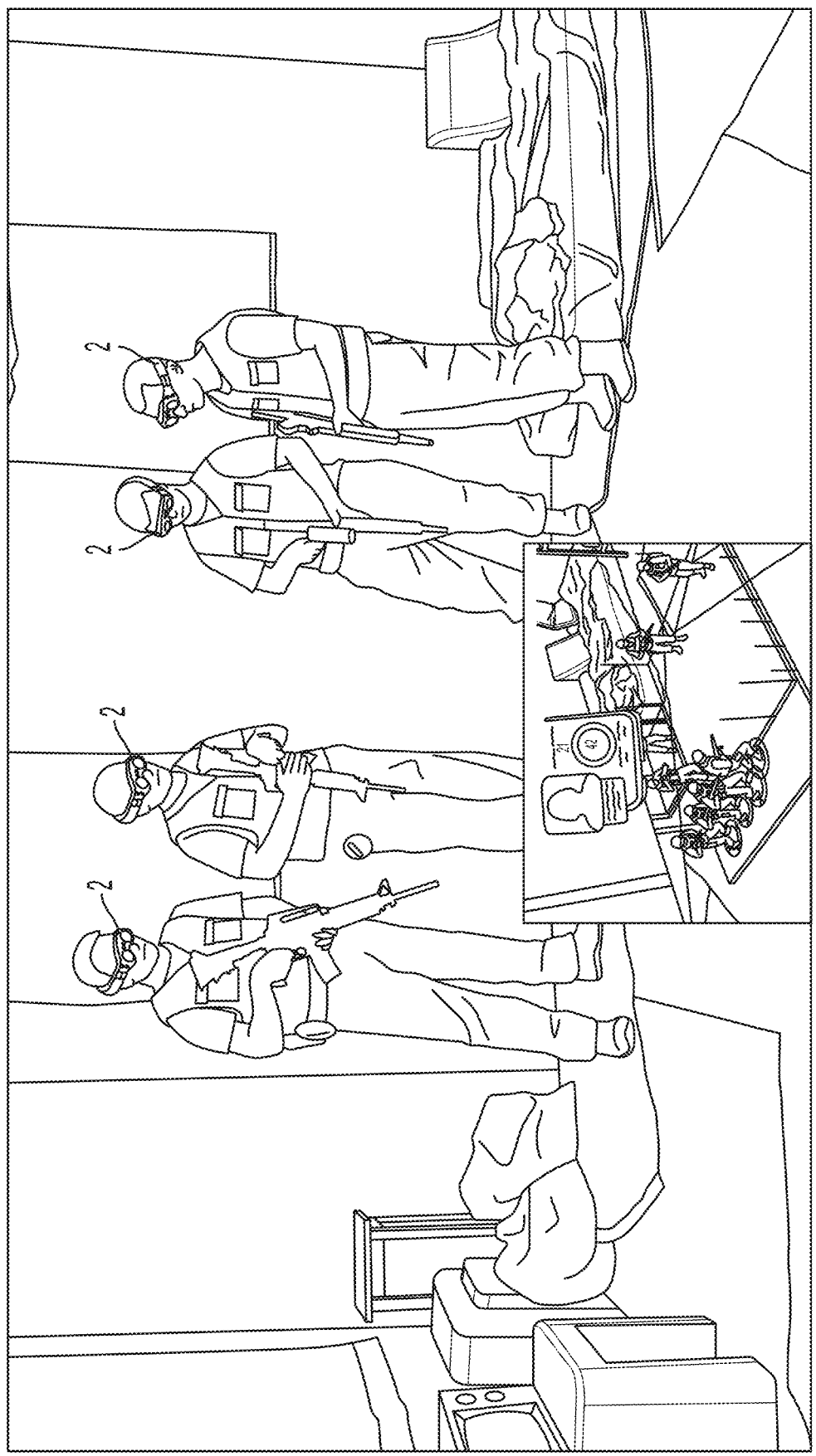
FIG. 69 illustrates an example training usage of mixed reality systems, according to some embodiments.

Referring to FIGS. 64-69, the subject wearable computing systems may be utilized to support sophisticated training exercises in almost any location—providing repeatability, enhanced access, and also diagnostic/evaluation visualization tools. For example, referring to FIG. 64, in one embodiment a user may be able to select one from a variety of prepared training scenarios. Referring to FIG. 65, in almost any environment, the wearable computing assets (2) may be utilized to present to the users a predetermined training/operation scenario wherein they encounter and visualize one or more members of a counteroffense, for example, as shown in FIGS. 66 and 67, wherein content/imagery regarding a counteroffense is shown to the operators in the exercise as augmented reality content through their head mounted components (2). Referring to FIGS. 68 and 69, the exercise may be reviewed in 3-dimensions versus time for enhanced diagnostics and learning.

In various embodiments, at the heart of the simulation/training configuration is a training simulation software configuration ("TSS"), which represents an accurate simulation engine; in other words, the TSS essentially is a set of rules that govern how a synthetic version of the world works—how fast a bullet drops, what a Warfighter, Police Officer, Firefighter, and others can see when standing at a certain location, how fast an enemy, fire, suspect moves, and so on. In various embodiments, a server-side component of the TSS, the "TSS/S", may be configured to permit users to connect to and interact with an ongoing simulation for the purpose of training. The TSS/S may be configured to provide a synthetic environment to connected users, receive information from users about their actions, factors these actions into the simulation, and then update the synthetic environment based on those actions and their simulated outcomes. A client-side component of the TSS, the "TSS/C", may be configured to allow a user to interact with a TSS. The simulation running on a server (the TSS/S) may be configured to provide each connected client (TSS/C) with information about the state of the simulated world. The TSS/C, running on an MAGIC LEAP Body Computer for example, may utilize the information from the TSS/S to determine how to present the world to the eyes and ears behind the head mounted component (2). The TSS/C also may be configured to provide an input mechanism, capturing sensor data from the user and communicating these to the TSS/S where the simulation processes these and determines how they alter the state of the simulated world. A training management tool ("TMT") may be configured to provide a tool suite with access to applications designed to support the training/simulation operation. For example, in various embodiments a TMT may be configured to provide: a server tool for configuring and deploying instances of the TSS/S, allowing warfighters, law enforcement officers, firefighters, and others to quickly plan and organize training events; a scenario editor used to create or modify training scenarios; an after-action review ("AAR") tool, configured to provide users with a variety of mechanisms for replaying training sessions and evaluating performance of those involved; a data client that manages access to data captured during training, generating common performance reports and allowing arbitrary queries to create specialized reports as needed; simulation editors that provide the capability to modify the underlying rules of the simulation (for example, to provide ballistic data for a new ammunition or to adjust the behaviors of a synthetic enemy, or fire, chemical spill etc.); administrative tools for managing user accounts.

In various embodiments, training system services may be remotely hosted resources, and may include, for example: a relatively comprehensive database, which may be referred to as a "data lake", for the storage of user account and training performance data; a file store for collecting and sharing training scenarios; available server resources earmarked for cloud hosting of TSS/S training servers as needed; access to what may be termed an "Authoritative Lifestream World Map" (or "LWM"), which contains data for use in training scenario creation and processing raw data stream captured from a wearable component (2) into a preferred LWM format. The system may also be configured to provide certain "training aids", which may be any items used in support of training with the training system (for example, training versions of weapons, taser, fire-fighting equipment, and CDC equipment for example). In various embodiments, the training system itself does not involve custom training tools but instead provides mechanisms for integrating a variety of equipment into training, and represents an expandable ecosystem. In various embodiments, the TSS/S is the simulation engine of the training environment and may be configured to generate an accurate synthetic representation of the operational environment necessary to support collective training. This may include: realistic explosive and ballistic simulation for weapons and munitions; hit/injury determination on synthetic entities and trainees (e.g., the TSS/S understands when shots hit synthetic hostiles, synthetic civilians, or real-world agents involved in the training); general pathfinding functionality allowing synthetic entities to understand the passable and obstructed areas of the simulated space; unit-level behaviors—synthetic entities have knowledge of their surroundings based on simulated senses, have the ability to move, have reaction times, are affected by conditions (e.g., if shot at, they might be suppressed), can make basic decisions (e.g., fight or run away), and have general proficiency levels (e.g., how accurate or disciplined they are in a firefight); group-level behaviors— using scripts, multiple synthetic entities can determine a course of action based on if/then conditions and coordinate their behavior. In various embodiments the TSS/S specifically may be configured to support group behaviors for civilians, a forest versus house fire, drug dealers, and enemy sniper teams; simulation of audio data for environment, entities, and actions and playback on head-worn components (2) or other outputs.

In various embodiments a TSS/S may be deployed to conduct training. Users participating in training then connect to the TSS/S intended for their exercise. Multiple TSS/S instances may be deployed simultaneously, allowing different groups to conduct different training at the same time. In various embodiments a TSS/S may be designed to permit flexibility in deployment. Using the server browser in the TMT, TSS/S instances may be hosted on dedicated platforms (servers in the cloud reserved for TSS/S use) or on commonly available local hardware (a typical laptop computer).

Self-hosting, with the TSS/S and TSS/C operating on the same platform, is an alternative configuration which allows solo training by using only a head mounted component (2) and computing pack (6) pair.

These configuration options allow the training system to provide training at point-of-need and in a variety of internet-available environments. At the perceived point of need with stable internet access—the TSS/S can be run in the cloud. In the field with zero connectivity—the TSS/S can be on an operator's laptop, and even without connectivity (i.e., such as internet connectivity via 802.11, or mobile wireless connectivity via 5G, 4G, LTE, and the like) an operator may conduct solo training using only the operator's mobile computing system (2, 6).

In various embodiments a goal of the TSS/S is to allow for an end user client agnostic system. With properly formatted data, the TSS/S can receive actions from and send simulation state information to any client (subject wearable computing system 2, 6; laptop; smartphone; etc.). One intent of this is to accommodate other training simulation systems—existing or planned—allowing maximum compatibility with this simulation/training environment (which also may be termed "STE" for short) after minimal integration. In variations where training is conducted without network access, the TSS/S may be configured to temporarily store training-related data and, when next able to establish a connection to STE Services, will upload this stored data to the data lake. At a one level in various embodiments, any interaction with the training system occurs on a client and begins with a "launcher". The launcher may be configured to check the user's credentials, using biometrics when accessed via a wearable component (2) or standard name and password if accessed from a laptop. Once authorized, if a connection to Training Services is possible, the launcher will check for updates to training-related software and apply these if necessary. The TSS/C may be configured to include a rendering engine used to display visual content. In a primary use case, a TSS/C is connected to a TSS/S, the server may be configured to describe the synthetic environment to the client, and the client is projecting the world to the user through the wearable headset (2). Alternately, a version of the render engine may be executed on a laptop or PC or other device, providing a "flat screen", non-mixed reality rendering of world data. In various embodiments, a goal of the TSS/C is to allow users to experience world data in different modes to support different objectives: a Mixed Reality Client Display may be configured to be operable only when using a specific head wearable headset (2). This display mode may employ a proprietary spatial computing technology to insert realistic synthetic content into the user's field of view. In this mode, the user may be physically moving through a real-world space; such a mode may be primarily used for tactical. A Virtual Client Display can be used with a wearable component (2) or with a laptop/PC. On a PC, this mode may be configured to show a flat, non-mixed reality display of world content, similar to what is used in existing PC-based training simulations. On a wearable headset such as those described herein (2), this mode may be configured to present content in a virtual reality mode. Regardless of the display being used, the user may be physically stationary when in this mode and may navigate an avatar through the synthetic environment via controls connected to their client (i.e., a keyboard and mouse, a d-pad, or hand-held controller 4). This mode can be used to virtually explore a space (for example, a chunk of LWM data) or to control a synthetic entity in a training exercise.

A Hybrid Client Display may be operable only when using a specific headset, such as those described herein (2). As with the Mixed Reality Display, this display mode makes use proprietary spatial computing technology. In the Hybrid Display Mode, the headset is not attempting to insert content into the user's field of view realistically but is instead presenting a physical space without consideration of where it is being projected in the real world. In this mode, the user is moves through the projected space as in the Mixed Reality Display Mode, by physically walking. This mode is primarily intended for rehearsal. For example, this mode would allow users to project a portion of a village taken from LWM inside an empty warehouse and then walk around within a to-scale projection of this location.

In various embodiments, when connecting to a TSS/S for training, clients connect with a specific role assigned: as a trainee, as a trainer, or as an observer. The client's role may dictate the information presented to the client and the controls made available to the client. For example, trainers see performance data and have controls for altering the training scenario while trainees do not.

The TSS/C may be configured to manage receipt of user input (e.g., when a trainee fires their weapon) and captures relevant data (location of user, orientation of rifle, shots taken, instructor triggering an ENDEX, etc.) to communicate to the connected TSS/S.

When the client is operating on a subject wearable computing headset (2), the headset may be configured to capture biometric data including heart rate, eye gaze, and perceived pupil dilation. This data is used in the AAR to present instructors with information to troubleshoot performance issues and guide performance improvement. A server browser may be used to find or deploy training servers.

In various embodiments, when deploying, the user may specify the type of deployment, the authorized participants, and the training scenario to be used. Once this is completed, the user may see the training server added to a list of available servers.

When connecting to a TSS/S, the user may be presented with a list of known TSS/S instances along with basic information about each. Users select a server to connect to for training or observation.

Options are provided to adjust advertising and access of deployed servers, allowing for everything between open "whoever wishes to join" servers and restricted servers visible only to certain users.

The TMT may be configured to provide a training scenario editor, allowing the user to custom-create training exercises.

Scenario creation may begin with a specification of the geographical location for the training. Portions of LWM can be used for this or the user can create a mesh using the depth sensors on a headset such as the subject wearable computing headset (2). Via a service provided by the OS, this mesh may be uploaded into LWM for others to use.

Once a training area has been specified, the scenario editor may be configured to allow the user to select an appearance for objects in the training area and to place synthetic entities for the training.

Once complete, scenarios can be saved and loaded at a later time. The scenarios are associated with the location of the training, allowing others who train in the same location to access a library of existing training scenarios. Templates for common drills may be utilized to guide the creation of standard training scenarios. In addition, so-called "enablers" may be used to modify any training scenario. Enablers may comprise modular "sub-scenarios", intended to permit varied training. For example, if a squad knocked out a bunker using grenades earlier, during the next evolution the instructor wants them to accomplish the objective using CAS. In various embodiments, it is expected that almost anyone can use this editor with minimal training. An underlying simulation data resource may be made accessible to users with sufficient credentials. This data may be extensible and parameterized, allowing the modification of the core simulation "rules." Such a configuration allows for the rapid modification of existing simulation data when more accurate details are reported, and the creation of new simulation entities as new systems are introduced. A "doctrine editor" may be configured to allow users with sufficient credentials to modify and create behaviors that govern how synthetic entities behave in the simulation.

In various embodiments, this may be what a trainer would use to, for example, create a "counter-party fighter" entity and assign it characteristics that cause it to perform in simulations in the same manner as observed on the battlefield.

Baseline elements of the behaviors may be parameterized and easily adjustable (for example, "these enemies are usually armed with these weapons and demonstrate this level of accuracy at these ranges").

More complicated behavior (for example, defining a particular ambush technique) may require scripting, but also may be addressed from within the doctrine editor.

Once completed, the behaviors defined here may be saved with specific entities. This means that when a user places a specific entity in the editor, that entity brings these behaviors with it. Thus, more technical users can define behaviors and less technical users can easily make use of them.

A training administrative tool may be configured to provide core administrative functionality for the STE. Users with appropriate credentials may use the admin tool to manage user accounts, alter permissions, review logs, promote new application versions, and perform other administrative functions.

In various embodiments, every user accessing the STE may have an STE account. The account tool may be used to set up or modify this account, to provide reminders about scheduled training, and to show performance data.

An "AAR" tool may be accessible by trainers during a training session (to review performance as training happens) or from historical data (to review performance of past training or training performed by a different group). Such a tool may be configured to provide the trainer with options for displaying playback of the training exercise. This can be done "to scale" (a life-size recreation of the training) or "on map" (a top-down view on a scaled-down image of the training).

Playback controls may be configured to allow modification of the replay such that the trainer can show sections of the training at a slower speed, can jump to different points in the timeline, rewind from a certain point, or bookmark sections for review.

Filters may be configured to allow the trainer to visualize detailed performance information in the replay. For example, the system may be utilized to visualize a particular operator's heart rate at a given point, or whether a particular operator cleared a given corner when he entered the room.

A data tool may be configured to provide access to training performance data stored in the data lake. A variety of common reports may be automatically generated from this tool. These may be organized for different levels of access (individual, squad leader, platoon leader, etc.).

In addition, this tool may be configured to manage access to the data pool to allow more involved custom-built queries. As there are already numerous commercially available data visualization tools, this may be intended to manage receipt and transmit of required data to a visualizer, not to recreate this functionality.

An authentication server may be a service that processes authentication requests when a client is launched. When approved, users are allowed access to other services.

In denied environments, where a user cannot connect to the authentication server, authentication may be configured to happen at the local level and permit only use of a specific device or local network.

Server resources may be reserved for TSS/S use, allowing cloud deployment of servers for training events.

LWM information may be required for several different aspects of the training operation. Access to this information may be managed by a service. Mesh sensor data, in the form of a versioned raw data stream, from a sensor-laden wearable computing headset (2), may be sent to this service to be pre-processed before sending the LWM.

Figure 77:
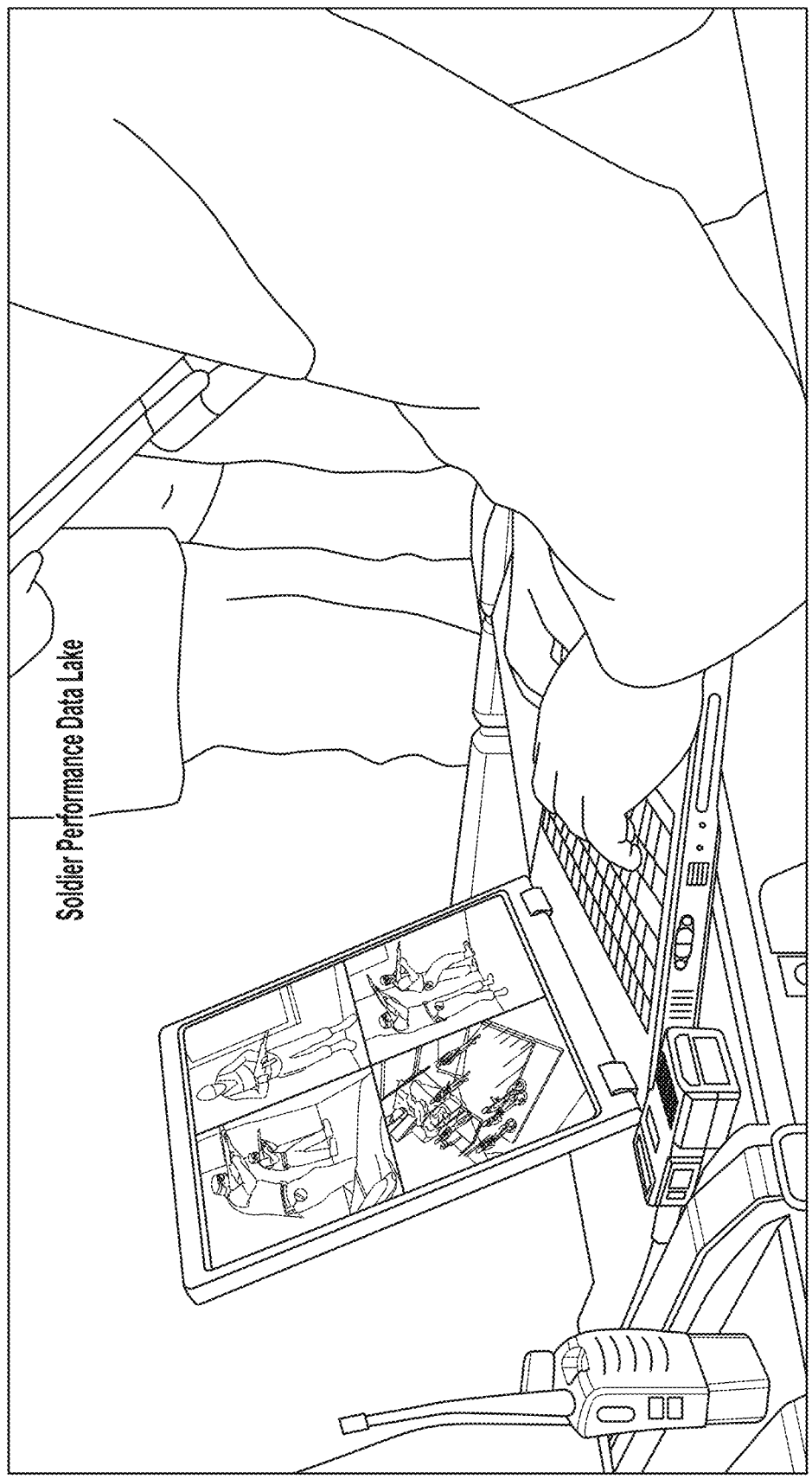
FIG. 77 illustrates an example mixed reality computing architecture, according to some embodiments.

As noted above, cloud-based data storage for the TSE may comprise a "data lake", which may, for example, contain all account information, logs, and training performance data. Referring ahead to FIG. 77, the data lake information may be made available from almost any connected location, utilizing an access point such as a secure laptop PC.

Drive space may be maintained to provide cloud-storage of scenarios, application installs, patches, archives, and Training backups.

Various synthetic training environment implementations envisioned herein may combine information pertaining to any and all equipment used by the military. Various examples are listed below.

Various embodiments relate to an Infantry Fighting Vehicle ("IFV") Crew trainer. This may be a full crew trainer which can be implemented within a motor pool without any additional resources prior to the crew, the IFV, the wearable computing technology (2, 6), a training scenario, and time. The driver of the IFV may utilize the wearable system (2, 6) and localize his position in the driver's seat based on pattern recognition of the control gage or a visible/scannable marker. This may then provide a world frame for the device to do digital overlay based on the control layout of the area, this is the same for all positions within the IFV (Gunner, Track Commander (TC), Loader, and Dismounts). Now the wearable computing system (2, 6) may be configured to overlay rendered replicas of the control panel readouts (gunner's sight, driver's periscope etc.) and track the user movement for interaction of the user and the IFV. The Device may then, for example, be configured to render the correct stimulus information at the correct depth (as seen through the gunner's sight) so that the gunner can practice target acquisition and engagement while interacting with the rest of the crew. The device may be configured to track this based on the localized position and subsequent head pose of the device. The weapon system may be tracked by vehicle commands which are recorded through directional microphones and the ear-protection-active-noise-canceling headphones. This may be configured to register shots fired enemies found and engaged. The doctrinal procedure for enemy engagement may be verbally shouted to one another, such as: Contact Dismounts Left (gunner(g))—Identified (TC)—target acquired (g)—fire (TC)—Target Destroyed (g). The gunner may fire three round bursts or few second bursts depending on the target and ammunition selection (high explosive (HE), armor piercing, and machine gun, for example. This data may then collected and sent to the TMT where the crew and users performance is aggregated with previous training, combat, and orthogonal data to update their overall lethality score and training roadmap for future training scenarios. In various embodiments, this may involve taking sensor data from the wearable computing system (2, 6) on the user and creating a dense mesh model of the environment, and also tracking the position/orientation of the user's head (the user's "head pose") within this environment. Such information may be passed through an application programming interface ("API") to the application layer of the system where there may be a scanning mode in the system configured to allow for an option of viewing this 3D mesh locally without any external information. Non-locally, the system may be configured to pull data from other nodes within the information framework to include the positional and heading information from other dismounted, mounted, Intelligence Surveillance Reconnaissance ("ISR"), and external sources to include into the 3D mesh of the world viewable by the Warfighter. This may include all land, air, sea, and space forces present in a given situation. This data may be time stamped and geo-tagged so that the transforms of where the spatial data resides to the user's eye can be constrained by the location and gaze of the user of the wearable computing system (2, 6).

In order to do the correct overlay of information to the user's perspective from the external sources, features may be recognized and overlapped in a repeatable fashion otherwise artifacts of temporal and spatial aliasing will provide confusing data. To correctly overlay one may use factual data, and also use a passable world type architecture in order to segment and orientate different objects virtual, and real to the same location.

This map of the world which would come from external sources to the internal sources also may be used to see what other people are seeing from their device perspective and from that of a particular user once transformation has been computed. This facilitates functionality such as augmented reality vision through walls, or observations of remotely captured information, such as video feed from an unmanned aircraft. With a red/green/blue ("RGB") picture camera or monochrome picture camera of adequate resolution, the system may be configured to overlay the image information on the dense mesh information. To give a more contextual understanding to the user on what is contained within the environment shared through Net Warrior or some other information transfer protocol and system.

Referring again to law enforcement, fire fighting, and/or hazardous materials environments, locally, much like the aforementioned military style implementations, a user may collect data from the world through sensors on the head and on the user, create a mesh of the world and display it overlaid in the real world and also miniature map of the data displayed and with interaction elements included. All funneled through the API and run through the application layer of the device for the user. Non-locally, the system may be configured to utilize many of the same sorts of off-user periphery devices and information to relay data to the user of the device, such as in a remote forest fire fighting scenario.

Figure 90:
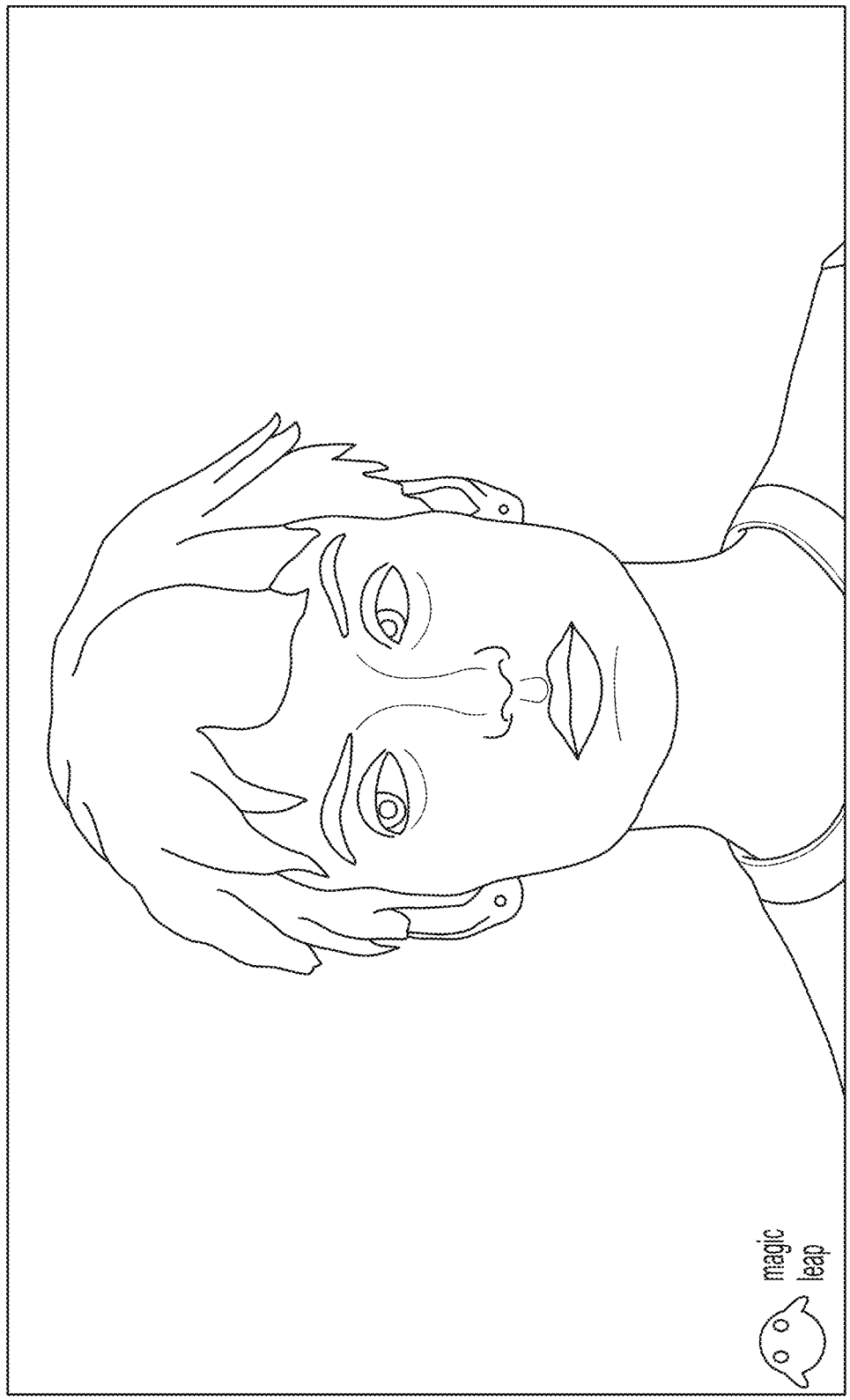
FIG. 90 illustrates an example virtual assistant, according to some embodiments.

Learning networks, neural networks, and/or so-called "artificial intelligence" (or "AI") computing configurations may be utilized to live stream adaptive soldier architecture to learn what operational information is likely to increase lethality, survivability, and mobility. This may be accomplished via machine learning, with the soldier being given a training mission and the model running a series of parameters and test cases; based on the output data from the training event, the system may be configured to optimize the heads-up display aspects of the wearable computing system (2, 6) based upon the level of data showed to the individual. This is a way to personalize the displayed data fidelity level to the particular user. Another implementation is the use of the machine learning model to dynamically change the data received and displayed in stressful situations, reducing the cognitive load on the user. Virtual assistants, or artificially-synthesized characters, such as that depicted in FIG. 90 and described in the aforementioned incorporated references, may be utilized to assist in efficient communication using the subject wearable computing configurations (2, 6), in roles such as general assistant, supervisor, colleague, and the like.

Figure 71:
FIG. 71 illustrates an example permissions architecture for mixed reality systems, according to some embodiments.
Figure 72:
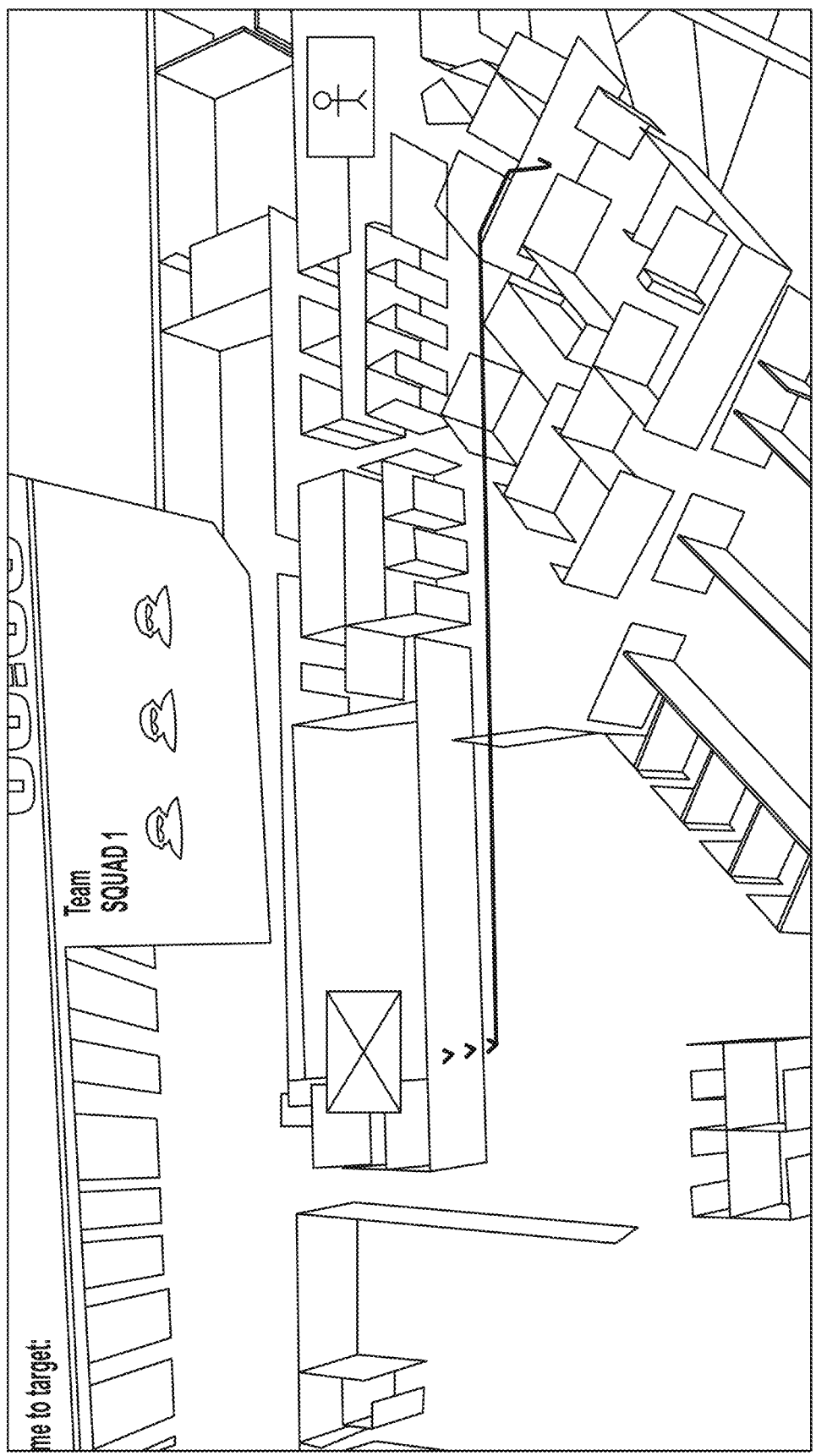
FIG. 72 illustrates an example permissions architecture for mixed reality systems, according to some embodiments.
Figure 73:
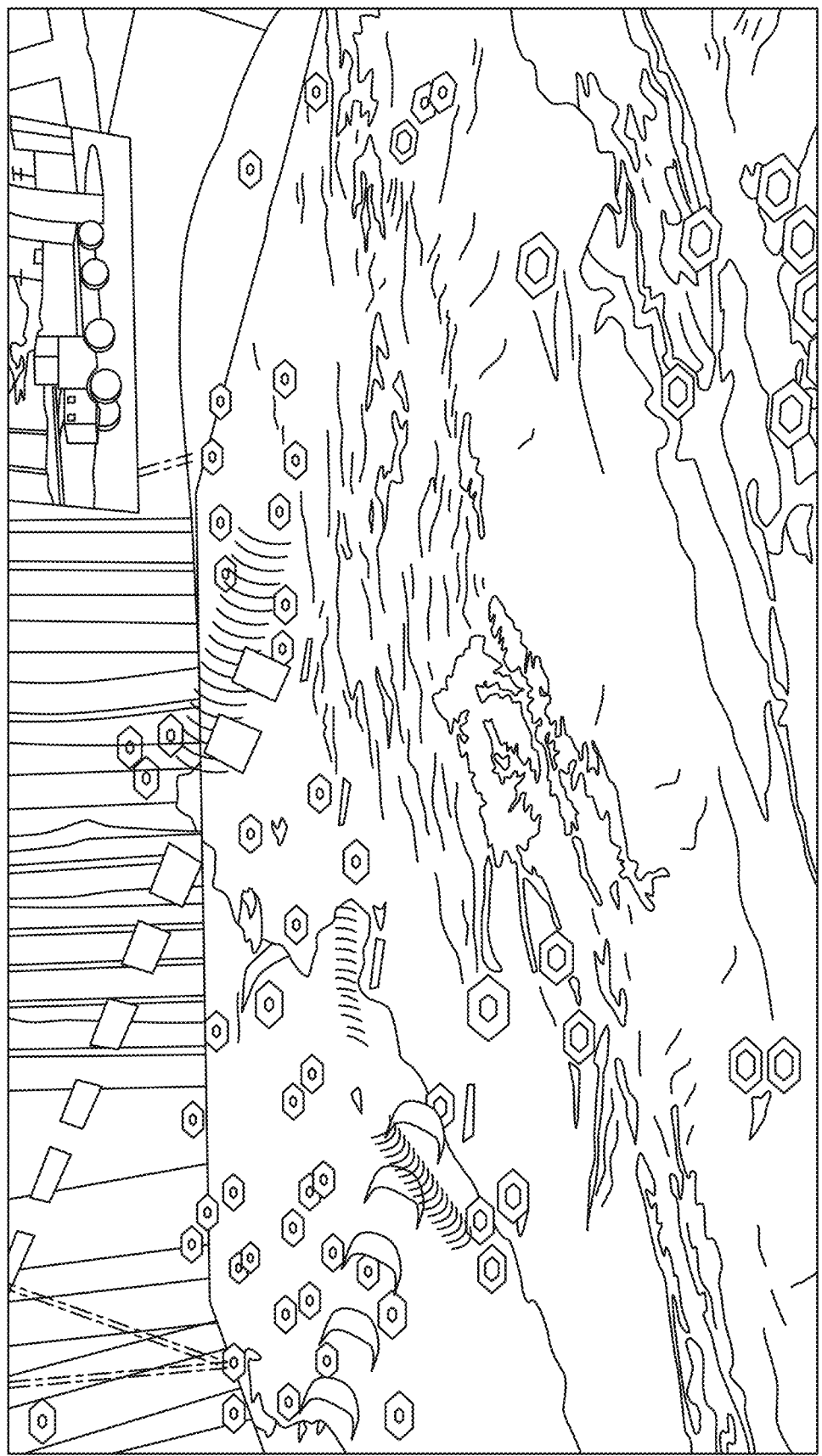
FIG. 73 illustrates an example permissions architecture for mixed reality systems, according to some embodiments.
Figure 74A:
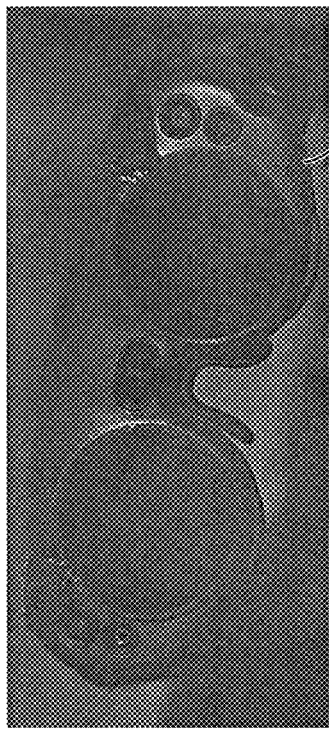
FIGS. 74A-74D illustrate exemplary dimming functions of mixed reality systems, according to some embodiments.
Figure 74B:
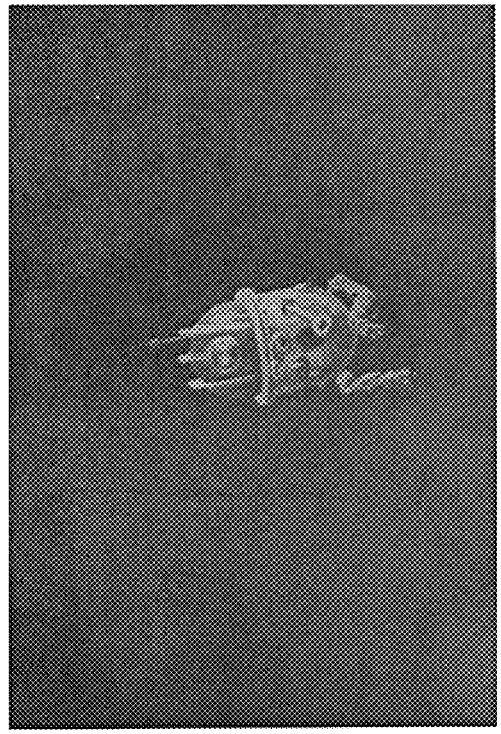
Figure 74C:
Figure 74D:
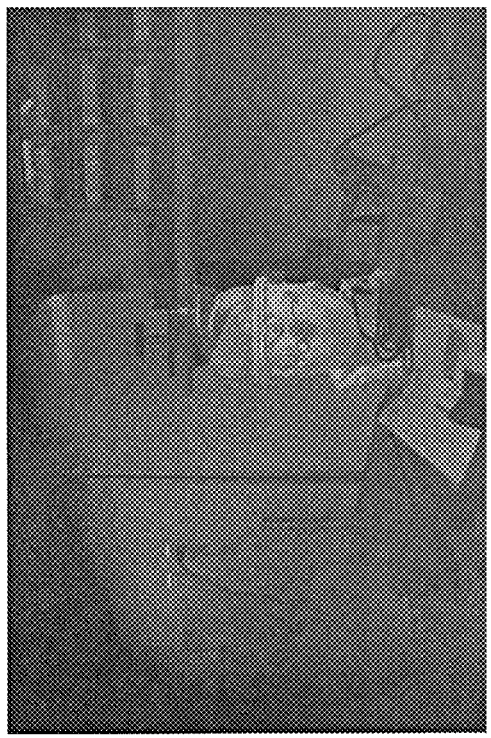

Planning capabilities may be enhanced as well utilizing configurations of the subject systems. For example, information pertaining to the world may be captured through the sensors and then sent to the authoritative server, once authenticated sent to the commanders in an operational headquarters or station. The Police, Firefighters, Military, and/or other services may be able to do en-route planning and situational rehearsal of an event prior to arrival to the scene or operational environment using such system configurations. Referring to FIGS. 71-73, the system may be configured such that commanders can watch everything unfolding on their floor or coffee table using their connected wearable computing systems (2, 6), and can, for example, use hand gestures to assist in controlling the battle/teams/resources; use gestures to redirect the team within a building, etc. In other words, the system may be configured such that a commander watches a multi perspective information feed through his wearable computing system (2, 6) and then with the overall picture in mind provides his local device with a hand gesture which a gesture recognition machine learning technology configuration captures this motion and interprets, based on the application definition of that gesture, to execute the desired task based on this prior determined interaction method.

Figure 70:
FIG. 70 illustrates an example usage of mixed reality systems, according to some embodiments.

As noted above, the system configuration may involve integration with other communication systems utilized by the operator, and may show various marker types of visualizations for obstacles or dangers to avoid, enemy combatant locations and status, etc., all of which may be geo-registered to the operator's area of operation using visualized waypoints, markers, audio, and the like. The wearable system may be configured to create a mesh pertaining to the geometry and position of objects around the operator, as shown in FIG. 70.

As noted above and described in the aforementioned incorporated references, global and local dynamic dimming may be utilized to enhance visualization of various presented imagery with a head-worn component (2) in the local environment. Referring to FIGS. 74A-74D, global dynamic dimming is illustrated, wherein the entire display is dimmed or darkened (i.e., darkened from FIG. 74A to FIG. 74B, and similarly the result is shown with the darkening from FIG. 74C to FIG. 74D) to assist in enhancing visualization of certain presented imagery or content. Localized dynamic dimming relates to contrast adjustment specifically around a particular portion or portions of presented imagery or content, such as a region at which the operator's eye gaze is directed. Such configurations may assist operators in avoiding visual washout, flash blindness, and optical vulnerability to certain weapons which may be known as "directed energy weapons". Dynamic dimming may also be utilized to selectively prevent light leakage when an operator generally is in a dark environment (also known as "maintenance of light security" or just "like security")—because leakage out may be detected by counterparties, and also bright light transiently leaked in may cause changes in the constriction of the user's pupils which becomes sub-optimal for the remainder of viewing through the headset (2); thus there is reason in many scenarios to block leakage in or out of light from the viewing area of the user.

Figure 75:
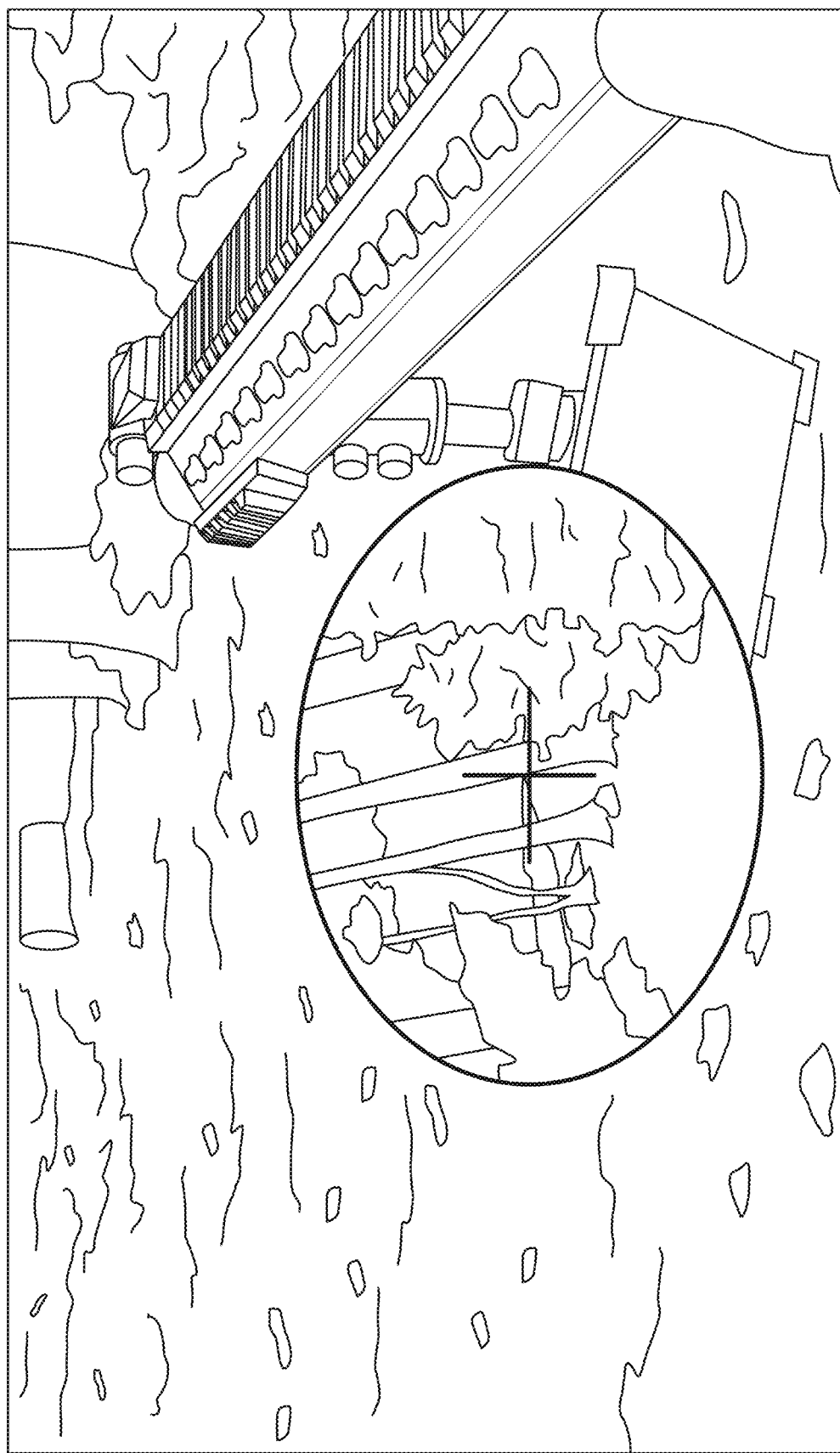
FIG. 75 illustrates an exemplary targeting function of mixed reality systems, according to some embodiments.
Figure 76:
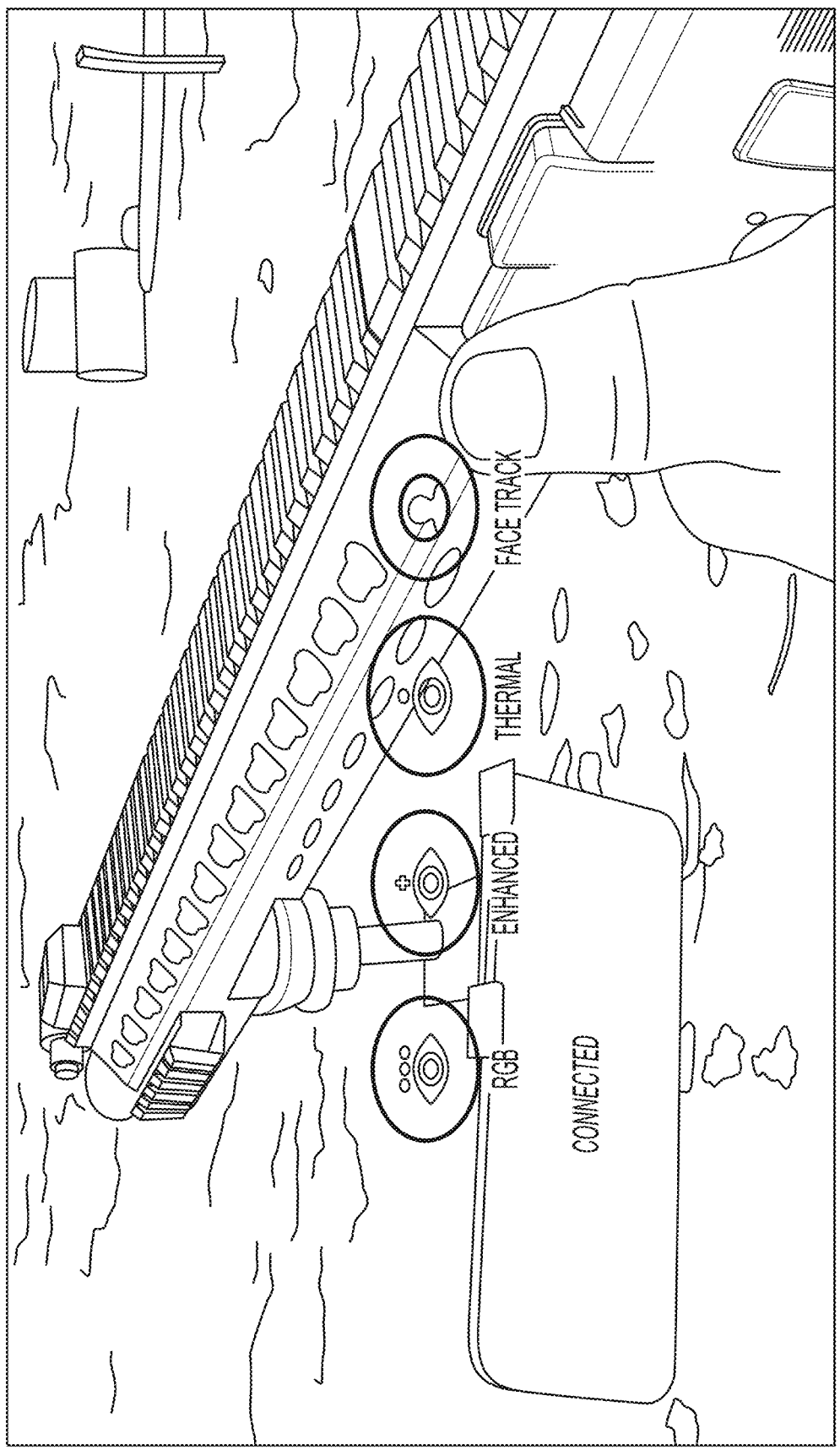
FIG. 76 illustrates an exemplary targeting function of mixed reality systems, according to some embodiments.
Figure 81:
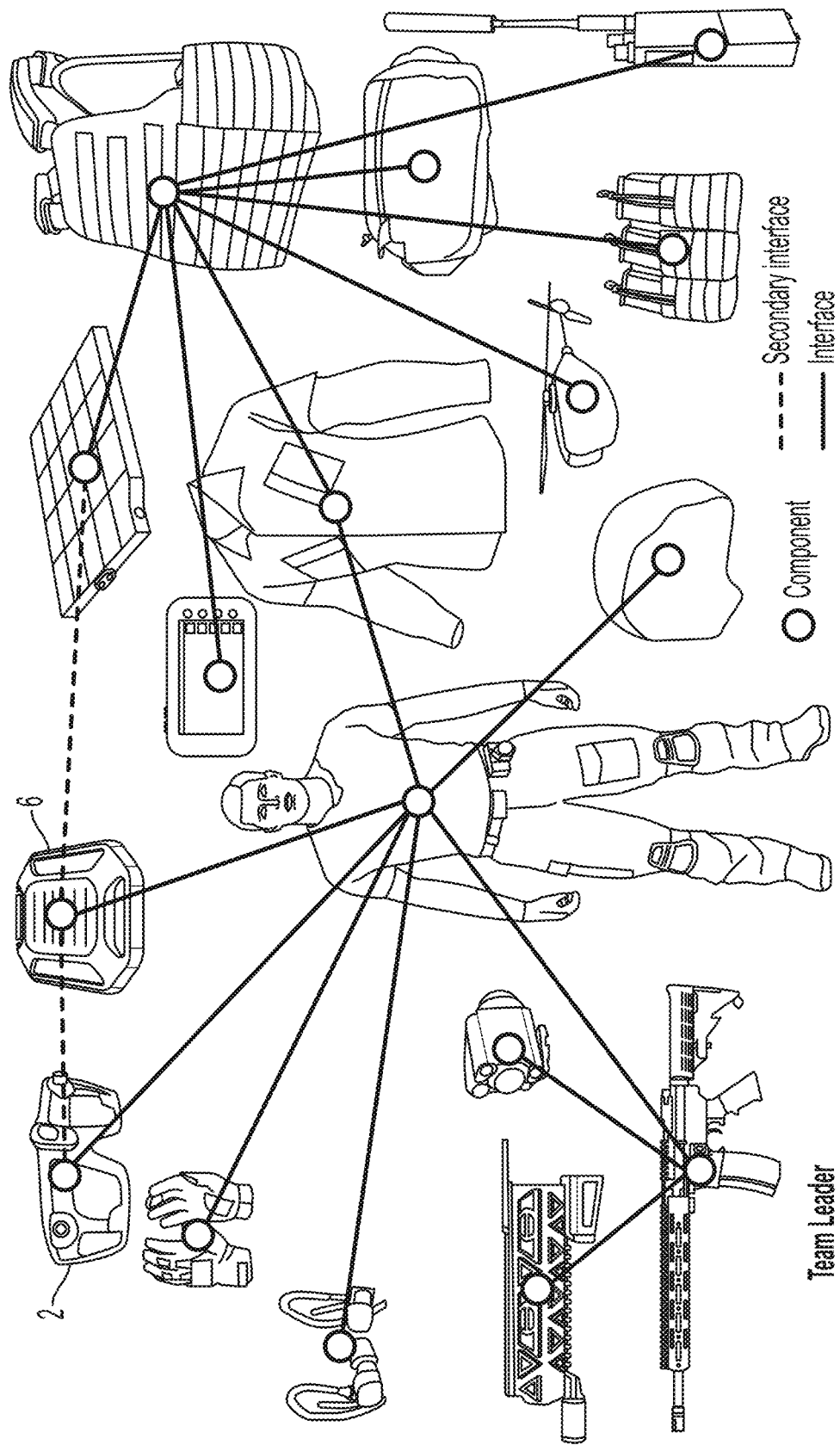
FIG. 81 illustrates an example mixed reality computing architecture, according to some embodiments.
Figure 82:
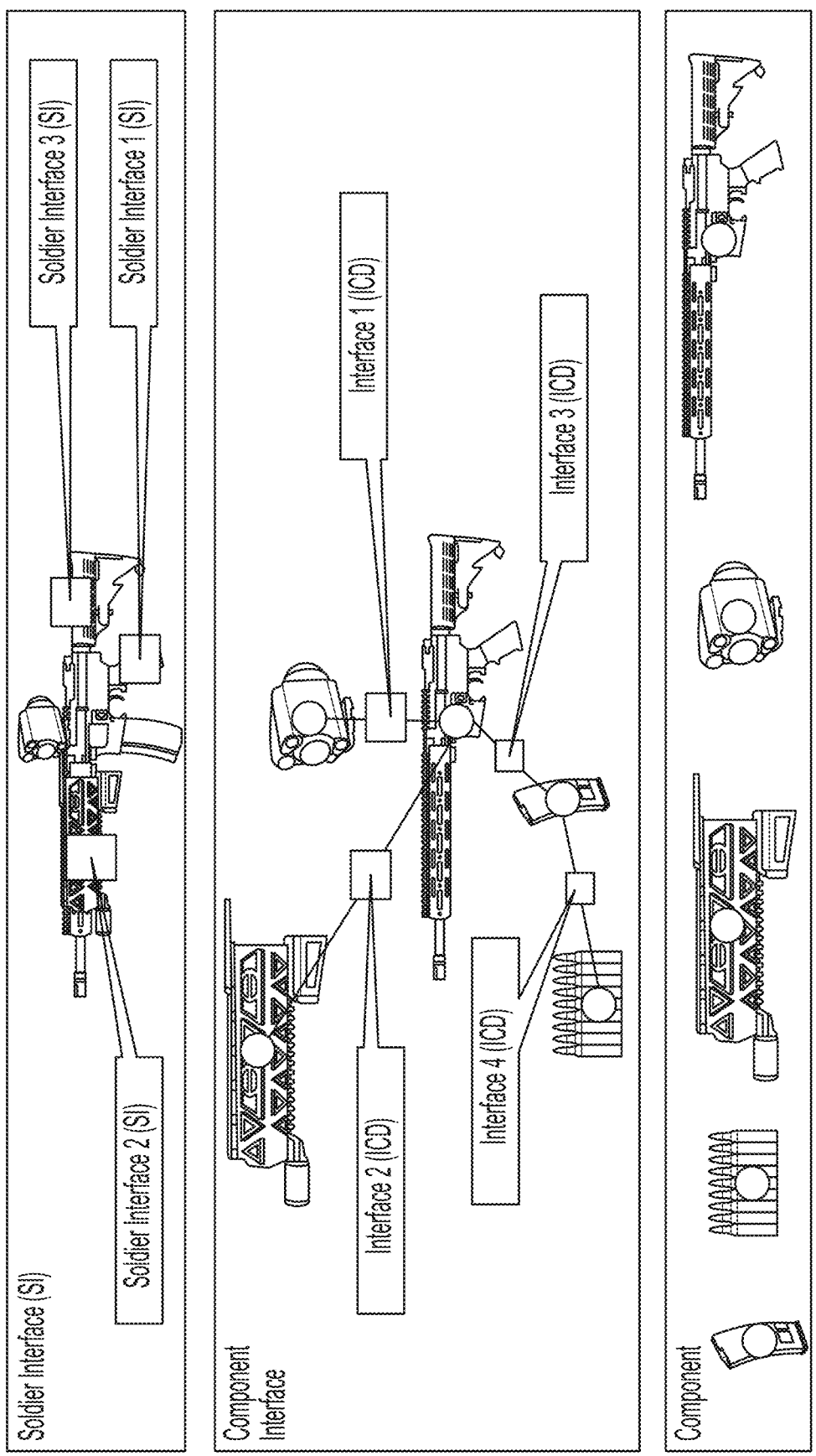
FIG. 82 illustrates an example mixed reality computing architecture, according to some embodiments.
Figure 83:
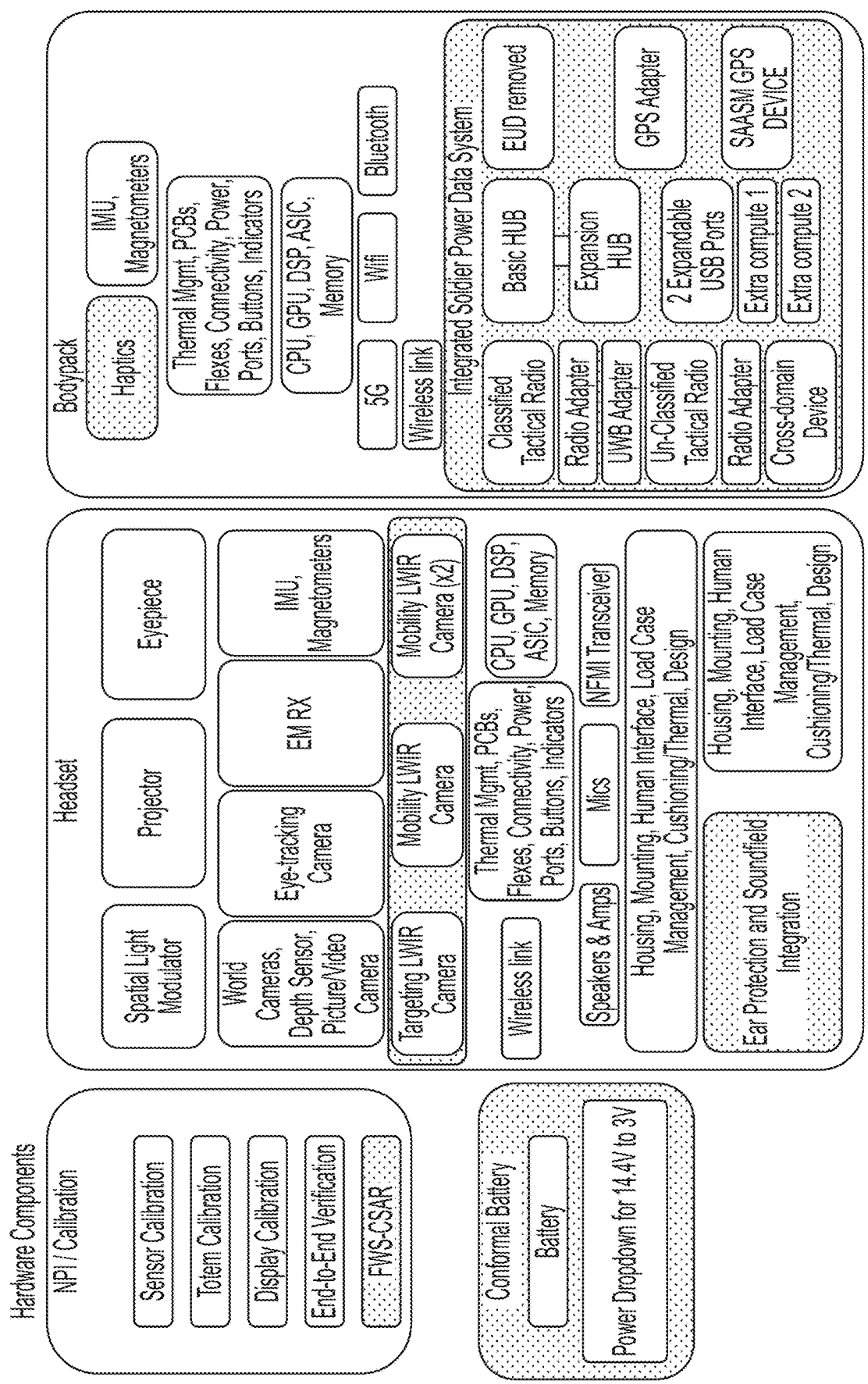
FIG. 83 illustrates an example mixed reality computing architecture, according to some embodiments.
Figure 84A:
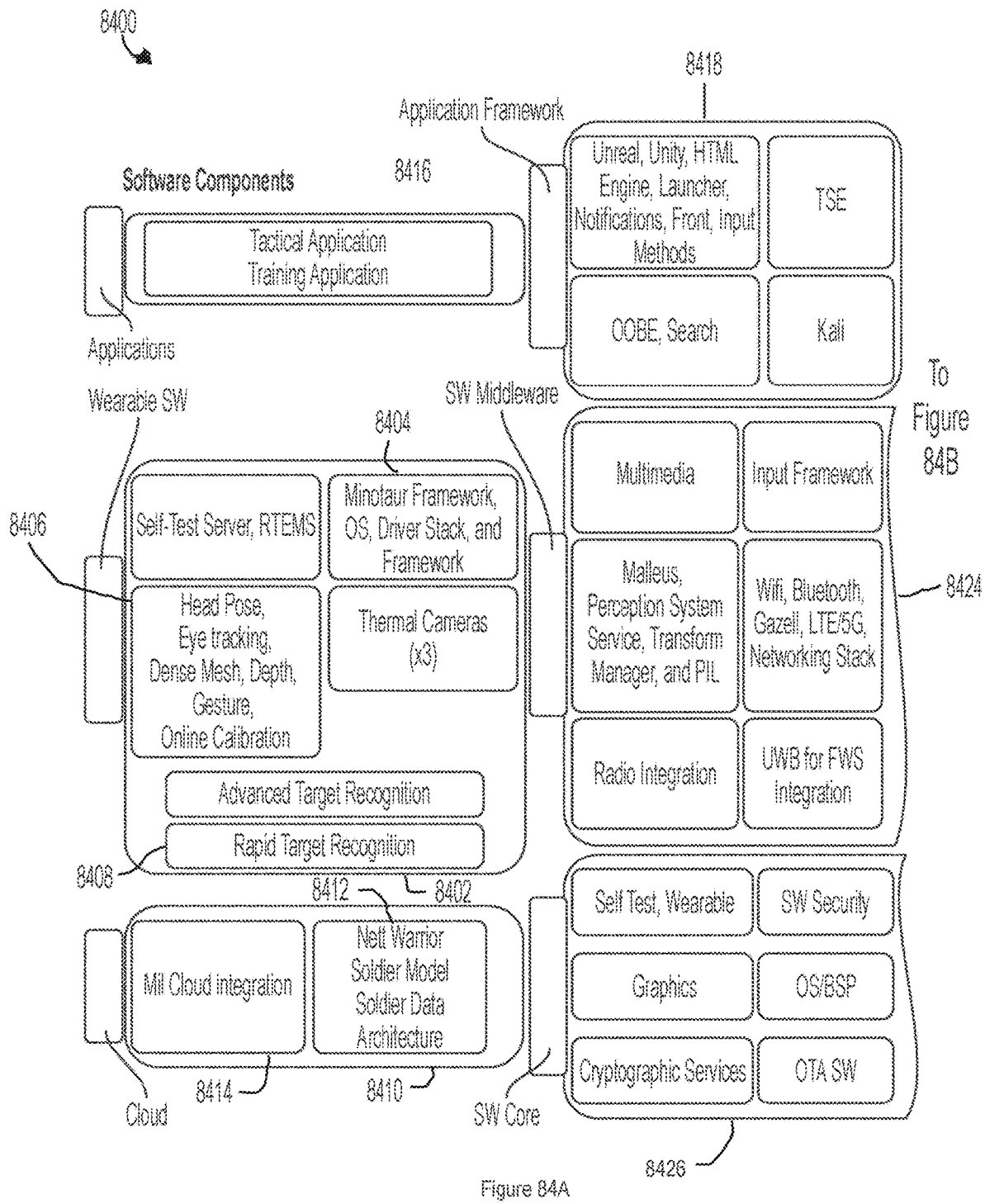
FIGS. 84A-84B illustrate an example mixed reality computing architecture, according to some embodiments.
Figure 84B:
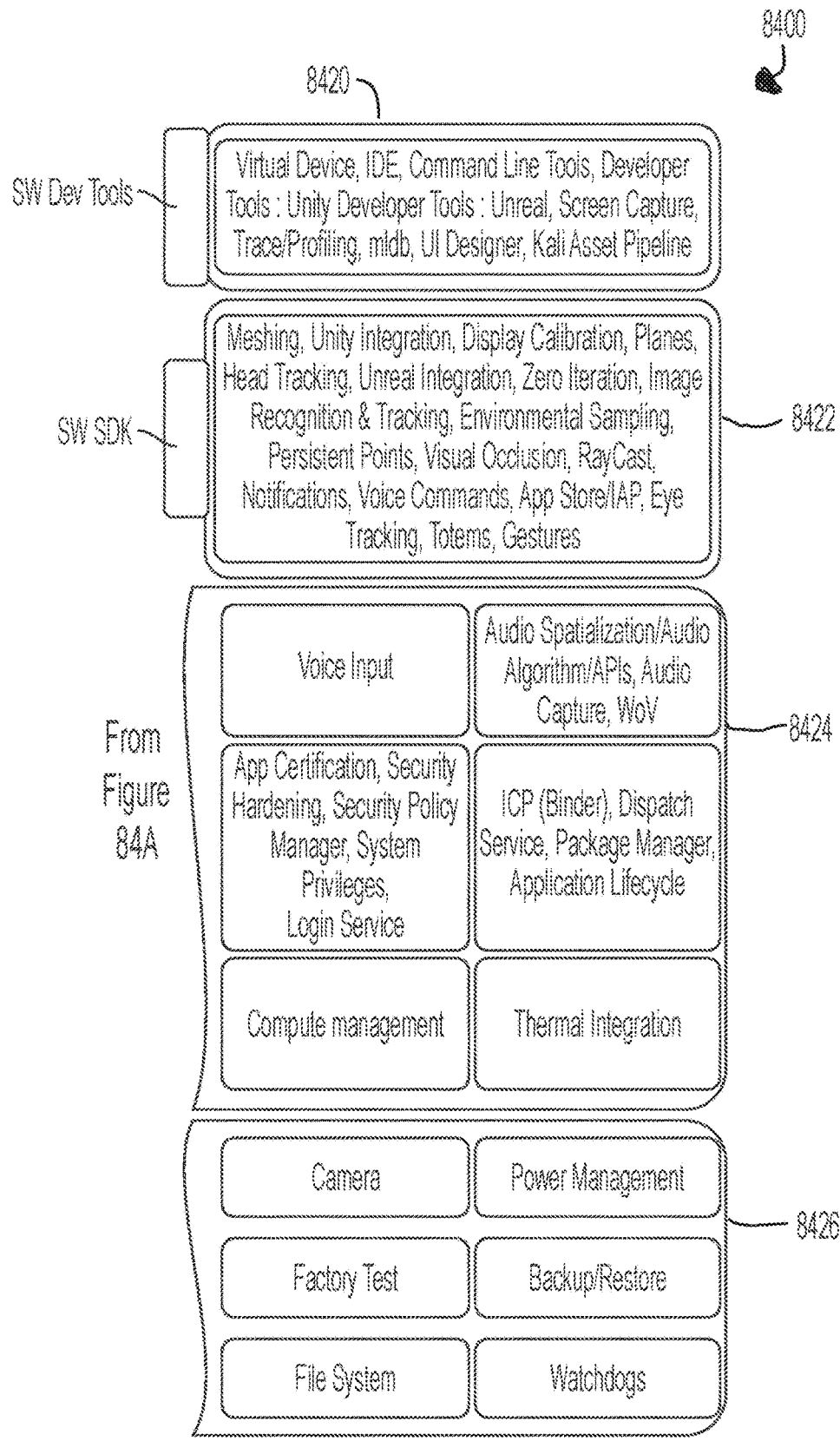

Referring to FIGS. 75 and 76, as noted above, the system may be integrated with various local target visualization and sighting tools, such as thermal, infrared, and/or RBG camera configurations, which may be operatively coupled to weapons or other implements, such as those shown in FIGS. 81-82, and also coupled to the data lake and many other resources, through hardware and software configurations such as those described and illustrated herein, such as in FIGS. 83 and 84.

Figure 78:
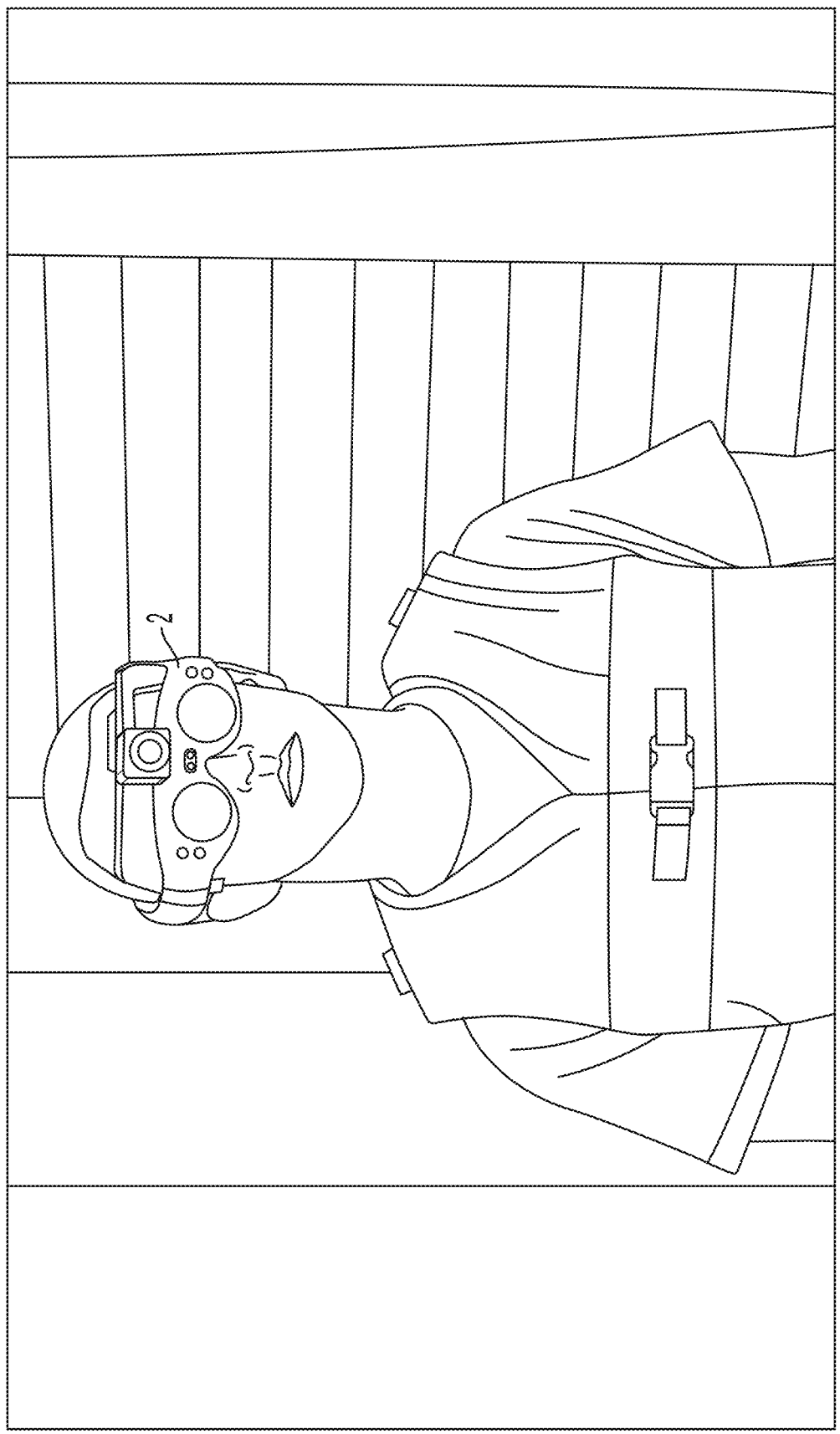
FIG. 78 illustrates an example sensor component of mixed reality systems, according to some embodiments.
Figure 79:
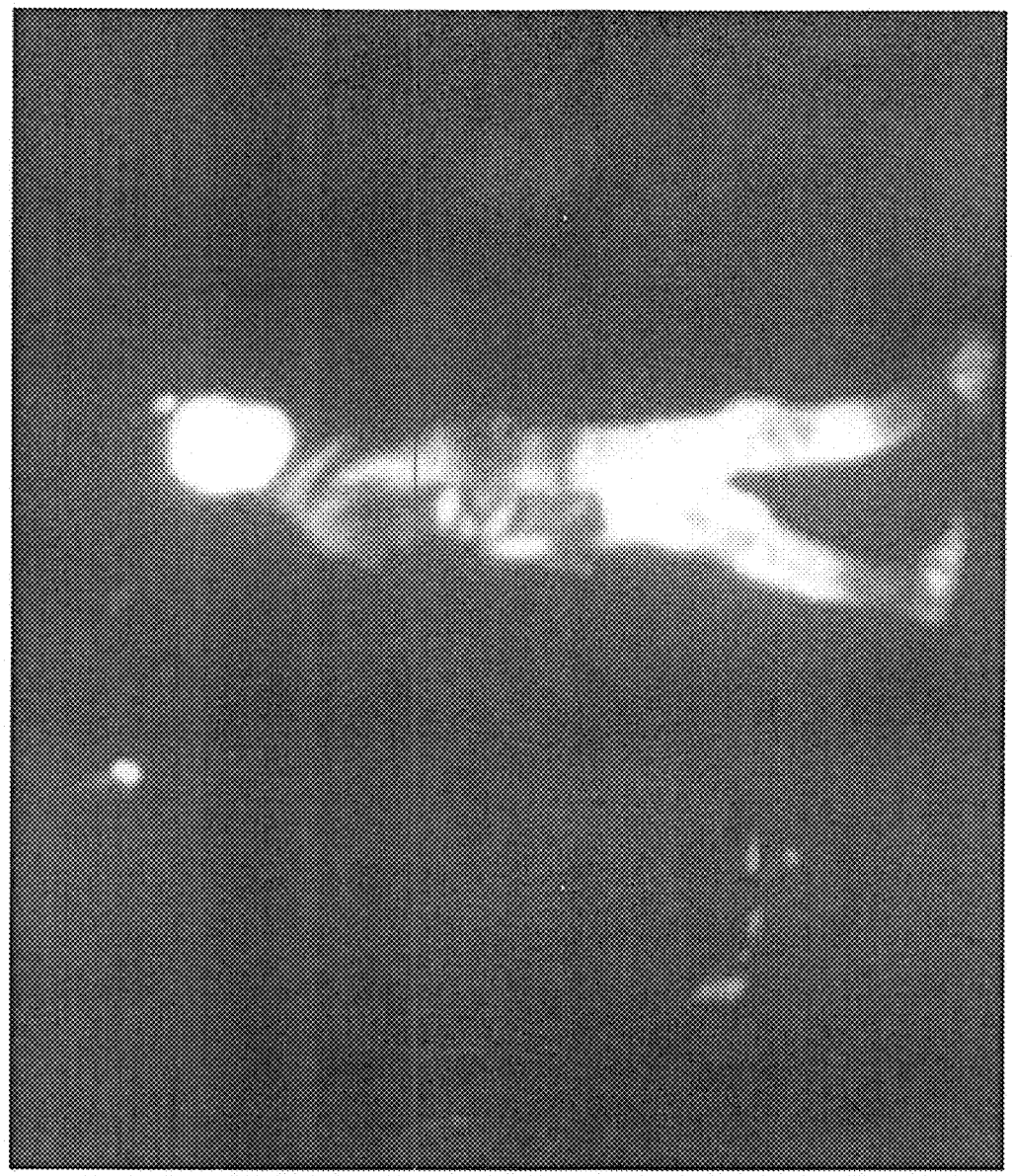
FIG. 79 illustrates an example sensor component of mixed reality systems, according to some embodiments.
Figure 80:
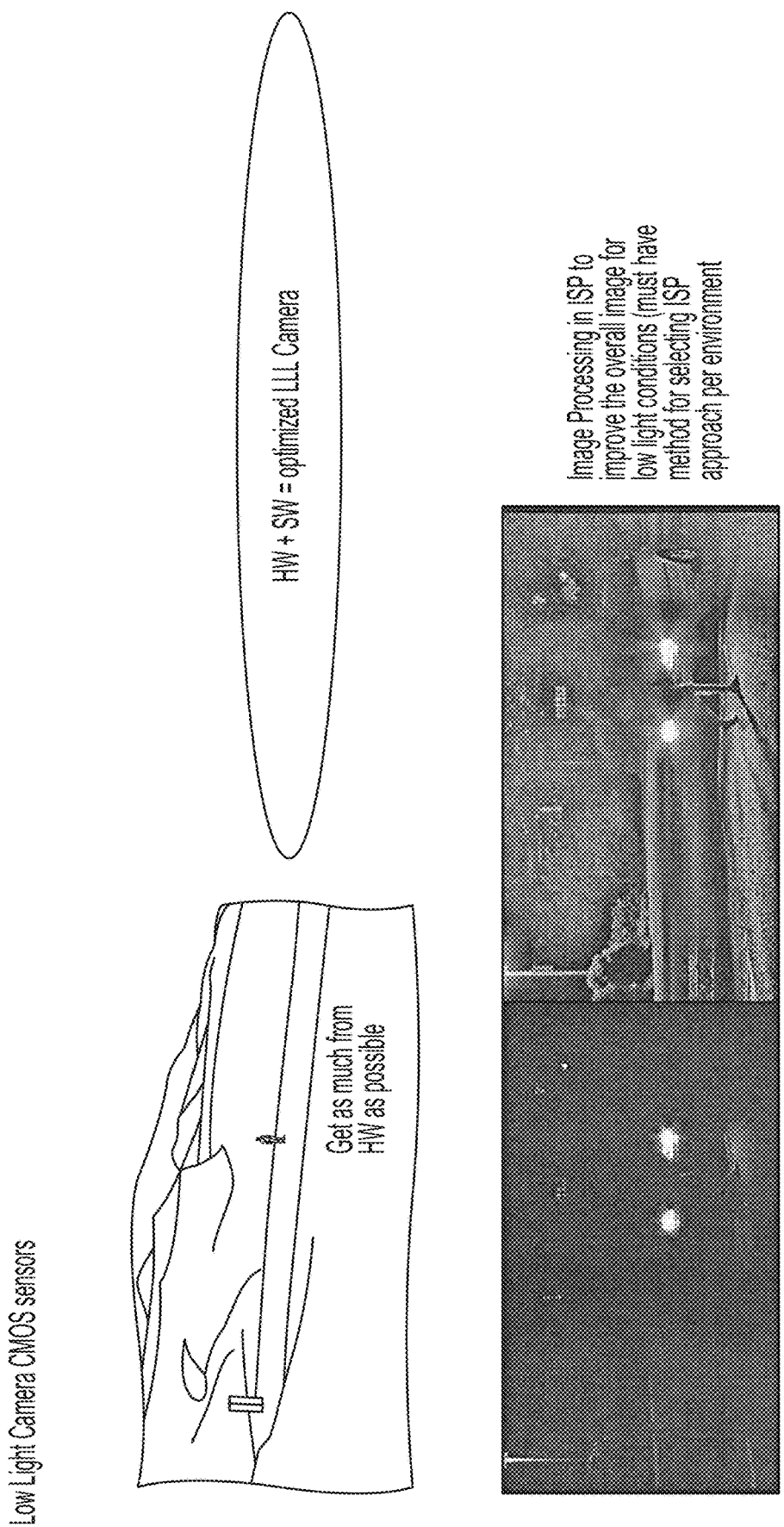
FIG. 80 illustrates an example sensor component of mixed reality systems, according to some embodiments.

Referring to FIG. 78, a head wearable component (2) may be physically integrated with a thermal and/or infrared camera, as discussed above, to assist in identifying certain objects nearby, such as humans or animals in an otherwise dark environment, as shown in FIG. 79. FIG. 80 illustrates certain aspects of a low light camera sensor configuration featuring CMOS sensor technology, with firmware, system software, and hardware optimized for low-light configurations.

Thermal imaging devices may be utilized in many of the configurations discussed herein, for example to assist in identifying the boundaries of the human hand versus other space or objects in gesture tracking, to observe decaying heat after a hand contact such as a hand print on a wall, to remove certain features (such as humans or animals) or "floaters" for the purposes of creating a mesh of a room (i.e., an assumption can be made that a 98-degree-F human shaped object is not a wall or other fixed object). Other known objects such as heater vents, windows with sun exposure, water heaters, furnaces, fireplaces, and the like may be identified, and such identification may be utilized to enhance quality, accuracy, and speed with which wearable computing resources (2, 6) may be utilized to understand the world around them and the associated user. For example, in one embodiment where a wearable component (2) may be configured to engage in facial recognition analysis, rather than searching an entire room for facial features that match a given database, the system may be configured to first identify easy-to-access faces which may be presented uncovered and readily thermally identified as approximately 98 degrees F.; then once one or more faces are located, spend more computing resource focused on those pixels rather than the room in general; in other words, when doing facial recognition, focus on faces rather than everything in the superset of things local to the user—and to do that a system capable of using thermal configurations to identify faces is valuable). Items may be labelled too hot to touch for first responders or firefighters. Inward facing sensors may be utilized to detect an operator's temperature, or outward facing sensors utilized to sense conditions of others (for example, to point out not only the existence of another person across the room, but that they appear to have a fever, or that they appear to be carrying a long gun that appears to have been recently shot; or perhaps that they appear to have some type of exothermic object resembling a laptop computer in their bag that recently has been operated; or perhaps that based upon the body temperature, a viewed person seems to have died 8 hours ago). Thermal sensor configurations may also be utilized to assist in labelling certain objects, such as dogs, cats, or persons, and even in visually associating certain content or imagery with them (for example, a system may be configured to place a bright red hat on each identified enemy combatant; or to put a pink mustache that moves around with the face of a particular dog or cat). Heat conditions and gradients may be visualized and color-coded, for example for firefighters running into unknown situations.

In other embodiments, thermal imaging may be utilized to assist in the mapping of lighting conditions (i.e., position and directionality of one or more lighting sources) in a given room, to assist with shadow simulation for virtual content presented in AR. Further, some objects change shape with temperature changes, providing another data point if that information is known. In various embodiments, if a user with wearable computing system (2) is in a room and is registered to the room based upon visible light camera head pose detection—and also has certain thermal elements (such as a heater vent, a fish tank, one or more lights, an electrical appliance) mapped into this spatial understanding of the room, and then the lights suddenly go out, the user may remain registered to the room by using the thermal elements. Thermal imaging also may be utilized to assist in horizon determination and matching—with sunlight-exposed portions of the world being elevated in temperature.

In various embodiments such as that illustrated in FIG. 78, it may be valuable to correct images for parallax based upon actual gaze of the user, or to do a real or near-real time Jacobian transformation to address the fact that one or more imaging devices may not be positioned at the same capture position as the user's eye gaze; this may be done for each eye based upon one imaging device as long as such imaging device captures both gaze fields of view of both eyes.

Various embodiments may be configured to rapidly identify windows also, as planar elements that are at least partially transparent to conventional visible light cameras, but which may have time-of-flight signals, scatter, and thermal characteristics that distinguish them from open space. Conventionally the identification of windows is a particular challenge for computer vision systems.

Figure 85:
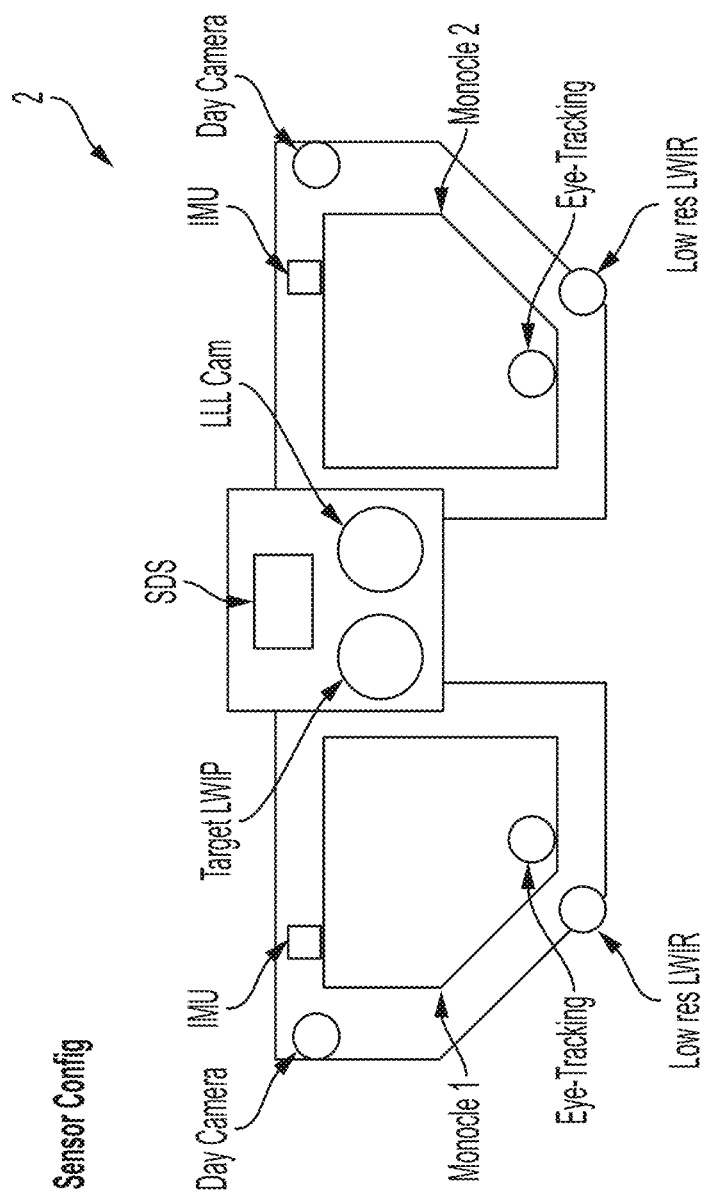
FIG. 85 illustrates an example wearable component of a mixed reality systems, according to some embodiments.
Figure 86A:
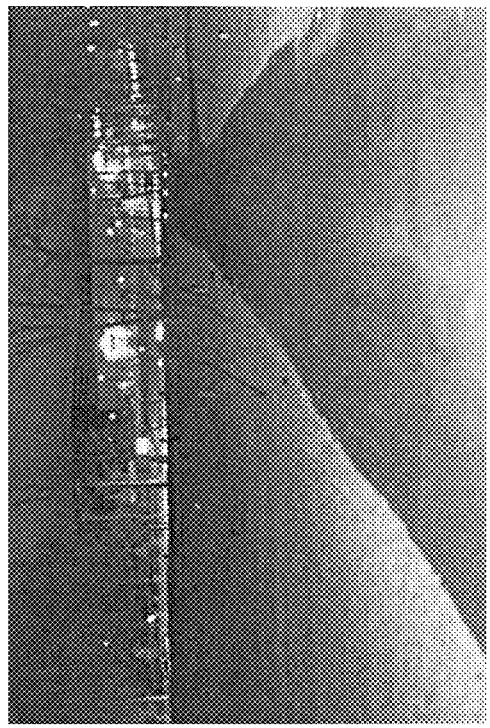
FIGS. 86A-86D illustrate an example sensor component of mixed reality systems, according to some embodiments.
Figure 86B:
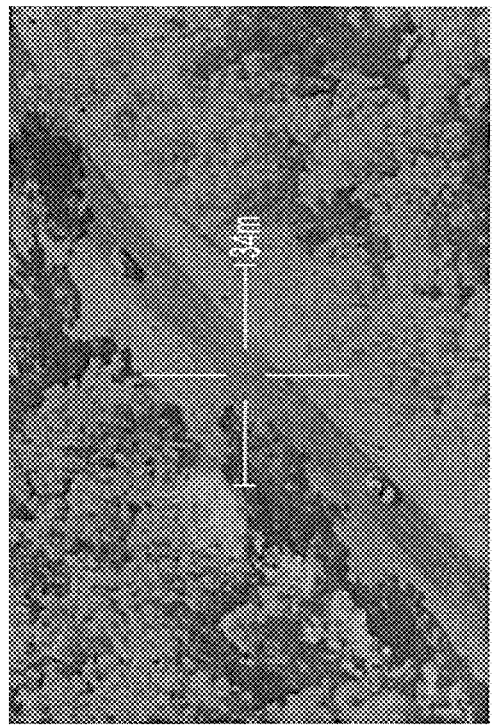
Figure 86C:
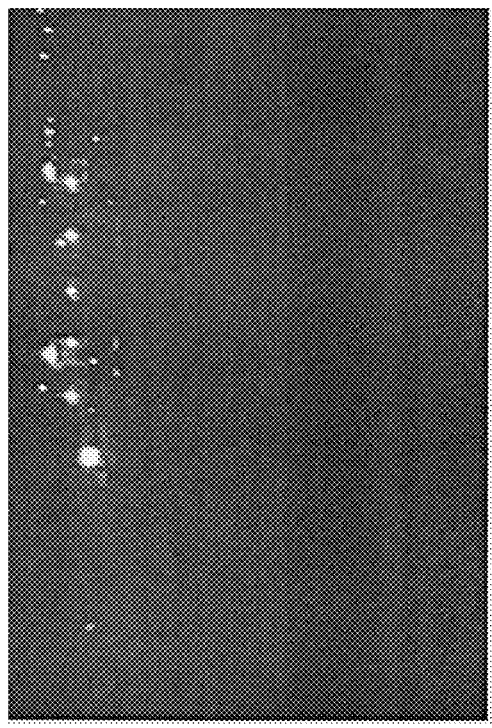
Figure 86D:
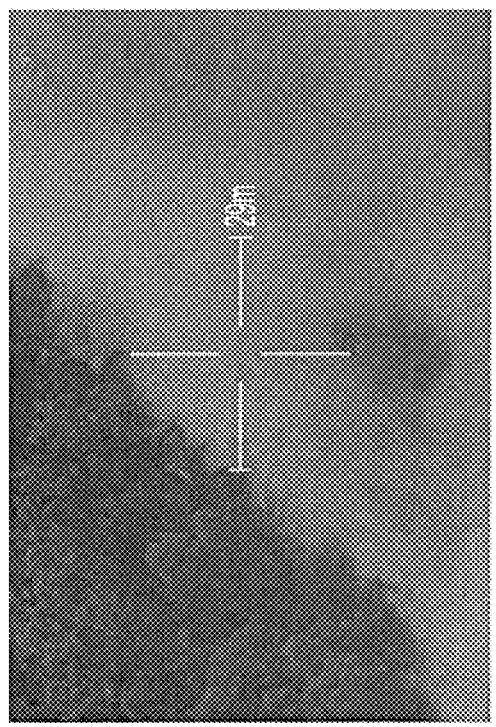
Figure 87:
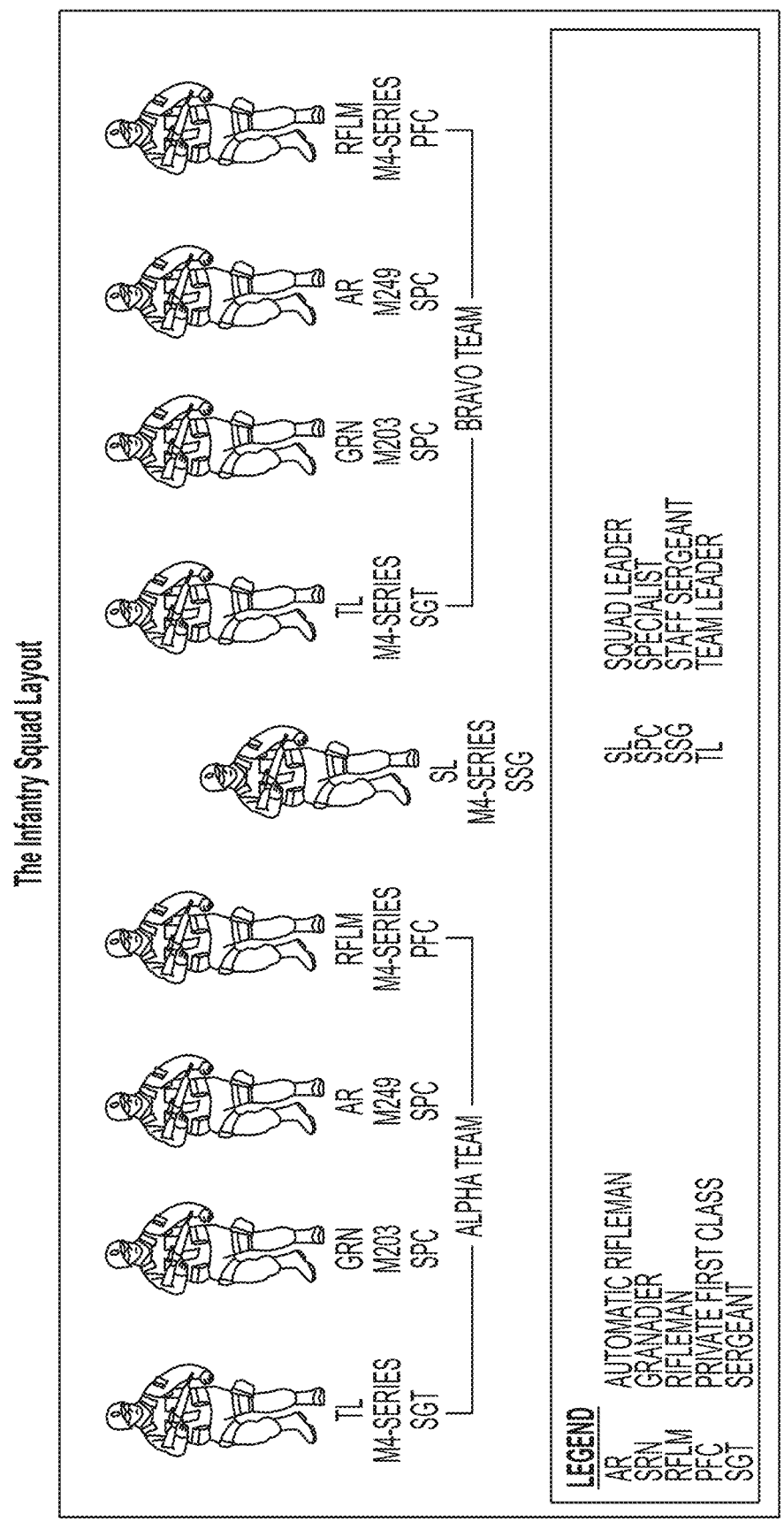
FIG. 87 illustrates an example mixed reality computing architecture, according to some embodiments.
Figure 88:
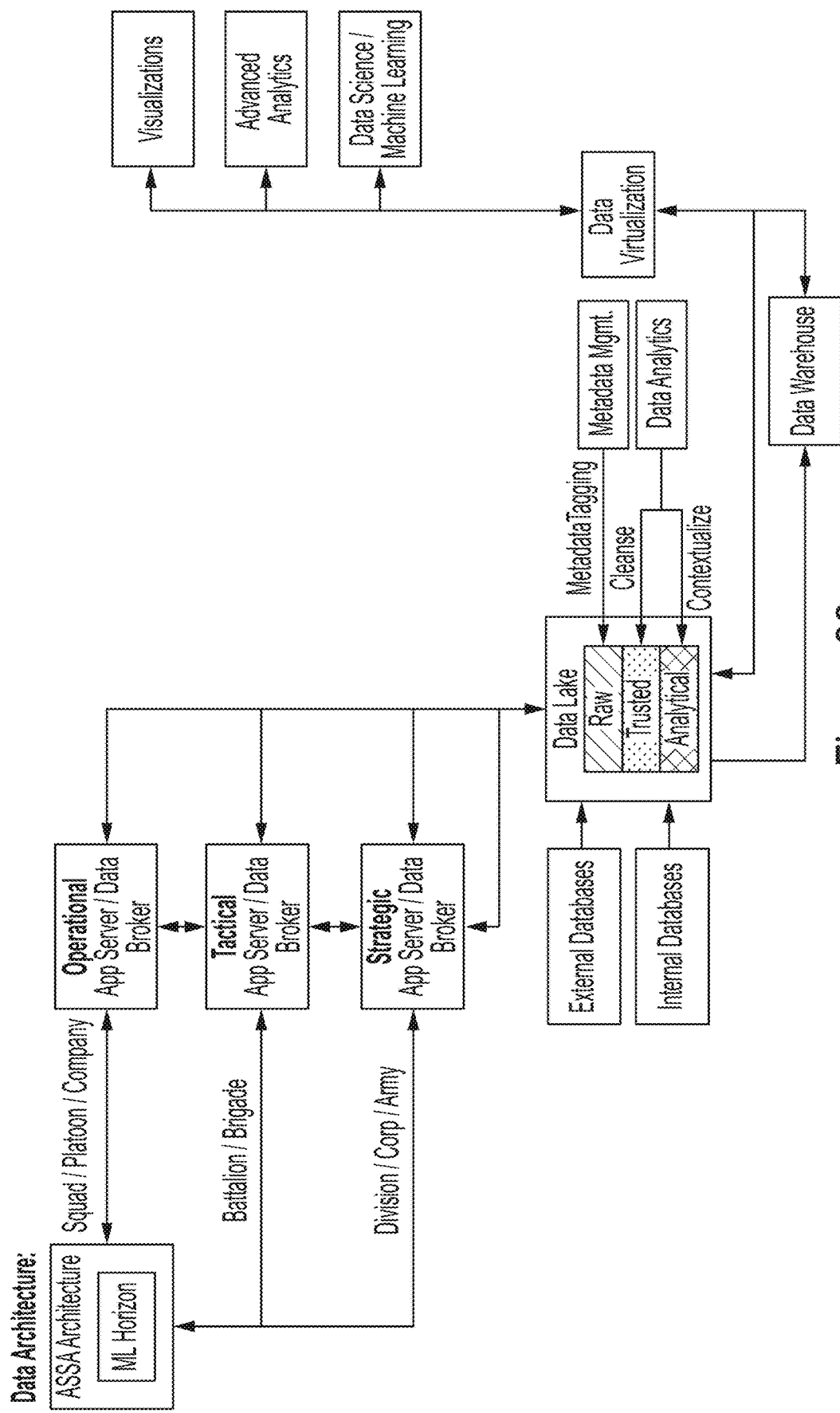
FIG. 88 illustrates an example mixed reality computing architecture, according to some embodiments.
Figure 89:
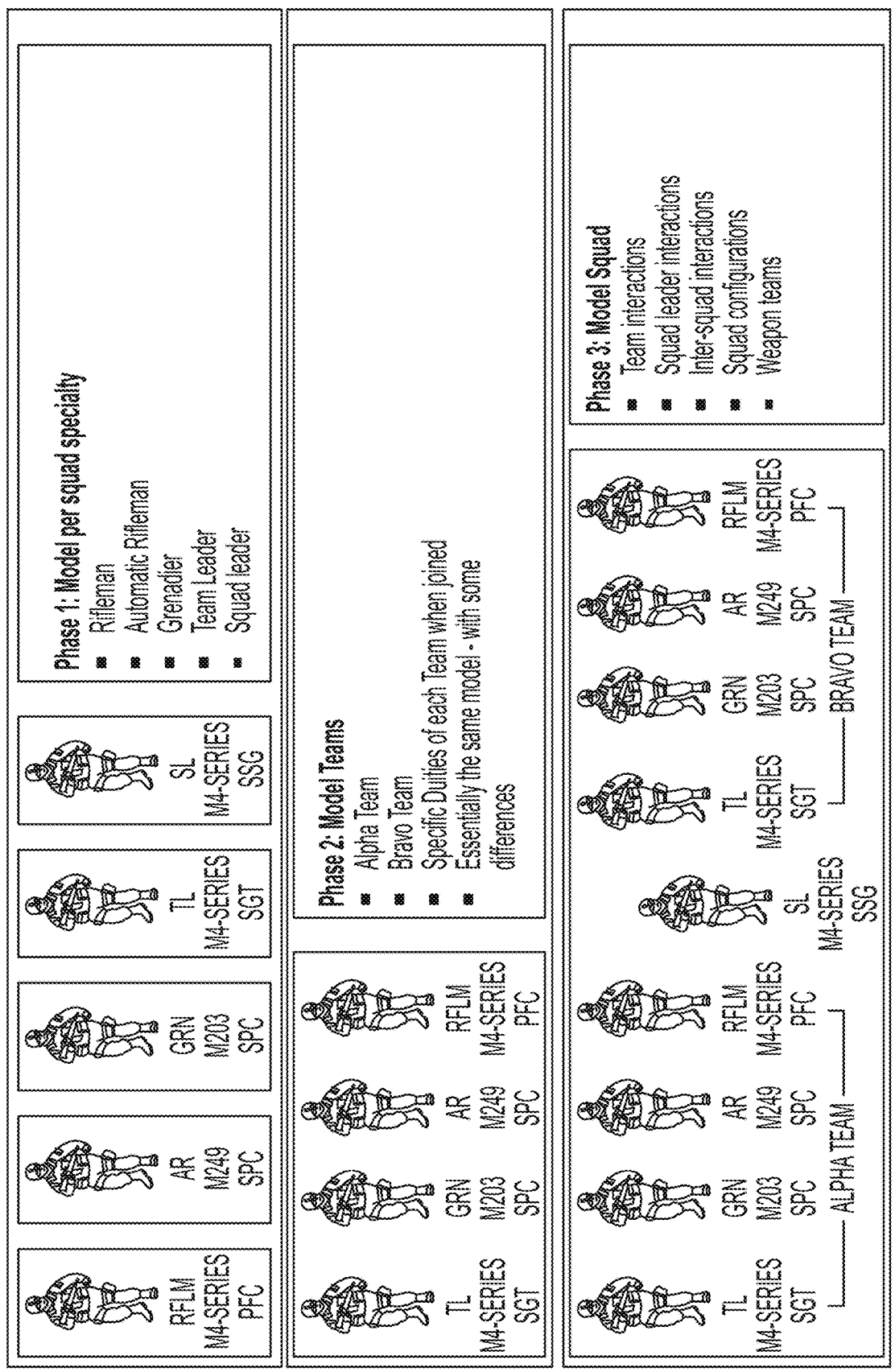
FIG. 89 illustrates an example mixed reality computing architecture, according to some embodiments.

Referring to FIG. 85, another embodiment of a wearable component (2) is illustrated with various sophisticated sensors integrated therein. Various configurations may be coupleable directly to an operator's head, to a helmet, inside of a vehicle, aircraft, or the like.

Figure 91:
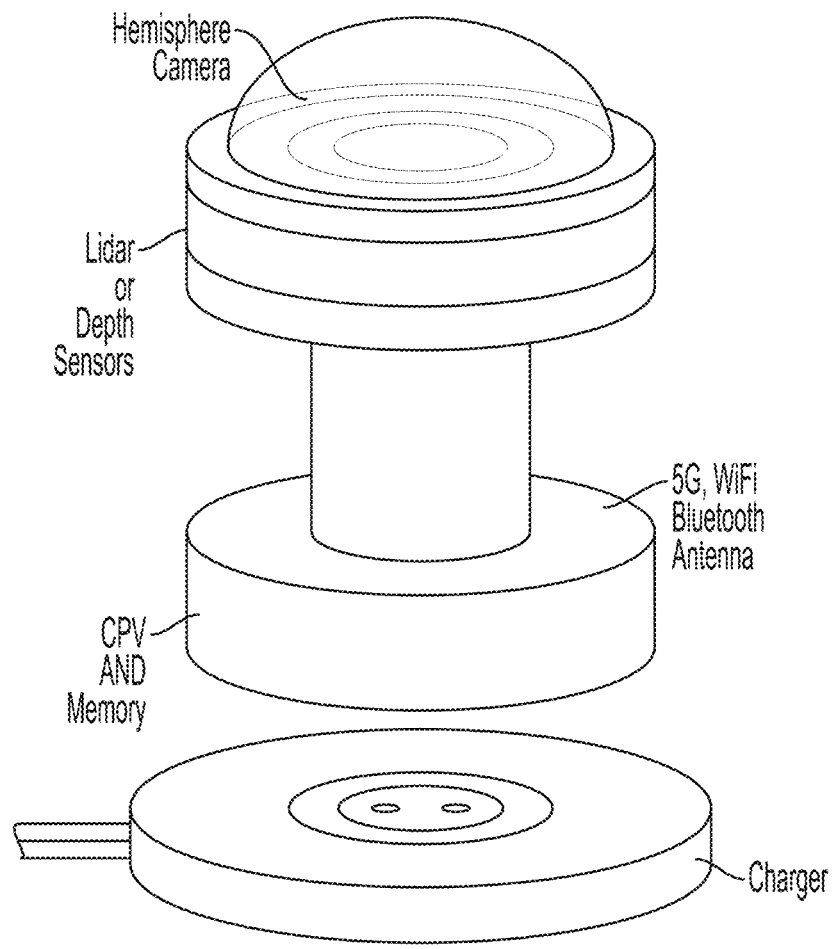
FIG. 91 illustrates an example mapping component of mixed reality systems, according to some embodiments.
Figure 92:
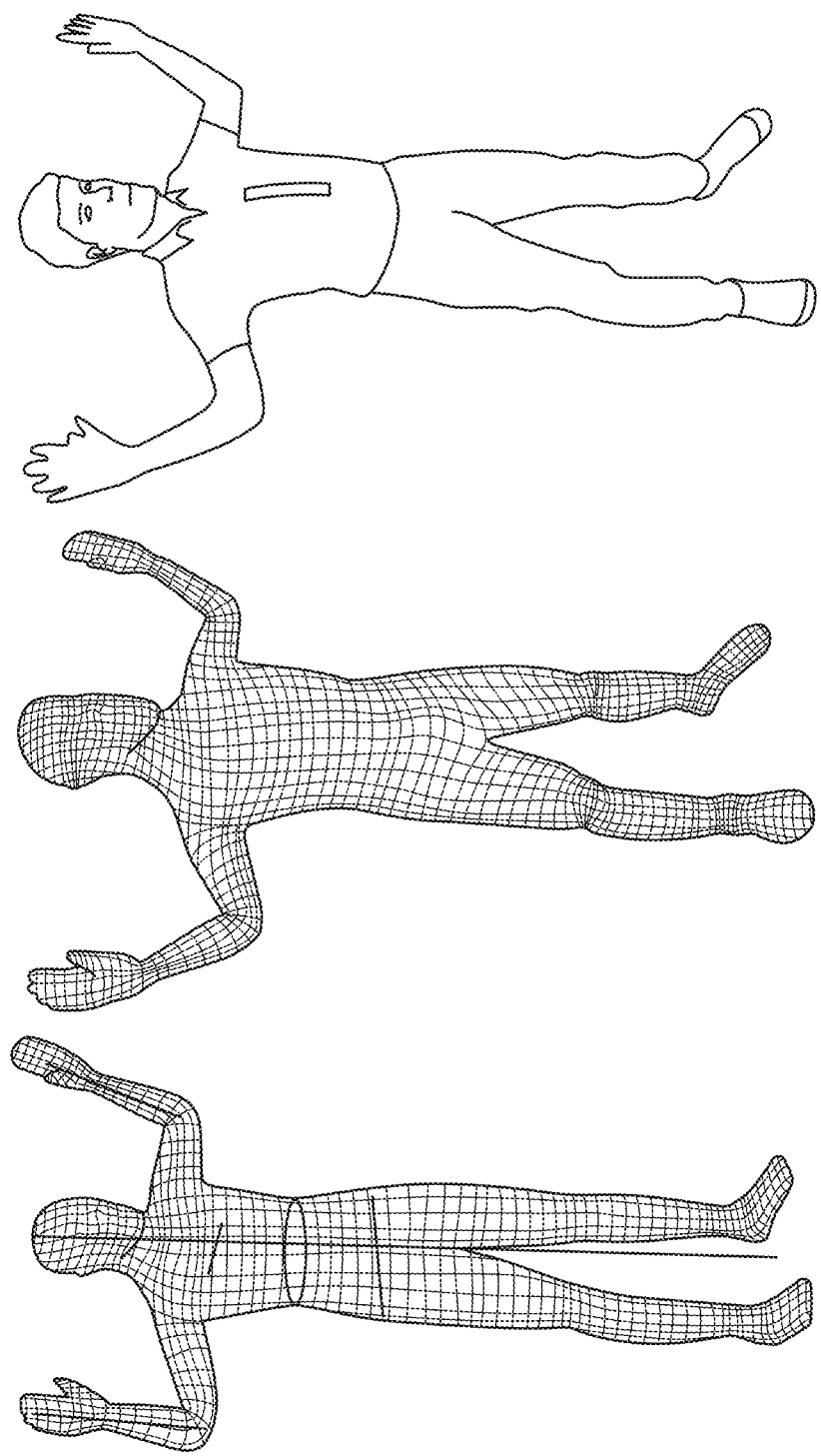
FIG. 92 illustrates an example virtual model, according to some embodiments.

Referring to FIG. 91, a mapping appliance embodiment is illustrated wherein a mapping/imaging unit removably coupled to a charger base is configured to create a point cloud of the room and overlay an RBG image over the captured point cloud mesh of such room, and to update this in real or near real time when operating. FIG. 92 illustrates a point cloud version of a person's geometry, which also may be viewed, for example, by an RGB camera in adequate light.

Figure 93:
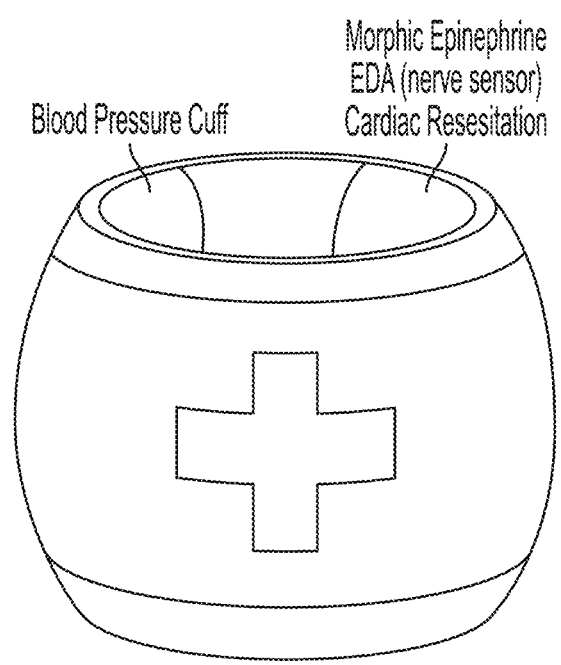
FIG. 93 illustrates an example cuff component of mixed reality systems, according to some embodiments.

Referring to FIG. 93, an embodiment of a cuff assistant module is illustrated, wherein a wrist-wearable cuff, akin to a somewhat large watch band, may be coupled to a user in times when certain types of biometric monitoring are desired, such as in an emergency or dangerous situation, so that others may utilize data collected and made available (i.e., such as by cloud connectivity) to monitor factors such as location (such as by GPS, mobile transceiver triangulation, and/or IP address) cardiac condition/output, temperature, etc. The cuff may also contain certain medical components, such as analgesics, which may be manually or automatically (i.e., such as remotely from an operation center or connected colleague) introduced to the user's body through the cuff. In various embodiments it may be wirelessly coupled to the wearable computing assets described herein (2, 6).

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses sight, sound, touch, taste, smell—and interacts with the real environment by moving one's own body in the real environment. Locations in a real environment can be described as coordinates in a coordinate space; for example, a coordinate can include latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment. As another example, an accelerometer, gyroscopic sensor, or other type of sensor in a peripheral device (e.g., controller 300 described below) can provide motion data and/or device orientation data indicating that the user is attempting to use the peripheral device to manipulate an object in the virtual environment, and a processor can use that data to cause the object to respond accordingly in the virtual environment. Other suitable types of sensor data may also be employed.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE includes a real lamp post (a real object) at a location coordinate, the virtual environment of the MRE may include a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may include a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may include a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of a MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

Figure 105A:
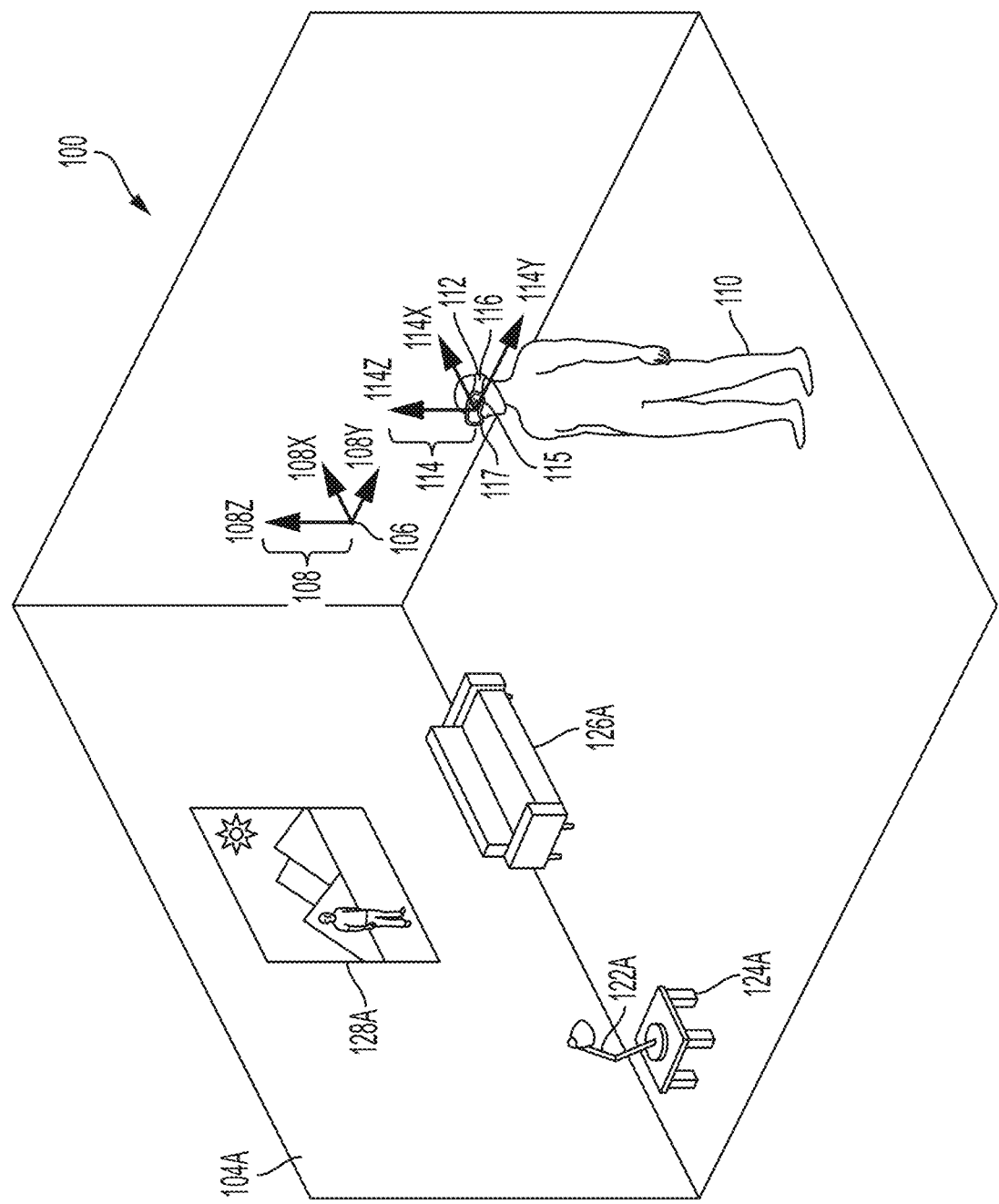
FIGS. 105A-105C illustrate an example mixed reality environment, according to some embodiments.

FIG. 105A illustrates an example real environment 100 in which a user 110 uses a mixed reality system 112. Mixed reality system 112 may include a display (e.g., a transmissive display) and one or more speakers, and one or more sensors (e.g., a camera), for example as described below. The real environment 100 shown includes a rectangular room 104A, in which user 110 is standing; and real objects 122A (a lamp), 124A (a table), 126A (a sofa), and 128A (a painting). Room 104A further includes a location coordinate 106, which may be considered an origin of the real environment 100. As shown in FIG. 105A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 105B:
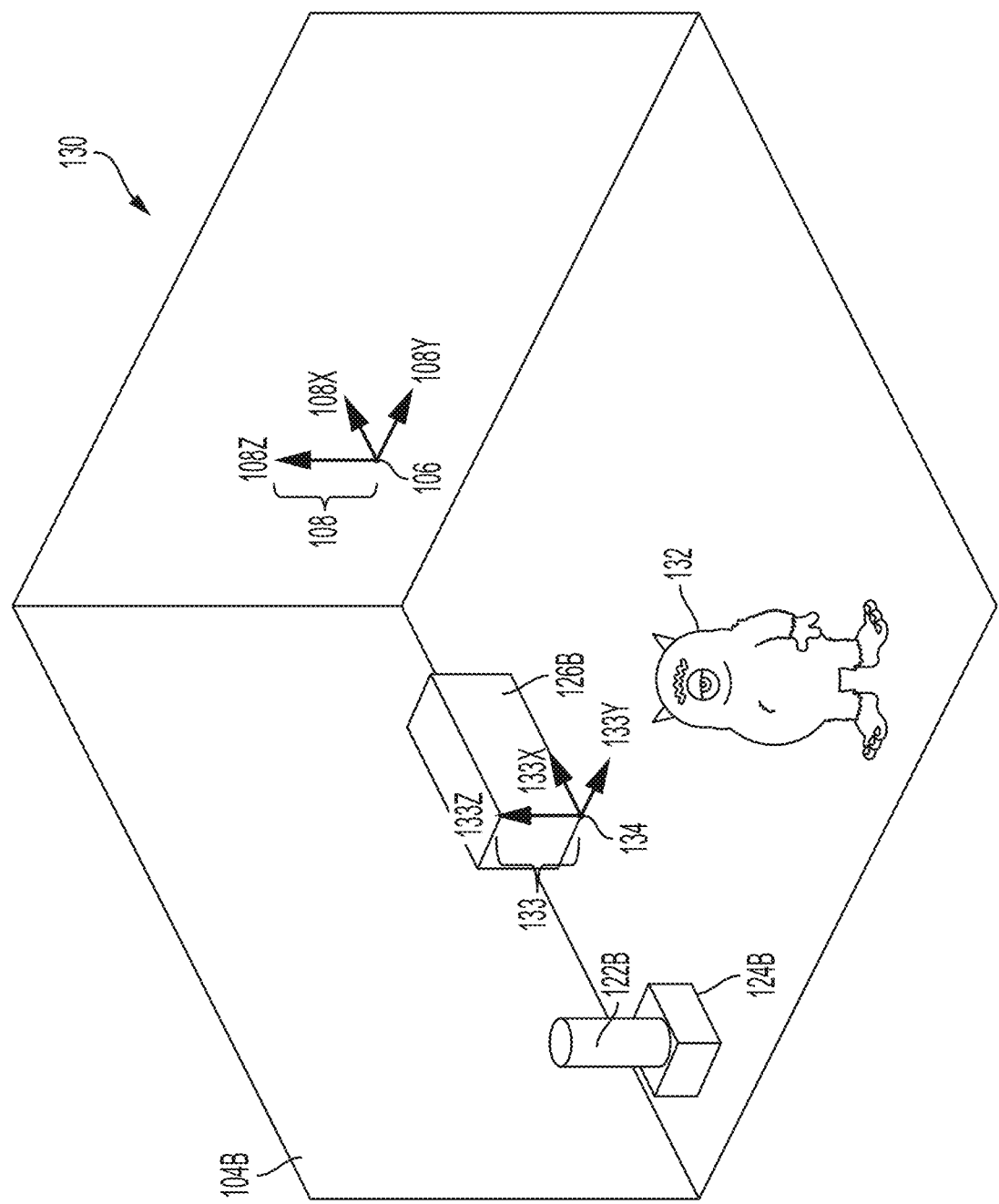

FIG. 105B illustrates an example virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 105A and 105B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 105C:
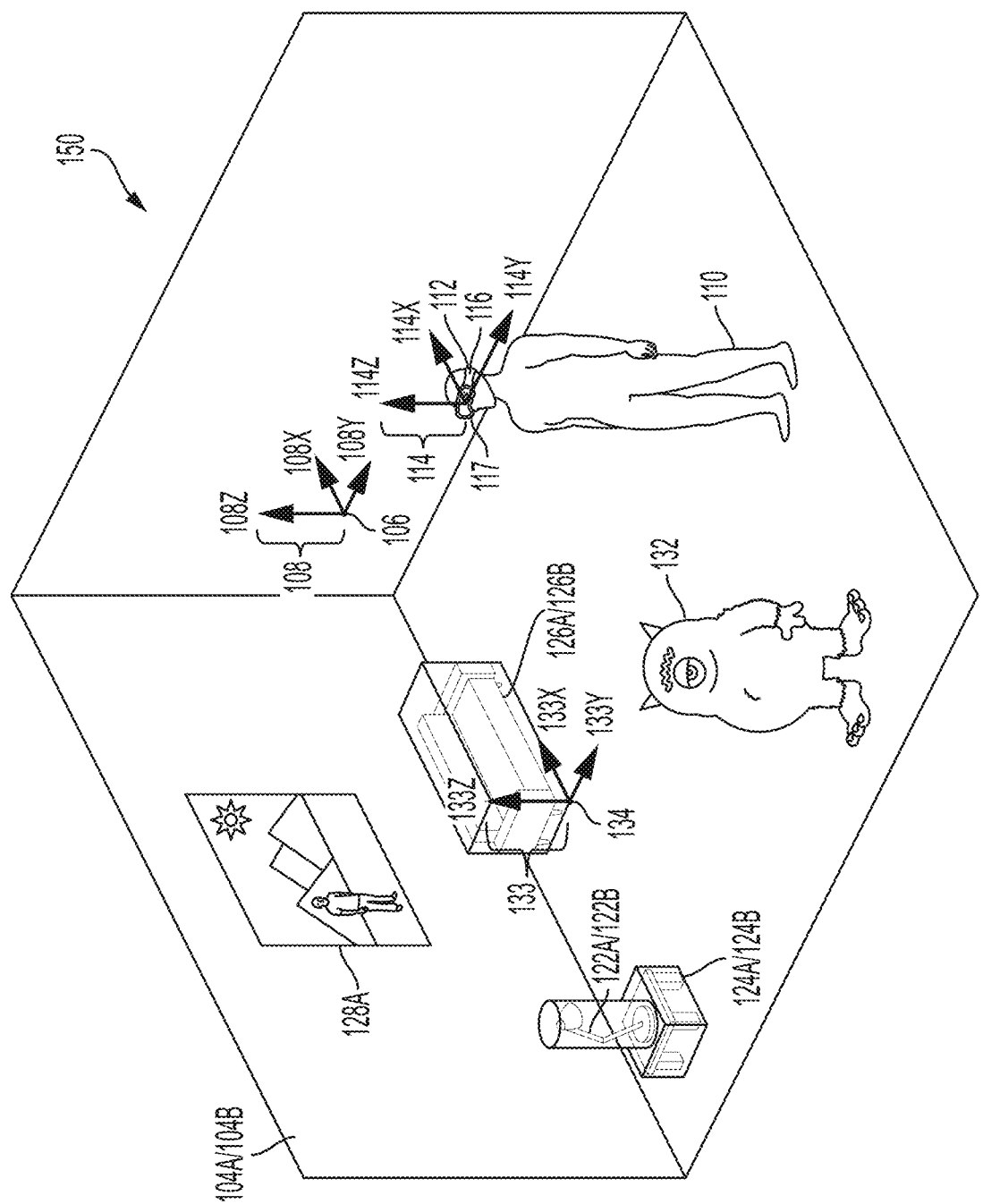

FIG. 105C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may include left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 106A:
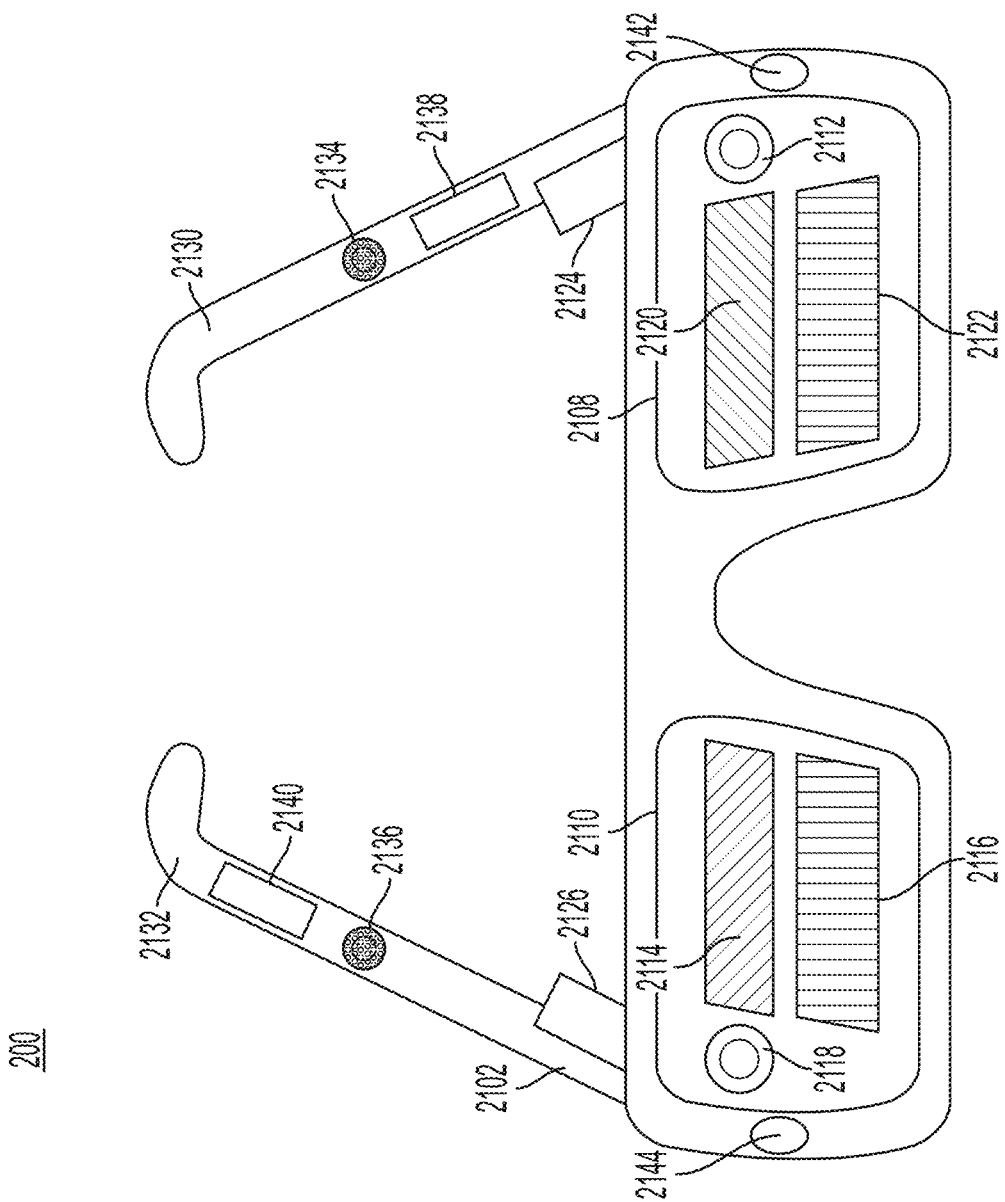
FIGS. 106A-106D illustrate components of an example mixed reality system that can be used to generate and interact with a mixed reality environment, according to some embodiments.
Figure 106B:
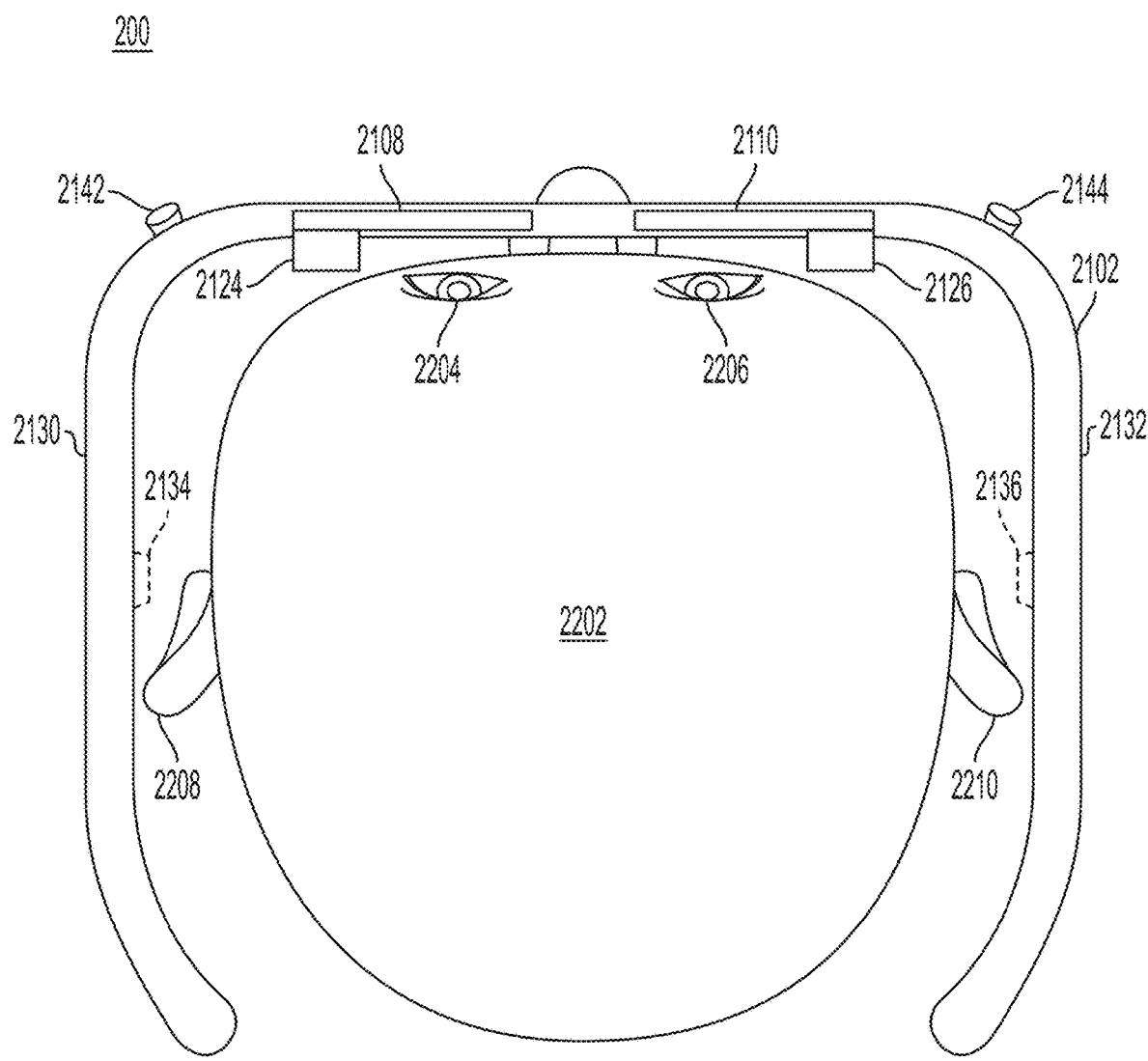
Figure 106C:
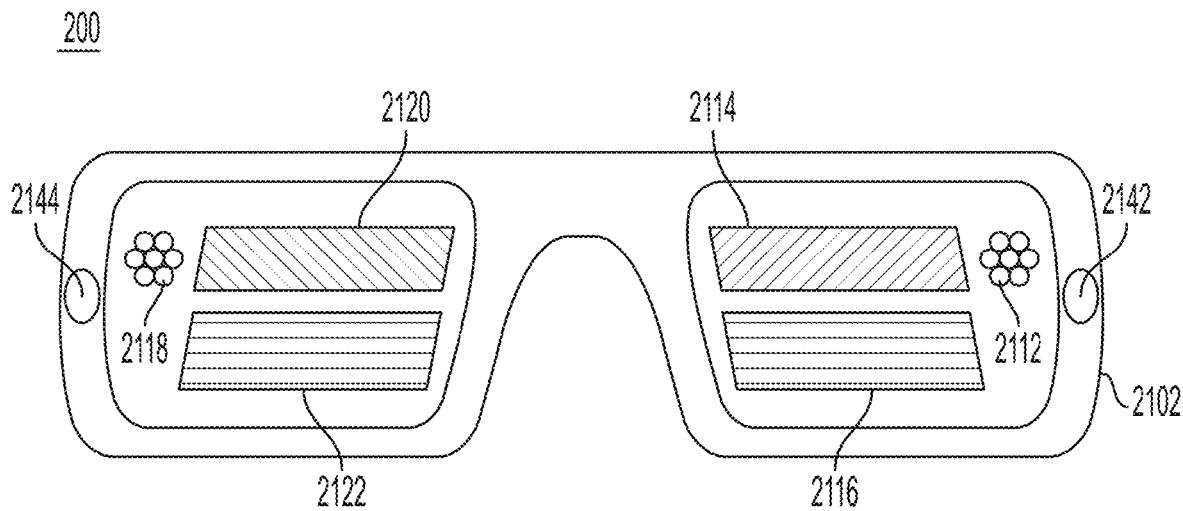
Figure 106D:
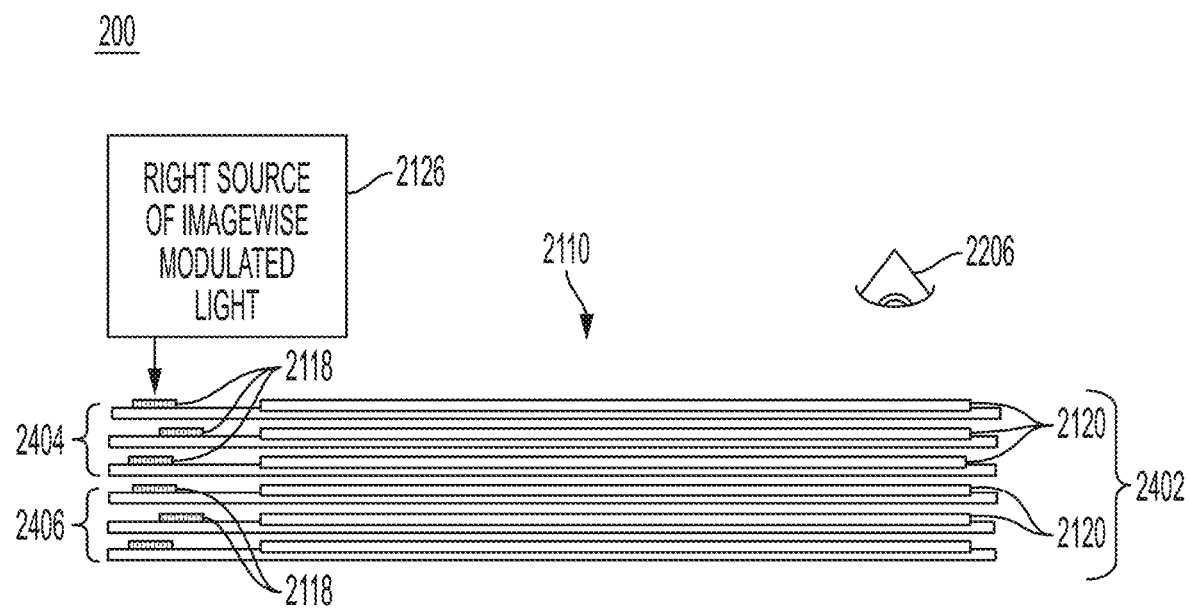

FIGS. 2A-2D illustrate components of an example mixed reality system 200 (which may correspond to mixed reality system 112) that may be used to present a MRE (which may correspond to MRE 150), or other virtual environment, to a user. FIG. 106A illustrates a perspective view of a wearable head device 2102 included in example mixed reality system 200. FIG. 106B illustrates a top view of wearable head device 2102 worn on a user's head 2202. FIG. 106C illustrates a front view of wearable head device 2102. FIG. 106D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 106D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. Although not shown in FIG. 2D, the structure of the left eyepiece 2108 is analogous to the structure of the right eyepiece 2110.

Figure 107A:
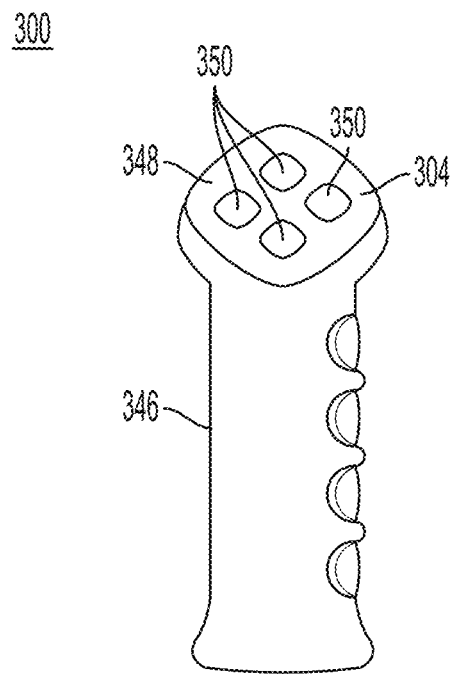
FIG. 107A illustrates an example mixed reality handheld controller that can be used to provide input to a mixed reality environment, according to some embodiments.

FIG. 107A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 107B:
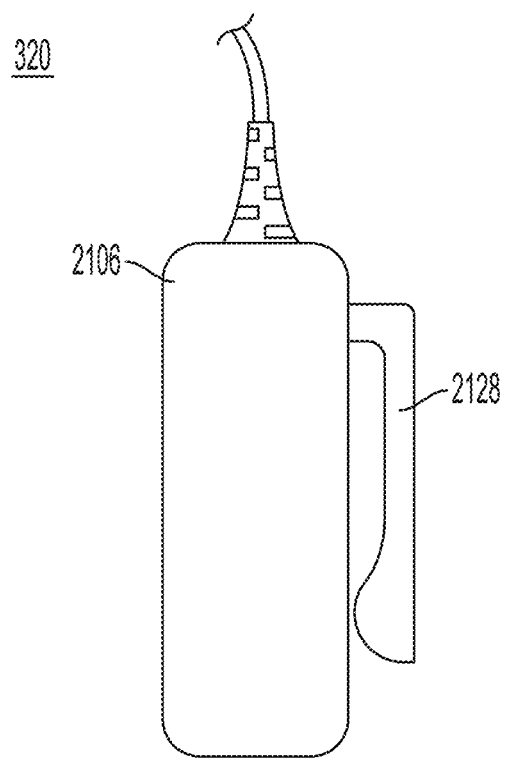
FIG. 107B illustrates an example auxiliary unit that can be used with an example mixed reality system, according to some embodiments.

FIG. 107B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 108:
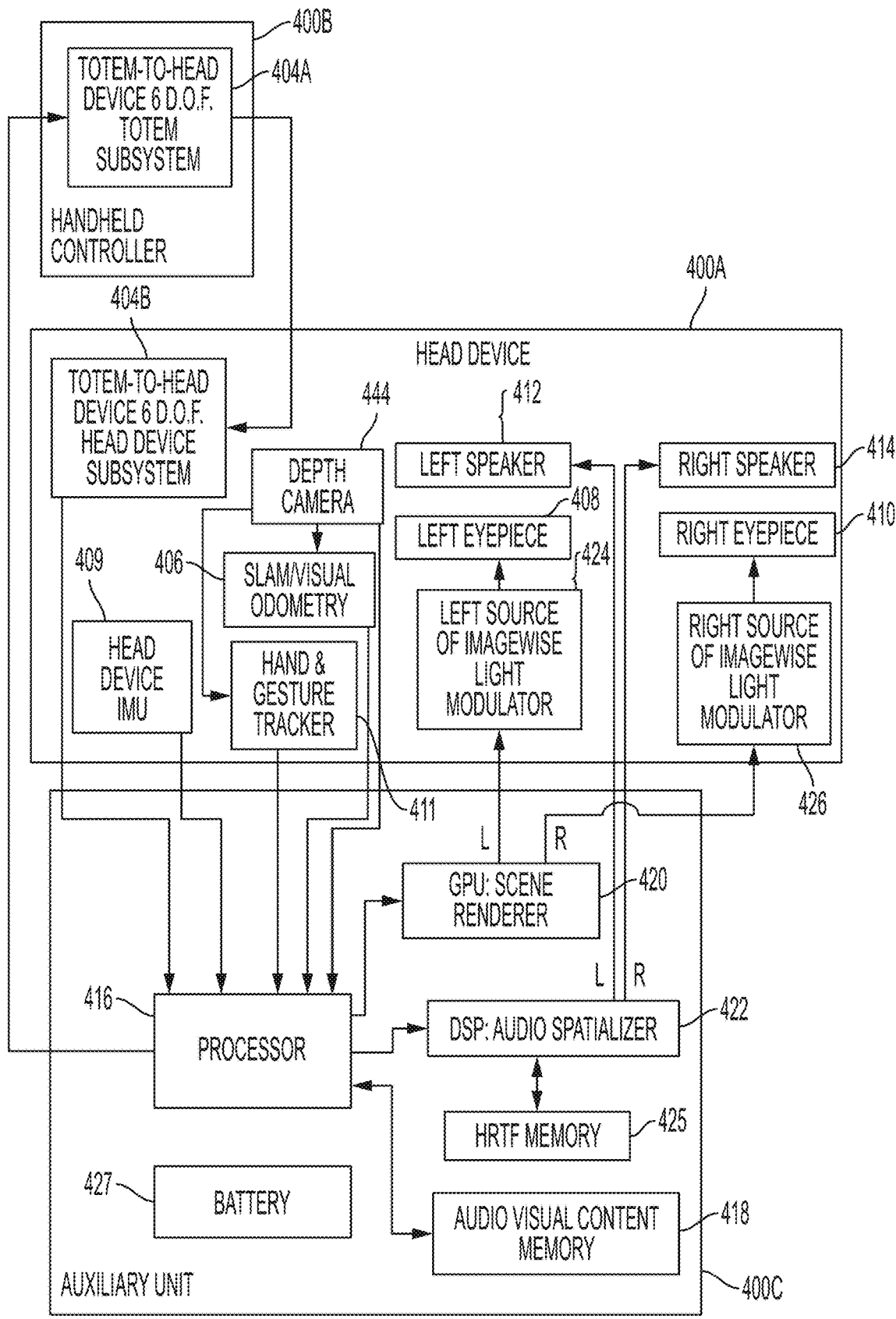
FIG. 108 illustrates an example functional block diagram for an example mixed reality system, according to some embodiments.

FIG. 108 shows an example functional block diagram that may correspond to an example mixed reality system, such as mixed reality system 200 described above (which may correspond to mixed reality system 112 with respect to FIG. 1). As shown in FIG. 108, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 108, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 108, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 108 presents elements corresponding to various components of an example mixed reality system, various other suitable arrangements of these components will become apparent to those skilled in the art. For example, elements presented in FIG. 108 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

System Architecture

A goal of mixed reality systems can be to synthesize real-world information and provide a user with information that otherwise may not be available and/or readily accessible to the user. The benefits of mixed reality systems can be especially apparent when a user needs to process a large amount of information in a short period of time to make a decision. In these situations, mixed reality systems are especially well-suited to aid a user in decision making by making relevant information easily accessible to the user. For example, in combat situations, a soldier may benefit from information such as remaining ammunition in their weapon magazine, location of squad members, and/or location of enemy combatants. This information—which might otherwise be unavailable to the soldier—can be presented to the soldier via, for example, a see-through display of a mixed reality system.

Because mixed reality systems may receive and parse a large amount of real-world information, an efficient computing architecture can yield improved user experiences and enhanced capabilities for a mixed reality system. An efficient computing architecture can allow a mixed reality system to quickly process inputs from a variety of real-world information sources. For example, referring back to FIG. 8, a mixed reality system comprising headset 2 and belt pack 6 (which may correspond to MR system 112, 200) may receive real-world input from one or more weapons, which may be communicably coupled to the mixed reality system. The one or more weapons may each include one or more sensors coupled to a microprocessor. For example, a sensor may detect the amount of ammunition remaining in a magazine, and that information may be sent to the microprocessor. The weapon's microprocessor may communicate this information to the mixed reality system via wired and/or wireless communication. For example, the weapon's microprocessor may communicate with the mixed reality system using a universal serial bus ("USB") connection and/or radiofrequency communication (e.g., WiFi, Bluetooth, cellular network, 5G).

In some embodiments, it may be more efficient for a mixed reality system to communicate with devices that include microprocessors. For example, a Fire Fighter Kit Monitor may include a fire extinguisher, and the fire extinguisher may include one or more sensors configured to detect the amount of suppressant remaining in the extinguisher. In some embodiments, the fire extinguisher may include a microprocessor configured to communicate with the one or more sensors. The microprocessor may be configured to receive the raw inputs from the sensors (e.g., voltage levels) and accordingly calculate the remaining amount of suppressant. The fire extinguisher's microprocessor may then communicate this information to a mixed reality system in a data structure that the mixed reality system can read. This computing architecture may relieve the computational burden placed on a mixed reality system by offloading one or more computations to the connected device's microprocessor.

In some embodiments, it may be more efficient for a mixed reality system to communicate directly with sensors on connected devices. For example, a Cuff Assistant device may be worn on a user's wrist, and the Cuff Assistant may include a sensor configured to measure the user's heartrate. In some embodiments, the sensor may communicate directly with a mixed reality system (e.g., without an intermediary device microprocessor) using wired and/or wireless means.

A mixed reality system may be configured to receive the raw inputs from the sensor (e.g., voltage levels) and accordingly calculate the heartrate. It can be more economically efficient for connected devices to include sensors that communicate directly with a mixed reality system, and for connected devices to omit individual microprocessors. In some embodiments, omitting device-specific microprocessors can decrease a manufacturing cost for connected devices, but may increase a computational burden on a mixed reality system serving as a hub for connected devices. For example, the mixed reality system may be required to compute a heartrate from voltage readings instead of offloading the computation to a device-specific microprocessor.

Figure 57:
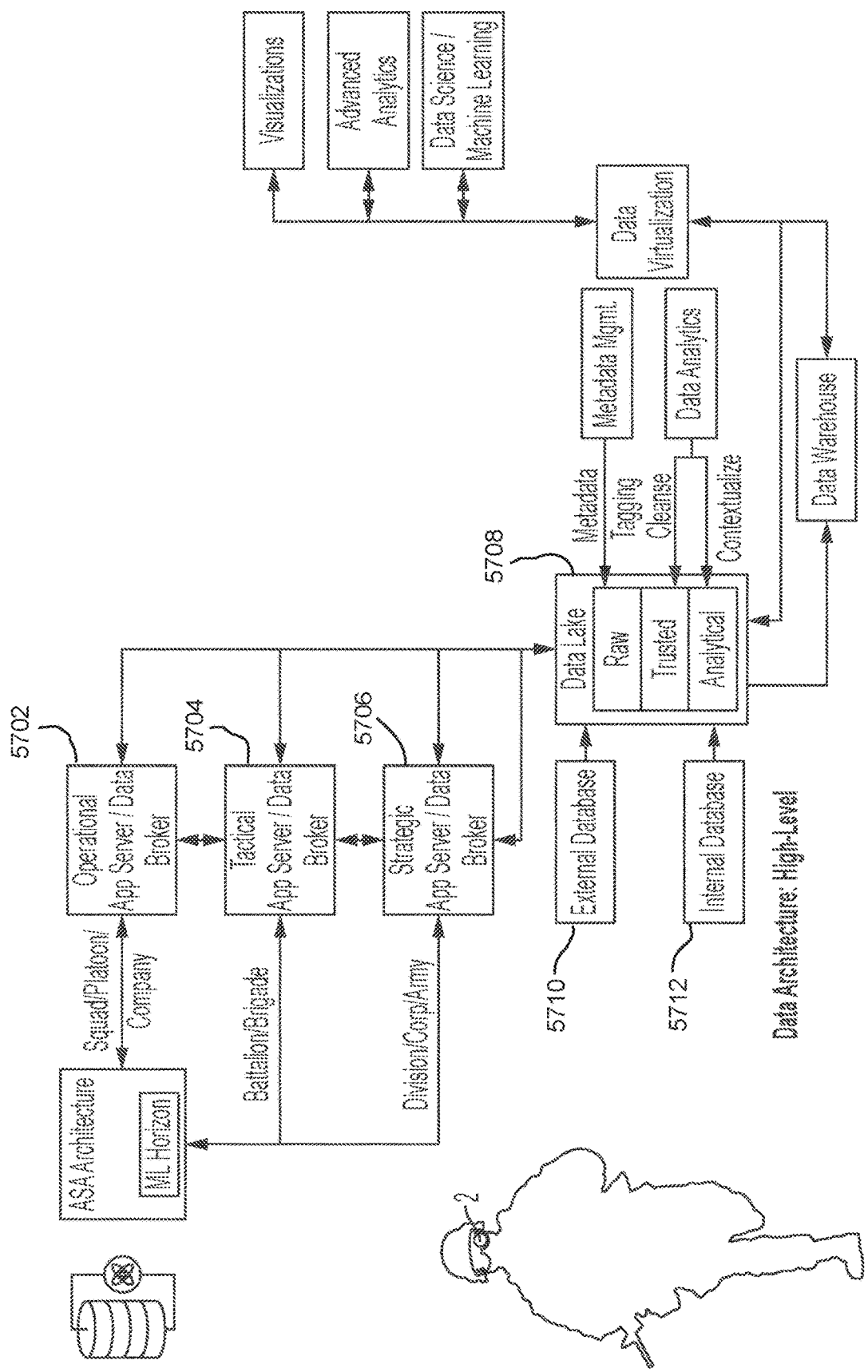
FIG. 57 illustrates an example mixed reality computing architecture, according to some embodiments.
Figure 58:
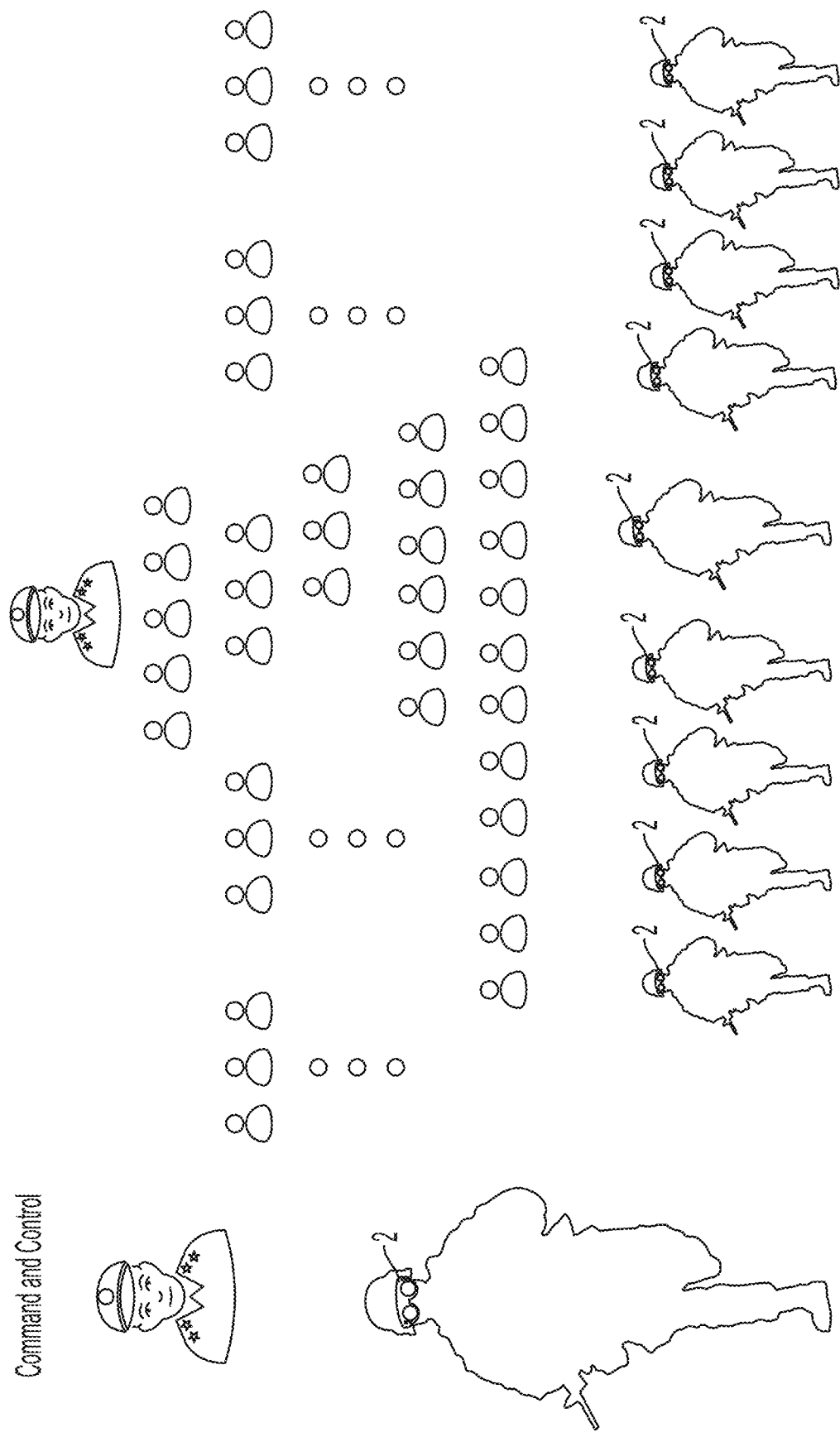
FIG. 58 illustrates an example mixed reality computing architecture, according to some embodiments.
Figure 59:
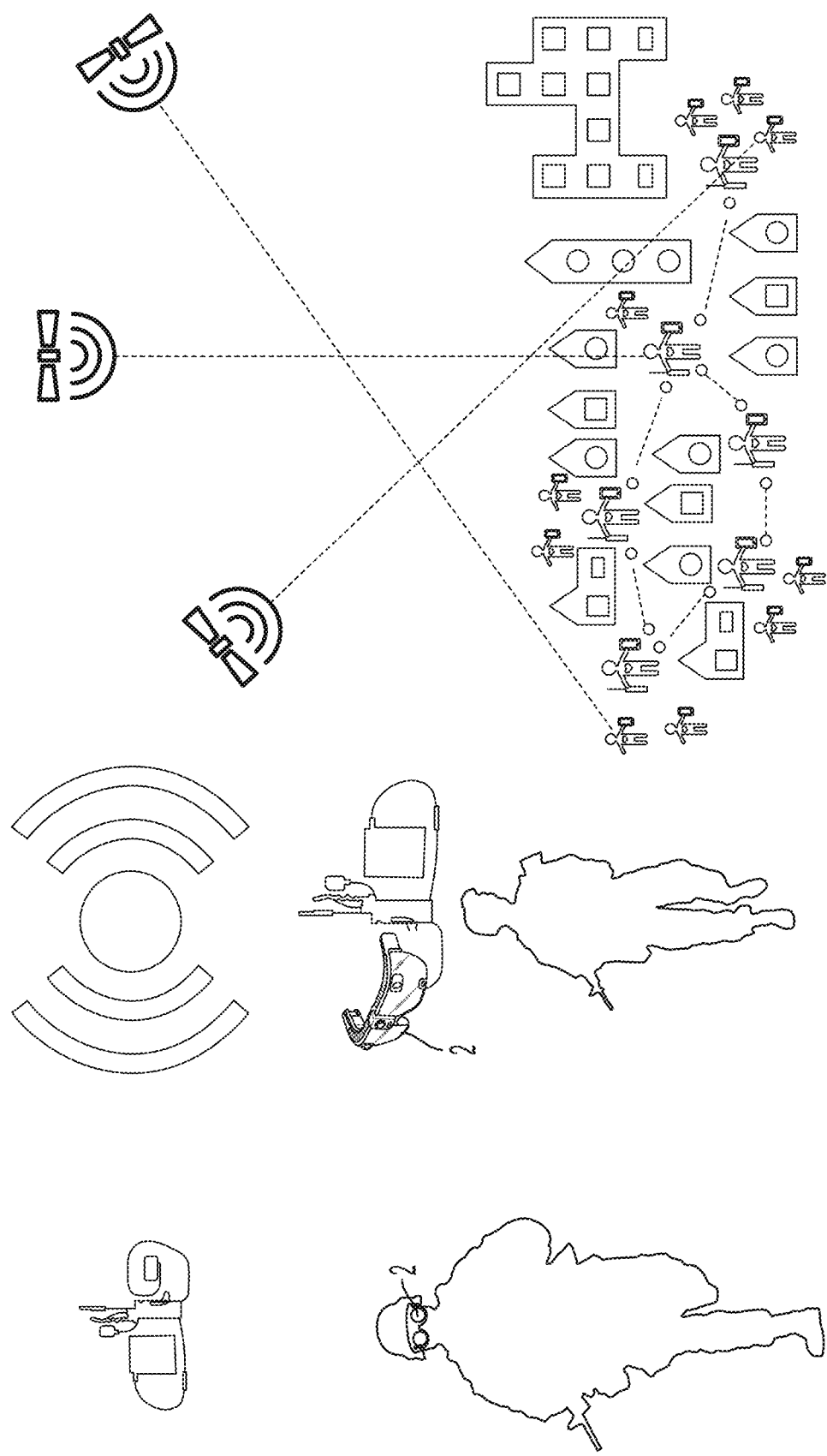
FIG. 59 illustrates an example mixed reality computing architecture, according to some embodiments.
Figure 60:
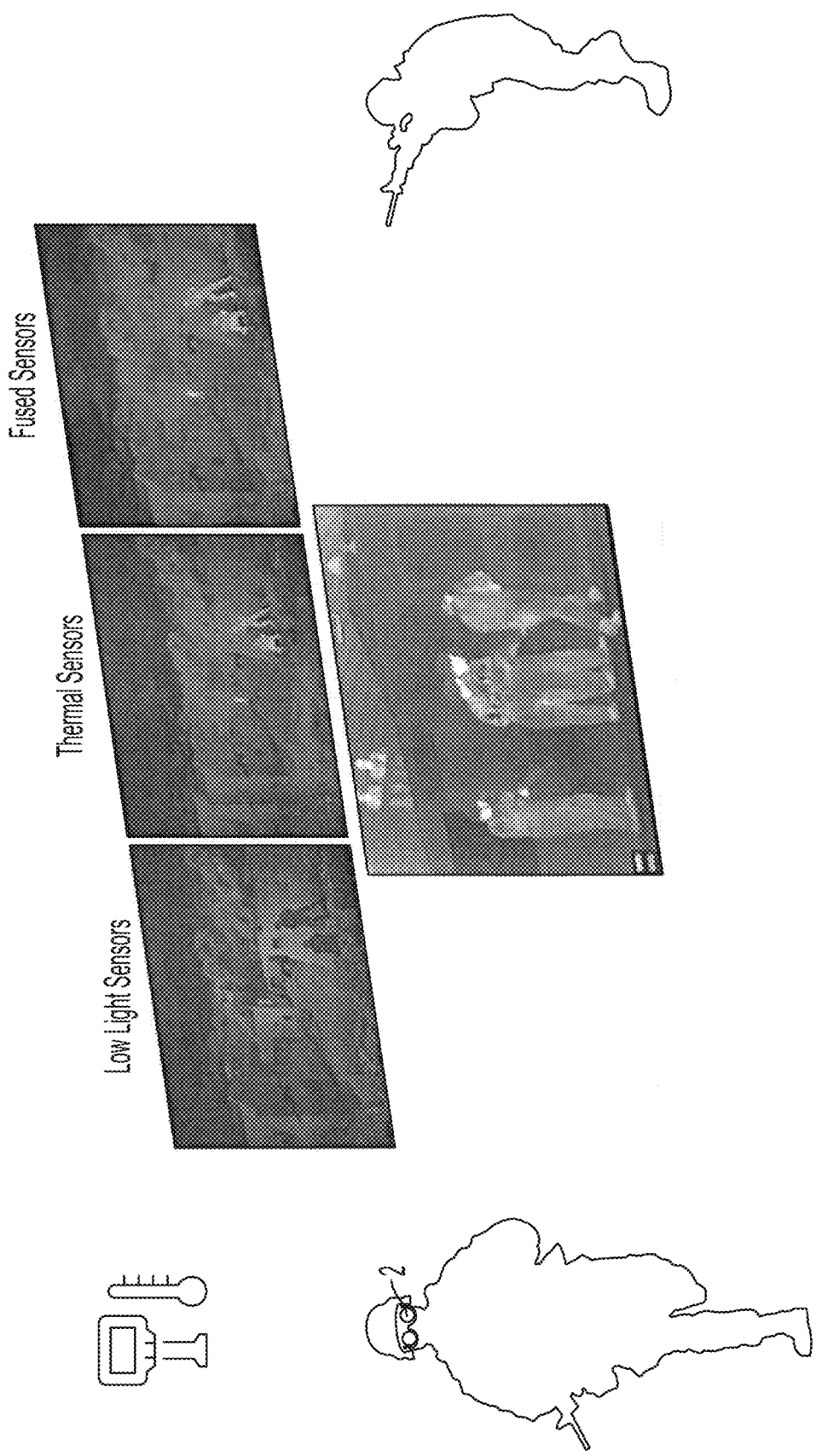
FIG. 60 illustrates an example mixed reality computing architecture, according to some embodiments.
Figure 61:
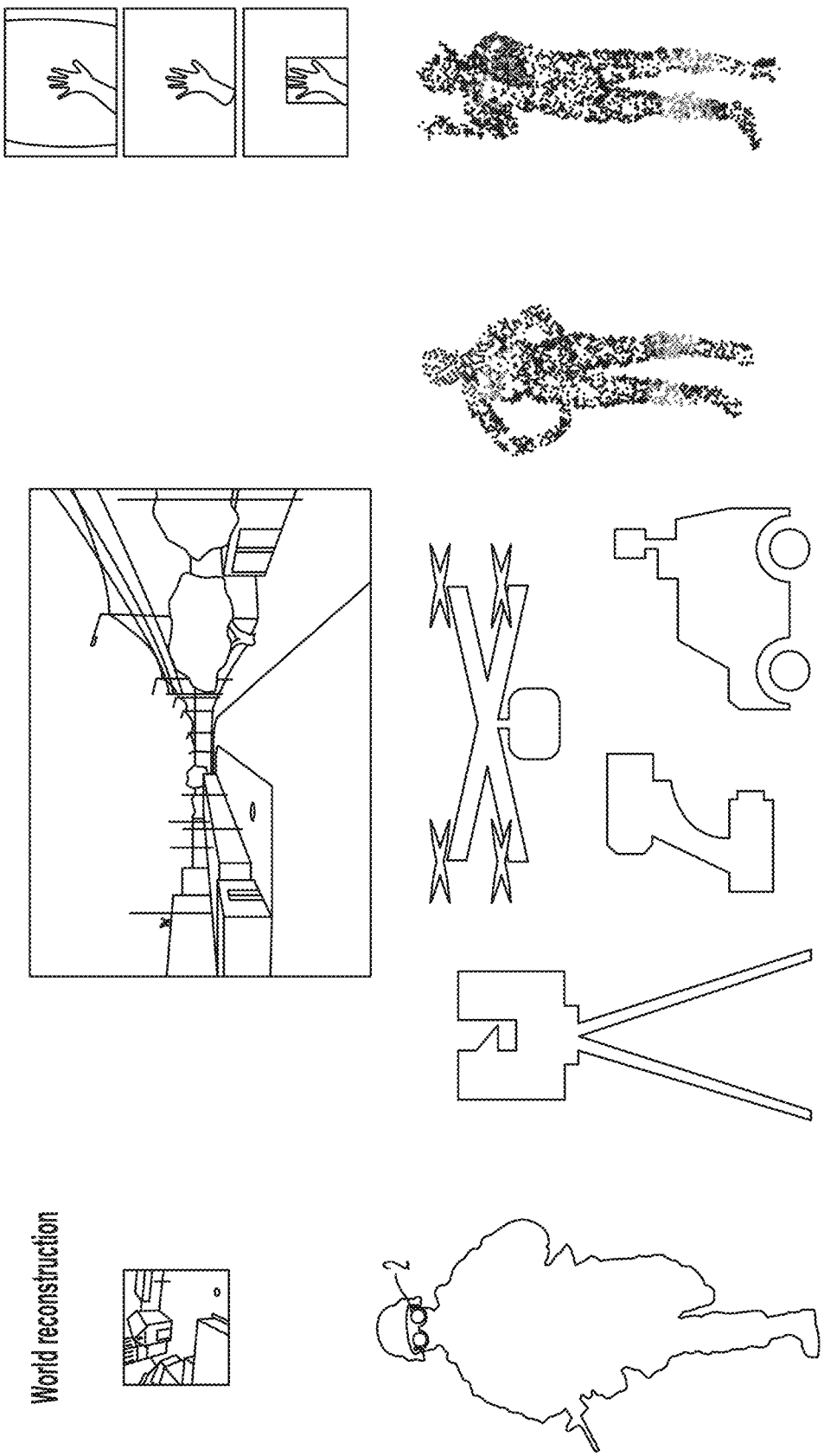
FIG. 61 illustrates an example mixed reality computing architecture, according to some embodiments.
Figure 64:
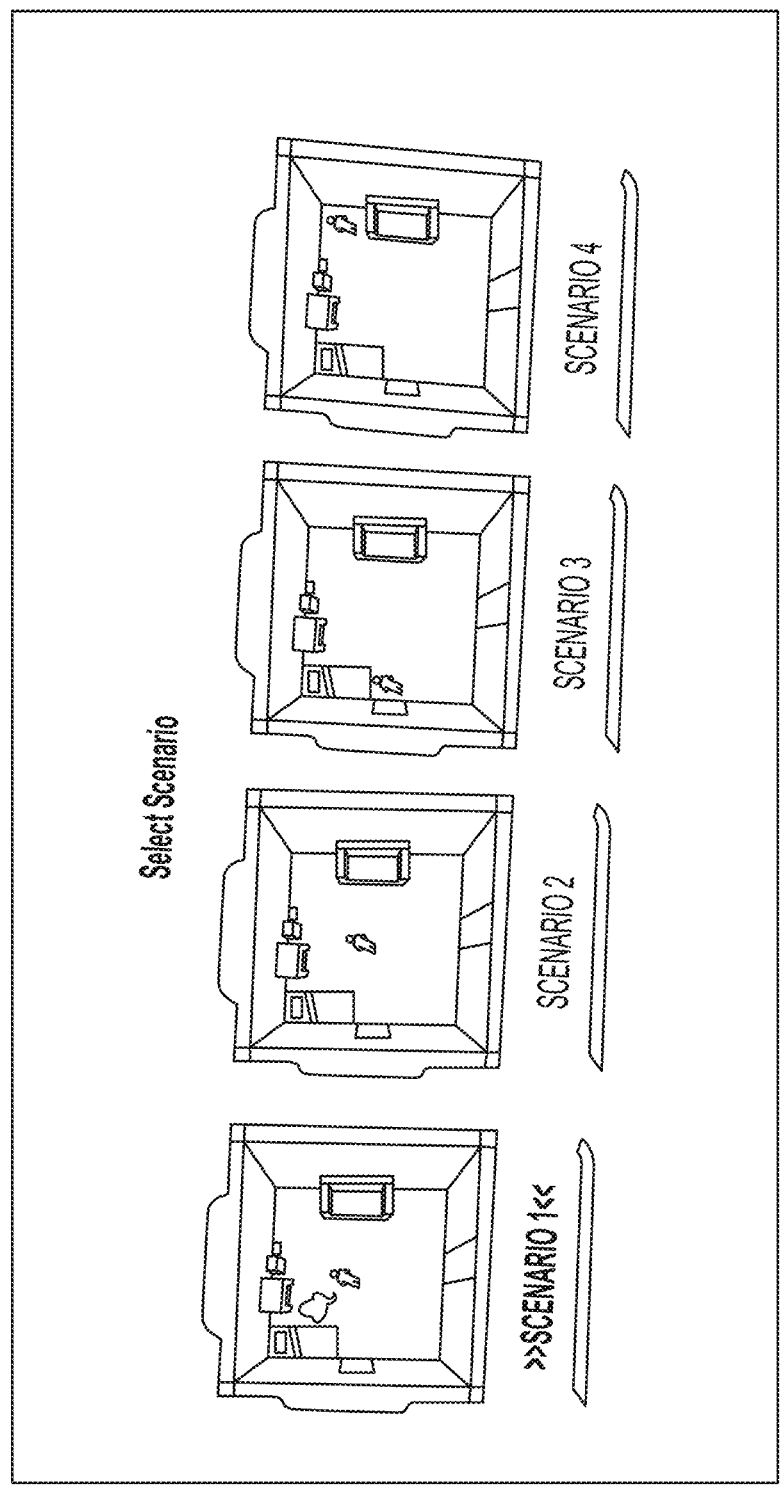
FIG. 64 illustrates an example training usage of mixed reality systems, according to some embodiments.

FIG. 57 illustrates an exemplary computing architecture for large-scale mixed reality applications. In some embodiments, multiple mixed reality systems (e.g., MR systems 112, 200) can be connected to each other and/or connected to external computing systems (e.g., a cloud-based server). An interconnected computing architecture may enable large-scale mixed reality applications, which may rely on large amounts of data and computing resources. In some embodiments, an efficient computing architecture can balance a need for rapid, low-latency computations and complex, processing-intensive computations. In some embodiments, an efficient computing architecture may implement edge computing principles. Edge computing principles can include dividing computing tasks across multiple systems and/or strategically locating computing systems to minimize communication latency between the systems.

For example, an exemplary computing architecture illustrated in FIG. 57 may be used in military training exercises. In a war games application of large-scale mixed reality, many soldiers (e.g., 100, 1,000, or 10,000) may be deployed to test, develop, and/or implement military strategies. Individual soldiers may be equipped with their own mixed reality systems, which may include a head-wearable device (e.g., MR systems 112, 200). Individual mixed reality systems can capture a wide array of real-world data. For example, individual mixed reality systems can capture soldier vitals, remaining ammunition, solider positioning, communications, weapon status, etc. Mixed reality systems can also capture information about the location of real objects and/or a soldier's location/orientation with respect to real objects (e.g., via SLAM). In some embodiments, information captured by mixed reality systems (e.g., mixed reality systems used by individual soldiers) can communicate with each other and/or communicate with external computing systems (e.g., one or more servers). Mixed reality systems may communicate with each other and/or communicate with external computing systems via any suitable means. For example, mixed reality systems may communicate via wired and/or wireless connections, including but not limited to: USB connection, cellular networks, WiFi, Bluetooth, 5G (millimeter wave and/or sub-6GHz), and the like.

In some embodiments, individual mixed reality systems can be organized into one or more groupings. For example, as shown in FIG. 57, a group of 10 soldiers may be assigned to a particular squad/platoon/company. Mixed reality systems used by those 10 soldiers may communicate with a remote operational server 5702. In some embodiments, the remote operational server 5702 may aggregate data collected by the squad's mixed reality systems. In some embodiments, computationally complex tasks that may not require low-latency operation may be executed on the remote operational server 5702. For example, each individual mixed reality system may generate its own understanding of real object locations and positioning (e.g., via SLAM). In some embodiments, this information can be transmitted to the remote operational server 5702, which may optimize object locations and positioning determined across multiple mixed reality systems. Multiple soldiers may yield repeated observations of the same real object from different perspectives, and synthesizing multiple streams of SLAM data may produce a more accurate estimation of real-world object location and positioning.

In some embodiments, individual mixed reality systems may display virtual objects according to local, preliminary SLAM computations. It may be beneficial for individual mixed reality systems to perform a "first-pass" SLAM estimation because the mixed reality system may rely on SLAM to visually display virtual objects in relation to real objects (e.g., a virtual target may appear in the same real location as a soldier moves around). Locally computing SLAM may allow a mixed reality system to visually display virtual objects in a low-latency manner, which can improve a user experience (e.g., by allowing the mixed reality system to display virtual objects in real-time). In some embodiments, SLAM optimizations can be performed remotely (e.g., at a remote operational server 5702). In some embodiments, optimization data can be sent back to mixed reality systems, which may use the data to update visual displays of virtual objects. Further details on optimizing SLAM calculations using additional observations and/or using optimized data to update SLAM calculations can be found in U.S. Provisional Patent Application No. 62/923,317, the contents of which are hereby incorporated by reference in their entirety.

Other computationally intensive tasks that may not require low-latency communications may also be offloaded to a remote server, which may transmit results back to individual mixed reality systems. For example, machine learning algorithms may be offloaded to a remote server (e.g., remote operational server 5702, remote tactical server 5704, remote strategic server 5706, and/or a data lake 5708). In some embodiments, machine learning algorithms may identify objects as targets based on data gathered from mixed reality systems. For example, one or more cameras on a mixed reality system may capture video that approximates a soldier's field of view. Mixed reality system may be connected to a weapon, which can have one or more sensors that may determine a direction the weapon is aimed at. For example, a laser sight from the weapon can be detected by one or more cameras of a mixed reality system to determine a weapon aim direction. In some embodiments, sensors such as accelerometers on the weapon can be used to determine a weapon aim direction. In some embodiments, data about a soldier's visual field-of-view and data about a weapon aim direction can be fed into machine learning algorithms (e.g., images with regions that a weapon is aimed at can be fed through a deep convolutional neural network) to determine what is likely to be a target.

In some embodiments, machine learning computations (e.g., convolutions, forward propagation, back propagation, etc.) can be performed at a remote server to train a neural network. In some embodiments, mixed reality systems can utilize machine learning to visually identify (e.g., via colored outlines) objects likely to be targets. Mixed reality systems may feed images to a remote server, which may run the images through a trained neural network to determine if regions are likely to be a target. In some embodiments, a trained neural network (e.g., a neural network that has been trained at a remote server) can be stored locally on a mixed reality system for low-latency identification of likely targets. In some embodiments, a locally stored, trained neural network may be updated periodically through a remote server that may be continually training a neural network with additional training data.

Similar methods of remote computation and/or local storage of completed computations can be employed for other machine learning/computationally complex applications, including automatic speech recognition. For example, a mixed reality system may record an audio of a user speaking and transmit the audio to a remote server for speech processing (e.g., speech recognition and/or natural language processing). In some embodiments, a mixed reality system may receive from a remote server instructions to perform one or more functions as a result of processing the audio of the user speaking. In some embodiments, it may be desirable to perform speech processing locally on a mixed reality system. For example, a soldier may wish to execute voice instructions to the mixed reality system (e.g., to turn off a night-sight functionality), and it may be desirable to execute the instructions as quickly as possible. In some embodiments, a speech recognition system can be trained at a remote server and stored locally on a mixed reality system.

In some embodiments, some mixed reality functionality can be performed locally on a mixed reality system. For example, a mixed reality system may employ eye-tracking technology (e.g., via one or more cameras pointed at a user's eyes) to identify what direction a user is looking at. In some embodiments, eye-tracking computations may be performed locally on a mixed reality system. It can be desirable to compute eye-tracking in a low-latency manner because visuals may be displayed to a user as a result of eye-tracking, and high latency (e.g., approximately 50 ms or greater) may create too much delay for a user. In some embodiments, spatialized audio rendering may be done locally at a mixed reality device. For example, a virtual sound that should be presented as originating from behind a user may be rendered and/or spatialized locally on a mixed reality device. It can be desirable to render and/or spatialize virtual audio in a low-latency manner so that virtual audio appears "synced" with (e.g., is presented at approximately the same time as) real or virtual visual events. In some embodiments, graphics rendering can be performed locally on a mixed reality system. It can be desirable to quickly render and display virtual objects to a user, and offloading computations (e.g., to a remote server) may produce unacceptable latency.

Mixed reality edge computing architectures may also rely on relative physical locations for efficient computing. For example, communications between nearby mixed reality systems may be lower latency than communications between a mixed reality system and a remote server. In some embodiments, computations that may be offloaded to a remote server may be distributed across connected mixed reality systems (e.g., if a remote server is not reachable). For example, mixed reality systems may communicate SLAM data to each other, which may increase an available pool of observations, which may lead to more accurate SLAM computations. In some embodiments, SLAM optimizations may be performed at a single mixed reality system that may include a more powerful processor than other, standard mixed reality systems. In some embodiments, SLAM optimizations may be distributed across the connected mixed reality systems, and the computational power may be pooled together.

In some embodiments, a remote server (e.g., a remote operational server 5702) may be located physically near connected mixed reality systems, which may reduce communication latency. For example, mixed reality systems deployed with soldiers may communicate with a remote server located at a base of operations, which may be physically near the mixed reality systems (e.g., less than 50 miles away). In some embodiments, communicating with a remote server located near mixed reality systems may yield lower latency than communicating with a remote server located further away (e.g., 2,000 miles away and/or on a different continent).

In some embodiments, mixed reality systems deployed in a large-scale mixed reality application can have individualized permissions/network connections. For example, while each soldier's mixed reality system may transmit data (e.g., SLAM, machine learning, and/or vitals data) to a remote operational server 5702, only a squad leader's mixed reality system may have read-access to each squad member's vitals data. A limited access structure can be implemented via any suitable means. For example, each mixed reality system can have a unique identifier, and a remote server may only transmit sensitive data to the appropriate mixed reality system. In some embodiments, a squad leader's mixed reality system can store an encryption/decryption key, which can be used to encrypt/decrypt communications between the mixed reality system and the remote server.

In some embodiments, a group of 1,000 soldiers can be assigned to a battalion, and each soldier may be equipped with an individual mixed reality system. In some embodiments, data collected from the entire battalion can be aggregated into a remote server (e.g., remote tactical server 5704, which may be the same as remote operational server 5702 or a separate server). In some embodiments, data aggregated about the battalion (e.g., squad status, overall troop movement, casualties, etc.) may be accessed by a limited subset of deployed mixed reality systems (e.g., by a mixed reality system used by a commanding officer). In some embodiments, data aggregated about the battalion can be accessed by a general computing system (e.g., by a laptop in used by a commanding officer).

In some embodiments, data aggregated by one or more remote servers (e.g., remote operational server 5702, remote tactical server 5704, and/or remote strategic server 5706) can be aggregated further into a separate remote server (e.g., data lake 5708). In some embodiments, data lake 5708 can access further external resources (e.g., the Internet) and internal resources (e.g., military databases) in addition to data gathered from deployed mixed reality systems. In some embodiments, data lake 5708 can be physically located in an area considered safe from enemy combatants (e.g., offshores) and/or may be decentralized (e.g., data lake 5708 may comprise one or more server farms located in different locations). It may be beneficial to utilize data lake 5708 to perform computationally complex tasks that may not require low-latency communication (e.g., in a similar manner that computations may be divided between mixed reality systems and remote operational server 5702). For example, remote operational server 5702 may run relatively simple machine learning algorithms (e.g., whether a visual is likely to be a target), and complex machine learning algorithms (e.g., what types of troop movements are more likely to win a battle) and/or neural network training may be performed using data aggregated at data lake 5708.

While some embodiments of the disclosure are described with respect to military applications, it will be understood by the skilled artisan that other applications of the disclosed embodiments (including applications not directly related to military technology or emergency services) are suitable and are within the scope of the disclosure.

FIG. 84 illustrates an exemplary mixed reality computing architecture, according to some embodiments. In some embodiments, mixed reality computing architecture 8400 may include one or more modules, which may be components of mixed reality computing architecture 8400. In some embodiments, a module can include one or more computer systems (e.g., MR system 112, 200 or a remote server) configured to execute instructions and/or store one or more data structures. For example, instructions executed by a module can be a process and/or sub-process running within mixed reality computing architecture 8400. In some embodiments, instructions executed by a module can be a thread running within mixed reality computing architecture 8400. In some embodiments, instructions executed by a module may run within the same process address space and/or memory space as other components of mixed reality computing architecture 8400. In some embodiments, instructions executed by a module may run in a different process address space and/or memory space as other components of mixed reality computing architecture 8400. In some embodiments, instructions executed by a module may run on different hardware than other components of mixed reality computing architecture 8400. For example, instructions executed by one or more modules of mixed reality computing architecture 8400 may run on mixed reality system 112 and/or 200, while other components of mixed reality computing architecture 8400 may run on a remote server. In some embodiments, instructions executed by one or more modules of mixed reality computing architecture 8400 may be instantiated within mixed reality computing architecture 8400. In some embodiments, instructions executed by and/or data structures stored in modules within mixed reality computing architecture 8400 may communicate with other components of mixed reality computing architecture 8400 (e.g., with instructions executed by and/or data structures stored in other modules).

In some embodiments, mixed reality computing architecture 8400 may include one or more modules and the one or more modules may include one or more sub-modules. In some embodiments, a sub-module can include one or more computer systems configured to execute instructions and/or store one or more data structures. For example, instructions executed by a sub-module can be a process and/or sub-process running within mixed reality computing architecture 8400. In some embodiments, instructions executed by a sub-module can be a thread running within mixed reality computing architecture 8400. In some embodiments, instructions executed by a sub-module may run within the same process address space and/or memory space as other components of mixed reality computing architecture 8400. In some embodiments, instructions executed by a sub-module may run in a different process address space and/or memory space as other components of mixed reality computing architecture 8400. In some embodiments, instructions executed by a sub-module may run on different hardware than other components of mixed reality computing architecture 8400. For example, instructions executed by one or more sub-modules of mixed reality computing architecture 8400 may run on an audio-specific processor (e.g., a DSP), while other components of mixed reality computing architecture 8400 may run on a general-purpose processor. In some embodiments, instructions executed by one or more sub-modules of mixed reality computing architecture 8400 may be instantiated within mixed reality computing architecture 8400. In some embodiments, instructions executed by and/or data structures stored in sub-modules within mixed reality computing architecture 8400 may communicate with other components of mixed reality computing architecture 8400 (e.g., with instructions executed by and/or data structures stored in other modules).

In some embodiments, instructions executed by wearable software module 8402 may run on a mixed reality system (e.g., MR system 112, 200). In some embodiments, instructions executed by wearable software module 8402 may run on a component of a mixed reality system (e.g., a head-wearable device of a mixed reality system). Instructions executed by wearable software module 8402 may include functions where low latency is beneficial. For example, instructions executed by wearable software module 8402 can include tracking sub-module 8406. In some embodiments, tracking sub-module 8406 can track real and/or virtual objects used to produce a mixed reality experience. For example, tracking sub-module 8406 can track head pose, which may include a position and/or orientation of a user's head. Head pose can be used to determine what virtual objects should be presented to a user (e.g., because only virtual objects located in a real location within a user's field of view should be presented). In some embodiments, estimating head pose exclusively remotely (e.g., at a remote server) may yield a latency between when a user turns and when a mixed reality system has determined that the field of view has shifted. It can be disconcerting for a user to turn and have a new virtual object appear 100 ms after they should have already seen it. In some embodiments, head pose can be preliminarily determined locally at a mixed reality headset and optimized using remote computations. For example, head pose data (e.g., images captured by a camera mounted on a head-wearable device and/or inertial measurement unit data) can be sent to cloud module 8410. In some embodiments, instructions executed by cloud module 8410 can run on a remote server (e.g., remote operational server 5702). For example, cloud module 8410 can include data management module 8410. In some embodiments, data management module 8410 can manage complex computations (e.g., training of neural networks and/or SLAM optimizations). In some embodiments, cloud module 8410 can include integration sub-module 8414. Integration sub-module 8414 may manage connections between servers and/or databases (e.g., other computing systems within an intranet and/or within the internet).

Other functions, for example, functions executed by rapid target acquisition sub-module 8408 can also be run on a mixed reality system. In some embodiments, it can be beneficial for mixed reality system to quickly display target acquisition visuals (e.g., outlining a target in red) with low latency, especially if the user is rapidly changing field of view. A rapidly changing field of view can result in targets quickly moving in out and out of sight, and it can be very desirable for a mixed reality system to recognize and/or visually display target indications to a user. In some embodiments, instructions executed by rapid target acquisition sub-module 8408 can be optimized by computations performed remotely. For example, a deep convolutional neural network may be trained at a remote server, and the trained model can be deployed to and run on rapid target acquisition sub-module 8408.

Figure 94:
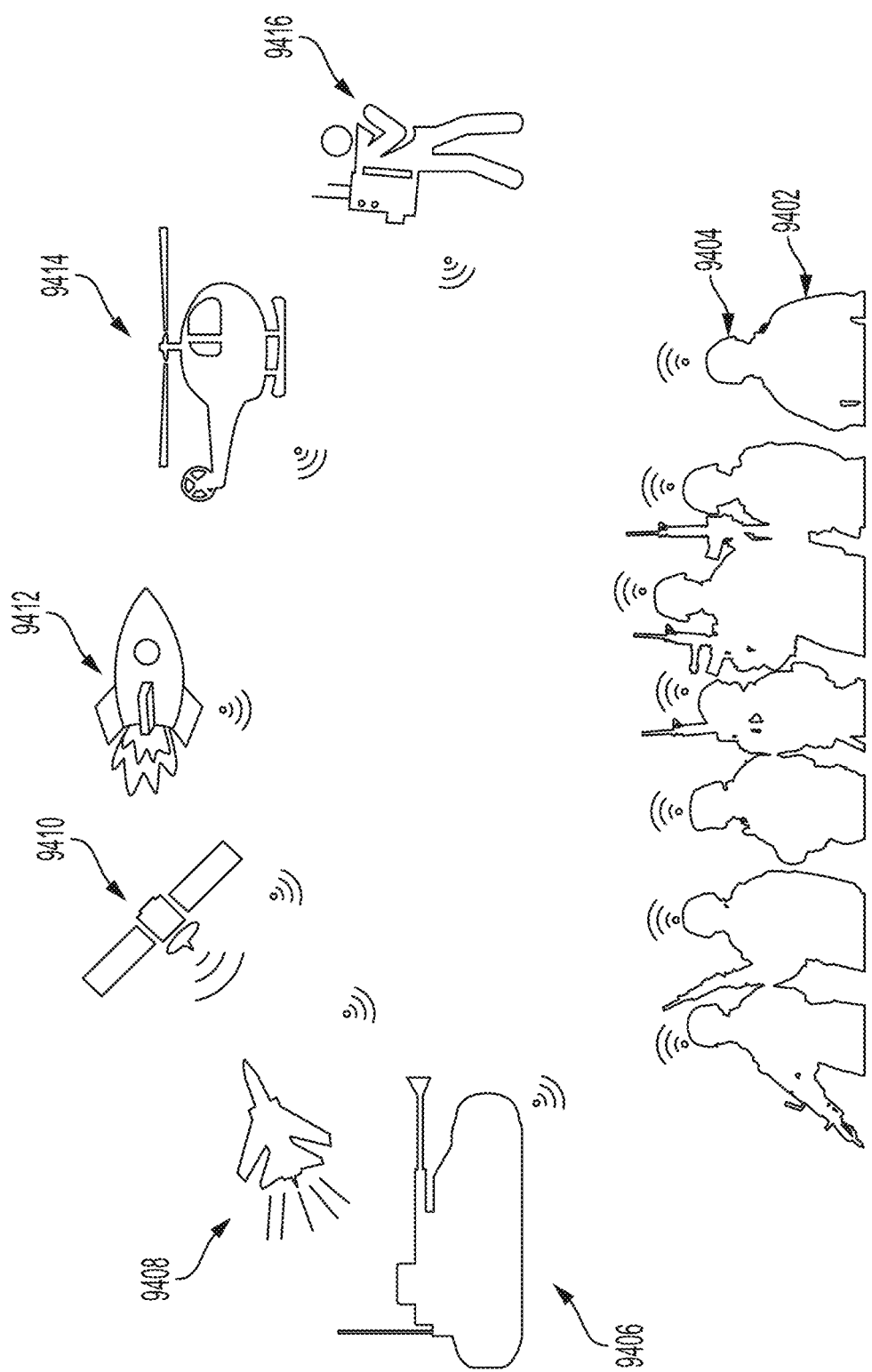
FIG. 94 illustrates an example mixed reality computing architecture, according to some embodiments.

In some embodiments, it can be beneficial to run instructions executed by OS sub-module 8404 on a mixed reality system. In some embodiments, OS sub-module 8404 can execute instructions related to basic operating system functionality (e.g., drivers, services, etc.) In some embodiments, OS sub-module 8404 can allow mixed reality system 112, 200 to function as a computing system and may allow a mixed reality system to run applications. In some embodiments, FIG. 94 illustrates an exemplary network and/or computing architecture, according to some embodiments. In some embodiments, data can be transmitted by one or more mixed reality systems 9404 worn by soldier 9402. In some embodiments, it may not be feasible for a mixed reality system 9404 to communicate with a remote server (e.g., because there is no cellular network connection available). In some embodiments, a large scale mixed reality application can take advantage of a decentralized network (e.g., an ad hoc and/or peer-to-peer network) to facilitate communications between components of the large scale system. For example, individual mixed reality systems may transmit data (e.g., wirelessly using Bluetooth, WiFi, 5G, and/or other radiofrequency communications) to a nearby vehicle 9406. In some embodiments, vehicle 9406 can include a communications array that may be more powerful than a communications array in mixed reality system 9404. In some embodiments, vehicle 9406 can relay and/or transmit data to aircraft 9408 and/or aircraft 9414 which may be passing within communications range. In some embodiments, aircraft 9408 and/or aircraft 9414 can relay and/or transmit data to satellite 9410. In some embodiments, satellite 9410 can rely and/or transmit data to a remote server and/or to spacecraft 9412. In some embodiments, data can be transmitted and/or relayed to communications array 9416 which may be portable enough to be mounted on a soldier (e.g., a communications officer). It is contemplated that any combination of components may communicate with other components bidirectionally (e.g., 2-way communication).

In some embodiments, an ad hoc and/or mesh network may effectively transmit data from mixed reality systems where a network infrastructure may sufficiently meet the needs of a large scale mixed reality application. In some embodiments, ad hoc and/or mesh communication can be suited for latency-agnostic transmissions, for example, SLAM optimizations, neural network training, mapping/navigation, non-live communication (e.g., messages), etc. In some embodiments, ad hoc and/or mesh communication may produce latency that hinders latency-sensitive transmissions, for example, graphical and/or audio rendering, preliminary SLAM computations, voice command processing, eye tracking, etc.

Figure 95:
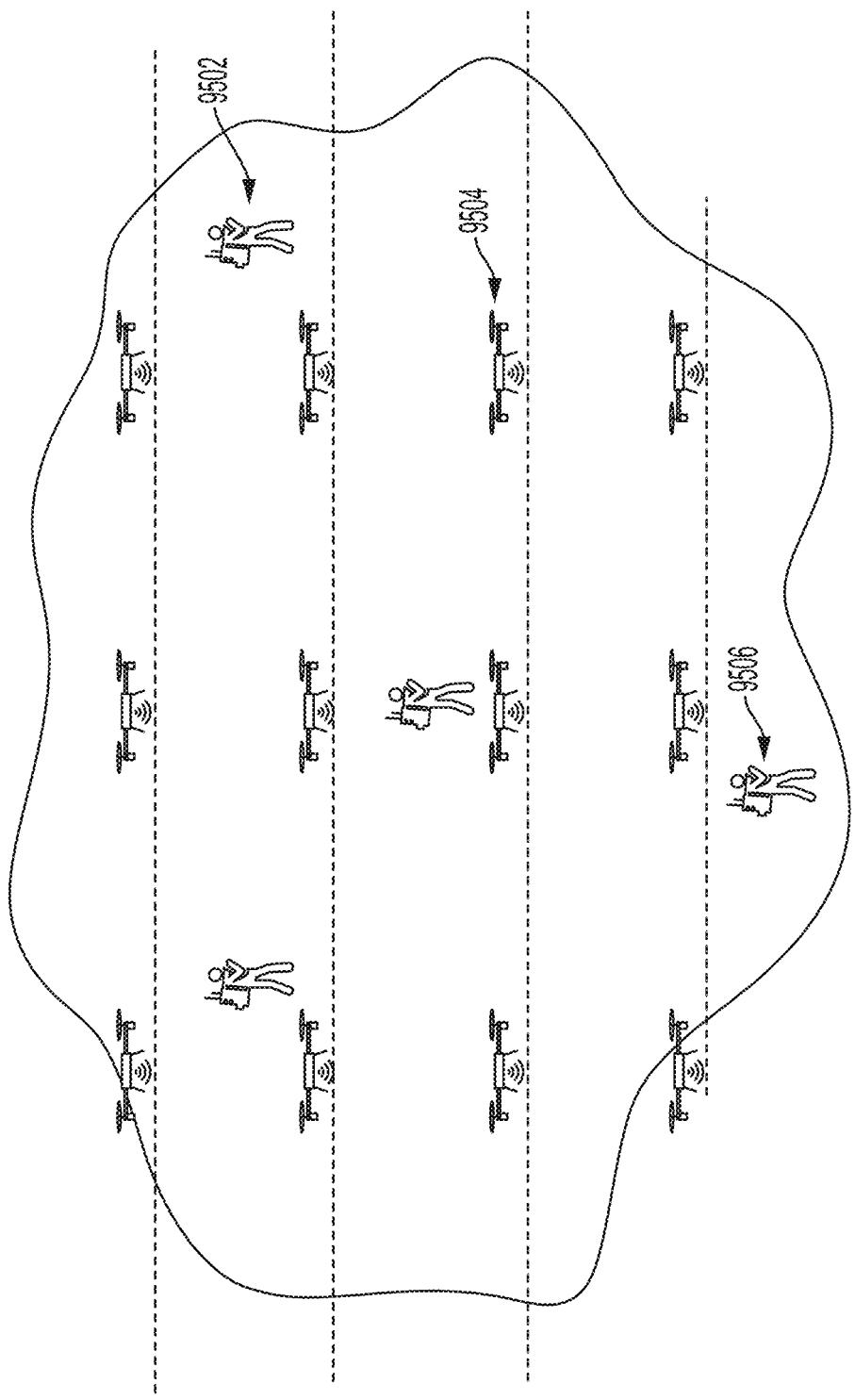
FIG. 95 illustrates an example mixed reality computing architecture, according to some embodiments.

FIG. 95 illustrates an exemplary network and/or computing architecture, according to some embodiments. In some embodiments, communications array 9502 (which may be coupled to one or more mixed reality systems) may communicate with one or more drones 9504. In some embodiments, one or more drones 9504 can form a network (e.g., a mesh network and/or an ad hoc network), which may facilitate communications between one or more mixed reality systems and/or one or more remote computing systems (e.g., a remote server). For example, communications array 9502 may not be able to communicate with communications array 9506 directly, but may be able to communicate with communications array 9506 via one or more drones 9504 (e.g., via relaying the data across multiple drones and/or via a mesh network).

Figure 96:
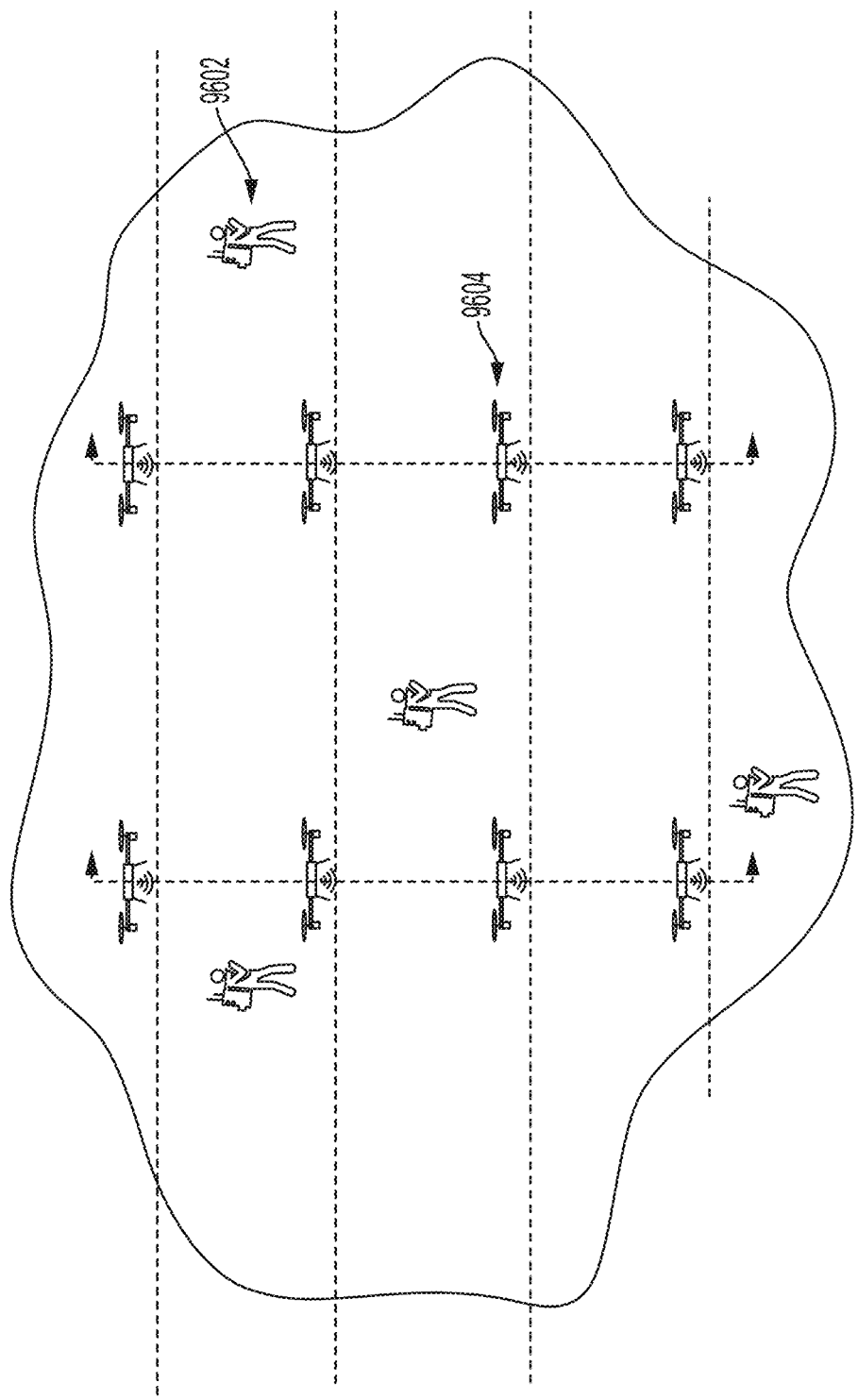
FIG. 96 illustrates an example mixed reality computing architecture, according to some embodiments.
Figure 97:
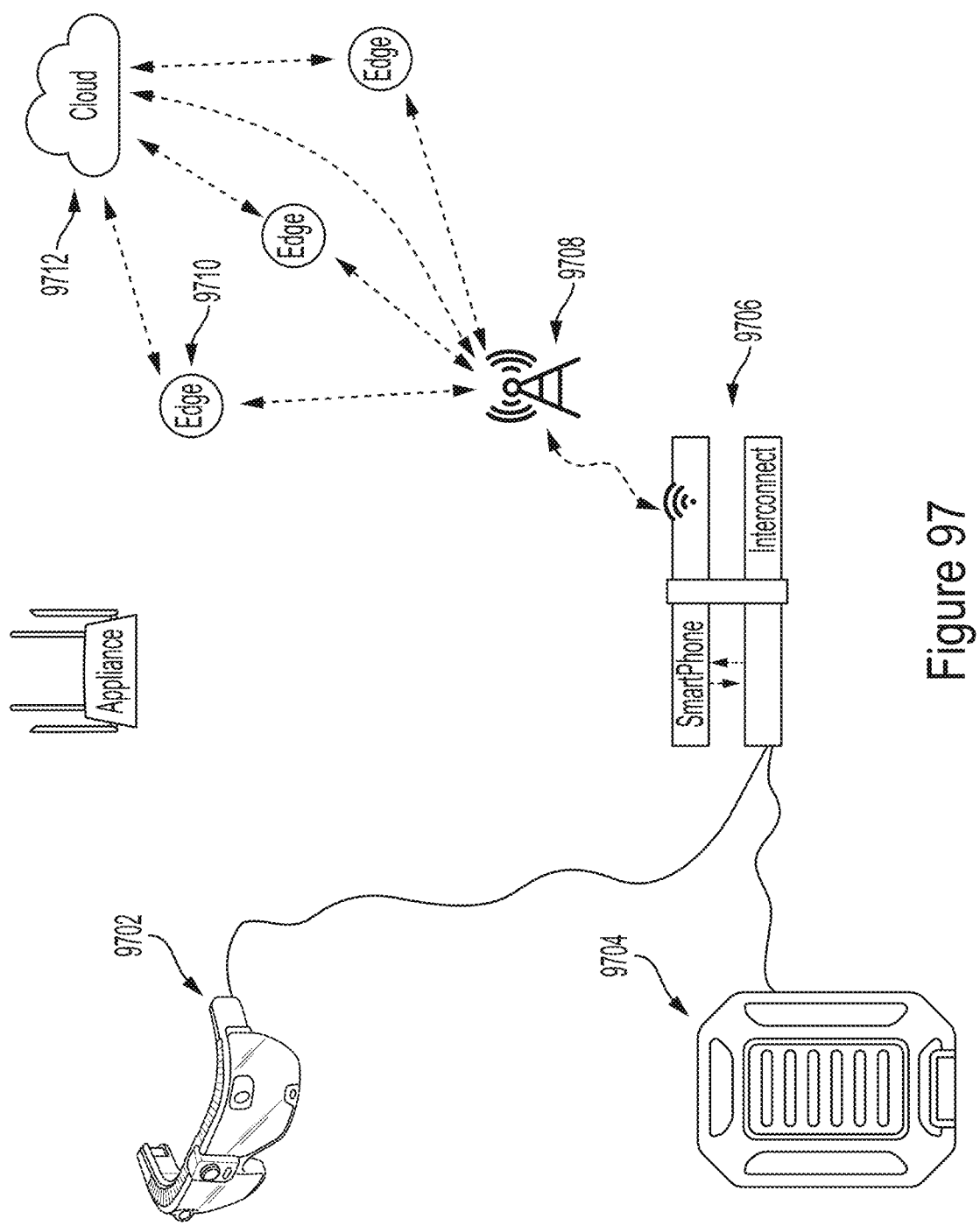
FIG. 97 illustrates an example mixed reality computing architecture, according to some embodiments.

FIG. 96 illustrates an exemplary network and/or computing architecture, according to some embodiments. In some embodiments, communications array 9602 can be mounted on a soldier who may be moving. One or more drones 9604 can form a network (e.g., a mesh network and/or an ad hoc network), which may facilitate communications between one or more mixed reality systems and/or one or more remote computing systems (e.g., a remote server). In some embodiments, a network formed by one or more drones 9604 can be mobile by virtue of the one or more drones 9604 moving along with communications array 9602. In some embodiments, one or more drones 9604 can fly in a predetermined pattern according to expected troop movement. In some embodiments, one or more drones 9604 can be configured to follow a soldier with a mounted communications array 9602. In some embodiments, one or more drones 9604 can be configured to maintain static and/or dynamic spacing between other drones (e.g., spacing can vary according to troop density, combat dangers, network reach, etc.).

FIGS. 97-102 illustrate exemplary network and/or computing architectures, according to some embodiments. In some embodiments, wearable component 9702 can correspond to wearable component 2 depicted in FIG. 6. In some embodiments, belt pack 9704 can correspond to belt pack 6 depicted in FIG. 7. In some embodiments, wearable component 9702 and/or belt pack 9704 can correspond to MR systems 112, 200. In some embodiments, wearable component 9702 and/or belt pack 9704 can connect (e.g., through a wired and/or wireless connection) to communications unit 9706. In some embodiments, communications unit 9706 can include a mobile device (e.g., a smart phone). In some embodiments, a mobile device may be configured to supply additional processing and/or communications abilities. For examples, a mobile device may include its own processor, which may be configured to execute computations. In some embodiments, a mobile device can be configured to act as an interface between a mixed reality system and other computing systems (e.g., accessories, sensors, other mixed reality systems, and/or remote servers). In some embodiments, a mobile device can include a radio frequency antenna and/or network modem configured to communicate with one or more cellular towers. The mobile device may act as a relay to transmit information from a mixed reality system to other computing devices (e.g., a remote server).

In some embodiments, communications unit 9706 can include an interconnect pack. In some embodiments, an interconnect pack can include a powerful antenna (e.g., a radiofrequency antenna) and/or transceiver. In some embodiments, an interconnect pack can be capable of high bandwidth transmissions. For example, an interconnect pack can be configured to communicate with wearable component 9702 and/or belt pack 9704. In some embodiments, an interconnect pack can be configured to receive all or a portion of all data captured by wearable component 9702 and/or belt pack 9704 (e.g., a video feed, depth information, SLAM data, an audio feed, vitals information, etc.). In some embodiments, an interconnect pack can be subject to less constraints than other electronic devices. For example, a smartphone may be subject to power and/or transmission limitations because a smartphone may be configured to be used near a user's head. In some embodiments, an interconnect pack may be configured to be used away from a user and/or sensitive parts of a user. In some embodiments, an interconnect pack can be coupled (e.g., through wired and/or wireless means) to a mobile device. In some embodiments, one or more mixed reality systems can be coupled to an interconnect pack, and the interconnect pack can be configured to communicate with other computing systems.

In some embodiments, communications unit 9706 can communicate with other computing systems. For example, communications unit 9706 can communicate with intermediary transceiver 9708. In some embodiments, intermediary transceiver 9708 can be a cellular tower. In some embodiments, intermediary transceiver 9708 can be a communications array mounted on a soldier. In some embodiments, intermediary transceiver 9708 can transmit information to one or more cloud servers 9712. In some embodiments, intermediary transceiver 9708 can transmit information directly to one or more cloud servers. In some embodiments, intermediary transceiver 9708 can transmit information via one or more edge nodes 9710. Edge nodes 9710 can be network devices that are decentralized and/or located physically near intermediary transceiver 9708. For example, a mixed reality system can be an edge node, a mobile device can be an edge node, a wireless access point can be an edge node, a communications array mounted on a soldier can be an edge node, etc. Physical proximity can reduce communication latency, which can be important for a variety of mixed reality functions, including SLAM computations, object recognition, voice recognition, etc.

Figure 98:
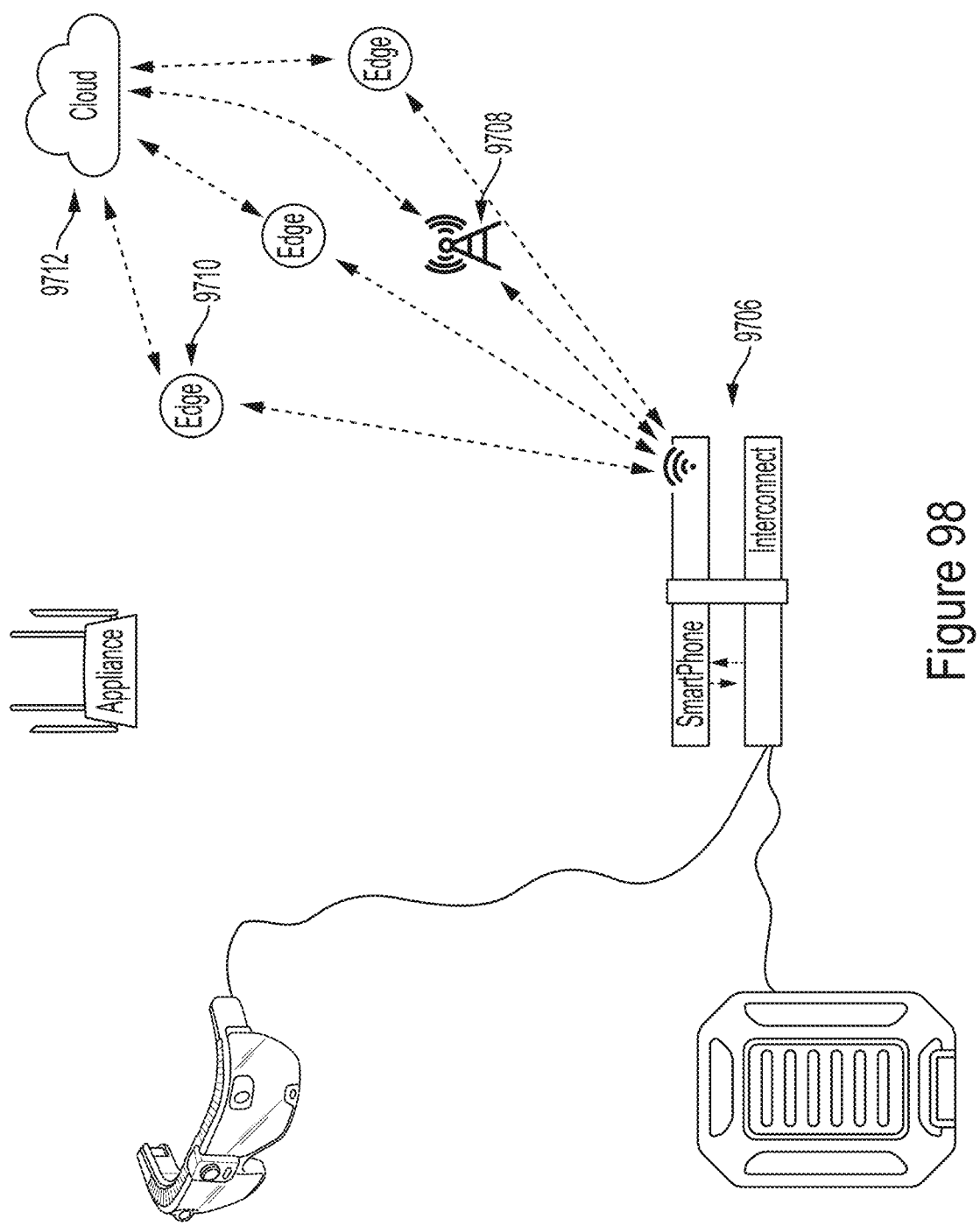
FIG. 98 illustrates an example mixed reality computing architecture, according to some embodiments.
Figure 99:
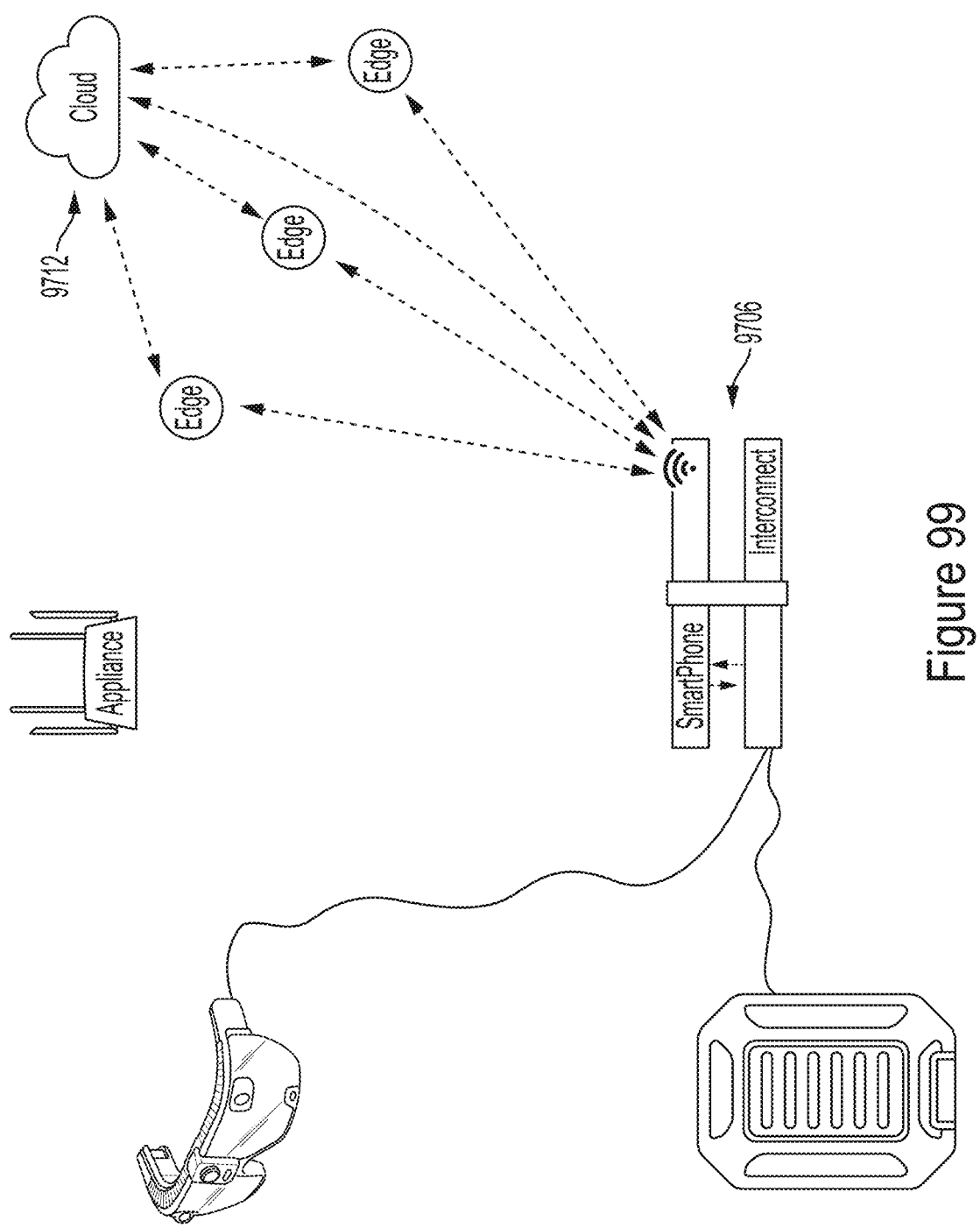
FIG. 99 illustrates an example mixed reality computing architecture, according to some embodiments.
Figure 100:
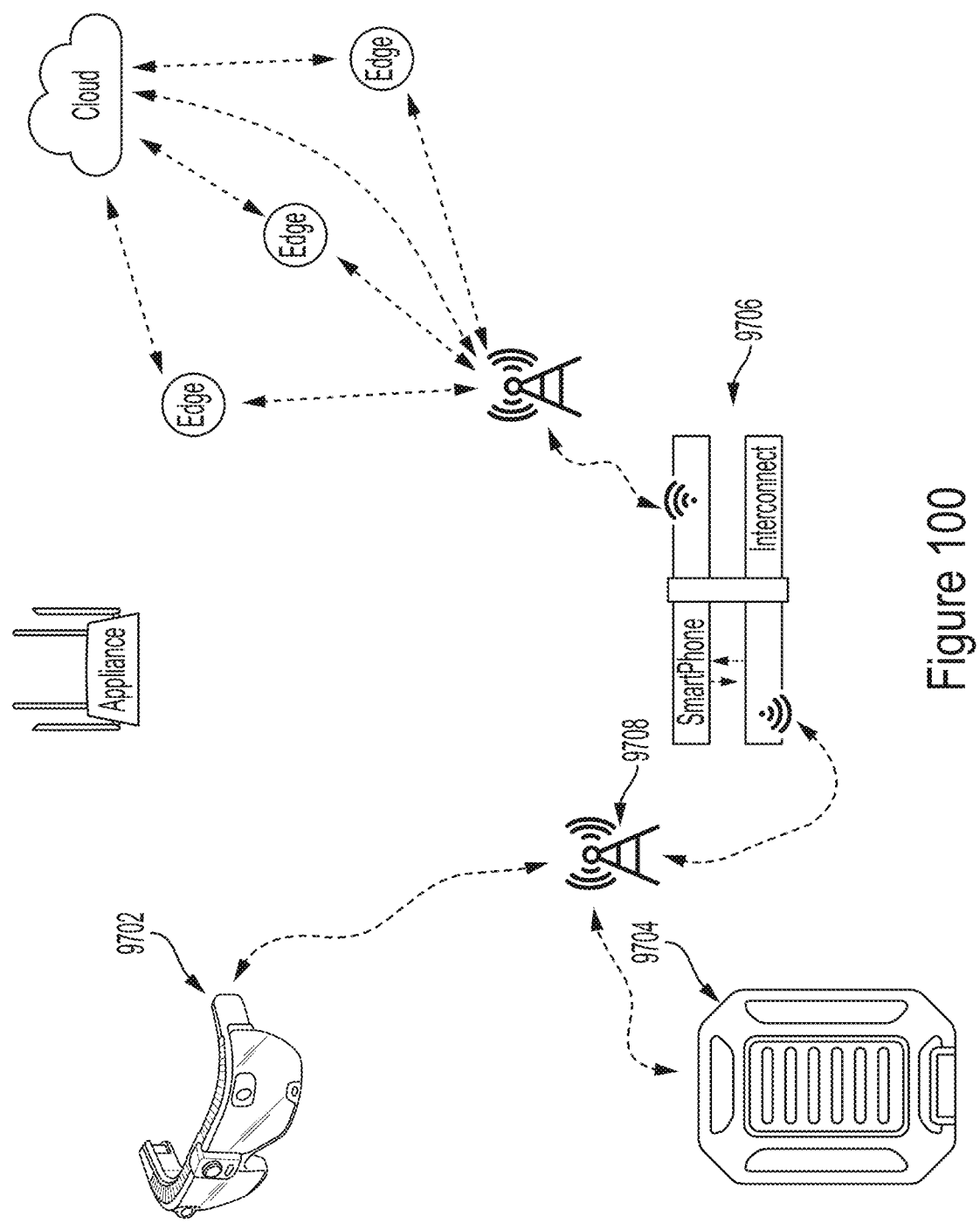
FIG. 100 illustrates an example mixed reality computing architecture, according to some embodiments.
Figure 101:
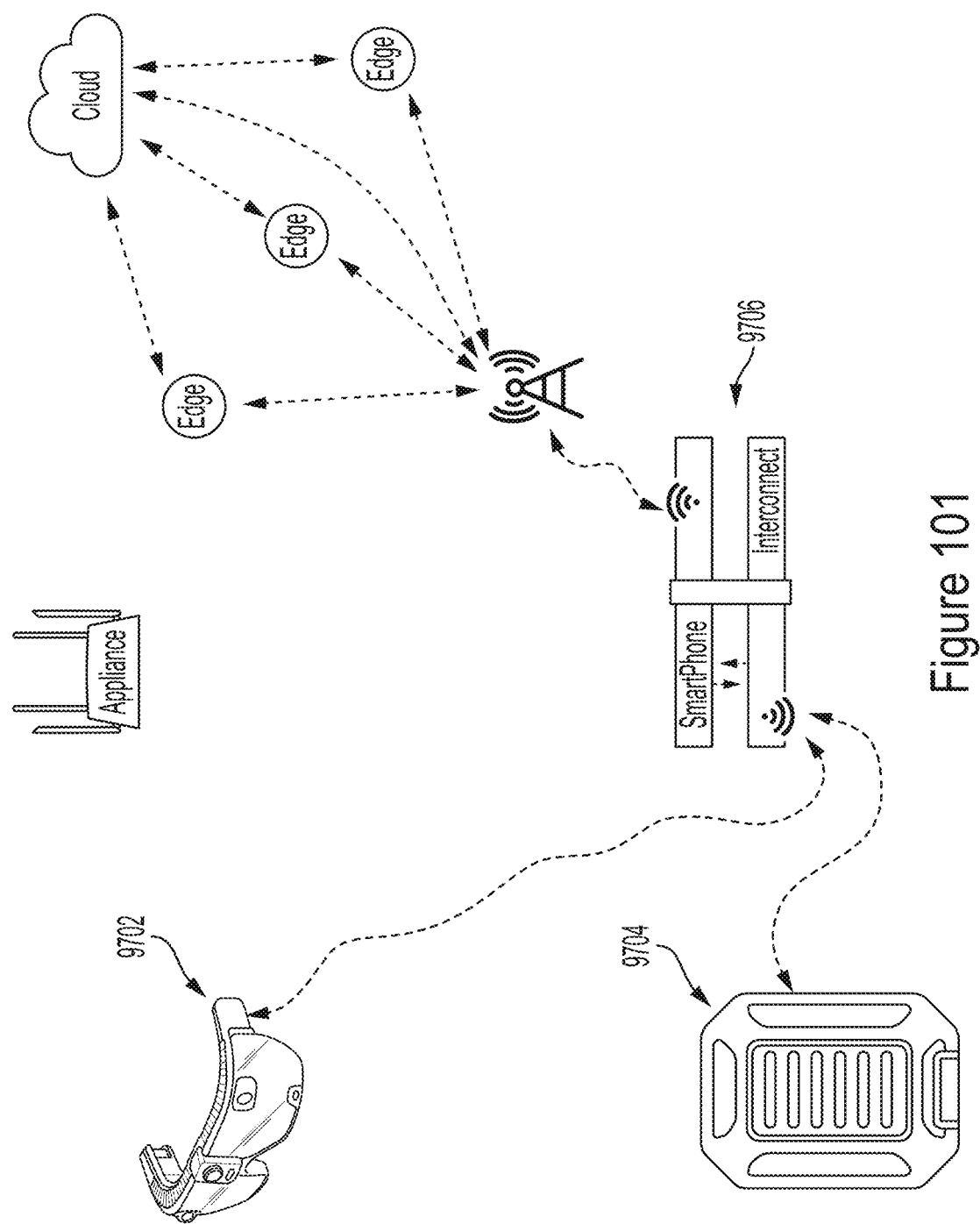
FIG. 101 illustrates an example mixed reality computing architecture, according to some embodiments.
Figure 102:
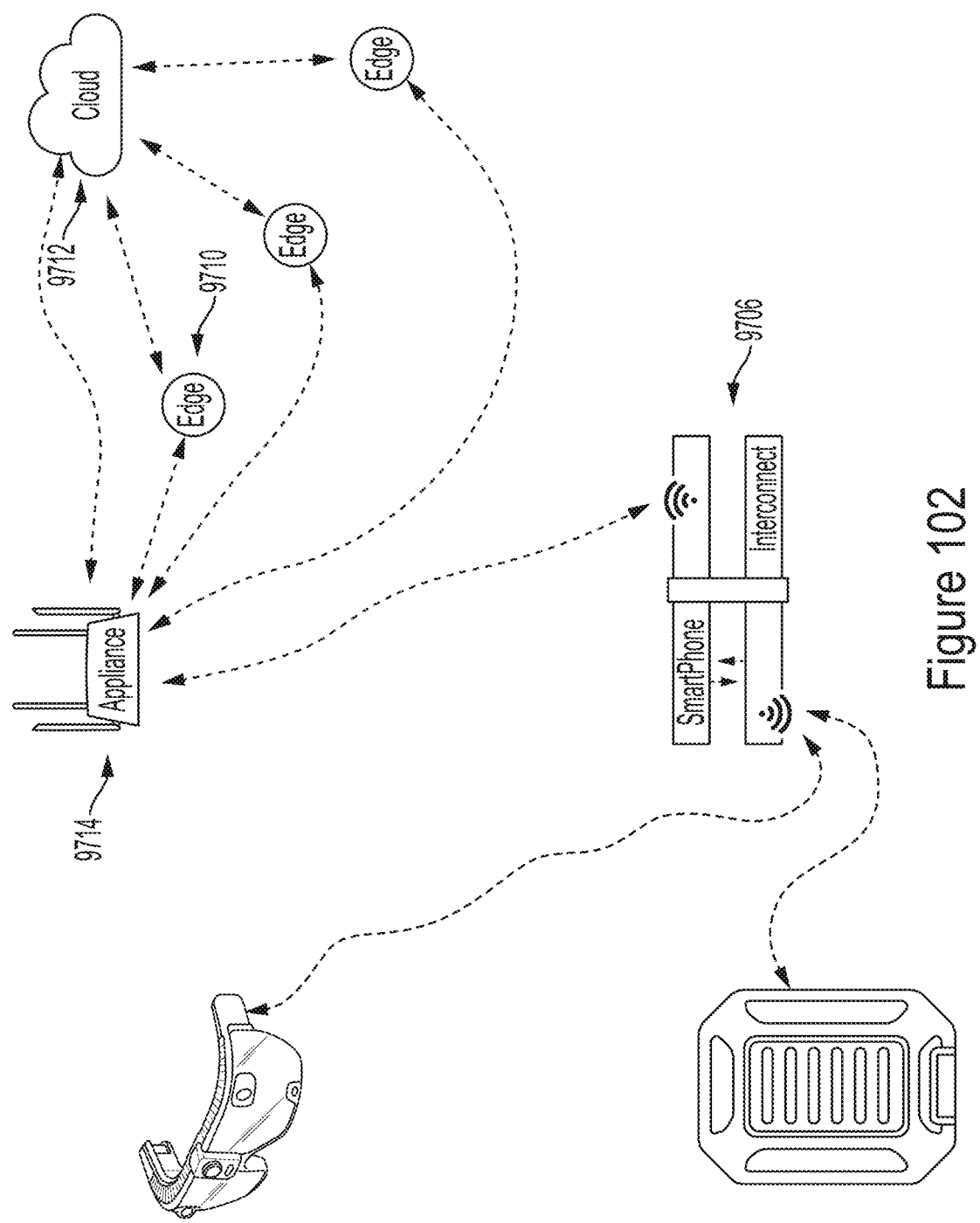
FIG. 102 illustrates an example mixed reality computing architecture, according to some embodiments.

FIG. 98 depicts an exemplary embodiment of mixed reality network communications. In some embodiments, communications unit 9706 can communicate directly with one or more edge nodes 9710. FIG. 99 depicts an exemplary embodiment of mixed reality network communications. In some embodiments, communications 9706 can communicate directly with one or more cloud servers 9712. FIG. 100 depicts an exemplary embodiment of mixed reality network communications. In some embodiments, wearable component 9702 and/or belt pack 9704 can communicate with communications unit 9706 via intermediary transceiver 9708. FIG. 101 depicts an exemplary embodiment of mixed reality network communications. In some embodiments, wearable component 9702 and/or belt pack 9704 can communicate with communications unit 9706 wirelessly (e.g., via Bluetooth, WiFi, 5G, and/or other radiofrequency communications). FIG. 102 depicts an exemplary embodiment of mixed reality network communications. In some embodiments, communications unit 9706 can communicate with one or more connectivity appliances 9714. In some embodiments, connectivity appliance 9714 can be a connected resource that has very good local connectivity. For example, an enterprise might have a connectivity appliance 9714 in each room. In some embodiments, connectivity appliance 9714 may have storage capabilities, be managed by local IT, etc. For example, in one embodiment, each connectivity appliance may have not only very good connectivity to pipe out of a building, but also store one or more high resolution meshes of a particular room (e.g., one or more meshes captured/refreshed by mixed reality systems in the area during the previous day).

Figure 103:
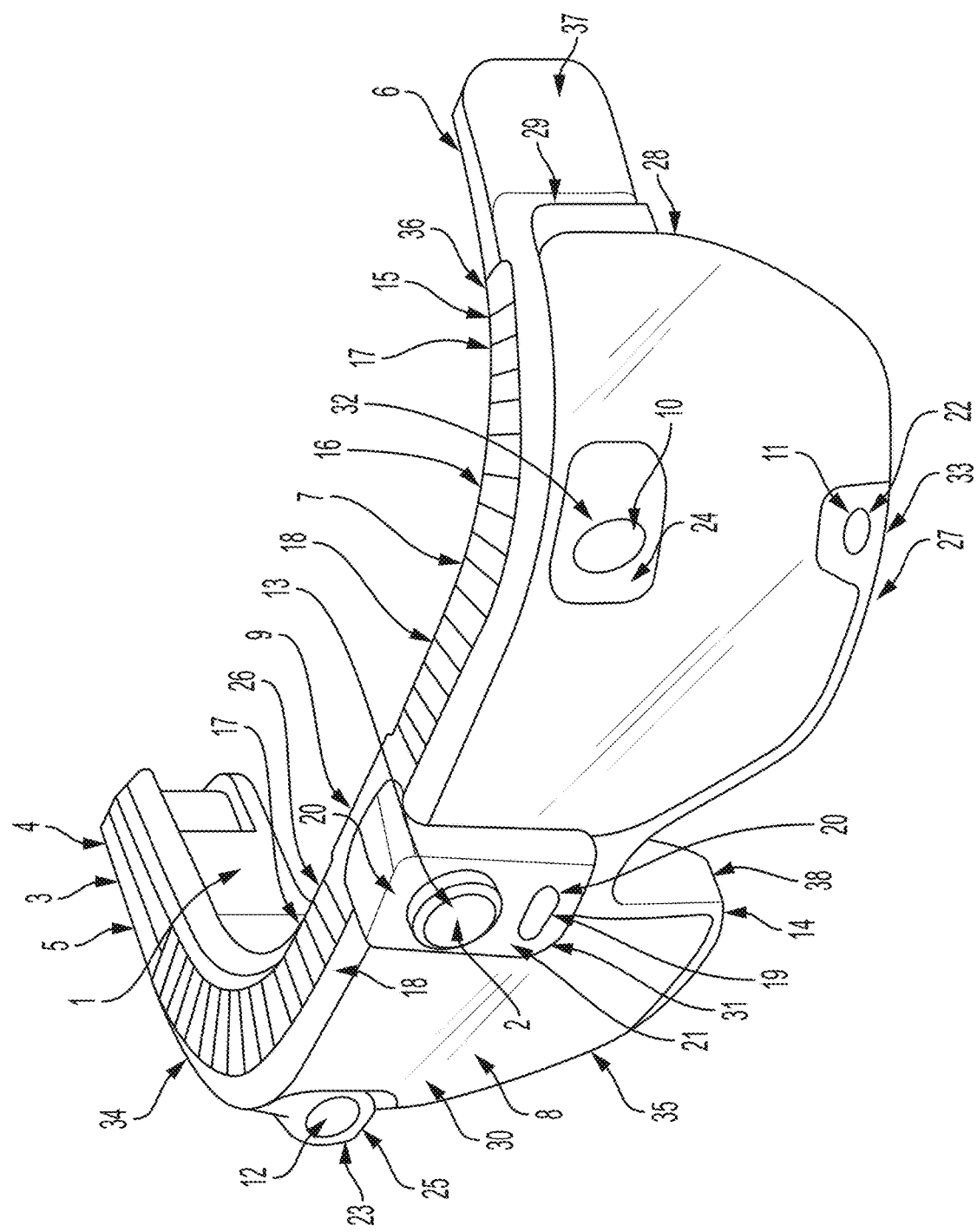
FIG. 103 illustrates an example head-wearable component of mixed reality systems, according to some embodiments.

FIG. 103 depicts an exemplary wearable component, which may correspond with an exemplary wearable component depicted in FIG. 6. In some embodiments, the wearable component can include electromagnetic sensor 1, light field camera 2, Bluetooth antenna 3, WiMax antenna 4, WiFi antenna 5, 4G/LTE antenna 6, active cooling fan 7, variable focal element 8, thermocouple 9, inertial measurement unit 10, visible RGB/monochrome camera 11, near infrared camera 12, long wave infrared camera 13, short wave infrared camera 14, infrared eye tracking cameras 15, neuromorphic differential sensors 16, thermistor 17, 5G antenna 18, deflection sensor 19, hemisphere camera 20, time of flight depth sensor 21, LIDAR sensor 22, structured light depth sensor 23, global dynamic dimmer 24, localized dynamic dimmer 25, refractive free form optics 26, diffractive lens optics 27, MEMS scanner single source 28, MEMS scanner dual source 29, digital hologram display 30, photodiode 31, CCD sensor 32, CMOS sensor 33, electron bombarded active pixel sensor 34, hybrid dynamic vision visible light sensor 35, internal interferometer 36, active noise canceling device 37, and/or microphone array 38.

Figure 104:
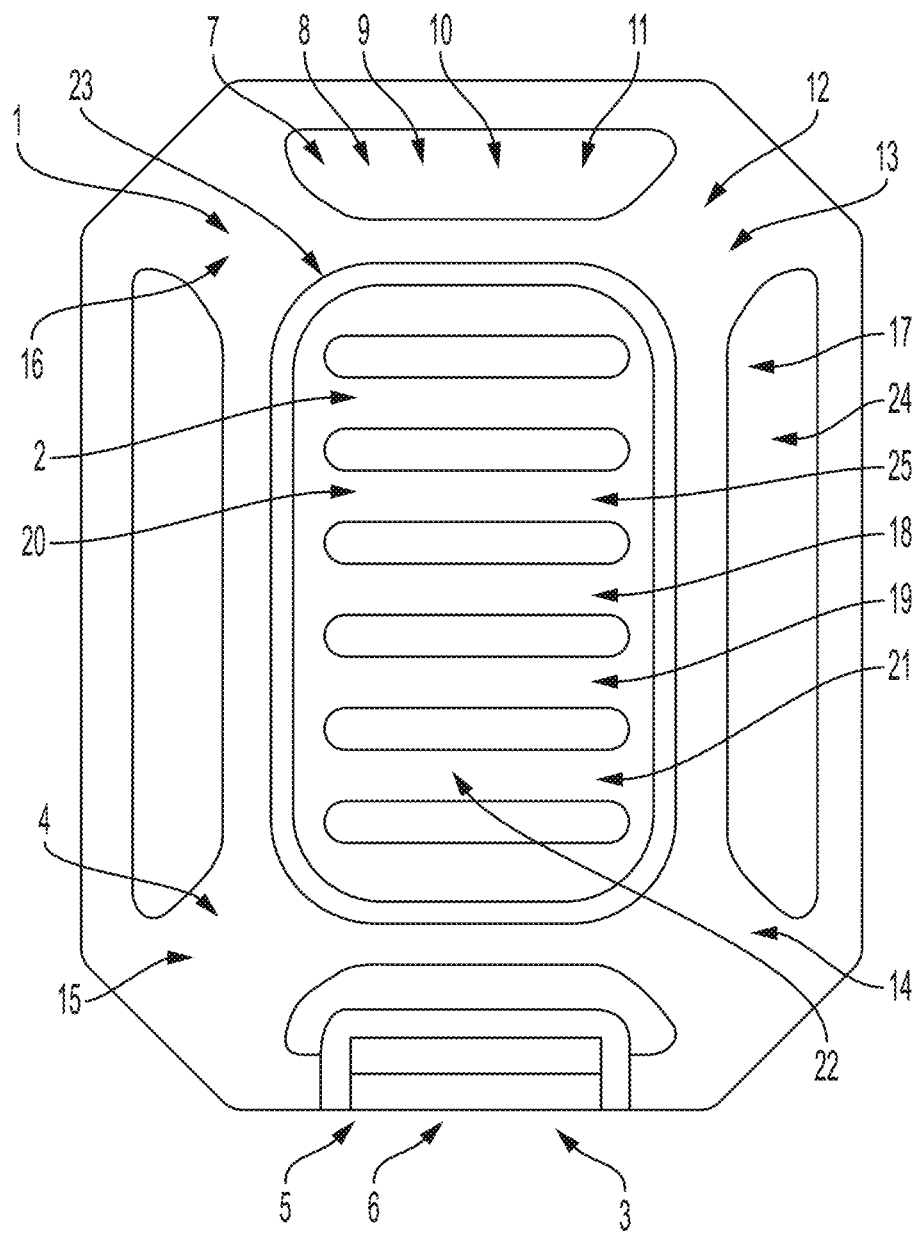
FIG. 104 illustrates an example wearable pack component of mixed reality systems.

FIG. 104 depicts an exemplary belt pack component, which may correspond with an exemplary belt pack component depicted in FIG. 7. In some embodiments, the belt pack component can include near field fingerprint reader 1, multi-purpose external connector 2, HDMI port 3, display port 4, short wave infrared camera 5, 5G antenna 6, WiFi antenna 7, internal Qi charger 8, USB-C connector 9, USB-A (version 2 and/or 3) connector 10, light field camera 11, 4G antenna 12, ultra wide band antenna 13, visible RGB and/or monochrome camera 14, Bluetooth camera 15, WiMax antenna 16, internal battery 17, internal memory 18, internal computation 19, long wave infrared camera 20, LCD touch panel 21, internal thermocouple 22, internal GPU 23, internal electromagnetic sensor 24, and/or near infrared camera 25.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. For example, while some embodiments are described with respect to military or emergency services applications, other suitable applications will be understood by the skilled artisan to be within the scope of the disclosure. In addition, many modifications may be made to adapt a particular situation, material, composition of matter, process, process act(s) or step(s) to the objective(s), spirit or scope of the present invention. Further, it will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method comprising:
receiving, at a server remote to a wearable head device, an image captured via a camera of the wearable head device;
receiving, at the server, an estimated orientation of a handheld device in communication with the wearable head device, the estimated orientation determined by the wearable head device;
in response to receiving the image and the estimated orientation, training a neural network based on the image to produce a trained neural network; and
transmitting the trained neural network to the wearable head device.

2. The method of claim 1, wherein receiving the image at the server comprises receiving the image via an intermediary relay.

3. The method of claim 2, wherein the intermediary relay comprises a drone network.

4. The method of claim 2, wherein:
the intermediary relay comprises a communications array, and
the communications array is mountable on a person.

5. The method of claim 2, wherein the intermediary relay comprises a second wearable head device.

6. The method of claim 2, wherein the intermediary relay comprises a cellular tower.

7. A system comprising:
a server that is remote to a wearable head device, the wearable head device comprising a camera; and
one or more processors configured to execute a method comprising:
receiving, at the server, an image captured via the camera of the wearable head device;
receiving, at the server, an estimated orientation of a handheld device in communication with the wearable head device, the estimated orientation determined by the wearable head device;
in response to receiving the image and the estimated orientation, training a neural network based on the image to produce a trained neural network; and
transmitting the trained neural network to the wearable head device.

8. The system of claim 7, wherein receiving the image at the server comprises receiving the image via an intermediary relay.

9. The system of claim 8, wherein the intermediary relay comprises a drone network.

10. The system of claim 8, wherein:
the intermediary relay comprises a communications array, and
the communications array is mountable on a person.

11. The system of claim 8, wherein the intermediary relay comprises a second wearable head device.

12. The system of claim 8, wherein the intermediary relay comprises a cellular tower.

13. A non-transitory computer-readable medium storing instructions that, when executed by one or more processors, cause the one or more processors to execute a method comprising:
receiving, at a server remote to a wearable head device, an image captured via a camera of the wearable head device;
receiving, at the server, an estimated orientation of a handheld device in communication with the wearable head device, the estimated orientation determined by the wearable head device;
in response to receiving the image and the estimated orientation, training a neural network based on the image to produce a trained neural network; and
transmitting the trained neural network to the wearable head device.

14. The non-transitory computer-readable medium of claim 13, wherein receiving the image at the server comprises receiving the image via an intermediary relay.

15. The non-transitory computer-readable medium of claim 14, wherein the intermediary relay comprises a drone network.

16. The non-transitory computer-readable medium of claim 14, wherein:
the intermediary relay comprises a communications array, and
the communications array is mountable on a person.

17. The non-transitory computer-readable medium of claim 14, wherein the intermediary relay comprises a second wearable head device.

18. The non-transitory computer-readable medium of claim 14, wherein the intermediary relay comprises a cellular tower.

* * * * *